United States Patent
Zhang et al.

(10) Patent No.: US 10,397,039 B2
(45) Date of Patent: Aug. 27, 2019

(54) APPARATUS, SYSTEMS AND METHODS FOR FALL-DOWN DETECTION BASED ON A WIRELESS SIGNAL

(71) Applicant: ORIGIN WIRELESS, INC., Greenbelt, MD (US)

(72) Inventors: Feng Zhang, Greenbelt, MD (US); Chen Chen, Burlingame, CA (US); Qinyi Xu, College Park, MD (US); Beibei Wang, Clarksville, MD (US); Chenshu Wu, Greenbelt, MD (US); Hangfang Zhang, Greenbelt, MD (US); Chau-Wai Wong, Raleigh, NC (US); David N. Claffey, Somerville, MA (US); Chun-I Chen, Brookeville, MD (US); Hung-Quoc Duc Lai, Parkville, MD (US); Zhung-Han Wu, College Park, MD (US); Min Wu, Clarksville, MD (US); Yi Han, Ellicott City, MD (US); Oscar Chi-Lim Au, San Jose, CA (US); K. J. Ray Liu, Potomac, MD (US)

(73) Assignee: ORIGIN WIRELESS, INC., Greenbelt, MD (US)

( * ) Notice: Subject to any disclaimer, the term of this patent is extended or adjusted under 35 U.S.C. 154(b) by 0 days.

(21) Appl. No.: 16/203,317

(22) Filed: Nov. 28, 2018

(65) Prior Publication Data

US 2019/0158340 A1 May 23, 2019

Related U.S. Application Data

(63) Continuation-in-part of application No. 15/326,112, filed as application No. PCT/US2015/041037 on Jul.
(Continued)

(51) Int. Cl.
*H04L 27/38* (2006.01)
*H04L 27/36* (2006.01)
(Continued)

(52) U.S. Cl.
CPC ............ *H04L 27/362* (2013.01); *H04B 1/38* (2013.01); *H04W 72/0413* (2013.01)

(58) Field of Classification Search
CPC ..... H04L 27/362; H04B 1/38; H04W 72/0413
See application file for complete search history.

(56) References Cited

U.S. PATENT DOCUMENTS

| | | | | |
|---|---|---|---|---|
| 2007/0072544 A1* | 3/2007 | Kim | ..................... | G08G 1/205 455/3.06 |
| 2010/0312432 A1* | 12/2010 | Hamada | ................ | G08G 1/163 701/31.4 |
| 2014/0206977 A1* | 7/2014 | Bahney | ............... | A61B 5/6833 600/391 |

* cited by examiner

Primary Examiner — Siu M Lee
(74) Attorney, Agent, or Firm — Yingxin Xiao

(57) ABSTRACT

Apparatus, systems and methods for detecting and monitoring fall-down actions and other transient motions are disclosed. In one example, a system for monitoring a transient motion in a venue is disclosed. The system comprises a transmitter, a receiver, and a transient motion monitor. The transmitter is located at a first position in the venue for transmitting a wireless signal through a wireless multipath channel impacted by the transient motion of an object in the venue. The receiver is located at a second position in the venue for: receiving the wireless signal through the wireless multipath channel, and obtaining a time series of channel information (CI) of the wireless multipath channel based on the wireless signal. The transient motion monitor is configured for: monitoring the transient motion based on the time series of CI, and triggering a response action based on the monitored transient motion.

30 Claims, 29 Drawing Sheets

Related U.S. Application Data 17, 2015, which is a continuation-in-part of application No. 14/605,611, filed on Jan. 26, 2015, now Pat. No. 10,168,414, application No. 16/203,317, which is a continuation-in-part of application No. 15/584,052, filed on May 2, 2017, and a continuation-in-part of application No. 15/434,813, filed on Feb. 16, 2017, now Pat. No. 10,129,862, and a continuation-in-part of application No. PCT/US2017/021963, filed on Mar. 10, 2017, and a continuation-in-part of application No. PCT/US2017/021957, filed on Mar. 10, 2017, and a continuation-in-part of application No. PCT/US2017/027131, filed on Apr. 12, 2017, and a continuation-in-part of application No. 15/384,217, filed on Dec. 19, 2016, which is a continuation-in-part of application No. 13/706,342, filed on Dec. 5, 2012, now Pat. No. 9,883,511, and a continuation-in-part of application No. 13/969,271, filed on Aug. 16, 2013, now Pat. No. 9,882,675, and a continuation-in-part of application No. 13/969,320, filed on Aug. 16, 2013, now Pat. No. 9,559,874, and a continuation-in-part of application No. 15/041,677, filed on Feb. 11, 2016, now Pat. No. 9,794,156, and a continuation-in-part of application No. 15/200,430, filed on Jul. 1, 2016, now Pat. No. 9,736,002, which is a continuation of application No. 14/262,153, filed on Apr. 25, 2014, now Pat. No. 9,407,306, application No. 15/384,217, filed on Dec. 19, 2016, which is a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 14/605,611, filed on Jan. 26, 2015, now Pat. No. 10,168,414, and a continuation-in-part of application No. 14/615,984, filed on Feb. 6, 2015, now Pat. No. 9,686,054, and a continuation-in-part of application No. 15/004,314, filed on Jan. 22, 2016, now Pat. No. 10,014,982, and a continuation-in-part of application No. 15/061,059, filed on Mar. 4, 2016, and a continuation-in-part of application No. PCT/US2015/041037, filed on Jul. 17, 2015, and a continuation-in-part of application No. 15/268,477, filed on Sep. 16, 2016, now Pat. No. 9,887,864, which is a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 15/284,496, filed on Oct. 3, 2016, and a continuation-in-part of application No. PCT/US2016/066015, filed on Dec. 9, 2016, application No. 16/203,317, which is a continuation-in-part of application No. PCT/US2017/015909, filed on Jan. 31, 2017, which is a continuation-in-part of application No. PCT/US2016/066015, filed on Dec. 9, 2016, and a continuation-in-part of application No. 15/861,422, filed on Jan. 3, 2018, and a continuation-in-part of application No. 15/873,806, filed on Jan. 17, 2018, now Pat. No. 10,270,642, and a continuation-in-part of application No. 16/101,444, filed on Aug. 11, 2018, now Pat. No. 10,291,460, and a continuation-in-part of application No. 16/200,608, filed on Nov. 26, 2018, and a continuation-in-part of application No. 16/200,616, filed on Nov. 26, 2018.

(60) Provisional application No. 62/148,019, filed on Apr. 15, 2015, provisional application No. 62/025,795, filed on Jul. 17, 2014, provisional application No. 62/069,090, filed on Oct. 27, 2014, provisional application No. 62/331,278, filed on May 3, 2016, provisional application No. 62/295,970, filed on Feb. 16, 2016, provisional application No. 62/320,965, filed on Apr. 11, 2016, provisional application No. 62/307,081, filed on Mar. 11, 2016, provisional application No. 62/316,850, filed on Apr. 1, 2016, provisional application No. 62/307,172, filed on Mar. 11, 2016, provisional application No. 62/334,110, filed on May 10, 2016, provisional application No. 62/322,575, filed on Apr. 14, 2016, provisional application No. 62/409,796, filed on Oct. 18, 2016, provisional application No. 62/557,117, filed on Sep. 11, 2017, provisional application No. 62/593,826, filed on Dec. 1, 2017, provisional application No. 62/106,395, filed on Jan. 22, 2015, provisional application No. 62/128,574, filed on Mar. 5, 2015, provisional application No. 62/219,315, filed on Sep. 16, 2015, provisional application No. 62/235,958, filed on Oct. 1, 2015, provisional application No. 62/265,155, filed on Dec. 9, 2015, provisional application No. 62/411,504, filed on Oct. 21, 2016, provisional application No. 62/383,235, filed on Sep. 2, 2016, provisional application No. 62/384,060, filed on Sep. 2, 2016, provisional application No. 62/678,207, filed on May 30, 2018, provisional application No. 62/734,224, filed on Sep. 20, 2018, provisional application No. 62/744,093, filed on Oct. 10, 2018, provisional application No. 62/753,017, filed on Oct. 30, 2018.

(51) Int. Cl.
*H04W 72/04* (2009.01)
*H04B 1/38* (2015.01)

Algorithm: Motion Detection

Initialization: The most recent $T$ amplitudes for each subcarrier $f$:

$[G(f;1), ..., G(f;T)]$;

Output: The human motion status inside a venue;

1: for $f = 1: F$ do

2:     Motion statistic computation for each subcarrier $f$:

3:     $\bar{G}_{(1)}(f) \leftarrow \frac{1}{T-1}\sum_{t=1}^{T-1} G(f;t)$;   $\bar{G}_{(2)}(f) \leftarrow \frac{1}{T-1}\sum_{t=2}^{T} G(f;t)$;

4:     $\psi(f) \leftarrow \dfrac{\sum_{t=2}^{T}\left(G(f;t)-\bar{G}_{(1)}(f)\right)\left(G(f;t-1)-\bar{G}_{(2)}(f)\right)}{\left(\sum_{t=2}^{T}\left(G(f;t)-\bar{G}_{(1)}(f)\right)^2\right)^{\frac{1}{2}}\left(\sum_{t=2}^{T}\left(G(f;t-1)-\bar{G}_{(2)}(f)\right)^2\right)^{\frac{1}{2}}}$;

5:     Motion detection for each subcarrier f:

6:     if $\psi(f) > \frac{-1+\gamma\sqrt{T-2}}{T-1}$ then

7:         $D(f) \leftarrow 1$;

8:     else

9:         $D(f) \leftarrow 0$;

10:     end if

11: end for

12: Final motion detection:

13: if $\frac{1}{F}\sum_{f=1}^{F} D(f) > 0.5$ then

14:     Motion is detected!

15: else

16:     No Motion is detected.

17: end if

FIG. 15

APPARATUS, SYSTEMS AND METHODS FOR FALL-DOWN DETECTION BASED ON A WIRELESS SIGNAL

CROSS-REFERENCE TO RELATED APPLICATIONS

The present application hereby claims priority to, and incorporates by reference the entirety of the disclosures of, each of the following applications:

(a) U.S. patent application Ser. No. 15/326,112, entitled "WIRELESS POSITIONING SYSTEMS", filed on Jan. 13, 2017,
 (1) which is a national stage entry of PCT patent application PCT/US2015/041037, entitled "WIRELESS POSITIONING SYSETMS", filed on Jul. 17, 2015, published as WO 2016/011433A2 on Jan. 21, 2016,
  a. which claims priority to U.S. Provisional patent application 62/148,019, entitled "WIRELESS POSITIONING SYSTEMS", filed on Apr. 15, 2015,
  b. which is a continuation-in-part of U.S. patent application Ser. No. 14/605,611, entitled "WIRELESS POSITIONING SYSTEMS", filed on Jan. 26, 2015, published as US2016/0018508A1 on Jan. 21, 2016,
   1. which claims priority to U.S. Provisional patent application 62/025,795, entitled "TIME-REVERSAL POSITIONING SYSTEMS", filed on Jul. 17, 2014, and
   2. which claims priority to U.S. Provisional patent application 62/069,090, entitled "TIME-REVERSAL POSITIONING SYSTEMS", filed on Oct. 27, 2014,
(b) U.S. patent application Ser. No. 15/584,052, entitled "METHOD, SYSTEM, AND APPARATUS FOR WIRELESS POWER TRANSMISSION BASED ON POWER WAVEFORMING", filed on May 2, 2017,
 (1) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
(c) U.S. patent application Ser. No. 15/434,813, entitled "METHODS, DEVICES, APPARATUS, AND SYSTEMS FOR MEDIUM ACCESS CONTROL IN WIRELESS COMMUNICATION SYSTEMS UTILIZING SPATIAL FOCUSING EFFECT", filed on Feb. 16, 2017,
 (1) which claims priority to U.S. Provisional patent application 62/295,970, entitled "THE IMPACT OF SPATIAL FOCUSING EFFECTS ON MEDIUM ACCESS CONTROL DESIGN FOR 5G", filed on Feb. 16, 2016,
 (2) which claims priority to U.S. Provisional patent application 62/320,965, entitled "OPTIMAL RATE ADAPTATION FOR THROUGHPUT MAXIMIZATION IN TIME REVERSAL DIVISION MULTIPLE ACCESS", filed on Apr. 11, 2016,
(d) PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
 (1) which claims priority to U.S. Provisional patent application 62/307,081, entitled "TR-BREATH: TIME-REVERSAL BREATHING RATE ESTIMATION AND DETECTION", filed on Mar. 11, 2016,
 (2) which claims priority to U.S. Provisional patent application 62/316,850, entitled "TR-BREATH: TIME-REVERSAL BREATHING RATE ESTIMATION AND DETECTION", filed on Apr. 1, 2016,
(e) PCT patent application PCT/US2017/021957, entitled "METHODS, APPARATUS, SERVERS, AND SYSTEMS FOR HUMAN IDENTIFICATION BASED ON HUMAN RADIO BIOMETRIC INFORMATION", filed on Mar. 10, 2017, published as WO2017/156487A1 on Sep. 14, 2017,
 (1) which claims priority to U.S. Provisional patent application 62/307,172, entitled "RADIO SHOT: THROUGH-THE-WALL HUMAN IDENTIFICATION", filed on Mar. 11, 2016,
 (2) which claims priority to U.S. Provisional patent application 62/334,110, entitled "TIME-REVERSAL TRACKING WITHOUT MAPPING", filed on May 10, 2016,
(f) PCT patent application PCT/US2017/027131, entitled "METHODS, APPARATUS, SERVERS, AND SYSTEMS FOR OBJECT TRACKING", filed on Apr. 12, 2017, published as WO2017/180698A1 on Oct. 19, 2017,
 (1) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
 (2) which claims priority to U.S. Provisional patent application 62/334,110, entitled "TIME-REVERSAL TRACKING WITHOUT MAPPING", filed on May 10, 2016, and
 (3) which claims priority to U.S. Provisional patent application 62/409,796, entitled "METHODS, DEVICES, SERVERS, AND SYSTEMS OF TIME REVERSAL BASED TRACKING", filed on Oct. 18, 2016,
(g) U.S. Provisional patent application 62/557,117, entitled "METHODS, DEVICES, SERVERS, APPARATUS, AND SYSTEMS FOR WIRELESS INTERNET OF THINGS APPLICATIONS", filed on Sep. 11, 2017,
(h) U.S. Provisional patent application 62/593,826, entitled "METHOD, APPARATUS, AND SYSTEM FOR OBJECT TRACKING AND NAVIGATION", filed on Dec. 1, 2017,
(i) U.S. patent application Ser. No. 15/384,217, entitled "METHOD, APPARATUS, SERVER, AND SYSTEMS OF TIME-REVERSAL TECHNOLOGY", filed on Dec. 19, 2016, published as US2017/0188359A1 on Jun. 29, 2017,
 (1) which is a Continuation-in-Part of U.S. patent application Ser. No. 13/706,342, entitled "WAVEFORM DESIGN FOR TIME-REVERSAL SYSTEMS," filed on Dec. 5, 2012, issued as U.S. Pat. No. 9,883,511 on Jan. 30, 2018,
 (2) which is a Continuation-in-Part of U.S. patent application Ser. No. 13/969,271, entitled "TIME-REVERSAL WIRELESS SYSTEMS HAVING ASYMMETRIC ARCHITECTURE", filed on Aug. 16, 2013, published as US2015/0049745A1 on Feb. 19, 2015, issued as U.S. Pat. No. 9,882,675 on Jan. 30, 2018,
 (3) which is a Continuation-in-Part of U.S. patent application Ser. No. 13/969,320, entitled "MULTIUSER TIME-REVERSAL DIVISION MULTIPLE ACCESS UPLINK SYSTEM WITH PARALLEL INTERFERENCE CANCELLATION", filed on Aug. 16, 2013, issued as U.S. Pat. No. 9,559,874 on Jan. 31, 2017,
 (4) which is a Continuation-in-Part of U.S. patent application Ser. No. 15/041,677, entitled "HANDSHAKING PROTOCOL FOR TIME-REVERSAL SYSTEM", filed on Feb. 11, 2016, published as US2016/

0164669A1 on Jun. 9, 2016, issued as U.S. Pat. No. 9,794,156 on Oct. 17, 2017, (5) which is a Continuation-in-Part of U.S. patent application Ser. No. 15/200,430, entitled "QUADRATURE AMPLITUDE MODULATION FOR TIME-REVERSAL SYSTEMS", filed on Jul. 1, 2016, published as US2016/0315797A1 on Oct. 27, 2016, issued as U.S. Pat. No. 9,736,002 on Aug. 15, 2017,
  a. which is a Continuation of U.S. patent application Ser. No. 14/262,153, entitled "QUADRATURE AMPLITUDE MODULATION FOR TIME-REVERSAL SYSTEMS", filed on Apr. 25, 2014, issued as U.S. Pat. No. 9,407,306 on Aug. 2, 2016, (6) which is a Continuation-in-Part of U.S. patent application Ser. No. 15/200,429, entitled "TIME-REVERSAL WIRELESS PARADIGM FOR INTERNET OF THINGS", filed on Jul. 1, 2016, issued as U.S. Pat. No. 9,781,700 on Oct. 3, 2017,
  a. which is a Continuation of U.S. patent application Ser. No. 14/943,648, entitled "TIME-REVERSAL WIRELESS PARADIGM FOR INTERNET OF THINGS", filed on Nov. 17, 2015, issued as U.S. Pat. No. 9,402,245 on Jul. 26, 2016,
    1. which is a Continuation of U.S. patent application Ser. No. 14/202,651, entitled "TIME-REVERSAL WIRELESS PARADIGM FOR INTERNET OF THINGS", filed on Mar. 10, 2014, issued as U.S. Pat. No. 9,226,304 on Dec. 29, 2015, (7) which is a Continuation-in-Part of U.S. patent application Ser. No. 14/605,611, entitled "WIRELESS POSITIONING SYSTEM", filed on Jan. 26, 2015, published as US2016/0018508A1 on Jan. 21, 2016,
  a. which claims priority to U.S. Provisional patent application 62/069,090, entitled "TIME-REVERSAL POSITIONING SYSTEMS", filed on Oct. 27, 2014,
  b. which claims priority to U.S. Provisional patent application 62/025,795, entitled "TIME-REVERSAL POSITIONING SYSTEMS", filed on Jul. 17, 2014, (8) which is a Continuation-in-Part of U.S. patent application Ser. No. 14/615,984, entitled "JOINT WAVEFORM DESIGN AND INTERFERENCE PRE-CANCELLATION FOR TIME-REVERSAL SYSTEMS", filed on Feb. 6, 2015, issued as U.S. Pat. No. 9,686,054 on Jun. 20, 2017,
  a. which claims priority to U.S. Provisional patent application 62/025,795, entitled "TIME-REVERSAL POSITIONING SYSTEMS", filed on Jul. 17, 2014, (9) which is a Continuation-in-Part of U.S. patent application Ser. No. 15/004,314, entitled "TIME-REVERSAL TECHNOLOGIES FOR HYBRID WIRELESS NETWORKS", filed on Jan. 22, 2016, issued as U.S. Pat. No. 10,014,982 on Jul. 3, 2018,
  a. which claims priority to U.S. Provisional patent application 62/106,395, entitled "TIME-REVERSAL TECHNOLOGIES FOR HYBRID WIRELESS NETWORKS", filed on Jan. 22, 2015,

(10) which is a Continuation-in-Part of U.S. patent application Ser. No. 15/061,059, entitled "TIME-REVERSAL SCALABILITY FOR HIGH NETWORK DENSIFICATION", filed on Mar. 4, 2016,
  a. which claims priority to U.S. Provisional patent application 62/128,574, entitled "TIME-REVERSAL SCALABILITY FOR HIGH NETWORK DENSIFICATION", filed on Mar. 5, 2015,

(11) which is a Continuation-in-Part of PCT patent application PCT/US2015/041037, entitled "WIRELESS POSITIONING SYSTEMS", filed on Jul. 17, 2015, published as WO2016/011433A2 on Jan. 21, 2016,
  a. which claims priority to U.S. Provisional patent application 62/148,019, entitled "WIRELESS POSITIONING SYSTEMS", filed on Apr. 15, 2015,
  b. which is a continuation-in-part of U.S. patent application Ser. No. 14/605,611, entitled "WIRELESS POSITIONING SYSTEMS", filed on Jan. 26, 2015, published as US2016/0018508A1 on Jan. 21, 2016,
    1. which claims priority to U.S. Provisional patent application 62/025,795 entitled "TIME-REVERSAL POSITIONING SYSTEMS", filed on Jul. 17, 2014, and
    2. which claims priority to U.S. Provisional patent application 62/069,090 entitled "TIME-REVERSAL POSITIONING SYSTEMS", filed on Oct. 27, 2014,

(12) which is a Continuation-in-Part of U.S. patent application Ser. No. 15/268,477, entitled "METHODS, DEVICES AND SYSTEMS OF HETEROGENEOUS TIME-REVERSAL PARADIGM ENABLING DIRECT CONNECTIVITY IN INTERNET OF THINGS", filed on Sep. 16, 2016, issued as U.S. Pat. No. 9,887,864 on Feb. 6, 2018,
  a. which claims priority to U.S. Provisional patent application 62/219,315, entitled "ENABLING DIRECT CONNECTIVITY IN INTERNET OF THINGS: A HETEROGENEOUS TIME-REVERSAL PARADIGM", filed on Sep. 16, 2015,
  b. which is a Continuation-in-part of U.S. patent application Ser. No. 15/200,429, entitled "TIME-REVERSAL WIRELESS PARADIGM FOR INTERNET OF THINGS", filed on Jul. 1, 2016, issued as U.S. Pat. No. 9,781,700 on Oct. 3, 2017,
    1. which is a Continuation of U.S. patent application Ser. No. 14/943,648, entitled "TIME-REVERSAL WIRELESS PARADIGM FOR INTERNET OF THINGS", filed on Nov. 17, 2015, issued as U.S. Pat. No. 9,402,245 on Jul. 26, 2016,
      i. which is a Continuation of U.S. patent application Ser. No. 14/202,651, entitled "TIME-REVERSAL WIRELESS PARADIGM FOR INTERNET OF THINGS", filed on Mar. 10, 2014, issued as U.S. Pat. No. 9,226,304 on Dec. 29, 2015,

(13) which is a Continuation-in-Part of U.S. patent application Ser. No. 15/284,496, entitled "TIME-REVERSAL COMMUNICATION SYSTEMS", filed on Oct. 3, 2016,
  a. which claims priority to U.S. Provisional patent application 62/235,958, entitled "SYMBOL TIMING FOR TIME-REVERSAL SYSTEMS WITH SIGNATURE DESIGN", filed on Oct. 1, 2015,

(14) which is a Continuation-in-Part of PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017, whose US national stage entry is Ser. No. 16/060,710, filed on Jun. 8, 2018,
  a. which claims priority to U.S. Provisional patent application 62/265,155, entitled "INDOOR EVENTS DETECTION SYSTEM", filed on Dec. 9, 2015,
  b. which claims priority to U.S. Provisional patent application 62/411,504, entitled "METHOD, APPA- RATUS, AND SYSTEM FOR WIRELESS INTERNET OF THINGS APPLICATIONS", filed on Oct. 21, 2016,
- c. which claims priority to U.S. Provisional patent application 62/383,235, entitled "TIME REVERSAL MONITORING SYSTEM", filed on Sep. 2, 2016,
- d. which claims priority to U.S. Provisional patent application 62/307,081, entitled "TR-BREATH: TIME-REVERSAL BREATHING RATE ESTIMATION AND DETECTION", filed on Mar. 11, 2016,
- e. which claims priority to U.S. Provisional patent application 62/316,850, entitled "TR-BREATH: TIME-REVERSAL BREATHING RATE ESTIMATION AND DETECTION", filed on Apr. 1, 2016,

(15) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,

(16) which claims priority to U.S. Provisional patent application 62/295,970, entitled "THE IMPACT OF SPATIAL FOCUSING EFFECTS ON THE MEDIUM ACCESS CONTROL DESIGN FOR 5G", filed on Feb. 16, 2016,

(17) which claims priority to U.S. Provisional patent application 62/320,965, entitled "OPTIMAL RATE ADAPTATION FOR THROUGHPUT MAXIMIZATION IN TIME REVERSAL DIVISION MULTIPLE ACCESS", filed on Apr. 11, 2016,

(18) which claims priority to U.S. Provisional patent application 62/307,081, entitled "TR-BREATH: TIME-REVERSAL BREATHING RATE ESTIMATION AND DETECTION", filed on Mar. 11, 2016,

(19) which claims priority to U.S. Provisional patent application 62/316,850, entitled "TR-BREATH: TIME-REVERSAL BREATHING RATE ESTIMATION AND DETECTION", filed on Apr. 1, 2016,

(20) which claims priority to U.S. Provisional patent application 62/307,172, entitled "RADIO SHOT: THROUGH-THE-WALL HUMAN IDENTIFICATION", filed on Mar. 11, 2016,

(21) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,

(22) which claims priority to U.S. Provisional patent application 62/334,110, entitled "TIME-REVERSAL TRACKING WITHOUT MAPPING", filed on May 10, 2016,

(23) which claims priority to U.S. Provisional patent application 62/409,796, entitled "METHODS, DEVICES, SERVERS, AND SYSTEMS OF TIME REVERSAL BASED TRACKING", filed on Oct. 18, 2016,

(24) which claims priority to U.S. Provisional patent application 62/383,235, entitled "TIME REVERSAL MONITORING SYSTEM", filed on Sep. 2, 2016,

(25) which claims priority to U.S. Provisional patent application 62/384,060, entitled "METHODS, DEVICES, SERVERS, SYSTEMS OF TIME REVERSAL MACHINE PLATFORM FOR BROADBAND WIRELESS APPLICATIONS", filed on Sep. 6, 2016,

(26) which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016, (j) PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017, published as WO2017/155634A1 on Sep. 14, 2017,
- (1) which claims priority to U.S. Provisional patent application 62/384,060, entitled "METHODS, DEVICES, SERVERS, SYSTEMS OF TIME REVERSAL MACHINE PLATFORM FOR BROADBAND WIRELESS APPLICATIONS", filed on Sep. 6, 2016,
- (2) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
- (3) which claims priority to U.S. Provisional patent application 62/307,081, entitled "TR-BREATH: TIME-REVERSAL BREATHING RATE ESTIMATION AND DETECTION", filed on Mar. 11, 2016,
- (4) which claims priority to U.S. Provisional patent application 62/316,850, entitled "TR-BREATH: TIME-REVERSAL BREATHING RATE ESTIMATION AND DETECTION", filed on Apr. 1, 2016,
- (5) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
- (6) which claims priority to U.S. Provisional patent application 62/334,110, entitled "TIME-REVERSAL TRACKING WITHOUT MAPPING", filed on May 10, 2016,
- (7) which claims priority to U.S. Provisional patent application 62/409,796, entitled "METHODS, DEVICES, SERVERS, AND SYSTEMS OF TIME REVERSAL BASED TRACKING", filed on Oct. 18, 2016,
- (8) which claims priority to U.S. Provisional patent application 62/383,235, entitled "TIME REVERSAL MONITORING SYSTEM", filed on Sep. 2, 2016,
- (9) which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016,
- (10) which claims priority to U.S. Provisional patent application 62/307,172, entitled "RADIO SHOT: THROUGH-THE-WALL HUMAN IDENTIFICATION", filed on Mar. 11, 2016,
- (11) which claims priority to PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017, whose US national stage entry is U.S. patent application Ser. No. 16/060,710, entitled "METHOD, APPARATUS, AND SYSTEMS FOR WIRELESS EVENT DETECTION AND MONITORING", filed on Jun. 8, 2018, (k) U.S. Provisional patent application 62/678,207, entitled "METHOD, APPARATUS, AND SYSTEM FOR OBJECT TRACKING AND MOTION MONITORING", filed on May 30, 2018, (l) U.S. patent application Ser. No. 15/861,422, entitled "METHOD, APPARATUS, SERVER, AND SYSTEMS OF TIME-REVERSAL TECHNOLOGY", filed on Jan. 3, 2018,
(m) U.S. patent application Ser. No. 15/873,806, entitled "METHOD, APPARATUS, AND SYSTEM FOR OBJECT TRACKING AND NAVIGATION", filed on Jan. 17, 2018.
(n) U.S. patent application Ser. No. 16/101,444, entitled "METHOD, APPARATUS, AND SYSTEM FOR WIRELESS MOTION MONITORING", filed on Aug. 11, 2018.
(o) U.S. Provisional Patent application 62/734,224, entitled "METHOD, APPARATUS, AND SYSTEM FOR WIRELESS SLEEP MONITORING", filed on Sep. 20, 2018.
(p) U.S. Provisional Patent application 62/744,093, entitled "METHOD, APPARATUS, AND SYSTEM FOR WIRELESS PROXIMITY AND PRESENCE MONITORING", filed on Oct. 10, 2018.
(q) U.S. Provisional Patent application 62/753,017, entitled "METHOD, APPARATUS, AND SYSTEM FOR HUMAN IDENTIFICATION BASED ON HUMAN RADIO BIOMETRIC INFORMATION", filed on Oct. 30, 2018.
(r) U.S. patent application Ser. No. 16/200,608, entitled "METHOD, APPARATUS, SERVER AND SYSTEM FOR VITAL SIGN DETECTION AND MONITORING", filed on Nov. 26, 2018.
(s) U.S. patent application Ser. No. 16/200,616, entitled "METHOD, APPARATUS, SERVER AND SYSTEM FOR REAL-TIME VITAL SIGN DETECTION AND MONITORING", filed on Nov. 26, 2018.

TECHNICAL FIELD

The present teaching generally relates to motion detection and monitoring. More specifically, the present teaching relates to detecting and monitoring fall-down actions and other transient motions of an object based on a wireless signal.

BACKGROUND

Regarding object motion tracking and monitoring, indoor location-based service is becoming more and more important nowadays. One popular approach is to use dead-reckoning method to estimate the location of a moving object in real time. Usually, the moving direction and the moving distance are estimated by inertia measurement unit (IMU). However, the performance of moving distance estimation in the dead-reckoning based approach is far from satisfactory, which is the main reason that such indoor navigation systems are still not popular now.

Estimating the speed of a moving object in an indoor environment, which may assist the location-based service, is also an open problem and no satisfactory results appear yet. The Doppler effect has been widely applied to different speed estimation systems using sound wave, microwave, or laser light. However, low speed such as human walking speed is very difficult to be estimated using Doppler shift, especially using electromagnetic (EM) waves. This is because the maximum Doppler shift is about $\Delta_f = v/cf_0$, where $f_0$ is the carrier frequency of the transmitted signal, c is the speed of light, and v is the human walking speed. Under normal human walking speed v=5.0 km/h and $f_0$=5.8 GHz, $\Delta_f$ is around 26.85 Hz and it is extremely difficult to estimate this tiny amount with high accuracy. In addition, these methods need line-of-sight (LOS) condition and perform poorly in a complex indoor environment with rich multipath reflections.

Most of the existing speed estimation methods that work well for outdoor environments fail to offer satisfactory performance for indoor environments, since the direct path signal is disturbed by the multipath signal in indoor environments and the time-of-arrival (or Doppler shift) of the direct path signal cannot be estimated accurately. Then, researchers focus on the estimation of the maximum Doppler frequency which may be used to estimate the moving speed. Various methods have been proposed, such as level crossing rate methods, covariance based methods, and wavelet based methods. However, these estimators provide results that are unsatisfactory because the statistics used in these estimators have a large variance and are location-dependent in practical scenarios. For example, the accuracy of one existing speed estimation method may only differentiate whether a mobile station moves with a fast speed (above 30 km/h) or with a slow speed (below 5 km/h).

Another kind of indoor speed estimation method based on the traditional pedestrian dead reckoning algorithm is to use accelerometers to detect steps and to estimate the step length. However, pedestrians often have different stride lengths that may vary up to 40% at the same speed, and 50% with various speeds of the same person. Thus, calibration is required to obtain the average stride lengths for different individuals, which is impractical in real applications and thus has not been widely adopted.

A transient motion is a special type of motion that happens suddenly and quickly and is important to monitor. For example, a fall-down action of a person is a transient motion that happens very fast, typically in 0.5 to 1 second, and can indicate an abnormal or unexpected motion of the person. Existing systems utilize camera or video to monitor a transient motion like fall-down. But these existing systems do not work in a dark environment due to low brightness or in a venue like restroom due to privacy. Other existing transient motion monitoring techniques based on speed estimation will suffer the same issues as those mentioned above regarding existing speed estimation methods.

Therefore, there is a need for apparatus and methods for tracking and monitoring motion (especially a transient motion) to solve the above-mentioned problems and to avoid the above-mentioned drawbacks.

SUMMARY

The present teaching generally relates to periodic motion (e.g. human breathing) detection. More specifically, the present teaching relates to periodic motion detection and monitoring based on time-reversal technology in a rich-scattering wireless environment, such as an indoor environment or urban metropolitan area, enclosed environment, underground environment, open-air venue with barriers such as parking lot, storage, yard, square, forest, cavern, valley, etc.

In one embodiment, a system having a processor, a memory communicatively coupled with the processor and a set of instructions stored in the memory for monitoring a transient motion in a venue is disclosed. The system comprises a transmitter, a receiver, and a transient motion monitor. The transmitter is located at a first position in the venue and configured for transmitting a wireless signal through a wireless multipath channel impacted by the transient motion of an object in the venue. The receiver is located at a second position in the venue and configured for:

receiving the wireless signal through the wireless multipath channel impacted by the transient motion of the object in the venue, and obtaining a time series of channel information (CI) of the wireless multipath channel based on the wireless signal. The transient motion monitor is configured for: monitoring the transient motion of the object based on the time series of CI, and triggering a response action based on the monitored transient motion of the object.

In another embodiment, a method implemented on a machine having a processor, a memory communicatively coupled with the processor and a set of instructions stored in the memory for monitoring a transient motion in a venue is disclosed. The method comprises: receiving a wireless signal through a wireless multipath channel impacted by the transient motion of an object in the venue; obtaining a time series of channel information (CI) of the wireless multipath channel based on the wireless signal; monitoring the transient motion of the object based on the time series of CI; and triggering a response action based on the monitored transient motion of the object.

In yet another embodiment, a monitor of a motion monitoring system is disclosed. The motion monitoring system comprises: a transmitter, a receiver, and the monitor. The monitor comprises: a processor, a memory communicatively coupled with the processor, and a set of instructions stored in the memory. The set of instructions, when executed, causes the processor to perform: obtaining a time series of channel information (CI) of a wireless multipath channel from the receiver of the motion monitoring system, wherein the receiver extracts the time series of CI from a wireless signal received from the transmitter of the motion monitoring system through the wireless multipath channel impacted by a transient motion of an object in a venue, monitoring the transient motion of the object based on the time series of CI, and triggering a response action based on the monitored transient motion of the object.

In still another embodiment, a receiver of a motion monitoring system is disclosed. The motion monitoring system comprises: a transmitter, the receiver, and a transient motion monitor. The receiver comprises: a wireless circuitry, a processor communicatively coupled with the wireless circuitry, a memory communicatively coupled with the processor, and a set of instructions stored in the memory. The wireless circuitry is configured to receive a wireless signal through a wireless multipath channel impacted by a transient motion of an object in a venue, wherein the wireless signal is transmitted by a transmitter of the motion monitoring system. The set of instructions, when executed, causes the processor to obtain a time series of channel information (CI) of the wireless multipath channel based on the wireless signal. The time series of CI is to be used by the transient motion monitor of the motion monitoring system to monitor the transient motion of the object and trigger a response action based on the monitored transient motion.

Other concepts are related to software for implementing the present teaching on detecting and monitoring fall-down actions and other transient motions of an object based on wireless channel information in a rich-scattering environment.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings.

FIG. 15 illustrates an exemplary algorithm of motion detection, according to one embodiment of the present teaching.

DETAILED DESCRIPTION

Figure 1:
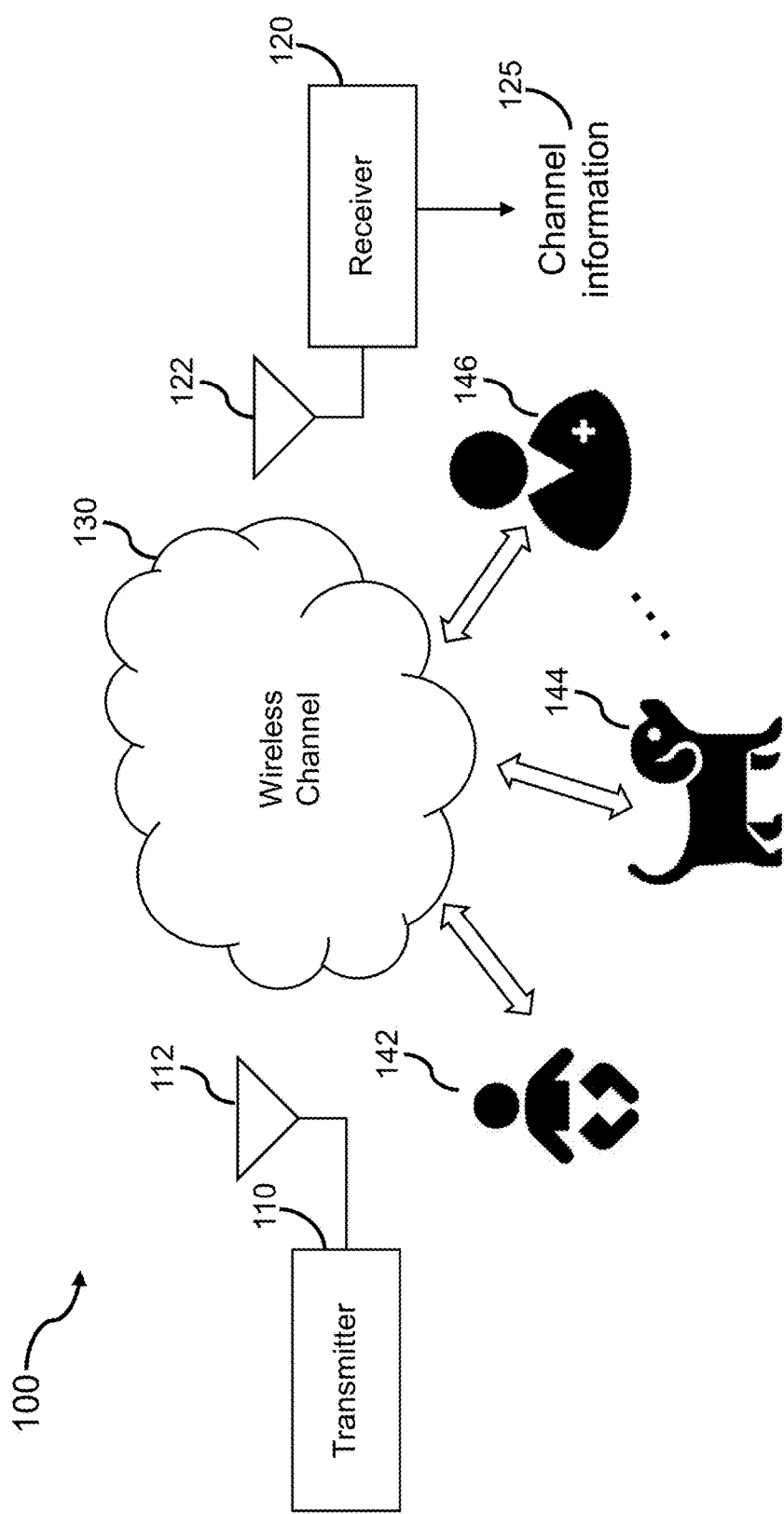
FIG. 1 illustrates an exemplary network environment for transient motion detection and monitoring in a venue, according to one embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching discloses systems, apparatus, and methods for detecting and monitoring a transient object motion in a venue based on a time series of channel information (CI) of a wireless multipath channel that is impacted by the object motion. According to various embodiments, the object may be a life (e.g. a human, a pet, an animal, etc.), a device (e.g. a weapon, a machine, etc.), or a land; the transient object motion may represent at least one of: a dangerous action, an action of danger, a threatening action, a frightening action, a striking action, a hitting action, a breaking action, a cracking action, a shattering action, a fragmenting action, a smashing action, a fracturing action, a piercing action, a puncturing action, a rupturing action, a deforming action, a melting action, a vaporizing action, a penetrating action, a perforating action, a cutting action, a grinding action, a rubbing action, a vigorous action, a powerful action, a high energy action, an action of an relative massive object, an impulsive action, a fall-down action, a collision, a hit, a crash, an accident, an explosion, an impact, a smash, a bump, a wreck, a pileup, a fight, a punch, a kick, a head punch, a burning, a heating, a cooling, a disturbance, an assertion, a heated exchange, a quarrel, a transient action of a human, a gesture, a body gesture, a head gesture, a facial gesture, a mouth, a limb gesture, a neck gesture, a shoulder gesture, an arm gesture, a hand gesture, a leg gesture, a finger gesture, an elbow gesture, a knee gesture, a stand-up action, a sit-down action, a lie-down action, a lifting action, a moving action, a pushing action, a pulling action, a punch, a nodding action, a clapping action, a bowing action, a dancing action, a pointing action, a walking action, a running action, a jumping action, a writing action, a typing action, a drawing action, a folding action, a repeating transient action, and another action The disclosed system can monitor the transient motion and its characteristics (e.g. speed, frequency, etc.) based on a time series of CI extracted from a wireless signal transmitted through a wireless multipath channel, where the wireless multipath channel is impacted by the transient motion of the object in the venue. In one embodiment, the wireless signal is a series of wireless probing signals. In one embodiment, a probing frequency of the wireless signal is greater than 100 Hz.

According to various embodiments, each channel information (CI) may comprise at least one of: a channel state information (CSI), a frequency domain CSI, a frequency domain CSI associated with at least one sub-band, a time domain CSI, a CSI in a domain, a channel impulse response (CIR), a channel frequency response (CFR), a channel characteristics, a channel filter response, a CSI of the wireless multipath channel, an information of the wireless multipath channel, a time stamp, an auxiliary information, a data, a meta data, a user data, an account data, an access data, a security data, a session data, a status data, a supervisory data, a household data, an identity (ID), a device data, a network data, a neighborhood data, an environment data, a real-time data, a sensor data, a stored data, an encrypted data, a compressed data, a protected data, and/or another channel information. In one embodiment, the disclosed system has hardware components (e.g. wireless transmitter/receiver with antenna, analog circuitry, power supply, processor, memory, etc.) and corresponding software components. According to various embodiments of the present teaching, the disclosed system includes a Bot (referred to as a Type 1 device) and an Origin (referred to as a Type 2 device) for transient motion detection and monitoring. Each device comprises a transceiver, a processor and a memory.

In one embodiment, the disclosed system uses CSI from regular off-the-shelf WiFi chips which are affordable, widely available, standard compliant, interoperable, FCC approved, with quality control and technical support by reputable brand. These components (WiFi chips, modules, design tools, knowhow) are much more affordable, much more widely available and much richer than the expensive, untested, uncommon, dedicated, limited edition experimental hardware components of an existing system. The disclosed system has a large effective range, due to the large WiFi coverage. The disclosed system can work in both line-of-sight (LOS) and non-line-of-sight (NLOS) conditions. The disclosed system may also use CSI from chips associated with 4G, LTE, LTE-U, 5G and beyond.

In one embodiment, the disclosed system can monitor and protect a fall-down action of a person, by estimating a moving speed of the person remotely without any wearable. The disclosed system can analyze the speed to determine that a fall-down has happened or is happening, e.g. based on a detected large negative acceleration due to gravity followed by a detected large positive acceleration due to hitting a floor.

The disclosed system includes features that are significantly more than an abstract idea. To measure a moving speed of an object (e.g. a transient motion speed of a person) remotely without wearables has been desired for decades. The disclosed system solves the long-time problem using physical WiFi chips as sensors to monitor the environment with WiFi signals and the associated multipath patterns. The disclosed system has hardware components (e.g. Type 1 device, Type 2 device each with processor, memory, wireless transceivers, cloud server, etc.). The WiFi signals are electromagnetic (EM) waves in the air which are measurable and with deterministic structure and frequency characteristics. The system has matching software components (e.g. embedded software in Type 1 device, in Type 2 device, in servers, etc.). The software can interface with low-level WiFi chips and firmware to extract CSI. Experimental results show that the disclosed system can detect an object fall-down with very high accuracy.

The disclosed system can be applied in many cases. In one example, the Type 1 device (transmitter) may be a small WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. In one example, the Type 2 (receiver) may be a WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. The Type 1 device and Type 2 devices may be placed in/near a conference room to count people. The Type 1 device and Type 2 devices may be in a motion monitoring system for older adults to monitor their daily activities and any sign of sudden or unexpected motions. The Type 1 device and Type 2 device may be used in baby monitors to monitor the sudden or unexpected motions (e.g. fall-down) of a living baby. The Type 1 device and Type 2 devices may be placed in bedrooms, bathrooms, or restrooms to monitor sudden or unexpected motions of a user. The Type 1 device and Type 2 devices may be placed in cars to monitor sudden or unexpected motions of passengers, driver, and/or any baby left in a car. The Type 1 device and Type 2 devices may be deployed in an area to detect sudden or unexpected motions of an object indicating any intruder or accident. There are numerous applications of wireless transient motion speed monitoring without wearables.

Hardware modules may be constructed to contain either the Type 1 transceiver and the Type 2 transceiver. The hardware modules may be sold to/used by variable brands to design, build and sell final commercial products. Products using the disclosed system and/or method may be home/office security products, motion monitoring products, WiFi products, mesh products, TV, STB, entertainment system, HiFi, speaker, home appliance, lamps, stoves, oven, microwave oven, table, chair, bed, shelves, tools, utensils, torches, vacuum cleaner, smoke detector, sofa, piano, fan, door, window, door/window handle, locks, smoke detectors, car accessories, computing devices, office devices, air conditioner, heater, pipes, connectors, surveillance camera, access point, computing devices, mobile devices, LTE devices, 3G/4G/5G/6G devices, gaming devices, eyeglasses, glass panels, VR goggles, necklace, watch, waist band, belt, wallet, pen, hat, wearables, implantable device, tags, parking tickets, smart phones, etc.

In addition, sleep monitoring acts as a critical and challenging task that attracts increasing demands and interests. The present teaching discloses the model, design, and implementation of SMARS (Sleep Monitoring via Ambient Radio Signals), which is the first practical Sleep Monitoring system that exploits Ambient Radio Signals to recognize sleep stages and assess sleep quality. This will enable a future smart home that monitors daily sleep in a ubiquitous, non-invasive and contactless manner, without instrumenting the subject's body or the bed. Different from previous RF-based approaches, the present teaching devises a statistical model that accounts for all reflecting and scattering multipaths, allowing highly accurate and instantaneous breathing estimation with ever best performance achieved on commodity devices. On this basis, SMARS then recognizes different sleep stages, including wake, REM, and NREM, which is previously only possible with dedicated hardware. A real-time system is implemented on commercial WiFi chipsets and deployed in 6 homes with 6 participants, resulting in 32 nights of data in total. The results demonstrate that SMARS yields a median error of 0.47 bpm and a 95% error of only 2.92 bpm for breathing estimation, and detects breathing robustly even when a person is 10m away from the link, or behind a wall. SMARS achieves sleep staging accuracy of 85%, outperforming advanced solutions using contact sensor or radar. Furthermore, SMARS is evaluated upon a recently released dataset that measures 20 patients' overnight sleep, which confirms the performance. By achieving promising results with merely a single commodity RF link, SMARS will set the stage for a practical in-home sleep monitoring solution.

Sleep plays a vital role in an individual's health and well-being, both mentally and physically. It is well recognized that sleep quantity and quality is fundamentally related to health risks like cardiovascular decease, stroke, kidney failure, diabetes, and adverse mental conditions, etc. Unfortunately, in modern society, a number of people suffer from sleep disorders. As recently reported, 10% of the population suffers from chronic insomnia (which is even higher among elders), and ⅓ of Americans do not get sufficient sleep. Monitoring sleep emerges as an essential demand to help, manage, diagnose, and treat the growing group of sleep disorders as well as to keep regular tabs on personal health.

Sleep monitoring, however, is a challenging task that has drawn tremendous efforts for decades. Generally, it measures sleep time, recognizes different sleep stages, e.g., wake, REM (Rapid Eye Movement) and NREM (Non-REM), and accordingly assesses an individual's sleep quality. Various solutions have been proposed. The medical gold standard relies on Polysomnography (PSG), which monitors various physiological parameters such as brain activities, respirations, and body movements by a number of wired sensors attached to the patient. Albeit accurate and comprehensive, PSG is usually expensive and cumbersome with the invasive sensors that may cause sleep difficulties, limiting itself to clinical usage for confirmed patients. Other approaches including photoplethysmography (PPG) and actigraphy (ACT) require users to wear dedicated sensors during sleep. Ballistocardiogram (BCG) needs to instrument the mattress with an array of EMFi sensors to measure ballistic force. Despite of the costs, these approaches provide suitable solutions for those who need special cares but are less-than-ideal for the public. Recent efforts in mobile computing envision in-home sleep monitoring using smartphones and wearables. These methods, however, only provide coarse-grained, less accurate measurements and fail to monitor vital signs like respiratory rate. In addition, mobiles and wearables are undesirable for especially elders and those with dementia.

Different from prevailing solutions, the disclosed solution looks forward to a future smart home that monitors daily sleep in a ubiquitous, non-invasive, contactless, and accurate manner, without instrumenting the body or the bed. One can observe an opportunity towards such a system by two perspectives: 1) Clinical study has shown that physiological activity varies among different sleep stages. For example, breathing rate becomes irregular and fast since brain oxygen consumption increases during REM sleep, and is more stable and slower during NREM sleep, rendering the feasibility of sleep staging based on breathing monitoring. 2) Recent advances in wireless technology have demonstrated non-contact sensing of body motions in the environments. Chest and abdomen motions caused by breathing can alter radio signal propagations and thus modulate the received signals, from which it is then possible to decipher breathing. One can explore a synergy between the two perspectives, resulting in a system to leverage ambient radio signals (e.g., WiFi) to capture a person's breathing and motion during sleep and further monitor the sleep behaviors.

While early works have investigated the feasibility of RF-based breathing estimation and sleep monitoring, they either rely on specialized hardware like FMCW radar, or only work in controlled environments. Solutions based on dedicated radios are usually expensive and not ubiquitously applicable. Others using commodity devices typically require the user to lay still on a bed with radios exceedingly close to his/her chest and fail in presence of extraneous motions or in Non-Line-Of-Sight (NLOS) scenarios. In addition, none of them can identify different sleep stages due to their limited accuracy in breathing estimation. Such limitations prevent them from application for practical in-home sleep monitoring.

The present teaching disclose the model, design, and implementation of SMARS, the first practical Sleep Monitoring system that exploits commodity Ambient Radio Signals to recognize sleep stages and assess the otherwise elusive sleep quality. SMARS works in a non-obtrusive way without any body contact. All that a user needs to do is to set up one single link between two commodity radios by, e.g., simply placing a receiver if a wireless router is already installed inside the home. SMARS advances the literature by a novel statistical model that allows highly accurate and instantaneous breathing estimation. On this basis, SMARS is able to distinguish different sleep stages, which is previously only obtainable by expensive dedicated hardware. Specifically, SMARS excels in three unique aspects to deliver practical sleep monitoring. First, one can devise a statistical model on motion in Channel State Information (CSI) that leverages all reflection and scattering multipaths indoors. Existing works usually assume a geometrical model with a few multipaths and one major path reflected off the human body (e.g., using a 2-ray model developed for outdoor space). Under real-world indoor environments, however, there could be as many as hundreds of multipaths, and signals not only reflect but also scatter off a person's body and other objects in the space. As a consequence, previous approaches fail in NLOS environments and for minute motions due to the lack of a dominant reflection path. In contrast, the disclosed model investigates the statistical characteristics of motion in CSI without making such unrealistic assumptions, underlying robust detection of arbitrary motions including breathing.

Second, SMARS achieves accurate respiratory rate estimation instantaneously and robustly. Most of previous breathing estimation schemes assume constant breathing rate during a relatively large time window to gain sufficient frequency resolution, losing fine-grained breathing variations during sleep. In addition, minute breathing motions can be easily buried in CSI measurement noises, rendering existing philosophies effective only in extraordinary close proximity (typically within 2-3m) without any extraneous motions. To improve time resolution, SMARS exploits the time-domain Auto-Correlation Function (ACF) to estimate breathing rate, which can report real-time breathing rates as frequent as every one second and make it possible to capture instantaneous breathing rate changes. By using ACF, SMARS also circumvents the use of noisy phase and the usually handcrafted CSI denoising procedure. More importantly, by eliminating the frequency offsets and thus synchronizing breathing signal over different subcarriers, ACF allows us to perform Maximal Ratio Combining (MRC) to combine multiple subcarriers to combat measurement noises and maximize breathing signals in an optimal way. By doing so, one can push the limit of the breathing signal to noise ratio (SNR) and thus significantly increase the sensing sensitivity for larger coverage as well as weaker breathing. Specifically, SMARS can reliably detect breathing when a person is 10 m away from the link, or behind a wall, which is even better than specialized low-power radars.

Finally, based on the extracted breathing rates and motion statistics during sleep, one can recognize different sleep stages (including wake, REM and NREM) and comprehensively assess the overall sleep quantity and quality. Based on in-depth understanding of the relationship between breathing rates and sleep stages, one can extract distinctive breathing features for classification for sleep staging. None of existing works using off-the-shelf devices can achieve the same goal of staging sleep.

A real-time system has been implemented on different commercial WiFi chipsets and its performance is evaluated through extensive experiments. The evaluation includes two parts: 1) One can deploy SMARS in 6 homes with 6 healthy subjects and collect 32 nights of data, 5 out of which have PSG data recorded by commercial devices. The results show that SMARS achieves great performance, with a median breathing estimation error of 0.47 breath per minute (bpm) and a 95% tile error of 2.92 bmp. Regarding sleep staging, SMARS produces a remarkable accuracy of 85.2%, while commercial solutions, e.g., EMFIT based on contact sensors and ResMed using radar, have accuracies of only 69.8% and 83.7% respectively. 2) One can further validate SMARS on a recently released dataset on RF-based respiration monitoring. The dataset collected 20 patients' overnight sleep for comparative evaluation of four state-of-the-art breathing monitoring systems, using clinically labeled PSG data as ground truths. All the four systems (based on ZigBee, Sub-RSS radio, UWB radar, and WiFi CSI, respectively) produce significant median errors of about 2-3 bpm and 95% tile errors of around or above 10 bpm. As comparison, SMARS achieves significant improvements by decreasing the median error to 0.66 bpm and the 95% tile error to 3.79 bpm. By achieving promising performance, SMARS can deliver clinically meaningful sleep monitoring for daily and regular use in practice and takes an important step towards a future smart home that monitors personal health everyday life.

In a nutshell, the core contribution here is SMARS, the first system that enables a smart home to stage an inhabitant's sleep using commodity off-the-shelf WiFi devices, by achieving highly accurate and instantaneous breathing estimation in the wild. SMARS also contributes the first statistical model for understanding and capturing motions in CSI, which will renovate various applications in wireless sensing.

In one embodiment, the present teaching discloses a method, an apparatus, a device, a system, and/or software (method/apparatus/device/system/software) of a wireless monitoring system. A time series of channel information (CI) of a wireless multipath channel may be obtained using a processor, a memory communicatively coupled with the processor and a set of instructions stored in the memory. The time series of CI may be extracted from a wireless signal transmitted between a Type 1 heterogeneous wireless device and a Type 2 heterogeneous wireless device in a venue through the wireless multipath channel. The wireless multipath channel may be impacted by a motion of an object in the venue. A characteristics and/or a spatial-temporal information of the object and/or of the motion of an object may be monitored based on the time series of CI. A task may be performed based on the characteristics and/or the spatial-temporal information. A presentation associated with the task may be generated in a user-interface (UI) on a device of a user. The time series of CI may be preprocessed.

The Type 1 device may comprise at least one heterogeneous wireless transmitter. The Type 2 device may comprise at least one heterogeneous wireless receiver. The Type 1 device and the Type 2 device may be the same device. Any device may have a processor, a memory communicatively coupled with the processor, and a set of instructions stored in the memory to be executed by the processor.

There may be multiple Type 1 heterogeneous wireless devices interacting with the same Type 2 heterogeneous wireless device, and/or there may be multiple Type 2 heterogeneous wireless devices interacting with the same Type 1 heterogeneous wireless device. The multiple Type 1 devices/Type 2 devices may be synchronized and/or asynchronous, with same/different window width/size and/or time shift. The multiple Type 1 devices/Type 2 devices may operate independently and/or collaboratively. The multiple Type 1 devices/Type 2 devices may be communicatively coupled to same or different servers (e.g. cloud server, edge server, local server). Operation of one device may be based on operation, state, internal state, storage, processor, memory output, physical location, computing resources, network of another device. Difference devices may communicate directly, and/or via another device/server/cloud server. The devices may be associated with one or more users, with associated settings. The settings may be chosen once, pre-programmed, and/or changed over time.

In the case of multiple Type 1 devices interacting with multiple Type 2 devices, any processing (e.g. time domain processing and/or frequency domain processing) may be different for different devices. The processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

The wireless receiver (e.g. Type 2 device) may receive the wireless signal and/or another wireless signal from the wireless transmitter (e.g. Type 1 device). The wireless receiver may receive another wireless signal from another wireless transmitter (e.g. a second Type 1 device). The wireless transmitter may transmit the wireless signal and/or another wireless signal to another wireless receiver (e.g. a second Type 2 device). The wireless transmitter, the wireless receiver, the another wireless receiver and/or the another wireless transmitter may be moving with the object and/or another object. The another object may be tracked.

The Type 1 device may be capable of wirelessly coupling with at least two Type 2 devices. The Type 2 device may be capable of wirelessly coupling with at least two Type 1 devices. The Type 1 device may be caused to switch/establish wireless coupling from the Type 2 device to a second Type 2 heterogeneous wireless device at another location in the venue. Similarly, the Type 2 device may be caused to switch/establish wireless coupling from the Type 1 device to a second Type 1 heterogeneous wireless device at yet another location in the venue. The switching may be controlled by a server, the processor, the Type 1 device, the Type 2 device, and/or another device. The radio used before switching may be different from the radio used after the switching. A second wireless signal may be caused to be transmitted between the Type 1 device and the second Type 2 device (or between the Type 2 device and the second Type 1 device) through the wireless multipath channel. A second time series of CI of the wireless multipath channel extracted from the second wireless signal may be obtained. The second wireless signal may be the first wireless signal. The characteristics, the spatial-temporal information and/or another quantity of the motion of the object may be monitored based on the second time series of CI. The Type 1 device and the Type 2 device may be the same device.

The wireless signal and/or the another wireless signal may have data embedded. The wireless receiver, the wireless transmitter, the another wireless receiver and/or the another wireless transmitter may be associated with at least one processor, memory communicatively coupled with respective processor, and/or respective set of instructions stored in the memory which when executed cause the processor to perform any and/or all steps needed to determine the spatial-temporal information, the initial spatial-temporal information, the initial time, the direction, the instantaneous location, the instantaneous angle, and/or the speed, of the object.

The processor, the memory and/or the set of instructions may be associated with the Type 1 heterogeneous wireless transceiver, one of the at least one Type 2 heterogeneous wireless transceiver, the object, a device associated with the object, another device associated with the venue, a cloud server, and/or another server.

The Type 1 device may transmit the wireless signal (e.g. a series of probe signals) in a broadcasting manner to at least one Type 2 device(s) through the wireless multipath channel in the venue. The wireless signal is transmitted without the Type 1 device establishing wireless connection with any of the at least one Type 2 device receiver(s).

The Type 1 device may transmit to a particular destination media access control (MAC) address common for more than one Type 2 devices. Each of the more than one Type 2 devices may adjust their MAC address to the particular MAC address.

The particular destination MAC address (common destination MAC address) may be associated with the venue. The association may be recorded in an association table of an Association Server. The venue may be identified by the Type 1 device, a Type 2 device and/or another device based on the particular destination MAC address, the series of probe signals, and/or the at least one time series of CI extracted from the probe signals.

For example, a Type 2 device may be moved to a new location in the venue (e.g. from another venue). And the Type 1 device may be newly set up in the venue such that the Type 1 device and the Type 2 device are not aware of the existence of each other, and they may not establish wireless connection at all. During set up, the Type 1 device may be instructed/guided/caused/controlled to send the series of probe signals to the particular destination MAC address (e.g. using a dummy receiver, using a hardware pin setting/connection, using a stored setting, using a local setting, using a remote setting, using a downloaded setting, or using a server). Upon power up, the Type 2 device may scan for probe signals according to a table of destination MAC addresses that may be used at different locations (e.g. different MAC address for different venue such as house, office, enclosure, floor, multi-storey building, store, airport, mall, stadium, hall, station, subway, lot, area, zone, region, district, city, country, continent). When the Type 2 device detects the probe signals sent to the particular destination MAC address, the Type 2 device can use the table to identify the venue based on the particular destination MAC address.

A location of a Type 2 device in the venue may be computed based on the particular destination MAC address, the series of probe signals, and/or the at least one time series of CI obtained by the Type 2 device from the probe signals. The computing may be performed by the Type 2 device.

The particular destination MAC address may be changed over time. It may be changed according to a time table, a rule, a policy, a mode, a condition, a situation and/or a change. The particular destination MAC address may be selected based on availability of the MAC address, a pre-selected list, collision pattern, traffic pattern, data traffic between the Type 1 device and another device, effective bandwidth, random selection, and/or a MAC address switching plan. The particular destination MAC address may be the MAC address of a second wireless device (e.g. a dummy receiver, or a receiver that serves as a dummy receiver).

The Type 1 device may transmit the probe signals in a channel selected from a set of channels. At least one CI of the selected channel may be obtained by a respective Type 2 device from the probe signal transmitted in the selected channel.

The selected channel may be changed over time. The change may be according to a time table, a rule, a policy, a mode, a condition, a situation, and/or a change. The selected channel may be selected based on availability of channels, a pre-selected list, co-channel interference, inter-channel interference, channel traffic patterns, data traffic between the Type 1 device and another device, effective bandwidth associated with channels, a security criterion, random selection, a channel switching plan, a criterion, and/or a consideration.

The particular destination MAC address and/or an information of the selected channel may be communicated between the Type 1 device and a server through a network. The particular destination MAC address and/or the information of the selected channel may also be communicated between a Type 2 device and a server through another network. The Type 2 device may communicate the particular destination MAC address and/or the information of the selected channel to another Type 2 device (e.g. via a mesh network, via Bluetooth, via WiFi, etc). The particular destination MAC address and/or the information of the selected channel may be chosen by a server. The particular destination MAC address and/or the information of the selected channel may be signaled in an announcement channel by the Type 1 device and/or a server. Before the particular destination MAC address and/or the information of the selected channel is being communicated, it may be pre-processed.

Wireless connection between the Type 1 device and another wireless device may be established. The Type 1 device may send a first wireless signal (e.g. a sounding frame, a probe signal, a request-to-send RTS) to the another wireless device. The another wireless device may reply by sending a second wireless signal (e.g. a command, or a clear-to-send CTS) to the Type 1 device, triggering the Type 1 device to transmit the wireless signal (e.g. series of probe signals) in the broadcasting manner to the at least one Type 2 device without establishing wireless connection with any of the at least one Type 2 device. The second wireless signal may be a response or an acknowledge (e.g. ACK) to the first wireless signal. The second wireless signal may contain a data with information of at least one of: the venue, and the Type 1 device. The first wireless signal may also be in response to the second wireless signal.

The another wireless device may be a dummy wireless device with a purpose (e.g. a primary purpose, a secondary purpose) to establish the wireless connection with the Type 1 device, to receive the first wireless signal, and/or to send the second wireless signal. The another wireless device may be physically attached to the Type 1 device.

In another example, the another wireless device may send a third wireless signal to the Type 1 device triggering the Type 1 device to transmit the wireless signal (e.g. series of probe signals) in the broadcasting manner to the at least one Type 2 device without establishing wireless connection with any of the at least one Type 2 device. The Type 1 device may reply to the third wireless signal by transmitting a fourth wireless signal to the another wireless device.

The another wireless device may not communicate further with the Type 1 device after establishing the connection with the Type 1 device. The another wireless device may suspend communication with the Type 1 device after establishing the connection. The communication may be resumed in the future. The another wireless device may enter an inactive mode, a hibernation mode, a sleep mode, a stand-by mode, a low-power mode, an OFF mode and/or a power-down mode, after establishing the wireless connection with the Type 1 device.

The another wireless device may have the particular destination MAC address. It may use the wireless connection to trigger the Type 1 device to send the at least one series of probe signals in a broadcasting manner to the particular destination MAC address. Each of the at least one Type 2 device may set its MAC address to the particular destination MAC address so as to receive the at least one series of probe signals from the Type 1 device. A new Type 2 device in the venue may obtain the particular destination MAC address from a designated source (e.g. a cloud server, an edge server, a remote server, a local server, a web server, an internet server, a webpage, a database) and set its MAC address to the particular destination MAC address so as to receive the at least one series of probe signals from the Type 1 device Both the Type 1 device and the another wireless device may be controlled and/or coordinated by at least one of: a first processor associated with the Type 1 device, a second processor associated with the another wireless device, a third processor associated with the designated source and/or a fourth processor associated with another device. The first processor and the second processor may coordinate with each other.

A first series of probe signals may be transmitted by a first antenna of the Type 1 device to at least one first Type 2 device through a first wireless multipath channel in a first venue. A second series of probe signals may be transmitted by a second antenna of the Type 1 device to at least one second Type 2 device through a second wireless multipath channel in a second venue. The first series and the second series may/may not be different. The at least one first Type 2 device may/may not be different from the at least one second Type 2 device. The first series and/or the second series of probe signals may be transmitted in a broadcasting manner. The first antenna may/may not be different from the second antenna.

The Type 1 device may send the two separate series of probe signals to two separate groups of Type 2 devices located in two venues. The first set of Type 2 devices (the at least one first Type 2 device) may receive the first time series of probe signals through a first wireless multipath channel of the first venue. The second set of Type 2 devices (the at least one second Type 2 device) may receive the second time series of probe signals through a second wireless multipath channel in the second venue. If in broadcasting mode, Type 1 device may not establish wireless connection with any of the at least one first and second Type 2 devices.

The two venues may have different sizes, shape, multipath characteristics. The first venue and the second venue may overlap partially. The immediate area around the first antenna and second antenna may be part of the overlapped area. The first venue may be a subset of the second venue, or vice versa. The first wireless multipath channel and the second wireless multipath channel may be different. For example, the first one may be WiFi while the second may be LTE. Or, both may be WiFi, but the first one may be 2.4 GHz WiFi and the second may be 5 GHz WiFi. Or, both may be 2.4 GHz WiFi, but may have different channel numbers, with different SSID names, and WiFi settings (e.g. encryption—the first may use PKA and the second may use PKA2).

Each first Type 2 device may obtain at least one first time series of CI from the first series of probe signals, the CI being of the first wireless multipath channel between the first Type 2 device and the Type 1 device. Each second Type 2 device may obtain at least one second time series of CI from the second series of probe signals, the CI being of the second wireless multipath channel between the second Type 2 device and the Type 1 device.

The first antenna may/may not be the second antenna. The at least one first Type 2 device may/may not be the same as the at least one second Type 2 device. A particular first Type 2 device may be the same as a particular second Type 2 device. The first and second series of probe signals may/may not be synchronous. The transmission of the first series of probe signals may not be synchronous to the transmission of the second series of probe signals. A probe signal may be transmitted with data. A probe signal may be replaced by a data signal.

The first series of probe signals may be transmitted at a first pseudo-regular interval (e.g. at a rate of 30 Hz). The second series of probe signals may be transmitted at a second pseudo-regular interval (e.g. at a rate of 300 Hz). The first pseudo-regular interval may/may not be different from the second pseudo-regular interval. The first and/or second pseudo-regular interval may be changed over time. The change may be according to at least one of: a time table, a rule, a policy, a mode, a condition, a situation, and/or a change. Any pseudo-regular interval may be changed over time.

The first series of probe signals may be transmitted to a first destination MAC address. The second series of probe signals may be transmitted to a second destination MAC address. The two destination MAC addresses may/may not be different. Any of the two destination MAC addresses may be changed over time. The change may be according to at least one of: a time table, a rule, a policy, a mode, a condition, a situation, and/or a change.

The first series of probe signals may be transmitted in a first channel. The second series of probe signals may be transmitted in a second channel. The first channel and the second channel may/may not be different. The first channel and/or the second channel may be changed over time. The change may be according to at least one of: a time table, a rule, a policy, a mode, a condition, a situation, and/or a change.

A first wireless connection may be established between the Type 1 device and another wireless device. The Type 1 device may establish the first wireless connection with the another wireless device. The Type 1 device may send a first wireless signal to the another wireless device. The another wireless device may send a second wireless signal to the Type 1 device. One of the first wireless signal and the second wireless signal may be in response to the other. The second wireless signal to the Type 1 device may trigger the Type 1 device to transmit the first series of probe signals in the broadcasting manner. The second wireless signal may be an acknowledge to the first wireless signal.

A second wireless connection may be established between the Type 1 device and yet another wireless device. The Type 1 device may establish the second wireless connection with the yet another wireless device. The Type 1 device may send a third wireless signal to the yet another wireless device. The yet another wireless device may send a fourth wireless signal to the Type 1 device. One of the third wireless signal and the fourth wireless signal may be in response to the other. The fourth wireless signal to the Type 1 device may trigger the Type 1 device to transmit the second series of probe signals in the broadcasting manner. The fourth wireless signal may be an acknowledge to the third wireless signal. The third wireless signal may be similar to the first wireless signal. The fourth wireless signal may be similar to the second wireless signal. The yet another wireless device may be the another wireless device. The third wireless signal may be sent by the Type 1 device before the first wireless communication is fully established and/or completed.

The another wireless device and the yet another wireless device may be the same device, which may perform signal handshake (e.g. the handshake with the first wireless signal and second wireless signal, or the handshake with the third signal and the fourth signal) with all Type 1 devices sequentially to trigger them to transmit in the broadcasting manner. The signal handshake with the Type 1 devices may be performed in at least one of: a sequential manner, a parallel manner and a mixed manner (partially sequential, partially parallel).

The Type 1 device, the another wireless device and/or the yet another wireless device may be controlled and/or coordinated, physically attached, or may be of/in/of a common device. At least two of the Type 1 device, the another wireless device and/or the yet another wireless device may be controlled by/connected to a common data processor, or may be connected to a common bus interconnect/network/LAN/Bluetooth network/BLE network/wired network/wireless network/mesh network/mobile network/cloud, or may share a common memory, or may be associated with a common user/user profile/user account/identity (ID)/household/house/physical address/location/geographic coordinate/IP subnet/SSID/user device/home device/office device/manufacturing device.

The Type 1 device, the another wireless device and/or the yet another wireless device may each be associated a processor, a memory communicatively coupled with the processor, and a set of instruction stored in the memory to be executed by the processor. The Type 1 device, the another wireless device and/or the yet another wireless device may each comprise a processor, a memory communicatively coupled with the processor, and a set of instruction stored in the memory to be executed by the processor. When executed, the set of instructions may cause the device to perform an operation. Their processors may be coordinated.

At least one series of probe signals may be transmitted asynchronously and contemporaneously by each of more than one Type 1 heterogeneous wireless devices. Each respective series of probe signals is transmitted by an antenna of respective Type 1 heterogeneous wireless device in a broadcasting manner to a respective set of Type 2 devices through a wireless multipath channel, without the respective Type 1 device establishing wireless connection with any of the respective set of Type 2 receivers.

The transmitting may be using a respective processor, a respective memory and a respective set of instructions. Each of the more than one Type 1 heterogeneous wireless devices may have a heterogeneous integrated circuit (IC). Each of the respective set of Type 2 Type 2 device may have a respective heterogeneous IC.

Each Type 1 device may be the signal source of a set of respective Type 2 devices (i.e. the Type 1 device sends a respective wireless signal (series of probe signals) to the set of respective Type 2 devices. Each respective Type 2 device chooses the Type 1 device from among all Type 1 devices as its signal source. Each Type 2 device may choose asynchronously (at different time). At least one time series of CI may be obtained by each respective Type 2 device from the respective series of probe signals from the Type 1 device, the CI being of the wireless multipath channel between the Type 2 device and the Type 1 device.

The respective Type 2 device chooses the Type 1 device from among all Type 1 devices as its signal source based on at least one of: identity (ID) of the Type 1 device and/or the respective Type 2 receiver, information of at least one of: a user, an account, access info, a parameter, a characteristics, and a signal strength associated with the Type 1 device and/or the respective Type 2 receiver, a task to be performed by the Type 1 device and/or the respective Type 2 receiver, whether the Type 1 device is the same as a past signal source, a history (of the past signal source, the Type 1 device, another Type 1 device, the respective Type 2 receiver, and another Type 2 receiver), and/or at least one threshold for switching signal source.

Initially, the Type 1 device may be the signal source of a set of initial respective Type 2 devices (i.e. the Type 1 device sends a respective wireless signal (series of probe signals) to the set of initial respective Type 2 devices) at an initial time. Each initial respective Type 2 device chooses the Type 1 device from among all Type 1 devices as its signal source.

The signal source (Type 1 device) of a particular Type 2 device may be changed when at least one of the following occurs: (1) a time interval between two adjacent probe signals (e.g. between the current probe signal and an immediate past probe signal, or between the next probe signal and the current probe signal) received from the current signal source of the particular Type 2 device exceeds a first threshold, (2) a signal strength associated with the current signal source of the Type 2 device is below a second threshold at the respective current time, (3) a processed signal strength associated with the current signal source of the Type 2 device is below a second threshold at the respective current time after the signal strength is processed with at least one of: a low pass filter, a band pass filter, a median filter, a moving average filter, a weighted averaging filter, a linear filter and a non-linear filter, and/or (4) the signal strength (or processed signal strength) associated with the current signal source of the Type 2 device is below a fourth threshold for a significant percentage of a recent time window (e.g 70%, 80%, 90%, etc.). The percentage may exceed a fifth threshold. Any of first threshold, second threshold, third threshold, fourth threshold and fifth threshold may be time varying.

Condition (1) may occur when the Type 1 device and the Type 2 device become progressively far away from each other, such that some probe signal from the Type 1 device becomes too weak and is not received by the Type 2 device. Conditions (2)-(4) may occur when the two devices become far from each other such that the signal strength becomes very weak.

The signal source of the particular Type 2 device may not change if the other Type 1 devices have signal strength weaker than the current signal source (current selected Type 1 device). In another example, the signal source of the particular Type 2 device may also not change if the other Type 1 devices have signal strength weaker than a factor (e.g. 1.1, 1.2, or 1.5, etc.) of signal strength of the current signal source.

If the signal source is changed, the new signal source may take effect at a near future time (e.g. the respective next time). The new signal source may be the Type 1 device with strongest signal strength. The new signal source may also be the Type 1 device with strongest processed signal strength, wherein the signal strength of each Type 1 device may be processed with at least one of: a low pass filter, a band pass filter, a median filter, a moving average filter, a weighted averaging filter, a linear filter and a non-linear filter.

A list of available Type 1 devices may be initialized. The list may be updated by examining signal strength associated with the respective set of Type 1 devices. The list of available Type 1 devices may also be updated by examining processed signal strength associated with the respective set of Type 1 devices.

The respective chosen Type 1 device may/may not be different from the current signal source.

A Type 2 device may choose between the first series of probe signals and the second series of probe signals based on: respective pseudo-regular intervals, respective destination MAC addresses, respective channels, respective characteristics/properties/states, a respective task to be performed by the Type 2 device, signal strength of first series and second series, and/or another consideration.

The yet another wireless device and the another wireless device may be the same device. They may be in/on/of a common device. The Type 1 device may first establish the first wireless communication with the another wireless device, and then establish the second wireless communication with the yet another wireless device. The Type 1 device may start establishing the second wireless communication with the yet another wireless device before the first wireless communication is fully established. The Type 1 device may start establishing the second wireless communication with the yet another wireless device while the first wireless communication is being established.

The another wireless device may set its MAC address to a first destination MAC address and establish the first wireless connection with the Type 1 device using the first destination MAC address. The yet another wireless device may set its MAC address to a second destination MAC address and establish the second wireless connection with the Type 1 device using the second destination MAC address.

The transmitting may be using a processor, a memory and a set of instructions. Each of the Type 1 device and/or at least one Type 2 device may also have a heterogeneous IC. The heterogeneous IC may comprise the processor, memory and the set of instructions. The heterogeneous IC in different devices may be the same or different. Each Type 2 device may extract at least one time series of CI of the wireless multipath channel between the Type 1 device and the Type 2 device from the wireless signal. Each time series of CI is associated with an antenna of the Type 1 device and an antenna of the Type 2 device. The heterogeneous IC may generate the wireless signal, transmit or receive the wireless signal, extract the time series of CI from the wireless signal, and make the time series of CI available (e.g. to the processor/memory, other processors/memory).

Multiple Type 1 devices may transmit wireless signals asynchronously (e.g. to the same Type 2 device, to a number of Type 2 devices).

Multiple Type 2 devices may receive the wireless signal asynchronously. They may extract respective time series of CI from the wireless signal asynchronously, with respective heterogeneous starting time.

The wireless signal may be a series of probe signals. A probe signal may be transmitted with data. A probe signal may be replaced by a data signal.

The series of probe signals may be transmitted at a pseudo-regular interval (e.g. 100 probe signals per second). The pseudo-regular interval may be changed. The series of probe signals may be scheduled at a regular interval (e.g. 100 probe signals per second), but each probe signal may experience small time perturbation, perhaps due to timing requirement, timing control, network control, handshaking, message passing, collision avoidance, carrier sensing, congestion, availability of resources, and/or another consideration.

The series of probe signals may be transmitted at the pseudo-regular interval for a period of time. The pseudo-regular interval, the duration of the period of time and/or the starting time of the period of time, may be changed over time. For example, it may be 100 probe signals per second (probe/sec in short) for 2 hours and then changed to 1000 probe/sec for 30 minutes, and may change again.

The change may be according to a time table, a rule, a policy, a mode, a condition and/or a change (e.g. once every hour, or changed whenever a certain event occur). For example, the pseudo-regular interval may normally be 100 probe/sec, but will be changed to 1000 probe/sec in some demanding situations, and may be changed to 10 probe/sec in some low power and/or standby situation. The probe signals may be sent in burst also, e.g. at 100 probe/sec for 1 minute and no signal for some time before and after the burst. Or, the probe signal may be sent at 100 probe/sec and then momentarily at a burst rate of 1000 probe/sec for 1 minute and then back to 100 probe/sec. In another example, the probe signal may be sent at 1 probe/sec in a low power mode, at 10 probe/sec in a standby mode, at 100 probe/sec in a normal mode, and at 1000 probe/sec in an armed mode, etc.

The change based on at least one task performed by Type 1 device or Type 2 device. For example, the task of one receiver may need 10 probe/sec while the task of another receiver may need 1000 probe/sec. The pseudo-regular interval may be increased to 1000 probe/sec to satisfy the most demanding receiver. In one example, the receivers, the tasks associated with the receivers and/or the wireless multipath channel as experienced by the receivers may be divided into at least one class (e.g. a low priority class, a high priority class, an emergency class, a critical-task class, a regular class, a privileged class, a non-subscription class, a subscription class, a paying class, a non-paying class, etc.) and the pseudo-regular interval may be adjusted for the sake of some selected class (e.g. the high priority class). When the need of that selected class is less demanding, the pseudo-regular interval may be changed (increased or decreased). When a receiver has critically low power, the pseudo-regular interval may be reduced to reduce the power consumption of the receiver to respond to the probe signals.

In one example, the probe signals may be used to transfer power wirelessly to a receiver, and the pseudo-regular interval may be adjusted to control the amount of power being wirelessly transferred to the receiver.

The pseudo-regular interval may be changed by and/or based on a server, the Type 1 device and/or the Type 2 device. The server may be communicatively coupled with the Type 1 device and/or the Type 2 device. The change may be communicated between the server, the Type 1 device and/or the Type 2 device. For example, the server may monitor, track, forecast and/or anticipate the needs of the Type 2 device and/or the tasks performed by the receivers, and may decide to change the pseudo-regular interval accordingly. The server may send the change request to the Type 1 device (immediately or with some time delay) and the Type 1 device may then make the change. The server may keep track of a time table and may make scheduled changes to the pseudo-regular interval according to the time table. The server may detect an emergency situation of a receiver and change the pseudo-regular interval immediately. The server may detect a slowly happening condition (and/or an evolving condition) associated with a receiver and gradually adjust the pseudo-regular interval accordingly.

There may be more than one Type 1 devices. Each Type 1 device may transmit a respective wireless signal to more than one respective Type 2 devices through the wireless multipath channel in the venue. A CI time series may be obtained, each CI time series associated with a Type 1 device and a Type 2 device.

The characteristics and/or the spatial-temporal information of the motion of the object may be monitored individually based on a CI time series associated with a particular Type 1 device and a particular Type 2 device.

The characteristics and/or the spatial-temporal information of the motion of the object may be monitored jointly based on any CI time series associated with the particular Type 1 device and any Type 2 device.

The characteristics and/or the spatial-temporal information of the motion of the object may also be monitored jointly based on any CI time series associated with the particular Type 2 device and any Type 1 device.

The characteristics and/or the spatial-temporal information of the motion of the object may be monitored globally based on any CI time series associated with any Type 1 device and any Type 2 device.

Any joint monitoring (of the same motion or of the same object) may be associated with at least one of: a user, a user account, a profile, a household, a room, a location, and/or a user history, etc.

A first wireless multipath channel between a Type 1 device and a Type 2 device may be different from a second wireless multipath channel between another Type 1 device and another Type 2 device. The two wireless multipath channels may be associated with different frequency bands, different bandwidth, different carrier frequency, different modulation, different wireless standards, different coding, different encryption, different payload characteristics, different networks, different network parameters, etc.

The first wireless multipath channel and the second wireless multipath channel may be associated with different kinds of wireless system (e.g. two of the following: WiFi, LTE, LTE-A, 2.5G, 3G, 3.5G, 4G, beyond 4G, 5G, 6G, 7G, a 802.11 system, a 802.15 system, a 802.16 system, mesh network, Zigbee, WiMax, Bluetooth, BLE, RFID, UWB, microwave system, radar like system, etc.). For example, the first may be WiFi while the second may be LTE.

The first wireless multipath channel and the second wireless multipath channel may be associated with similar kinds of wireless system, but in different network. For example, the first wireless multipath channel may be associated with a WiFi network named "Pizza and Pizza" in the 2.4 GHz band with a bandwidth of 20 MHz while the second may be associated with a WiFi network called "StarBud hotspot" in the 5 GHz band with a bandwidth of 40 MHz.

The first wireless multipath channel may be associated with a particular wireless system (e.g. WiFi, or LTE, or 3G, or BLE, or mesh network, or adhoc network) while the second wireless multipath channel may be associated another wireless system of same kind as the first wireless multipath channel (e.g. both WiFi, or both LTE, or both 3G, etc.) with different network ID, SSID, characteristics, settings, and/or parameters. The first wireless multipath channel may also be a WiFi channel while the second wireless multipath channel may be another WiFi channel. For example, both first and second wireless multipath channels may be in the same WiFi network named "StarBud hotspot", using two different WiFi channels in "StarBud hotspot".

In one embodiment, a wireless monitoring system may comprise training at least one classifier of at least one known events in a venue based on training CI time series associated with the at least one events.

For each of the at least one known event happening in the venue in a respective training time period associated with the known event, a respective training wireless signal (e.g. a respective series of training probe signals) may be transmitted by an antenna of a first Type 1 heterogeneous wireless device using a processor, a memory and a set of instructions of the first Type 1 device to at least one first Type 2 heterogeneous wireless device through a wireless multipath channel in the venue in the respective training time period.

At least one respective time series of training CI (training CI time series) may be obtained asynchronously by each of the at least one first Type 2 device from the (respective) training wireless signal. The CI may be CI of the wireless multipath channel between the first Type 2 device and the first Type 1 device in the training time period associated with the known event. The at least one training CI time series may be preprocessed.

For a current event happening in the venue in a current time period, a current wireless signal (e.g. a series of current probe signals) may be transmitted by an antenna of a second Type 1 heterogeneous wireless device using a processor, a memory and a set of instructions of the second Type 1 device to at least one second Type 2 heterogeneous wireless device through the wireless multipath channel in the venue in the current time period associated with the current event.

At least one time series of current CI (current CI time series) may be obtained asynchronously by each of the at least one second Type 2 device from the current wireless signal (e.g. the series of current probe signals). The CI may be CI of the wireless multipath channel between the second Type 2 device and the second Type 1 device in the current time period associated with the current event. The at least one current CI time series may be preprocessed.

The at least one classifier may be applied to classify at least one current CI time series obtained from the series of current probe signals by the at least one second Type 2 device, to classify at least one portion of a particular current CI time series, and/or to classify a combination of the at least one portion of the particular current CI time series and another portion of another CI time series. The at least one classifier may also be applied to associate the current event with a known event, an unknown event and/or another event.

Each wireless signal (e.g. each series of probe signals) may comprise at least two CI each with an associated time stamp. Each CI may be associated with a respective time stamp.

A current CI time series associated with a second Type 2 device and another current CI time series associated with another second Type 2 device may have different starting time, different time duration, different stopping time, different count of items in the time series, different sampling frequency, different sampling period between two consecutive items in the time series, and/or CI (CI) with different features.

The first Type 1 device and the second Type 1 device may be the same device. The first Type 1 device and the second Type 1 device may be at same location in the venue.

The at least one first Type 2 device and the at least one second Type 2 device may be the same. The at least one first Type 2 device may be a permutation of the at least one second Type 2 device. A particular first Type 2 device and a particular second Type 2 device may be the same device.

The at least one first Type 2 device and/or a subset of the at least one first Type 2 device may be a subset of the at least one second Type 2 device. The at least one second Type 2 device and/or a subset of the at least one second Type 2 device may be a subset of the at least one first Type 2 device.

The at least one first Type 2 device and/or a subset of the at least one first Type 2 device may be a permutation of a subset of the at least one second Type 2 device. The at least one second Type 2 device and/or a subset of the at least one second Type 2 device may be a permutation of a subset of the at least one first Type 2 device.

The at least one second Type 2 device and/or a subset of the at least one second Type 2 device may be at same respective location as a subset of the at least one first Type 2 device. The at least one first Type 2 device and/or a subset of the at least one first Type 2 device may be at same respective location as a subset of the at least one second Type 2 device.

The antenna of the Type 1 device and the antenna of the second Type 1 device may be at same location in the venue. Antenna(s) of the at least one second Type 2 device and/or antenna(s) of a subset of the at least one second Type 2 device may be at same respective location as respective antenna(s) of a subset of the at least one first Type 2 device. Antenna(s) of the at least one first Type 2 device and/or antenna(s) of a subset of the at least one first Type 2 device may be at same respective location(s) as respective antenna(s) of a subset of the at least one second Type 2 device.

A first section of a first time duration of the first CI time series and a second section of a second time duration of the second section of the second CI time series may be aligned. A map between items of the first section and items of the second section may be computed.

The first section may comprise at least one of: a first segment of the first CI time series with a first starting time and/or a first ending time, and another segment of a processed first CI time series. The processed first CI time series may be the first CI time series processed by a first operation.

The second section may comprise at least one of: a second segment of the second CI time series with a second starting time and a second ending time, and another segment of a processed second CI time series. The processed second CI time series may be the second CI time series processed by a second operation.

The first operation and/or the second operation may comprise at least one of: subsampling, re-sampling, interpolation, filtering, transformation, feature extraction, preprocessing, and/or another operation.

A first item of the first section may be mapped to a second item of the second section. The first item of the first section may also be mapped to another item of the second section. Another item of the first section may also be mapped to the second item of the second section. The mapping may be one-to-one, one-to-many, many-to-one, many-to-many.

At least one function of at least one of: the first item of the first section of the first CI time series, another item of the first CI time series, a time stamp of the first item, a time difference of the first item, a time differential of the first item, a neighboring time stamp of the first item, another time stamp associated with the first item, the second item of the second section of the second CI time series, another item of the second CI time series, a time stamp of the second item, a time difference of the second item, a time differential of the second item, a neighboring time stamp of the second item, and another time stamp associated with the second item, may satisfy at least one constraint.

One constraint may be that a difference between the time stamp of the first item and the time stamp of the second item may be upper-bounded by an adaptive upper threshold and lower-bounded by an adaptive lower threshold.

The first section may be the entire first CI time series. The second section may be the entire second CI time series. The first time duration may be equal to the second time duration.

A section of a time duration of a CI time series may be determined adaptively. A tentative section of the CI time series may be computed. A starting time and an ending time of a section (e.g. the tentative section, the section) may be determined. The section may be determined by removing a beginning portion and an ending portion of the tentative section.

A beginning portion of a tentative section may be determined as follows. Iteratively, items of the tentative section with increasing time stamp may be considered as a current item, one item at a time.

In each iteration, at least one activity measure may be computed and/or considered. The at least one activity measure may be associated with at least one of: the current item associated with a current time stamp, past items of the tentative section with time stamps not larger than the current time stamp, and/or future items of the tentative section with time stamps not smaller than the current time stamp. The current item may be added to the beginning portion of the tentative section if at least one criterion associated with the at least one activity measure is satisfied.

The at least one criterion associated with the activity measure may comprise at least one of: (a) the activity measure is smaller than an adaptive upper threshold, (b) the activity measure is larger than an adaptive lower threshold, (c) the activity measure is smaller than an adaptive upper threshold consecutively for at least a predetermined amount of consecutive time stamps, (d) the activity measure is larger than an adaptive lower threshold consecutively for at least another predetermined amount of consecutive time stamps, (e) the activity measure is smaller than an adaptive upper threshold consecutively for at least a predetermined percentage of the predetermined amount of consecutive time stamps, (f) the activity measure is larger than an adaptive lower threshold consecutively for at least another predetermined percentage of the another predetermined amount of consecutive time stamps, (g) another activity measure associated with another time stamp associated with the current time stamp is smaller than another adaptive upper threshold and larger than another adaptive lower threshold, (h) at least one activity measure associated with at least one respective time stamp associated with the current time stamp is smaller than respective upper threshold and larger than respective lower threshold, (i) percentage of time stamps with associated activity measure smaller than respective upper threshold and larger than respective lower threshold in a set of time stamps associated with the current time stamp exceeds a threshold, and (j) another criterion.

An activity measure associated with an item at time $T1$ may comprise at least one of: (1) a first function of the item at time $T1$ and an item at time $T1-D1$, wherein $D1$ is a pre-determined positive quantity (e.g. a constant time offset), (2) a second function of the item at time $T1$ and an item at time $T1+D1$, (3) a third function of the item at time $T1$ and an item at time $T2$, wherein $T2$ is a pre-determined quantity (e.g. a fixed initial reference time; $T2$ may be changed over time; $T2$ may be updated periodically; $T2$ may be the beginning of a time period and $T1$ may be a sliding time in the time period), and (4) a fourth function of the item at time $T1$ and another item.

At least one of: the first function, the second function, the third function, and/or the fourth function may be a function (e.g. $F(X, Y, \ldots)$) with at least two arguments: $X$ and $Y$.

The two arguments may be scalars. The function (e.g. $F$) may be a function of at least one of: $X$, $Y$, $(X-Y)$, $(Y-X)$, $abs(X-Y)$, $X^a$, $Y^b$, $abs(X^a-Y^b)$, $(X-Y)^a$, $(X/Y)$, $(X+a)/(Y+b)$, $(X^a/Y^b)$, and $((X/Y)^a-b)$, wherein $a$ and $b$ are may be some predetermined quantities. For example, the function may simply be $abs(X-Y)$, or $(X-Y)^2$, $(X-Y)^4$. The function may be a robust function. For example, the function may be $(X-Y)^2$ when $abs(X-Y)$ is less than a threshold $T$, and $(X-Y)+a$ when $abs(X-Y)$ is larger than $T$. Alternatively, the function may be a constant when $abs(X-Y)$ is larger than $T$. The function may also be bounded by a slowly increasing function when $abs(X-y)$ is larger than $T$, so that outliers cannot severely affect the result. Another example of the function may be $(abs(X/Y)-a)$, where $a=1$. In this way, if $X=Y$ (i.e. no change or no activity), the function will give a value of 0. If $X$ is larger than $Y$, $(X/Y)$ will be larger than 1 (assuming $X$ and $Y$ are positive) and the function will be positive. And if $X$ is less than $Y$, $(X/Y)$ will be smaller than 1 and the function will be negative.

In another example, both arguments $X$ and $Y$ may be n-tuples such that $X=(x\_1, x\_2, \ldots, x\_n)$ and $Y=(y\_1, y\_2, \ldots, y\_n)$. The function may be a function of at least one of: $x\_i$, $y\_i$, $(x\_i-y\_i)$, $(y\_i-x\_i)$, $abs(x\_i-y\_i)$, $x\_i^a$, $y\_i^b$, $abs(x\_i^a-y\_i^b)$, $(x\_i-y\_i)^a$, $(x\_i/y\_i)$, $(x\_i+a)/(y\_i+b)$, $(x\_i^a/y\_i^b)$, and $((x\_i/y\_i)^a-b)$, wherein $i$ is a component index of the n-tuple $X$ and $Y$, and $1<=i<=n$. E.g. component index of $x\_1$ is $i=1$, component index of $x\_2$ is $i=2$.

The function may comprise a component-by-component summation of another function of at least one of the following: $x\_i$, $y\_i$, $(x\_i-y\_i)$, $(y\_i-x\_i)$, $abs(x\_i-y\_i)$, $x\_i^a$, $y\_i \ ^b$, $abs(x\_i^a-y\_i^b)$, $(x\_i-y\_i)^a$, $(x\_i/y\_i)$, $(x\_i+a)/(y\_i+b)$, $(x\_i^a/y\_i^b)$, and $((x\_i/y\_i)^a-b)$, wherein $i$ is the component index of the n-tuple $X$ and $Y$. For example, the function may be in a form of $sum\_\{i=1\}^n (abs(x\_i/y\_i)-1)/n$, or $sum\_\{i=1\}^n w\_i*(abs(x\_i/y\_i)-1)$, where $w\_i$ is some weight for component $i$.

The map may be computed using dynamic time warping (DTW). The DTW may comprise a constraint on at least one of: the map, the items of the first CI time series, the items of the second CI time series, the first time duration, the second time duration, the first section, and/or the second section. Suppose in the map, the $i^\{th\}$ domain item is mapped to the $j^\{th\}$ range item. The constraint may be on admissible combination of $i$ and $j$ (constraint on relationship between $i$ and $j$).

Mismatch cost between a first section of a first time duration of a first CI time series and a second section of a second time duration of a second CI time series may be computed.

The first section and the second section may be aligned such that a map comprising more than one links may be established between first items of the first CI time series and second items of the second CI time series. With each link, one of the first items with a first time stamp may be associated with one of the second items with a second time stamp.

A mismatch cost between the aligned first section and the aligned second section may be computed. The mismatch cost may comprise a function of: an item-wise cost between a first item and a second item associated by a particular link of the map, and a link-wise cost associated with the particular link of the map.

The aligned first section and the aligned second section may be represented respectively as a first vector and a second vector of same vector length. The mismatch cost may comprise at least one of: an inner product, an inner-product-like quantity, a quantity based on correlation, a quantity based on covariance, a discriminating score, a distance, a Euclidean distance, an absolute distance, an Lk distance (e.g. L1, L2, . . . ), a weighted distance, a distance-like quantity and/or another similarity value, between the first vector and the second vector. The mismatch cost may be normalized by the respective vector length.

A parameter derived from the mismatch cost between the first section of the first time duration of the first CI time series and the second section of the second time duration of the second CI time series may be modeled with a statistical distribution. At least one of: a scale parameter, a location parameter and/or another parameter, of the statistical distribution may be estimated.

The first section of the first time duration of the first CI time series may be a sliding section of the first CI time series. The second section of the second time duration of the second CI time series may be a sliding section of the second CI time series.

A first sliding window may be applied to the first CI time series and a corresponding second sliding window may be applied to the second CI time series. The first sliding window of the first CI time series and the corresponding second sliding window of the second CI time series may be aligned.

Mismatch cost between the aligned first sliding window of the first CI time series and the corresponding aligned second sliding window of the second CI time series may be computed. The current event may be associated with at least one of: the known event, the unknown event and/or the another event, based on the mismatch cost.

The classifier may be applied to at least one of: each first section of the first time duration of the first CI time series, and/or each second section of the second time duration of the second CI time series, to obtain at least one tentative classification results. Each tentative classification result may be associated with a respective first section and a respective second section.

The current event may be associated with at least one of: the known event, the unknown event and/or the another event, based on the mismatch cost.

The current event may be associated with at least one of: the known event, the unknown event and/or the another event, based on a largest number of tentative classification results in more than one sections of the first CI time series and corresponding more than sections of the second CI time series. For example, the current event may be associated with a particular known event if the mismatch cost points to the particular known event for N consecutive times (e.g. N=10). In another example, the current event may be associated with a particular known event if the percentage of mismatch cost within the immediate past N consecutive N pointing to the particular known event exceeds a certain threshold (e.g. >80%).

In another example, the current event may be associated with a known event that achieve smallest mismatch cost for the most times within a time period. The current event may be associated with a known event that achieves smallest overall mismatch cost, which is a weighted average of at least one mismatch cost associated with the at least one first sections. The current event may be associated with a particular known event that achieves smallest of another overall cost.

The current event may be associated with the "unknown event" if none of the known events achieve mismatch cost lower than a first threshold T1 in a sufficient percentage of the at least one first section. The current event may also be associated with the "unknown event" if none of the events achieve an overall mismatch cost lower than a second threshold T2.

The current event may be associated with at least one of: the known event, the unknown event and/or the another event, based on the mismatch cost and additional mismatch cost associated with at least one additional section of the first CI time series and at least one additional section of the second CI time series.

The known events may comprise at least one of: a door closed event, a door open event, a window closed event, a window open event, a multi-state event, an on-state event, an off-state event, an intermediate state event, a continuous state event, a discrete state event, a human-present event, a human-absent event, a sign-of-life-present event, and/or a sign-of-life-absent event.

A projection for each CI may be trained using a dimension reduction method based on the training CI time series. The dimension reduction method may comprise at least one of: principal component analysis (PCA), PCA with different kernel, independent component analysis (ICA), Fisher linear discriminant, vector quantization, supervised learning, unsupervised learning, self-organizing maps, auto-encoder, neural network, deep neural network, and/or another method. The projection may be applied to at least one of: the training CI time series associated with the at least one event, and/or the current CI time series, for the at least one classifier.

The at least one classifier of the at least one event may be trained based on the projection and the training CI time series associated with the at least one event. The at least one current CI time series may be classified based on the projection and the current CI time series.

The projection may be re-trained using at least one of: the dimension reduction method, and another dimension reduction method, based on at least one of: the training CI time series, at least one current CI time series before retraining the projection, and/or additional training CI time series.

The another dimension reduction method may comprise at least one of: principal component analysis (PCA), PCA with different kernels, independent component analysis (ICA), Fisher linear discriminant, vector quantization, supervised learning, unsupervised learning, self-organizing maps, auto-encoder, neural network, deep neural network, and/or yet another method, The at least one classifier of the at least one event may be re-trained based on at least one of: the re-trained projection, the training CI time series associated with the at least one events, and/or at least one current CI time series.

The at least one current CI time series may be classified based on: the re-trained projection, the re-trained classifier, and/or the current CI time series.

Each CI may comprise a vector of complex values. Each complex value may be preprocessed to give the magnitude of the complex value. Each CI may be preprocessed to give a vector of non-negative real numbers comprising the magnitude of corresponding complex values.

Each training CI time series may be weighted in the training of the projection.

The projection may comprise more than one projected components. The projection may comprise at least one most significant projected component. The projection may comprise at least one projected component that may be beneficial for the at least one classifier.

The channel information (CI) may be associated with/may comprise signal strength, signal amplitude, signal phase, received signal strength indicator (RSSI), channel state information (CSI), a channel impulse response (CIR), a channel frequency response (CFR). The CI may be associated with information associated with a frequency band, a frequency signature, a frequency phase, a frequency amplitude, a frequency trend, a frequency characteristics, a frequency-like characteristics, a time domain element, a frequency domain element, a time-frequency domain element, an orthogonal decomposition characteristics, and/or a non-orthogonal decomposition characteristics of the wireless signal through the wireless multipath channel.

The CI may also be associated with information associated with a time period, a time signature, a time stamp, a time amplitude, a time phase, a time trend, and/or a time characteristics of the wireless signal. The CI may be associated with information associated with a time-frequency partition, a time-frequency signature, a time-frequency amplitude, a time-frequency phase, a time-frequency trend, and/or a time-frequency characteristics of the wireless signal. The CI may be associated with a decomposition of the wireless signal. The CI may be associated with information associated with a direction, an angle of arrival (AoA), an angle of a directional antenna, and/or a phase of the wireless signal through the wireless multipath channel. The CI may be associated with attenuation patterns of the wireless signal through the wireless multipath channel. Each CI may be associated with a Type 1 device and a Type 2 device. Each CI may be associated with an antenna of the Type 1 device and an antenna of the Type 2 device.

The channel information (CI) may be obtained from a communication hardware that is capable of providing the CI. The communication hardware may be a WiFi-capable chip/IC (integrated circuit), a chip compliant with a 802.11 or 802.16 or another wireless/radio standard, a next generation WiFi-capable chip, a LTE-capable chip, a 5G-capable chip, a 6G/7G/8G-capable chip, a Bluetooth-enabled chip, a BLE (Bluetooth low power)-enabled chip, a UWB chip, another communication chip (e.g. Zigbee, WiMax, mesh network), etc. The communication hardware computes the CI and stores the CI in a buffer memory and make the CI available for extraction. The CI may comprise data and/or at least one matrices related to channel state information (CSI). The at least one matrices may be used for channel equalization, and/or beam forming, etc.

The wireless multipath channel may be associated with a venue. The attenuation may be due to signal propagation in the venue, signal propagating/reflection/refraction/diffraction through/at/around air (e.g. air of venue), refraction medium/reflection surface such as wall, doors, furniture, obstacles and/or barriers, etc. The attenuation may be due to reflection at surfaces and obstacles (e.g. reflection surface, obstacle) such as floor, ceiling, furniture, fixtures, objects, people, pets, etc.

Each CI may be associated with a time stamp. Each CI may comprise N1 components (e.g. N1 frequency domain components in CFR, N1 time domain components in CIR, or N1 decomposition components). Each component may be associated with a component index. Each component may be a real quantity, an imaginary quantity, a complex quantity, a magnitude, a phase, a flag, and/or a set. Each CI may comprise a vector of complex numbers, a matrix of complex numbers, a set of mixed quantities, and/or a multi-dimensional collection of at least one complex numbers.

Components of a CI time series associated with a particular component index may form a respective component time series associated with the respective index. A CI time series may be divided into N1 component time series. Each respective component time series is associated with a respective component index. The characteristics/spatial-temporal information of the motion of the object may be monitored based on the component time series.

A component-wise characteristics of a component-feature time series of a CI time series may be computed. The component-wise characteristics may be a scalar (e.g. energy) or a function with a domain and a range (e.g. an autocorrelation function, a transform, an inverse transform). The characteristics/spatial-temporal information of the motion of the object may be monitored based on the component-wise characteristics.

A total characteristics of the CI time series may be computed based on the component-wise characteristics of each component time series of the CI time series. The total characteristics may be a weighted average of the component-wise characteristics. The characteristics/spatial-temporal information of the motion of the object may be monitored based on the total characteristics.

The Type 1 device and Type 2 device may support WiFi, WiMax, 3G/beyond 3G, 4G/beyond 4G, LTE, 5G, 6G, 7G, Bluetooth, BLE, Zigbee, a proprietary wireless system, and/or another wireless system.

A common wireless system and/or a common wireless channel may be shared by the Type 1 transceiver and/or the at least one Type 2 transceiver. The at least one Type 2 transceiver may transmit respective wireless signal contemporaneously using the common wireless system and/or the common wireless channel. The Type 1 transceiver may transmit a wireless signal to the at least one Type 2 transceiver using the common wireless system and/or the common wireless channel.

A Type 1 device may temporarily function as a Type 2 device, and vice versa.

Each Type 1 device and Type 2 device may have at least one transmitting/receiving antenna. Each CI may be associated with one of the transmitting antenna of the Type 1 device and one of the receiving antenna of the Type 2 device.

The at least one time series of CI may correspond to various antenna pairs between the Type 1 device and the Type 2 device. The Type 1 device may have at least one antenna. The Type 2 device may also have at least one antenna. Each time series of CI may be associated with an antenna of the Type 1 device and an antenna of the Type 2 device. Averaging or weighted averaging over antenna links may be performed. The averaging or weighted averaging may be over the at least one time series of CI. The averaging may optionally be performed on a subset of the at least one time series of CI corresponding to a subset of the antenna pairs.

Time stamps of CI of a portion of a time series of CI may be irregular and may be corrected so that corrected timestamps of time-corrected CI may be uniformly spaced in time. In the case of multiple Type 1 devices and/or multiple Type 2 devices, the corrected time stamp may be with respect to the same or different clock.

An original timestamp associated with each of the CI may be determined. The original timestamp may not be uniformly spaced in time. Original timestamps of all CI of the particular portion of the particular time series of CI in the current sliding time window may be corrected so that corrected timestamps of time-corrected CI may be uniformly spaced in time.

The characteristics and/or spatial-temporal information may comprise: a location, a position (e.g. initial position, new position), a position on a map, a height, a horizontal location, a vertical location, a distance, a displacement, a speed, an acceleration, a rotational speed, a rotational acceleration, an angle of motion, direction of motion, rotation, a path, deformation, transformation, shrinking, expanding, a gait, a gait cycle, a head motion, a repeated motion, a periodic motion, a pseudo-periodic motion, an impulsive motion, a sudden motion, a fall-down motion, a transient motion, a behavior, a transient behavior, a period of motion, a frequency of motion, a time trend, a temporal profile, a temporal characteristics, an occurrence, a change, a change in frequency, a change in timing, a change of gait cycle, a timing, a starting time, an ending time, a duration, a history of motion, a motion type, a motion classification, a frequency, a frequency spectrum, a frequency characteristics, a presence, an absence, a proximity, an approaching, a receding, an identity of the object, a composition of the object, a head motion rate, a head motion direction, a mouth-related rate, an eye-related rate, a breathing rate, a heart rate, a hand motion rate, a hand motion direction, a leg motion, a body motion, a walking rate, a hand motion rate, a positional characteristics, a characteristics associated with movement of the object, a tool motion, a machine motion, a complex motion, and/or a combination of multiple motions, an event and/or another information. The processor shares computational workload with the Type 1 heterogeneous wireless device and Type 2 heterogeneous wireless device.

The Type 1 device and/or Type 2 device may be a local device. The local device may be: a smart phone, a smart device, TV, sound bar, set-top box, access point, router, repeater, remote control, speaker, fan, refrigerator, microwave, oven, coffee machine, hot water pot, utensil, table, chair, light, lamp, door lock, camera, microphone, motion sensor, security device, fire hydrant, garage door, switch, power adapter, computer, dongle, computer peripheral, electronic pad, sofa, tile, accessory, smart home device, smart vehicle device, smart office device, smart building device, smart manufacturing device, smart watch, smart glasses, smart clock, smart television, smart oven, smart refrigerator, smart air-conditioner, smart chair, smart table, smart accessory, smart utility, smart appliance, smart machine, smart vehicle, an internet-of-thing (IoT) device, an internet-enabled device, a computer, a portable computer, a tablet, a smart house, a smart office, a smart building, a smart parking lot, a smart system, and/or another device.

Each Type 1 device may be associated with a respective identify (ID). Each Type 2 device may also be associated with a respective identify (ID). The ID may comprise: a numeral, a combination of text and numbers, a name, a password, an account, an account ID, a web link, a web address, index to some information, and/or another ID. The ID may be assigned. The ID may be assigned by hardware (e.g. hardwired, via a dongle and/or other hardware), software and/or firmware. The ID may be stored (e.g. in a database, in memory, in a server, in the cloud, stored locally, stored remotely, stored permanently, stored temporarily) and may be retrieved. The ID may be associated with at least one record, account, user, household, address, phone number, social security number, customer number, another ID, time stamp, and/or collection of data. The ID and/or part of the ID of a Type 1 device may be made available to a Type 2 device. The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by the Type 1 device and/or the Type 2 device.

The object may be a person, passenger, child, older person, baby, sleeping baby, baby in a vehicle, patient, worker, high-value worker, expert, specialist, waiter, customer in a mall, traveler in airport/train station/bus terminal/shipping terminals, staff/worker/customer service personnel in a factory/mall/supermarket/office/workplace, serviceman in sewage/air ventilation system/lift well, lifts in lift wells, elevator, inmate, people to be tracked/monitored, animal, a plant, a living object, a pet, dog, cat, smart phone, phone accessory, computer, tablet, portable computer, dongle, computing accessory, networked devices, WiFi devices, IoT devices, smart watch, smart glasses, smart devices, speaker, keys, smart key, wallet, purse, handbag, backpack, goods, cargo, luggage, equipment, motor, machine, air conditioner, fan, air conditioning equipment, light fixture, moveable light, television, camera, audio and/or video equipment, stationary, surveillance equipment, parts, signage, tool, cart, ticket, parking ticket, toll ticket, airplane ticket, credit card, plastic card, access card, food packaging, utensil, table, chair, cleaning equipment/tool, vehicle, car, cars in parking facilities, merchandise in a warehouse/store/supermarket/distribution center, boat, bicycle, airplane, drone, remote control car/plane/boat, robot, manufacturing device, assembly line, material/unfinished part/robot/wagon/transports on a factory floor, object to be tracked in airport/shopping mart/supermarket, non-object, absence of an object, presence of an object, object with a form, object with a changing form, object with no form, mass of fluid, mass of liquid, mass of gas/smoke, fire, flame, electromagnetic (EM) source, EM medium, and/or another object.

The object itself may be communicatively coupled with some network, such as WiFi, MiFi, 3G/4G/LTE/5G, Bluetooth, BLE, WiMax, Zigbee, mesh network, adhoc network, and/or other network. The object itself may be bulky with AC power supply, but is moved during installation, cleaning, maintenance, renovation, etc. It may also be installed in a moveable platform such as a lift, a pad, a movable, platform, an elevator, a conveyor belt, a robot, a drone, a forklift, a car, a boat, a vehicle, etc.

The object may have multiple parts, each part with different movement. For example, the object may be a person walking forward. While walking, his left hand and right hand may move in different direction, with different instantaneous speed, acceleration, motion, etc.

The wireless transmitter (e.g. Type 1 device), the wireless receiver (e.g. Type 2 device), another wireless transmitter and/or another wireless receiver may move with the object and/or another object (e.g. in prior movement, current movement and/or future movement. They may be communicatively coupled to one or more nearby device. They may transmit time series of CI and/or information associated with the time series of CI to the nearby device, and/or each other. They may be with the nearby device.

The wireless transmitter and/or the wireless receiver may be part of a small (e.g. coin-size, cigarette box size, or even smaller), light-weight portable device. The portable device may be wirelessly coupled with a nearby device.

The nearby device may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The nearby device may be connected to a cloud server, a local server and/or other server via internet, wired internet connection and/or wireless internet connection. The nearby device may be portable.

The portable device, the nearby device, a local server and/or a cloud server may share the computation and/or storage for a task (e.g. obtain time series of CI, determine characteristics/spatial-temporal information of the object associated with the movement of the object, computation of time series of power information, determining/computing the particular function, searching for local extremum, classification, identifying particular value of time offset, denoising, processing, simplification, cleaning, wireless smart sensing task, extract CI from wireless signal, switching, segmentation, estimate trajectory, process the map, correction, corrective adjustment, adjustment, map-based correction, detecting error, checking for boundary hitting, thresholding, etc.) and information (e.g. time series of CI).

The nearby device may/may not move with the object. The nearby device may be portable/not portable/moveable/non-moveable. The nearby device may use battery power, solar power, AC power and/or other power source. The nearby device may have replaceable/non-replaceable battery, and/or rechargeable/non-rechargeable battery. The nearby device may be similar to the object. The nearby device may have identical (and/or similar) hardware and/or software to the object. The nearby device may be a smart device, a network enabled device, a device with connection to WiFi/3G/4G/5G/6G/Zigbee/Bluetooth/adhoc network/other network, a smart speaker, a smart watch, a smart clock, a smart appliance, a smart machine, a smart equipment, a smart tool, a smart vehicle, an internet-of-thing (IoT) device, an internet-enabled device, a computer, a portable computer, a tablet, and another device.

The nearby device and/or at least one processor associated with the wireless receiver, the wireless transmitter, the another wireless receiver, the another wireless transmitter and/or a cloud server (in the cloud) may determine the initial spatial-temporal information of the object. Two or more of them may determine the initial spatial-temporal info jointly. Two or more of them may share intermediate information in the determination of the initial spatial-temporal information (e.g. initial position).

In one example, the wireless transmitter (e.g. Type 1 device, or Tracker Bot) may move with the object. The wireless transmitter may send the wireless signal to the wireless receiver (e.g. Type 2 device, or Origin Register) or determining the initial spatial-temporal information (e.g. initial position) of the object. The wireless transmitter may also send the wireless signal and/or another wireless signal to another wireless receiver (e.g. another Type 2 device, or another Origin Register) for the monitoring of the motion (spatial-temporal info) of the object. The wireless receiver may also receive the wireless signal and/or another wireless signal from the wireless transmitter and/or the another wireless transmitter for monitoring the motion of the object. The location of the wireless receiver and/or the another wireless receiver may be known.

In another example, the wireless receiver (e.g. Type 2 device, or Tracker Bot) may move with the object. The wireless receiver may receive the wireless signal transmitted from the wireless transmitter (e.g. Type 1 device, or Origin Register) for determining the initial spatial-temporal info (e.g. initial position) of the object. The wireless receiver may also receive the wireless signal and/or another wireless signal from another wireless transmitter (e.g. another Type 1 device, or another Origin Register) for the monitoring of the current motion (e.g. spatial-temporal info) of the object. The wireless transmitter may also transmit the wireless signal and/or another wireless signal to the wireless receiver and/or the another wireless receiver (e.g. another Type 2 device, or another Tracker Bot) for monitoring the motion of the object. The location of the wireless transmitter and/or the another wireless transmitter may be known.

The venue may be a space such as a room, a house, an office, a workplace, a hallway, a walkway, a lift, a lift well, an escalator, an elevator, a sewage system, air ventilations system, a staircase, a gathering area, a duct, an air duct, a pipe, a tube, an enclosed structure, a semi-enclosed structure, an enclosed area, an area with at least one wall, a plant, a machine, an engine, a structure with wood, a structure with glass, a structure with metal, a structure with walls, a structure with doors, a structure with gaps, a structure with reflection surface, a structure with fluid, a building, a roof top, a store, a factory, an assembly line, a hotel room, a museum, a classroom, a school, a university, a government building, a warehouse, a garage, a mall, an airport, a train station, a bus terminal, a hub, a transportation hub, a shipping terminal, a government facility, a public facility, a school, a university, an entertainment facility, a recreational facility, a hospital, a seniors home, an elderly care facility, a community center, a stadium, a playground, a park, a field, a sports facility, a swimming facility, a track and/or field, a basketball court, a tennis court, a soccer stadium, a baseball stadium, a gymnasium, a hall, a garage, a shopping mart, a mall, a supermarket, a manufacturing facility, a parking facility, a construction site, a mining facility, a transportation facility, a highway, a road, a valley, a forest, a wood, a terrain, a landscape, a den, a patio, a land, a path, an amusement park, an urban area, a rural area, a suburban area, a metropolitan area, a garden, a square, a plaza, a music hall, a downtown facility, an over-air facility, a semi-open facility, a closed area, a train platform, a train station, a distribution center, a warehouse, a store, a distribution center, a storage facility, an underground facility, a space (e.g. above ground, outer-space) facility, a floating facility, a cavern, a tunnel facility, an indoor facility, an open-air facility, an outdoor facility with some walls/doors/reflective barriers, an open facility, a semi-open facility, a car, a truck, a bus, a van, a container, a ship/boat, a submersible, a train, a tram, an airplane, a vehicle, a mobile home, a cave, a tunnel, a pipe, a channel, a metropolitan area, downtown area with relatively tall buildings, a valley, a well, a duct, a pathway, a gas line, an oil line, a water pipe, a network of interconnecting pathways/alleys/roads/tubes/cavities/caves/pipe-like structure/air space/fluid space, a human body, an animal body, a body cavity, an organ, a bone, a teeth, a soft tissue, a hard tissue, a rigid tissue, a non-rigid tissue, a blood/body fluid vessel, windpipe, air duct, a den, etc. The venue may be an indoor space, an outdoor space, The venue may include both the inside and outside of the space. For example, the venue may include both the inside of a building and the outside of the building. For example, the venue can be a building that has one floor or multiple floors, and a portion of the building can be underground. The shape of the building can be, e.g., round, square, rectangular, triangle, or irregular-shaped. These are merely examples. The disclosure can be used to detect events in other types of venue or spaces.

The wireless transmitter (e.g. Type 1 device) and/or the wireless receiver (e.g. Type 2 device) may be embedded in a portable device (e.g. a module, or a device with the module) that may move with the object (e.g. in prior movement and/or current movement). The portable device may be communicatively coupled with the object using a wired connection (e.g. through USB, microUSB, Firewire, HDMI, serial port, parallel port, and other connectors) and/or a wireless connection (e.g. Bluetooth, Bluetooth Low Energy (BLE), WiFi, LTE, ZigBee, etc.). The portable device may be a lightweight device. The portable may be powered by battery, rechargeable battery and/or AC power. The portable device may be very small (e.g. at sub-millimeter scale and/or sub-centimeter scale), and/or small (e.g. coin-size, card-size, pocket-size, or larger). The portable device may be large, sizable, and/or bulky (e.g. heavy machinery to be installed). The portable device may be a WiFi hotspot, an access point, a mobile WiFi (MiFi), a dongle with USB/micro USB/Firew1ire/other connector, a smartphone, a portable computer, a computer, a tablet, a smart device, an internet-of-thing (IoT) device, a WiFi-enabled device, an LTE-enabled device, a smart watch, a smart glass, a smart mirror, a smart antenna, a smart battery, a smart light, a smart pen, a smart ring, a smart door, a smart window, a smart clock, a small battery, a smart wallet, a smart belt, a smart handbag, a smart clothing/garment, a smart ornament, a smart packaging, a smart paper/book/magazine/poster/printed matter/signage/display/lighted system/lighting system, a smart key/tool, a smart bracelet/chain/necklace/wearable/accessory, a smart pad/cushion, a smart tile/block/brick/building material/other material, a smart garbage can/waste container, a smart food carriage/storage, a smart ball/racket, a smart chair/sofa/bed, a smart shoe/footwear/carpet/mat/shoe rack, a smart glove/hand wear/ring/hand ware, a smart hat/headwear/makeup/sticker/tattoo, a smart mirror, a smart toy, a smart pill, a smart utensil, a smart bottle/food container, a smart tool, a smart device, an IoT device, a WiFi enabled device, a network enabled device, a 3G/4G/5G/6G enabled device, an embeddable device, an implantable device, air conditioner, refrigerator, heater, furnace, furniture, oven, cooking device, television/set-top box (STB)/DVD player/audio player/video player/remote control, hi-fi, audio device, speaker, lamp/light, wall, door, window, roof, roof tile/shingle/structure/attic structure/device/feature/installation/fixtures, lawn mower/garden tools/yard tools/mechanics tools/garage tools, garbage can/container, 20-ft/40-ft container, storage container, factory/manufacturing/production device, repair tools, fluid container, machine, machinery to be installed, a vehicle, a cart, a wagon, warehouse vehicle, a car, a bicycle, a motorcycle, a boat, a vessel, an airplane, a basket/box/bag/bucket/container, a smart plate/cup/bowl/pot/mat/utensils/kitchen tools/kitchen devices/kitchen accessories/cabinets/tables/chairs/tiles/lights/water pipes/taps/gas range/oven/dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable device may have an identity (ID) as described above.

An event may be monitored based on the time series of CI. The event may be an object related event, such as fall-down of the object (e.g. an person and/or a sick person), a rotation, a hesitation, a pause, an impact (e.g. a person hitting a sandbag, a door, a window, a bed, a chair, a table, a desk, a cabinet, a box, another person, an animal, a bird, a fly, a table, a chair, a ball, a bowling ball, a tennis ball, a football, a soccer ball, a baseball, a basketball, a volley ball, etc.), a two-body action (e.g. a person letting go a balloon, catching a fish, molding a clay, writing a paper, a person typing on a computer, etc.), a car moving in a garage, a person carrying a smart phone and walking around an airport/mall/government building/office/etc, an autonomous moveable object/machine moving around (e.g. vacuum cleaner, utility vehicle, a car, drone, self-driving car, etc.).

The task or the wireless smart sensing task may comprise: object detection, presence detection, object recognition, object verification, tool detection, tool recognition, tool verification, machine detection, machine recognition, machine verification, human detection, human recognition, human verification, baby detection, baby recognition, baby verification, human breathing detection, motion detection, motion estimation, motion verification, periodic motion detection, periodic motion estimation, periodic motion verification, stationary motion detection, stationary motion estimation, stationary motion verification, cyclo-stationary motion detection, cyclo-stationary motion estimation, cyclo-stationary motion verification, transient motion detection, transient motion estimation, transient motion verification, trend detection, trend estimation, trend verification, breathing detection, breathing estimation, breathing estimation, human biometrics detection, human biometrics estimation, human biometrics verification, environment informatics detection, environment informatics estimation, environment informatics verification, gait detection, gait estimation, gait verification, gesture detection, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, irregularity detection, locationing, tracking, multiple object tracking, indoor tracking, indoor position, indoor navigation, power transfer, wireless power transfer, object counting, car tracking in parking garage, patient detection, patient monitoring, patient verification, wireless communication, data communication, signal broadcasting, networking, coordination, administration, encryption, protection, cloud computing, other processing and/or other task. The task may be performed by the Type 1 device, the Type 2 device, another Type 1 device, another Type 2 device, a nearby device, a local server, an edge server, a cloud server, and/or another device.

A first part of the task may comprise at least one of: preprocessing, signal conditioning, signal processing, post-processing, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder detection, baby detection, baby monitoring, patient monitoring, object recognition, wireless power transfer, and/or wireless charging.

A second part of the task may comprise at least one of: a smart home task, a smart office task, a smart building task, a smart factory task (e.g. manufacturing using a machine or an assembly line), a smart internet-of-thing (IoT) task, a smart system task, a smart home operation, a smart office operation, a smart building operation, a smart manufacturing operation (e.g. moving supplies/parts/raw material to a machine/an assembly line), an IoT operation, a smart system operation, turning on a light, turning off the light, controlling the light in at least one of: a room, a region, and/or the venue, playing a sound clip, playing the sound clip in at least one of: the room, the region, and/or the venue, playing the sound clip of at least one of: a welcome, a greeting, a farewell, a first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of: the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, a heating system, a ventilation system, a lighting system, a heating device, a stove, an entertainment system, a door, a fence, a window, a garage, a computer system, a networked device, a networked system, a home appliance, an office equipment, a lighting device, a robot (e.g. robotic arm), a smart vehicle, a smart machine, an assembly line, a smart device, an internet-of-thing (IoT) device, a smart home device, and/or a smart office device.

The task may include: detect a user returning home, detect a user leaving home, detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming back, in the rest room, etc.), monitor/detect location of a user/pet, do something automatically upon detection, do something for the user automatically upon detecting the user, turn on/off/dim a light, turn on/off music/radio/home entertainment system, turn on/off/adjust/control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/control coffee machine/hot water pot, turn on/off/control/preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/messaging system/notification system, etc.).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/HiFi/speech synthesis/sound/voice/music/song/sound field/background sound field/dialog system, using visual tool such as TV/entertainment system/computer/notebook/smart pad/display/light/color/brightness/patterns/symbols, using haptic tool/virtual reality tool/gesture/tool, using a smart device/appliance/material/furniture/fixture, using web tool/server/cloud server/fog server/edge server/home network/mesh network, using messaging tool/notification tool/communication tool/scheduling tool/email, using user interface/GUI, using scent/smell/fragrance/taste, using neural tool/nervous system tool, using a combination, etc.) the user of his mother's birthday and to call her, prepare a report, and give the report (e.g. using a tool for reminding as discussed above). The task may turn on the air conditioner/heater/ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc.

Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/arm the home security system to guard the home against any intruder, adjust air conditioning/heating/ventilation systems to "away-from-home" profile to save energy, send alerts/reports/updates to the user's smart phone, etc.

A motion may comprise at least one of: a no-motion, a resting motion, a non-moving motion, a deterministic motion, a transient motion, a fall-down motion, a repeating motion, a periodic motion, a pseudo-periodic motion, a periodic motion associated with breathing, a periodic motion associated with heartbeat, a periodic motion associated with a living object, a periodic motion associated with a machine, a periodic motion associated with a man-made object, a periodic motion associated with nature, a complex motion with a transient element and a periodic element, a repetitive motion, a non-deterministic motion, a probabilistic motion, a chaotic motion, a random motion, a complex motion with a non-deterministic element and a deterministic element, a stationary random motion, a pseudo-stationary random motion, a cyclo-stationary random motion, a non-stationary random motion, a stationary random motion with a periodic autocorrelation function (ACF), a random motion with a periodic ACF for a period of time, a random motion that is pseudo-stationary for a period of time, a random motion of which an instantaneous ACF has a pseudo-periodic element for a period of time, a machine motion, a mechanical motion, a vehicle motion, a drone motion, an air-related motion, a wind-related motion, a weather-related motion, a water-related motion, a fluid-related motion, an ground-related motion, a change in electro-magnetic characteristics, a sub-surface motion, a seismic motion, a plant motion, an animal motion, a human motion, a normal motion, an abnormal motion, a dangerous motion, a warning motion, a suspicious motion, a rain, a fire, a flood, a tsunami, an explosion, a collision, an imminent collision, a human body motion, a head motion, a facial motion, an eye motion, a mouth motion, a tongue motion, a neck motion, a finger motion, a hand motion, an arm motion, a shoulder motion, a body motion, a chest motion, an abdominal motion, a hip motion, a leg motion, a foot motion, a body joint motion, a knee motion, an elbow motion, an upper body motion, a lower body motion, a skin motion, a below-skin motion, a subcutaneous tissue motion, a blood vessel motion, an intravenous motion, an organ motion, a heart motion, a lung motion, a stomach motion, an intestine motion, a bowel motion, an eating motion, a breathing motion, a facial expression, an eye expression, a mouth expression, a talking motion, a singing motion, an eating motion, a gesture, a hand gesture, an arm gesture, a keystroke, a typing stroke, a user-interface gesture, a man-machine interaction, a gait, a dancing movement, a coordinated movement, and/or a coordinated body movement.

The heterogeneous IC of the Type 1 device and/or any Type 2 receiver may comprise a low-noise amplifier (LNA), a power amplifier, a transmit-receive switch, a media access controller, a baseband radio, a 2.4 GHz radio, a 3.65 GHz radio, a 4.9 GHz radio, a 5 GHz radio, a 5.9 GHz radio, a below 6 GHz radio, a below 60 GHz radio and/or another radio.

The heterogeneous IC may comprise a processor, a memory communicatively coupled with the processor, and a set of instructions stored in the memory to be executed by the processor. The IC may be an application specific integrated circuit (ASIC), a field programmable gate array (FPGA), other programmable logic device, discrete logic, and/or a combination.

The heterogeneous IC may support a broadband network, a wireless network, a mobile network, a mesh network, a cellular network, a wireless local area network (WLAN), a wide area network (WAN), and a metropolitan area network (MAN), a WLAN standard, WiFi, LTE, a 802.11 standard, 802.11a, 802.11b, 802.11g, 802.11n, 802.11ac, 802.11ad, 802.11af, 802,11ah, 802.11ax, 802.11ay, a mesh network standard, a 802.15 standard, a 802.16 standard, a cellular network standard, 3G, 3.5G, 4G, beyond 4G, 4.5G, 5G, 6G, 7G, 8G, 9G, Bluetooth, Bluetooth Low-Energy (BLE), Zigbee, WiMax, and/or another wireless network protocol.

The processor may comprise a general purpose processor, a special purpose processor, a microprocessor, a microcontroller, an embedded processor, a digital signal processor, a central processing unit (CPU), a graphical processing unit (GPU), a multi-processor, a multi-core processor, and/or a processor with graphics capability, and/or a combination.

The memory may be volatile, non-volatile, random access memory (RAM), Read Only Memory (ROM), Electrically Programmable ROM (EPROM), Electrically Erasable Programmable ROM (EEPROM), hard disk, flash memory, CD-ROM, DVD-ROM, a magnetic storage, an optical storage, an organic storage, a storage system, a storage network, network storage, cloud storage, or other form of non-transitory storage medium known in the art.

The set of instructions (machine executable code) corresponding to the method steps may be embodied directly in hardware, in software, in firmware, or in combinations thereof.

The presentation may be a presentation in an audio-visual way, a graphical way (e.g. using GUI), a textual way, a symbolic way or a mechanical way.

Computational workload associated with the method is shared among the processor, the Type 1 heterogeneous wireless device, the Type 2 heterogeneous wireless device, a local server, a cloud server, and another processor.

An operation, a pre-processing, a processing and/or a postprocessing may be applied to data (e.g. time series of CI, autocorrelation). An operation may be preprocessing, processing and/or postprocessing. The preprocessing, processing and/or postprocessing may be an operation. An operation may comprise preprocessing, processing, post-processing, computing a function of the operands, filtering, linear filtering, nonlinear filtering, folding, grouping, energy computation, lowpass filtering, bandpass filtering, highpass filtering, median filtering, rank filtering, quartile filtering, percentile filtering, mode filtering, finite impulse response (FIR) filtering, infinite impulse response (IIR) filtering, moving average (MA) filtering, autoregressive (AR) filtering, autoregressive moving averaging (ARMA) filtering, selective filtering, adaptive filtering, interpolation, decimation, subsampling, upsampling, resampling, time correction, time base correction, phase correction, magnitude correction, phase cleaning, magnitude cleaning, matched filtering, enhancement, restoration, denoising, smoothing, signal conditioning, enhancement, restoration, spectral analysis, linear transform, nonlinear transform, frequency transform, inverse frequency transform, Fourier transform, wavelet transform, Laplace transform, Hilbert transform, Hadamard transform, trigonometric transform, sine transform, cosine transform, power-of-2 transform, sparse transform, graph-based transform, graph signal processing, fast transform, a transform combined with zero padding, cyclic padding, padding, zero padding, feature extraction, decomposition, projection, orthogonal projection, non-orthogonal projection, over-complete projection, eigen-decomposition, singular value decomposition (SVD), principle component analysis (PCA), independent component analysis (ICA), grouping, sorting, thresholding, soft thresholding, hard thresholding, clipping, soft clipping, first derivative, second order derivative, high order derivative, convolution, multiplication, division, addition, subtraction, integration, maximization, minimization, local maximization, local minimization, optimization of a cost function, neural network, recognition, labeling, training, clustering, machine learning, supervised learning, unsupervised learning, semi-supervised learning, comparison with another time series of CI, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, matched filtering, Kalman filtering, particle filter, intrapolation, extrapolation, importance sampling, Monte Carlo sampling, compressive sensing, representing, merging, combining, splitting, scrambling, error protection, forward error correction, doing nothing, time varying processing, conditioning averaging, weighted averaging, arithmetic mean, geometric mean, averaging over selected frequency, averaging over antenna links, a logical operation, permutation, combination, sorting, AND, OR, XOR, union, intersection, vector addition, vector subtraction, vector multiplication, vector division, inverse, a norm, a distance, and/or another operation. The operation may be the preprocessing, processing, and/or post-processing. Operations may be applied jointly on multiple time series or functions.

The function (e.g. function of the operands) may comprise: a scalar function, a vector function, a discrete function, a continuous function, a polynomial function, a magnitude, a phase, an exponential function, a logarithmic function, a trigonometric function, a transcendental function, a logical function, a linear function, an algebraic function, a nonlinear function, a piecewise linear function, a real function, a complex function, a vector-valued function, an inverse function, a derivative of a function, an integration of a function, a circular function, a function of another function, a one-to-one function, a one-to-many function, a many-to-one function, a many-to-many function, a zero crossing, absolute function, indicator function, a mean, a mode, a median, a range, a statistics, a variance, a trimmed mean, a percentile, a square, a cube, a root, a power, a sine, a cosine, a tangent, a cotangent, a secant, a cosecant, an elliptical function, a parabolic function, a hyperbolic function, a game function, a zeta function, an absolute value, a thresholding, a quantization, a piecewise constant function, a composite function, a function of function, an input time function processed with an operation (e.g. filtering), a probabilistic function, a stochastic function, a random function, an ergodic function, a stationary function, a deterministic function, a transformation, a frequency transform, an inverse frequency transform, a discrete time transform, Laplace transform, Hilbert transform, sine transform, cosine transform, triangular transform, wavelet transform, integer transform, power-of-2 transform, sparse transform, projection, decomposition, principle component analysis (PCA), independent component analysis (ICA), neural network, feature extraction, a moving function, a function of a moving window of neighboring items of a time series, a filtering function, a convolution, a mean function, a variance function, a statistical function, short-time transform, discrete transform, discrete Fourier transform, discrete cosine transform, discrete sine transform, Hadamard transform, eigen-decomposition, eigenvalue, singular value decomposition (SVD), singular value, orthogonal decomposition, matching pursuit, sparse transform, sparse approximation, any decomposition, graph-based processing, graph-based transform, graph signal processing, classification, labeling, learning, machine learning, detection, estimation, feature extraction, learning network, feature extraction, denoising, signal enhancement, coding, encryption, mapping, remapping, vector quantization, lowpass filtering, highpass filtering, bandpass filtering, matched filtering, Kalman filtering, preprocessing, postprocessing, particle filter, FIR filtering, IIR filtering, autoregressive (AR) filtering, adaptive filtering, first order derivative, high order derivative, integration, zero crossing, smoothing, median filtering, mode filtering, sampling, random sampling, resampling function, downsampling, upsampling, interpolation, extrapolation, importance sampling, Monte Carlo sampling, compressive sensing, statistics, short term statistics, long term statistics, mean, variance, autocorrelation function, cross correlation, moment generating function, time averaging, etc.

Machine learn, training, discriminative training, deep learning, neural network, continuous time processing, distributed computing, distributed storage, acceleration using GPU/DSP/coprocessor/multicore/multiprocessing may be applied to a step (or each step) of this disclosure.

A frequency transform may include Fourier transform, Laplace transform, Hadamard transform, Hilbert transform, sine transform, cosine transform, triangular transform, wavelet transform, integer transform, power-of-2 transform, combined zero padding and transform, Fourier transform with zero padding, and/or another transform. Fast versions and/or approximated versions of the transform may be performed. The transform may be performed using floating point, and/or fixed point arithmetic.

An inverse frequency transform may include inverse Fourier transform, inverse Laplace transform, inverse Hadamard transform, inverse Hilbert transform, inverse sine transform, inverse cosine transform, inverse triangular transform, inverse wavelet transform, inverse integer transform, inverse power-of-2 transform, combined zero padding and transform, inverse Fourier transform with zero padding, and/or another transform. Fast versions and/or approximated versions of the transform may be performed. The transform may be performed using floating point, and/or fixed point arithmetic.

Sliding time window may have time varying window width. It may be smaller at the beginning to enable fast acquisition and may increase over time to a steady-state size. The steady-state size may be related to the frequency, repeated motion, transient motion, and/or spatial-temporal information to be monitored. Even in steady state, the window size may be adaptively changed based on battery life, power consumption, available computing power, a change in amount of targets, the nature of motion to be monitored, etc.

The time shift between two sliding time windows at adjacent time instance may be constant/variable/locally adaptive over time. When shorter time shift is used, the update of any monitoring may be more frequent which may be used for fast changing situations, object motions, and/or objects. Longer time shift may be used for slower situations, object motions, and/or objects.

The window width/size and/or time shift may be changed upon a user request/choice. The time shift may be changed automatically (e.g. as controlled by processor/computer/server/cloud server) and/or adaptively.

At least one characteristics of a function (e.g. auto-correlation function, auto-covariance function, cross-correlation function, cross-covariance function, power spectral density, a time function, a frequency domain function, a frequency transform) may be determined (e.g. by an object tracking server, the processor, the Type 1 heterogeneous device, the Type 2 heterogeneous device, and/or another device). The at least one characteristics of the function may include: a local maximum, a local minimum, a local extremum, a local extremum with positive time offset, a first local extremum with positive time offset, an n^th local extremum with positive time offset, a local extremum with negative time offset, a first local extremum with negative time offset, an n^th local extremum with negative time offset, a constrained (with argument within a constraint) maximum, minimum, constrained maximum, constrained minimum, a constrained extremum, a slope, a derivative, a higher order derivative, a maximum slope, a minimum slope, a local maximum slope, a local maximum slope with positive time offset, a local minimum slope, a constrained maximum slope, a constrained minimum slope, a maximum higher order derivative, a minimum higher order derivative, a constrained higher order derivative, a zero-crossing, a zero crossing with positive time offset, an n^th zero crossing with positive time offset, a zero crossing with negative time offset, an n^th zero crossing with negative time offset, a constrained zero-crossing, a zero-crossing of slope, a zero-crossing of higher order derivative, and/or another characteristics. At least one argument of the function associated with the at least one characteristics of the function may be identified. Some quantity (e.g. a spatial-temporal information of the object) may be determined based on the at least one argument of the function.

A characteristics of a motion of an object in the venue may comprise at least one of: an instantaneous characteristics, a short-term characteristics, repetitive characteristics, a recurring characteristics, a history, an incremental characteristics, a changing characteristics, a deviational characteristics, a phase, a magnitude, a time characteristics, a frequency characteristics, a time-frequency characteristics, a decomposition characteristics, an orthogonal decomposition characteristics, a non-orthogonal decomposition characteristics, a deterministic characteristics, a probabilistic characteristics, a stochastic characteristics, an autocorrelation function (ACF), a mean, a variance, a statistics, a duration, a timing, a trend, a periodic characteristics, a long-term characteristics, a historical characteristics, an average characteristics, a current characteristics, a past characteristics, a future characteristics, a predicted characteristics, a location, a distance, a height, a speed, a direction, a velocity, an acceleration, a change of the acceleration, an angle, an angular speed, an angular velocity, an angular acceleration of the object, a change of the angular acceleration, an orientation of the object, an angular of a rotation, a deformation of the object, a shape of the object, a change of shape of the object, a change of size of the object, a change of structure of the object, and/or a change of characteristics of the object.

At least one local maximum and at least one local minimum of the function may be identified. At least one local signal-to-noise-ratio-like (SNR-like) parameter may be computed for each pair of adjacent local maximum and local minimum. The SNR-like parameter may be a function (e.g. linear, log, exponential function, a monotonic function) of a fraction of a quantity (e.g. power, magnitude, etc.) of the local maximum over the same quantity of the local minimum. It may also be the function of a difference between the quantity of the local maximum and the same quantity of the local minimum.

Significant local peaks may be identified or selected. Each significant local peak may be a local maximum with SNR-like parameter greater than a threshold T1 and/or a local maximum with amplitude greater than a threshold T2.

The at least one local minimum and the at least one local minimum in the frequency domain may be identified/computed using a persistence-based approach.

A set of selected significant local peaks may be selected from the set of identified significant local peaks based on a selection criterion. The characteristics/spatial-temporal information of the object may be computed based on the set of selected significant local peaks and frequency values associated with the set of selected significant local peaks.

In one example, the selection criterion may always correspond to select the strongest peaks in a range. While the strongest peaks may be selected, the unselected peaks may still be significant (rather strong).

Unselected significant peaks may be stored and/or monitored as "reserved" peaks for use in future selection in future sliding time windows. As an example, there may be a particular peak (at a particular frequency) appearing consistently over time. Initially, it may be significant but not selected (as other peaks may be stronger). But in later time, the peak may become stronger and more dominant and may be selected. When it became "selected", it may be back-traced in time and made "selected" in the earlier time when it was significant but not selected. In such case, the back-traced peak may replace a previously selected peak in an early time. The replaced peak may be the relatively weakest, or a peak that appear in isolation in time (i.e. appearing only briefly in time).

In another example, the selection criterion may not correspond to select the strongest peaks in the range. Instead, it may consider not only the "strength" of the peak, but the "trace" of the peak—peaks that may have happened in the past, especially those peaks that have been identified for a long time.

For example, if a finite state machine (FSM) is used, it may select the peak(s) based on the state of the FSM. Decision thresholds may be computed adaptively based on the state of the FSM.

A similarity score may be computed (e.g. by a server, the processor, the Type 1 device, the Type 2 device, a local server, a cloud server, and/or another device) based on a pair of temporally adjacent CI of a time series of CI. The pair may come from the same sliding window or two different sliding windows. The similarity score may also be based on a pair of, temporally adjacent or not so adjacent, CI from two different time series of CI. The similarity score may be or may include: a time reversal resonating strength (TRRS), a correlation, a cross-correlation, an auto-correlation, a covariance, a cross-covariance, an auto-covariance, an inner product of two vectors, a distance score, a discrimination score, a metric, a neural network output, a deep learning network output, and/or another score. The characteristics and/or spatial-temporal information may be determined/computed based on the similarity score.

Any threshold may be pre-determined, adaptively determined and/or determined by a finite state machine. The adaptive determination may be based on time, space, location, antenna, path, link, state, battery life, remaining battery life, available power, available computational resources, available network bandwidth, etc.

A threshold to be applied to a test statistics to differentiate two events (or two conditions, or two situations, or two states), A and B, may be determined. Data (e.g. CI, channel state information (CSI)) may be collected under A and/or under B in a training situation. The test statistics may be computed based on the data. Distributions of the test statistics under A may be compared with distributions of the test statistics under B, and the threshold may be chosen according to some criteria. The criteria may comprise: maximum likelihood (ML), maximum aposterior probability (MAP), discriminative training, minimum type 1 error for a given type 2 error, minimum type 2 error for a given type 1 error, and/or other criteria. The threshold may be adjusted to achieve different sensitivity to the A, B and/or another event/condition/situation/state. The threshold adjustment may be automatic, semi-automatic and/or manual. The threshold adjustment may be applied once, sometimes, often, periodically, occasionally, sporadically, and/or on demand. The threshold adjustment may be adaptive. The threshold adjustment may depend on the object, an object movement/location/direction/action, an object characteristics/spatial-temporal information/size/property/trait/habit/behavior, the venue, a feature/fixture/furniture/barrier/material/machine/living thing/thing/object/boundary/surface/medium that is in/at/of the venue, a map, a constraint of the map, the event/state/situation/condition, a time, a timing, a duration, a current state, a past history, a user, and/or a personal preference, etc.

A stopping criterion of an iterative algorithm may be that change of a current parameter (e.g. offset value) in the updating in an iteration is less than a threshold. The threshold may be 0.5, 1, 1.5, 2, or another number. The threshold may be adaptive. It may change as the iteration progresses. For the offset value, the adaptive threshold may be determined based on the task, particular value of the first time, the current time offset value, the regression window, the regression analysis, the regression function, the regression error, the convexity of the regression function, and/or an iteration number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The searching for a local extremum may comprise a robust search, a minimization, a maximization, an optimization, a statistical optimization, a dual optimization, a constraint optimization, a convex optimization, a global optimization, a local optimization an energy minimization, a linear regression, a quadratic regression, a higher order regression, a linear programming, a nonlinear programming, a stochastic programming, a combinatorial optimization, a constraint programming, a constraint satisfaction, a calculus of variations, an optimal control, a dynamic programming, a mathematical programming, a multi-objective optimization, a multi-modal optimization, a disjunctive programming, a space mapping, an infinite-dimensional optimization, a heuristics, a metaheuristics, a convex programming, a semidefinite programming, a conic programming, a cone programming, an integer programming, a quadratic programming, a fractional programming, a numerical analysis, a simplex algorithm, an iterative method, a gradient descent, a subgradient method, a coordinate descent, a conjugate gradient method, a Newton's algorithm, a sequential quadratic programming, an interior point method, an ellipsoid method, a reduced gradient method, a quasi-Newton method, a simultaneous perturbation stochastic approximation, an interpolation method, a pattern search method, a line search, a non-differentiable optimization, a genetic algorithm, an evolutionary algorithm, a dynamic relaxation, a hill climbing, a particle swarm optimization, a gravitation search algorithm, a simulated annealing, a memetic algorithm, a differential evolution, a dynamic relaxation, a stochastic tunneling, a Tabu search, a reactive search optimization, a curve fitting, a least square, a simulation based optimization, a variational calculus, and/or a variant. The search for a local extremum may be associated with an objective function, a loss function, a cost function, a utility function, a fitness function, an energy function, and/or an energy function.

Regression may be performed using a regression function to fit sampled data (e.g. CI, a feature of CI, a component of CI) or another function (e.g. autocorrelation function) in a regression window. In at least one iteration, a length of the regression window and/or a location of the regression window may change. The regression function may be a linear function, a quadratic function, a cubic function, a polynomial function, and/or another function.

The regression analysis may minimize an absolute error, a square error, a higher order error (e.g. third order, fourth order, etc.), a robust error (e.g. square error for smaller error magnitude and absolute error for larger error magnitude, or a first kind of error for smaller error magnitude and a second kind of error for larger error magnitude), another error, a weighted sum of absolute error (e.g. for a wireless transmitter with multiple antennas and a wireless receiver with multiple antennas, each pair of transmitter antenna and receiver antenna form a link. Error associated with different links may have different weights. One possibility is that some links and/or some components with larger noise may have smaller or bigger weight.), a weighted sum of square error, a weighted sum of higher order error, a weighted sum of robust error, a weighted sum of the another error, an absolute cost, a square cost, a higher order cost, a robust cost, another cost, a weighted sum of absolute cost, a weighted sum of square cost, a weighted sum of higher order cost, a weighted sum of robust cost, and/or a weighted sum of another cost.

The regression error determined may be an absolute error, a square error, a higher order error, a robust error, yet another error, a weighted sum of absolute error, a weighted sum of square error, a weighted sum of higher order error, a weighted sum of robust error, and/or a weighted sum of the yet another error.

The time offset associated with maximum regression error (or minimum regression error) of the regression function with respect to the particular function in the regression window may become the updated current time offset in the iteration.

A local extremum may be searched based on a quantity comprising a difference of two different errors (e.g. a difference between absolute error and square error). Each of the two different errors may comprise an absolute error, a square error, a higher order error, a robust error, another error, a weighted sum of absolute error, a weighted sum of square error, a weighted sum of higher order error, a weighted sum of robust error, and/or a weighted sum of the another error.

The quantity may be compared with an F-distribution, a central F-distribution, another statistical distribution, a threshold, a threshold associated with a probability, a threshold associated with a probability of finding a false peak, a threshold associated with the F-distribution, a threshold associated the central F-distribution, and/or a threshold associated with the another statistical distribution.

The regression window may be determined based on at least one of: the movement of the object, a quantity associated with the object, the at least one characteristics and/or spatial-temporal information of the object associated with the movement of the object, an estimated location of the local extremum, a noise characteristics, an estimated noise characteristics, an F-distribution, a central F-distribution, another statistical distribution, a threshold, a preset threshold, a threshold associated with a probability, a threshold associated with a desired probability, a threshold associated with a probability of finding a false peak, a threshold associated with the F-distribution, a threshold associated the central F-distribution, a threshold associated with the another statistical distribution, a condition that a quantity at the window center is largest within the regression window, a condition that the quantity at the window center is largest within the regression window, a condition that there is only one of the local extremum of the particular function for the particular value of the first time in the regression window, another regression window, and/or another condition.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

A current parameter (e.g. time offset value) may be initialized based on a target value, a target profile, a trend, a past trend, a current trend, a target speed, a speed profile, a target speed profile, a past speed trend, the movement of the object, at least one characteristics and/or spatial-temporal information of the object associated with the movement of object, a positional quantity of the object, an initial speed of the object associated with the movement of the object, a predefined value, an initial width of the regression window, a time duration, a value based on a carrier frequency of the wireless signal, a bandwidth of the wireless signal, an amount of antennas associated with the wireless multipath channel, a noise characteristics, and/or an adaptive value.

The current time offset may be at the center, on the left side, on the right side, and/or at another fixed relative location, of the regression window.

FIG. 1 illustrates an exemplary network environment 100 for transient motion detection and monitoring in a venue, according to one embodiment of the present teaching. As shown in FIG. 1, the exemplary network environment 100 includes a transmitter 110, an antenna 112, a wireless channel 130, an antenna 122, and a receiver 120. The antenna 112 is electrically coupled to the transmitter 110; the antenna 122 is electrically coupled to the receiver 120.

In one embodiment, the transmitter 110 is located at a first position in a venue; while the receiver 120 is located at a second position in the venue. The transmitter 110 is configured for transmitting a wireless signal through the wireless channel 130. The wireless channel 130 in this example is a wireless multipath channel that is impacted by a transient motion of an object in the venue. According to various embodiments, the object may be a human (e.g. a baby 142, or a patient 146) or a pet (e.g. a puppy 144). The receiver 120 in this example receives the wireless signal through the wireless multipath channel 130 and obtains at least one time series of channel information (CI) of the wireless multipath channel based on the wireless signal. Because the motion of the object impacts the wireless multipath channel through which the wireless signal is transmitted, the channel information 125 extracted from the wireless signal includes information related to the object motion.

In various embodiments, the transmitter 110 may be part of a Bot or a Type 1 device placed in a venue, while the receiver 120 may be part of an Origin or a Type 2 device placed in the venue. In various embodiments, the Bot and/or the Origin may include (not shown) multiple transmitters, multiple receivers, and/or multiple transceivers. In one embodiment, the antenna 112 and/or the antenna 122 is replaced with a multi-antenna array that can form a plurality of beams each of which points in a distinct direction. The transmitter 110 can be configured to wirelessly transmit signals having different types or functions. Similarly, the receiver 120 is configured to receive wireless signals having different types or functions. In one embodiment, the transmitter 110 has at least one antenna; and the receiver 120 has at least one antenna. Each of the at least one time series of CI is associated with one of the at least one antenna of the transmitter 110 and one of the at least one antenna of the receiver 120.

Figure 2:
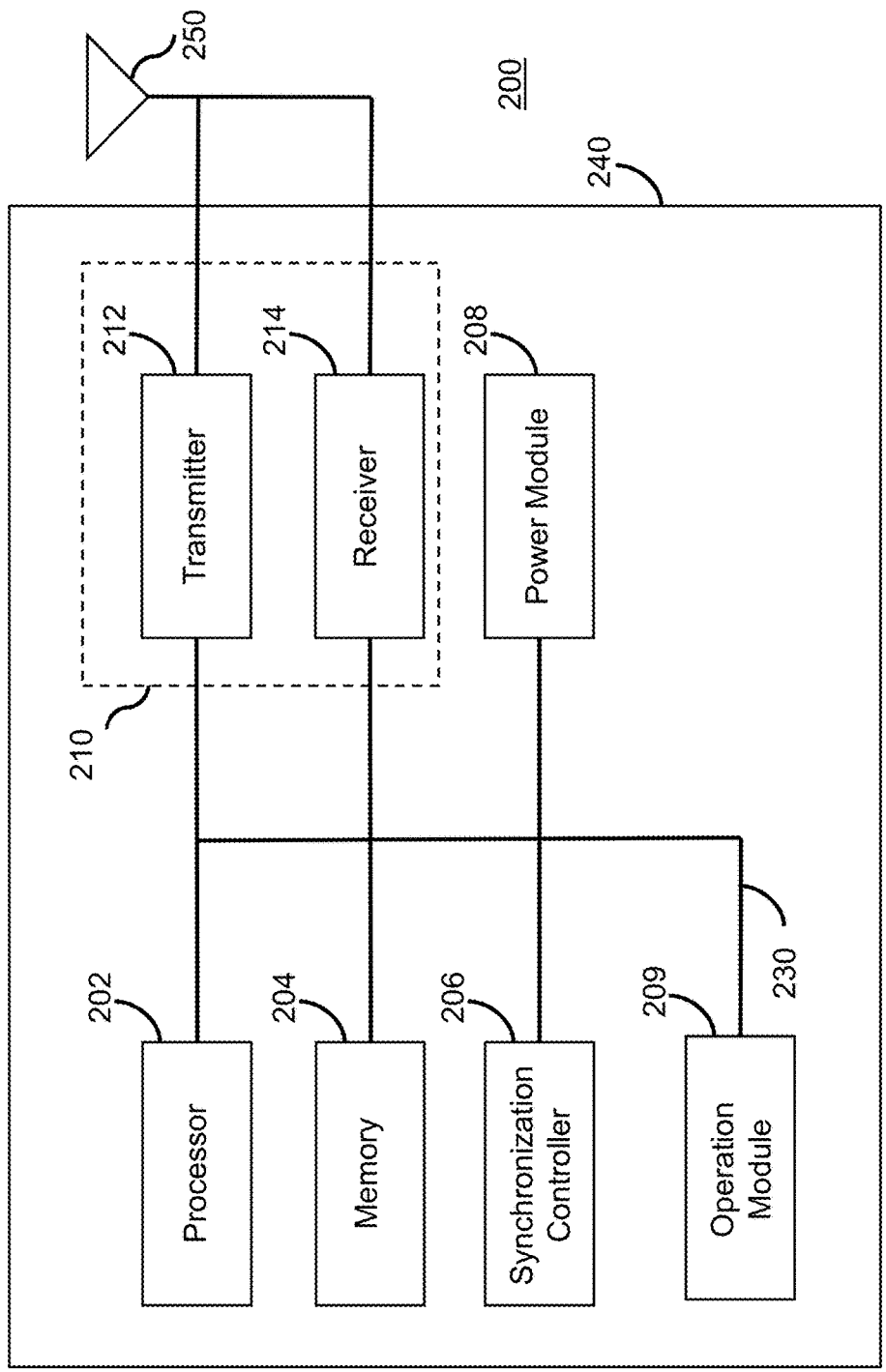
FIG. 2 illustrates an exemplary diagram of a device in a motion monitoring system, according to one embodiment of the present teaching.

FIG. 2 illustrates an exemplary diagram of a device 200 in a motion monitoring system, according to one embodiment of the present teaching. The device 200 is an example of a device that can be configured to implement the various methods described herein. According to various embodiments, the device may be: a Type 1 device which is a Bot including a transmitter, a Type 2 device which is an Origin including a receiver, a transient motion monitor, and/or other components in FIGS. 1 and 3-22. As shown in FIG. 2, the device 200 includes a housing 240 containing a processor 202, a memory 204, a transceiver 210 comprising a transmitter 212 and a receiver 214, a synchronization controller 206, a power module 208, and an operation module 209.

In this embodiment, the processor 202 controls the general operation of the device 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 204, which can include both read-only memory (ROM) and random access memory (RAM), can provide instructions and data to the processor 202. A portion of the memory 204 can also include non-volatile random access memory (NVRAM). The processor 202 typically performs logical and arithmetic operations based on program instructions stored within the memory 204. The instructions (a.k.a., software) stored in the memory 204 can be executed by the processor 202 to perform the methods described herein. The processor 202 and the memory 204 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the device 200 to transmit and receive data to and from a remote device (e.g., an Origin or a Bot). An antenna 250 is typically attached to the housing 240 and electrically coupled to the transceiver 210. In various embodiments, the device 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit signals having different types or functions, such signals being generated by the processor 202. Similarly, the receiver 214 is configured to receive wireless signals having different types or functions, and the processor 202 is configured to process signals of a plurality of different types.

In one embodiment, the device 200 may be a Bot or an Origin of a motion monitoring system. The motion monitoring system may comprise at least one Bot and at least one Origin. The synchronization controller 206 in this example may be configured to control the operations of the device 200 to be synchronized or un-synchronized with another device, e.g. another Origin or another Bot. In one embodiment, each of the device 200 and other Bots or Origins in the system may transmit or receive the wireless signals individually and asynchronously.

The operation module 209 in this example may perform one or more operations for transient motion detection and monitoring. The operation module 209 may comprise one or more sub-modules to implement different methods disclosed herein. In one embodiment, the device 200 may be a transient motion monitor of a motion monitoring system, where the operation module 209 includes one or more of the components for monitoring a transient motion, e.g. a fall-down action.

The power module 208 can include a power source such as one or more batteries, and a power regulator, to provide regulated power to each of the above-described modules in FIG. 2. In some embodiments, if the device 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the device 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 202 can implement not only the functionality described above with respect to the processor 202, but also implement the functionality described above with respect to the operation module 209. Conversely, each of the modules illustrated in FIG. 2 can be implemented using a plurality of separate components or elements.

In one embodiment, a system having a processor, a memory communicatively coupled with the processor and a set of instructions stored in the memory for monitoring a transient motion in a venue is disclosed. The system comprises a transmitter, a receiver, and a transient motion monitor. Each of the transmitter, the receiver, and the transient motion monitor can be implemented as the device 200. The transmitter is located at a first position in the venue and configured for transmitting a wireless signal through a wireless multipath channel impacted by the transient motion of an object in the venue. The receiver is located at a second position in the venue and configured for: receiving the wireless signal through the wireless multipath channel impacted by the transient motion of the object in the venue, and obtaining a time series of channel information (CI) of the wireless multipath channel based on the wireless signal. The transient motion monitor is configured for: monitoring the transient motion of the object based on the time series of CI, and triggering a response action based on the monitored transient motion of the object.

In one embodiment, the object is a person. The transient motion represents a fall-down action of the person. The transient motion monitor is coupled to at least one of: the transmitter, the receiver, an additional transmitter, an additional receiver, a cloud server, a fog server, a local server, and an edge server.

In one embodiment, the response action comprises at least one of: presenting a data related to the transient motion of the object, displaying the data visually, playing an audio related to the data, animating the data, presenting an alarm, displaying an alarm, sounding an alarm, animating an alarm, sending a message to a designated user, informing emergency service, requesting emergency service, taking corrective measure, taking preventive measure, initiating emergency response procedure, activating counter measure, controlling the object, controlling the transient motion of the object, controlling a next motion of the object, controlling a speed of the object, controlling a direction of the object, controlling a gait of the object, controlling a state of the object, controlling a second device in response to the transient motion of the object, turning on the second device, turning off the second device, turning off the second device and turning on a third device, sending a data to a fourth device, triggering the fourth device to respond collaboratively, presenting the data on the fourth device, displaying the data visually on the fourth device, playing an audio to present the data on the fourth device, and sounding an alarm on the fourth device.

In one embodiment, the transient motion monitor is further configured for: determining a sliding time window having a duration comparable to the transient motion of the object; and computing an intermediate quantity (IQ) based on CI of the time series in the sliding time window, wherein the transient motion of the object is monitored based on the IQ. In one embodiment, the duration of the sliding time window is determined based on at least one of: the transient motion of the object, a speed of the object in the transient motion, the IQ, a carrier frequency of the wireless signal, a carrier wavelength of the wireless signal, a sounding rate of the wireless signal, a number of probing per second in the wireless signal, a bandwidth of the wireless signal, and another factor. For example, a formula used in the disclosed system to compute duration of sliding time window is $T\_0=(0.54 \ lambda/v)+(M/F\_s)$, where $T\_0$ is duration, lambda is carrier wavelength, v is speed of object, $F\_s$ is sounding rate, M is number of samples for averaging.

In one embodiment, the target IQ is the speed profile of the object. The disclosed system may compute and analyze speed to detect the fall-down. The disclosed system can also analyze the speed to detect other events and patterns. For example, the disclosed system can analyze repeated patterns of the speed to recognize a walking gait. For example, a close-to-zero speed suggests no motion, while repeated speed patterns suggest a gait cycle. The IQ can also be intermediate values used to compute speed. For example, CSI may be a vector of CFR (channel frequency response). The IQ may be: magnitude or magnitude square of each CFR component of CSI, autocorrelation function (ACF) of magnitude square of a CFR component of CSI, first local maximum of the ACF, time offset corresponding to first local maximum of the ACF. The IQ can also be features of speed used to detect the fall-down, including e.g. maximum speed in a time window, maximum change of acceleration in the time window.

In one embodiment, the IQ comprises at least one of: a time stamp, a timing, a time period, a time duration, a frequency, a period, a cycle, a rhythm, a pace, a count, an indicator, an occurrence, a state, a set, a distance, a displacement, a direction, a speed, a velocity, an acceleration, an angular distance, an angular speed, an angular acceleration, a change of location, a change of direction, a change of speed, a change of acceleration, a proximity, a presence, an absence, an appearance, a disappearance, a location, a statistics, a motion statistics, a breathing statistics, a distance statistics, a speed statistics, an acceleration statistics, a metric, an 1_k distance metric, an 1_0 distance metric, an 1_1 distance metric, an absolute distance metric, an 1_2 distance metric, a Euclidean distance metric, an 1_infinity distance metric, a path, a volume, a mass, a surface area, a shape, a posture, an energy, a trend, a time sequence, a label, a tag, a class, a category, a time profile, a time quantity, a frequency quantity, a transient quantity, an incremental quantity, an instantaneous quantity, an averaged quantity, a locally averaged quantity, a filtered quantity, a quantity change, a repeating quantity, an event, a recognized event, a recognized motion sequence, a gesture, a hand gesture, a finger gesture, a wrist gesture, an elbow gesture, an arm gesture, a shoulder gesture, a head gesture, a facial gesture, a neck gesture, a waist gesture, a leg gesture, a foot gesture, a maximum, a minimum, a constrained maximum, a constrained minimum, a local maximum, a local minimum, a first local maximum, a first local minimum, a k-th local maximum, a k-th local minimum, an average, a weighted average, a percentile, a mean, a median, a mode, a trimmed mean, a conditional mean, a conditional statistics, an ordered statistics, a variance, a skewness, a kurtosis, a moment, a high order moment, a cumulant, a correlation, a covariance, a co-skewness, a co-kurtosis, a first order statistics, a second order statistics, a third order statistics, a high order statistics, a robust quantity, an argument associated with another quantity, a feature of a CI, a complex component of a CI, a magnitude of the complex component, a phase of the complex component, a function of the complex component of the CI, a polynomial of the magnitude of the complex component, a square of the magnitude of the complex component, a time series of the feature of CI, an autocorrelation function of the feature of CI, and a function of another quantity.

In one example, computing the IQ based on the CI comprises: computing an auto function (AF) based on the CI of the time series in the sliding time window; computing an IQ-related feature of the AF; and computing the IQ based on the IQ-related feature of the AF, wherein the AF comprises at least one of: auto-correlation function, auto-covariance function, cross-correlation function, cross-covariance function, differential function, differential auto-correlation, differential auto-covariance, differential cross-correlation, differential cross-covariance, a frequency transform, frequency spectrum, and a power spectral density.

In one embodiment, computing the AF comprises: transforming each CI of the time series in the sliding time window; and computing the AF of each transformed CI in the sliding time window. Transforming each CI may comprise performing at least one of the following on the CI: a scalar operation, a magnitude, a phase, a nonlinear map, a linear map, a piecewise linear map, a function, a linear function, a nonlinear function, a piecewise linear function, a real function, a complex function, a vector-valued function, an inverse function, a derivative of a function, an integration of a function, a function of another function, a one-to-one function, a one-to-many function, a many-to-one function, a many-to-many function, a logarithmic function, an exponential function, a trigonometric function, a circular function, an algebraic function, a transcendental function, a power function, a root function, a polynomial, a square, a cube, a sine, a cosine, a tangent, a cotangent, a secant, a cosecant, an elliptical function, a parabolic function, a hyperbolic function, a gamma function, a zeta function, an absolute value, a thresholding, a quantization, a piecewise constant function, a piecewise linear function, a table look-up, a set operation, a histogram, a combination, a permutation, a subset, an inclusion, a logical operation, an OR, an ADD, an XOR, a union, an intersection, a set difference, a symmetric difference a Cartesian product, a power set, a cardinality, an average, a weighted average, a mean, a variance, a range, a trimmed mean, a statistics, a percentile, a vector operation, a norm, a metric, a vector addition, a vector subtraction, a vector multiplication, a vector division, a dot product, an inner product, an outer product, an arithmetic operation, a mathematical operation, a subspace, a projection, a decomposition, a vector transformation, a change of basis, a rotation, a translation, a vector function, a projection, a principal component, a kernel principal component, an independent component, a neighborhood component, a connected component, a linear transform, a nonlinear transform, Fourier transform, Laplace transform, Hilbert transform, Sine transform, Cosine transform, Wavelet transform, Hadamard transform, Slant transform, Fast Fourier transform (FFT), discrete cosine transform (DCT), frequency transform, frequency decomposition, inverse transform, time transform, time decomposition, a frequency, a spectrum, a period, a time, a matrix operation, a rank, a transpose, a determinant, a matrix addition, a matrix subtraction, a matrix multiplication, a matrix division, a matrix inverse, a basis vector, a basis, an eigenvalue, and an eigenvector.

In one embodiment, each CI has at least one component. Computing the AF may comprise: transforming each of the at least one component of each CI of the time series in the sliding time window, computing, for each component, a component auto function (CAF) based on the corresponding transformed component of each CI of the time series in the sliding time window, and computing the AF by aggregating the at least one CAF associated with the at least one component (each CAF associated with one of the at least one component) based on weighted averaging. Computing the IQ-related feature of the AF may comprise: determining a presence of a class of features comprising the IQ-related feature in the AF in a window of argument of the AF; and computing the IQ-related feature of the AF in the window of argument of the AF. Determining the presence of the class of features in the window of argument of the AF may comprise: computing a first regression of the AF in the window of argument of the AF and a first regression error corresponding to the first regression, computing a second regression of the AF in the window of argument of the AF and a second regression error corresponding to the second regression, computing a function of the first regression error and the second regression error, and determining the presence of the class of features in the AF by comparing the function with a threshold. The IQ-related feature in the AF may comprise at least one of the following of the AF: a maximum, a minimum, a constrained maximum, a constrained minimum, a local maximum, a local minimum, a first local maximum, a first local minimum, a k-th local maximum, a k-th local minimum, an average, a weighted average, a percentile, a mean, a median, a mode, a trimmed mean, a conditional mean, and an argument associated with another quantity. In one embodiment, computing the IQ based on the IQ-related feature of the AF comprises: determining an IQ-related argument of the AF in a window of argument of the AF corresponding to the IQ-related feature; and computing the IQ based on at least one of: the IQ-related feature, the IQ-related argument, and the window of argument of the AF.

In one embodiment, the IQ-related feature is a maximum. The class of features includes all maximum and minimum. For each window of ACF ("window of argument of AF"), one can apply linear regression (order 1) and quadratic regression (order 2). If there is a maximum or minimum, the order 2 regression error should be much less than order 1 regression error. Thus the disclosed system can detect the presence of the class of features by comparing a function of the order 2 regression error and the order 1 regression error. When the system detects a window has a worthwhile maximum or minimum, some algorithm may be applied to find the local peak, e.g. the maximum of the order 2 regression.

In one embodiment, the IQ is the speed. The disclosed system computes the speed based on a formula: v=0.54 lambda/t, where v is speed, lambda is carrier wavelength, and t is time associated with first local max of ACF.

In one embodiment, the transient motion monitor is further configured for: computing at least one feature of the IQ, wherein the transient motion of the object is monitored based on the at least one feature of the IQ, and wherein the at least one feature comprises at least one of: an IQ within an analysis time window, a maximum, a minimum, a locally maximum, a locally minimum, an IQ within a target range, a thresholding, an incremental change, a rate of change, a first derivative, a second derivative, a higher order derivative, a mean, a median, a mode, a variance, a total variation, a filtered IQ, a lowpass filtered IQ, a highpass filtered IQ, a nonlinear filtered IQ, a transformed IQ, and a function of IQ. In one embodiment, the transient motion monitor is further configured for: comparing a feature of the IQ with a threshold; and detecting the transient motion of the object when the feature of IQ is larger than the threshold, wherein the response action is triggered based on the detected transient motion of the object.

In one embodiment, the system detects a fall-down by analyzing the speed, e.g. by computing two quantities: (1) maximum change of acceleration in 0.5s window, and (2) maximum speed in the 0.5s window. A threshold can be put on each of the two quantities. If both are larger than their corresponding thresholds, the system determines that the fall-down is detected.

In one embodiment, the transient motion monitor is further configured for: determining that a first significant fraction of IQ in an observation time window are within a first target range, and a second significant fraction of changing rate of IQ in the observation time window are within a second target range. The transient motion is part of a series of repeated gait cycles of the object. Each of the observation time window, the first target range and the second target range is related to the repeated gait cycles of the object. The transient motion of the object is monitored by analyzing the IQ in the observation time window and estimating an information of the repeated gait cycles of the object based on the IQ in the observation time window. The information comprises at least one of: a cycle duration, a cycle period, a cycle frequency, a gait intensity, a stage of a gait cycle, a gait start time, a gait stop time, a time trend of the gait cycles, a classification of the gait, a behavior associated with the gait, an activity associated with the gait, a meaning associated with the gait, a state of the object associated with the gait, a change in gait, a normal gait, a deviation from normal gait, and another gait with a characteristics different from the repeated gait cycles. In one embodiment, analyzing the IQ in the observation time window comprises: identifying at least one of the following characteristic IQ features: a significant feature of IQ, a feature of IQ in a target range, an IQ with a magnitude in a target IQ range, a local mean of IQ, a local variance of IQ, a local behavior of IQ, a local statistics of IQ, a global statistics of IQ, a global behavior of IQ, a local maximum IQ, a local minimum IQ, a zero-crossing of IQ, a zero-crossing of mean-subtracted IQ, a pair of adjacent local maximum IQ and local minimum IQ, time stamp associated with an identified characteristic IQ feature, a window of IQ that match a training pattern; and computing the information based on the identified at least one characteristic IQ feature.

In one embodiment, the transient motion monitor is further configured for: determining a first analysis time window of a first window length comprising at least one first time stamp, wherein each of the at least one first time stamp is associated with a respective sliding time window; computing at least one first intermediate quantity (IQ) each associated with a respective first time stamp in the first analysis time window based on CI of the time series in the respective sliding time window; comparing the at least one first IQ in the first analysis time window with at least one second IQ in a second analysis time window of a second window length, wherein each of the at least one second IQ is associated with a respective second time stamp in the second analysis time window; computing a first nonlinear mapping between the at least one first time stamp in the first analysis time window and the at least one second time stamp in the second analysis time window based on the at least one first IQ in the first analysis time window and the at least one second IQ in the second analysis time window; computing a first matching score between the at least one first IQ in the first analysis time window and the at least one second IQ in the second analysis time window based on the first nonlinear mapping; monitoring the transient motion of the object based on the first matching score; and detecting the transient motion of the object when the first matching score is less than or equal to a threshold.

In various embodiments, the system can determine between two events (e.g. fall-down vs stand-up), by comparing matching scores associated with the two events respectively. This can be generalized to recognize N events. In one embodiment, the transient motion monitor is further configured for: computing a second nonlinear mapping between the at least one first time stamp in the first analysis time window and at least one third time stamp in a third analysis time window based on the at least one first IQ in the first analysis time window and at least one third IQ in the third analysis time window, wherein each of the at least one third IQ is associated with one of the at least one third time stamp in the third analysis time window; computing a second matching score between the at least one first IQ in the first analysis time window and the at least one third IQ in the third analysis time window based on the second nonlinear mapping; comparing the first matching score and the second matching score to generate a comparison result; and identifying, based on the comparison result, the transient motion of the object as one of: a first reference motion and a second reference motion, wherein the first reference motion is associated with the at least one second IQ in the second analysis time window, and wherein the second reference motion is associated with the at least one third IQ in the third analysis time window.

In one embodiment, the system further comprises at least one heterogeneous transmitter and at least one heterogeneous receiver for obtaining at least one time series of training channel information (CI) in a training stage. Each of the at least one heterogeneous transmitter is located in a respective training venue and configured for transmitting a respective wireless signal through the wireless multipath channel impacted by a respective training transient motion of a respective training object in the respective training venue in the training stage. Each of the at least one heterogeneous receiver is located in the respective training venue and configured for: receiving the respective wireless signal through the wireless multipath channel, and obtaining a respective time series of training CI of the wireless multipath channel based on the respective wireless signal, wherein a respective time window of the respective time series of training CI is associated with the respective training transient motion. The transient motion monitor is further configured for: computing at least one training IQ each associated with a respective time stamp in the respective time window, based on training CI of the respective time series in a sliding time window associated with the respective time stamp, and computing the at least one second IQ in the second analysis time window of the second window length, based on the at least one training IQ associated with each of the at least one time series of training CI.

In one embodiment, the transient motion monitor is further configured for: computing a third nonlinear mapping between time stamps of a first time window and time stamps of a second time window, based on at least one first training IQ in the first time window associated with a first time series of training CI and at least one second training IQ in the second time window associated with a second time series of training CI; computing, based on the third nonlinear mapping, a third matching score between the at least one first training IQ in the first time window and the at least one second training IQ in the second time window; and computing the at least one second IQ in the second analysis time window of the second window length, based on at least one of: the third matching score, the third nonlinear mapping, the at least one first training IQ and the at least one second training IQ.

The system can monitor a transient motion based on more than one (N>1) IQ features (e.g. speed+acceleration), by computing a non-linear mapping of the time stamps. In one embodiment, the transient motion monitor is further configured for: determining a first analysis time window of a first window length comprising at least one first time stamp, wherein each of the at least one first time stamp is associated with a respective sliding time window; for each first time stamp in the first analysis time window, computing a set of N first intermediate quantity (IQ) comprising $IQ\_1$, $IQ\_2$, ..., and $IQ\_N$ associated with the first time stamp based on CI of the time series in the respective sliding time window associated with the time stamp, wherein N is greater than 1; comparing the set of N first IQ associated with each first time stamp in the first analysis time window with a set of N second IQ associated with one of at least one second time stamp in a second analysis time window of a second window length; computing a nonlinear mapping between the at least one first time stamp in the first analysis time window and the at least one second time stamp in the second analysis time window based on all first IQ in the first analysis time window and all second IQ in the second analysis time window; computing, based on the nonlinear mapping, a matching score between the first IQ in the first analysis time window and the second IQ in the second analysis time window; monitoring the transient motion of the object based on the matching score; and detecting the transient motion of the object when the matching score is less than or equal to a threshold.

In one embodiment, the system further comprises: an additional receiver configured for: receiving the wireless signal through the wireless multipath channel impacted by the transient motion of the object in the venue, and obtaining an additional time series of CI of the wireless multipath channel based on the wireless signal. The transient motion monitor is further configured for monitoring the transient motion of the object jointly based on the time series of CI and the additional time series of CI.

In one embodiment, the system further comprises: an additional transmitter configured for transmitting an additional wireless signal through the wireless multipath channel impacted by the transient motion of the object in the venue. The receiver is further configured for: receiving the additional wireless signal through the wireless multipath channel, and obtaining an additional time series of CI of the wireless multipath channel based on the additional wireless signal. The transient motion monitor is further configured for monitoring the transient motion of the object jointly based on the time series of CI and the additional time series of CI.

In one embodiment, the transient motion monitor is further configured for computing a location of the transient motion of the object based on at least one of: a location of the transmitter; a location of the receiver; a location of a device that is at least one of: an additional receiver in the venue for receiving the wireless signal from the transmitter through the wireless multipath channel, and an additional transmitter in the venue for transmitting an additional wireless signal to the receiver through the wireless multipath channel; and a joint monitoring of the transient motion of the object based on the time series of CI and at least one of: an additional time series of CI extracted from the wireless signal received by the additional receiver, and an additional time series of CI extracted from the additional wireless signal transmitted by the additional transmitter. In various embodiments, the location where the fall-down happens can be found using the above method for any number of transmitters and any number of receivers.

One aspect of the disclosure is related to the estimation of one or more characteristics and/or spatial-temporal information of an object such as speed, acceleration, gait cycle, a gait, an object motion, and an event. More specifically, the present teaching is related to determining at least one characteristics and/or spatial-temporal information of the object based on time reversal technology in a rich scattering environment.

The event may be an object related event, such as fall-down of the object (e.g. an person and/or a sick person), a rotation, a hesitation, a pause, an impact (e.g. a person hitting a sandbag, a door, a window, a bed, a chair, a table, a desk, a cabinet, a box, another person, an animal, a bird, a fly, a table, a chair, a ball, a bowling ball, a tennis ball, a football, a soccer ball, a baseball, a basketball, a volley ball, etc.), a two-body action (e.g. a person letting go a balloon, catching a fish, molding a clay, writing a paper, a person typing on a computer, etc.), a car moving in a garage, a person carrying a smart phone and walking around an airport/mall/government building/office/etc., an autonomous moveable object/machine moving around (e.g. vacuum cleaner, utility vehicle, a car, drone, self-driving car, etc.).

A threshold (e.g. first threshold, second threshold, etc.) to be applied to a test statistics to differentiate two events (or two conditions, or two situations, or two states), A and B, may be determined. Data (e.g. channel information, channel state information (CSI) may be collected under A and/or under B in a training situation. The test statistics may be computed based on the data. Distributions of the test statistics under A may be compared with distributions of the test statistics under B, and the threshold may be chosen according to some criteria. The criteria may comprise: maximum likelihood (ML), maximum aposterior probability (MAP), discriminative training, minimum type 1 error for a given type 2 error, minimum type 2 error for a given type 1 error, and/or other criteria. The threshold may be adjusted to achieve different sensitivity to the A, B and/or another event/condition/situation/state. The threshold adjustment may be automatic, semi-automatic and/or manual. The threshold adjustment may be applied once, sometimes, often, periodically, occasionally, sporadically, and/or on demand. The threshold adjustment may be adaptive. The threshold adjustment may depend on the object, an object movement/location/direction/action, an object characteristics/spatial-temporal information/size/property/trait/habit/behavior, the venue, a feature/fixture/furniture/barrier/material/machine/living thing/thing/object/boundary/surface/medium that is in/at/of the venue, a map, a constraint of the map, the event/state/situation/condition, a time, a timing, a duration, a current state, a past history, a user, and/or a personal preference, etc.

The characteristics and/or spatial-temporal information may be position (e.g. initial position, new position, position), speed, acceleration, angle of motion, direction of motion, rotation, deformation, transformation, shrinking, expanding, another spatial-temporal characteristics, and/or another characteristics, etc. The object may have multiple parts, each part with different movement. For example, the object may be a person walking forward. While walking, his left hand and right hand may move in different direction, with different instantaneous speed, acceleration, motion, etc.

In one example, a system, apparatus and/or method for determining at least one characteristics and/or spatial-temporal information of an object associated with a movement of the object (e.g. current movement, and/or prior movement) comprises obtaining one or more time series of channel information (CI) of a wireless multipath channel (e.g. wireless multipath channel) using a processor, a memory communicatively coupled with the processor and a set of instructions stored in the memory. The at least one time series of channel information is obtained from a wireless signal sent through the wireless multipath channel. The wireless multipath channel is impacted by the movement of the object. The system, apparats and/or method further comprises determining the one or more characteristics and/or spatial-temporal information of the object associated with the movement of the object based on the one or more time series of channel information.

The channel information may be obtained from a WiFi-enabled chip, an LTE-enabled chip, a Bluetooth-enabled chip, a BLE-enabled (Bluetooth-Low-Energy enabled) chip, and another chip enabled for wireless communication using the wireless signal (e.g. Zigbee, WiMax, 3G/4G/5G/6G/7G/8G, etc.).

The channel information may include channel state information (CSI) of the wireless multipath channel.

Each CSI of the wireless multipath channel may be associated with a time. Each CSI may include time domain element, frequency domain element, and/or time-frequency domain element. Each CSI may contain one or more elements. Each element of the CSI may be a real quantity, an imaginary quantity, a complex quantity, a magnitude, a phase, a flag, and/or a set.

Each channel information (CI) may include a vector of complex numbers, a matrix of complex numbers, a set of mixed quantities, and/or a multi-dimensional collection of at least one complex numbers.

One or more time series of power information may be computed based on the one or more time series of channel information of the wireless multipath channel. Each power information may be associated with a channel information of the wireless multipath channel. Both the power information and the channel information may be associated with a time. The vector of the channel information and the vector of the power information may have the same number of elements. Each real element of the power information vector may be computed based on respective magnitude, phase, real part, imaginary part and/or another function of corresponding complex element of the channel information. In particular, the real element of the power information vector may be based on square of magnitude of corresponding complex element of the channel information.

A particular function may be determined based on a first time, a time offset, a first window of power information and a second window of power information. Although power information is mentioned here, the particular function may be applied to channel information and/or other information. The first window of power information may be a first subset of a particular time series of power information associated with the first time. The second window of power information may be a second subset of the particular time series of power information associated with a second time which is at the time offset from the first time. The first window and the second window may be of the same size. The second window is at the time offset from the first window. The first window and the second window may both be windows of the same particular time series of power information (and/or or channel information, and/or other information). The cardinality of the first subset may be equal to the cardinality of the second subset.

The particular function may be computed for at least one value of the first time and for at least one value of the time offset for each of the first time. The one or more characteristics and/or spatial-temporal information of the object associated with the movement of the object may be determined based on the articular function computed for the at least one value of time offset. A particular value of the first time may be associated with the movement of the object and the at least one characteristics and/or spatial-temporal information of the object.

The particular function may be a second function of at least one of: a covariance function, a covariance-like function, an auto-covariance function, an auto-covariance-like function, a correlation function, a correlation-like function, an auto-correlation function, an auto-correlation-like function, an inner product, another function, a combination of any of these functions with a preprocessing function, a combination of any of these functions with a post-processing function, and a combination of any of these functions with at least one of: frequency decomposition, time decomposition, time-frequency decomposition, and another decomposition.

The second function may be at least one of: de-noising, smoothing, conditioning, enhancement, restoration, feature extraction, weighted averaging, low-pass filtering, bandpass filtering, high-pass filtering, median filtering, ranked filtering, quartile filtering, percentile filtering, mode filtering, linear filtering, nonlinear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transform, Fourier transform, Laplace, Hadamard transform, transformation, decomposition, selective filtering, adaptive filtering, derivative, first order derivative, second order derivative, higher order derivative, integration, zero crossing, indicator function, absolute conversion, convolution, multiplication, division, preprocessing, post-processing, another transform, another processing, another filter, and a third function, and a third function.

The particular function may be an estimate of a weighted sum of square of autocorrelation function (ACF) of electric field components of the received electromagnetic (EM) wave of the wireless signal.

The power information may include a frequency decomposition, time decomposition, time-frequency decomposition, and/or another decomposition. Another function may be determined based on a frequency of the frequency decomposition (or a variable/index of other decompositions), the first time, the time offset, the first window of power information and the second window of power information. The another function may be computed for at least one value of the frequency of the frequency decomposition. The particular function may be computed by averaging the another function computed for the at least one value of the frequency of the frequency decomposition.

In another example, the power information may include a frequency subband decomposition. Another function is determined based on a frequency subband of the frequency decomposition, the first time, the time offset, the first window of power information and the second window of power information. The another function may be computed for at least one instance of the frequency subband of the frequency decomposition. The particular function may be computed by averaging the another function computed for the at least one instance of the frequency subband of the frequency decomposition.

In another example, the power information may comprise a time-frequency decomposition. Another function may be determined based on a time-frequency partition of the time-frequency decomposition, the first time, the time offset, the first window of power information and the second window of power information. The another function may be computed for at least one instance of the time-frequency partition of the time-frequency decomposition. The particular function may be computed by averaging the another function computed for the at least one instance of the time-frequency partition of the time-frequency decomposition.

The computing of the particular function may comprise determining a preliminary function based on the first time, a third time, the time offset, a third window of power information and a fourth window of power information. The third window of power information may be a third subset of the particular time series of power information associated with the third time. The fourth window of power information may be a fourth subset of the particular time series of power information associated with a fourth time at the time offset from the third time. The preliminary function may be computed for a particular value of the first time and a particular value of the time offset for at least one value of the third time close to the first time. The particular function for the particular value of the first time and the particular value of the time offset may be computed by averaging the preliminary function for the particular value of the first time and the particular value of the time offset computed for the at least one value of the third time close to the first time.

At least one special characteristics and/or special spatial-temporal info (e.g. local maximum, local minimum, zero crossing, etc.) may be determined/computed for a particular value of the first time. At least one particular value of the time offset each associated with a respective special characteristics and/or spatial-temporal information (e.g. local maximum, local minimum, zero crossing, etc.) of the particular function for the particular value of the first time may be identified. The at least one special characteristics and/or special spatial-temporal info of the object associated with the movement of the object may be determined based on the at least one particular value of the time offset.

The at least one special characteristics and/or special spatial-temporal information of the particular function for the particular value of the first time may include: a local maximum, a local maximum with positive time offset, a first local maximum with positive time offset, a local maximum with negative time offset, a first local maximum with negative time offset, a local minimum, a local minimum with positive time offset, a first local minimum with positive time offset, a local minimum with negative time offset, a first local minimum with negative time offset, a local extremum, a local extremum with positive time offset, a first local extremum with positive time offset, a local extremum with negative time offset, a first local extremum with negative time offset, a zero crossing, a zero crossing with positive time offset, a first zero crossing with positive time offset, a zero crossing with negative time offset, a first zero crossing with negative time offset, a local maximum slope, a local maximum slope with positive time offset, a first local maximum slope with positive time offset, a local maximum slope with negative time offset, a first local maximum slope with negative time offset, a local minimum slope, a local minimum slope with positive time offset, a first local minimum slope with positive time offset, a local minimum slope with negative time offset, a first local minimum slope with negative time offset, a local maximum second order derivative, a local minimum second order derivative, a local maximum higher order derivative, a local minimum higher order derivative, a zero crossing, a zero crossing of slope, a zero crossing of second order derivative, a zero crossing of higher order derivative, and/or another characteristics and/or spatial-temporal information.

There may be a search for a local extremum of the particular function for a particular value of the first time. The search may comprise the following operations. (1) A current time offset value may be initialized. This is followed by a recursion. (2) In each iteration of the recursion, a regression window around the current time offset value may be determined. (3) The particular function within the regression window around the current time offset value may be approximated with/by a regression function using regression analysis. (4) Regression error of the regression function with respect to the particular function may be determined. (5) The current time offset value may be updated based on convexity of the regression function, another characteristics and/or spatial-temporal information of the regression function, and/or regression error of the regression function with respect to the particular function in the regression window. (6) Performing the iteration of the recursion until at least one stopping criterion is satisfied.

The local extremum of the particular function may be determined for the particular value of the first time based on the corresponding extremum of the regression function in the regression window. A particular value of the time offset associated with the local extremum of the particular function may be identified in the regression window. At least one characteristics and/or spatial-temporal information of the object associated with the movement of the object may be computed based on the particular value of the time offset.

The local extremum may be at least one of: a local maximum, a local maximum with positive time offset, a first local maximum with positive time offset, a local maximum with negative time offset, a first local maximum with negative time offset, a local minimum, a local minimum with positive time offset, a first local minimum with positive time offset, a local minimum with negative time offset, a first local minimum with negative time offset, a local maximum slope, a local maximum slope with positive time offset, a first local maximum slope with positive time offset, a local maximum slope with negative time offset, a first local maximum slope with negative time offset, a local minimum slope, a local minimum slope with positive time offset, a first local minimum slope with positive time offset, a local minimum slope with negative time offset, a first local minimum slope with negative time offset, a local maximum second order derivative, a local minimum second order derivative, a local maximum higher order derivative, and/or a local minimum higher order derivative.

The initial current time offset value may be positive, negative and/or zero. In at least one iteration, a length of the regression window and/or a location of the regression window may change. The regression function may be a linear function, a quadratic function, a cubic function, a polynomial function, and/or another function.

The regression analysis may minimize an absolute error, a square error, a higher order error (e.g. third order, fourth order, etc.), a robust error (e.g. square error for smaller error magnitude and absolute error for larger error magnitude, or a first kind of error for smaller error magnitude and a second kind of error for larger error magnitude), another error, a weighted sum of absolute error (e.g. for a wireless transmitter with multiple antennas and a wireless receiver with multiple antennas, each pair of transmitter antenna and receiver antenna form a link. Error associated with different links may have different weights. One possibility is that some links and/or some components with larger noise may have smaller or bigger weight.), a weighted sum of square error, a weighted sum of higher order error, a weighted sum of robust error, a weighted sum of the another error, an absolute cost, a square cost, a higher order cost, a robust cost, another cost, a weighted sum of absolute cost, a weighted sum of square cost, a weighted sum of higher order cost, a weighted sum of robust cost, and/or a weighted sum of another cost.

The regression error determined may be an absolute error, a square error, a higher order error, a robust error, yet another error, a weighted sum of absolute error, a weighted sum of square error, a weighted sum of higher order error, a weighted sum of robust error, and/or a weighted sum of the yet another error.

The time offset associated with maximum regression error of the regression function with respect to the particular function in the regression window may become the updated current time offset in the iteration.

In one example, if the regression function is locally convex in the regression window, time offset associated with maximum regression error of the regression function with respect to the particular function in the regression window may become the updated current time offset.

In another example, if the regression function is locally concave in the regression window, time offset associated with maximum regression error of the regression function with respect to the particular function in the regression window may become the updated current time offset.

If the regression function is locally convex in the regression window, at least one of time offsets associated with two ends of the regression window may become the updated current time offset.

If the regression function is locally concave in the regression window, at least one of time offsets associated with two ends of the regression window may become the updated current time offset.

At least one of time offsets associated with two ends of the regression window may become the updated current time offset based on the local convexity of the regression function in the regression window. If the regression is locally convex in part of the window and locally concave in another part of the window, the window size may be reduced.

The local extremum may be searched based on a quantity comprising a difference of two different errors (e.g. a difference between absolute error and square error). The two different errors may comprise an absolute error, a square error, a higher order error, a robust error, another error, a weighted sum of absolute error, a weighted sum of square error, a weighted sum of higher order error, a weighted sum of robust error, and/or a weighted sum of the another error.

Each of the first error and the second error of the two different errors may be an absolute error, a square error, a higher order error, a robust error, another error, a weighted sum of absolute error, a weighted sum of square error, a weighted sum of higher order error, a weighted sum of robust error, and/or a weighted sum of the another error. The second of the two different errors may be an absolute error, a square error, a higher order error, a robust error, another error, a weighted sum of absolute error, a weighted sum of square error, a weighted sum of higher order error, a weighted sum of robust error, and/or a weighted sum of the another error.

The local extremum may be searched based on a quantity comprising a difference of a first error and a second error. The quantity may be compared with an F-distribution, a central F-distribution, another statistical distribution, a threshold, a threshold associated with a probability, a threshold associated with a probability of finding a false peak, a threshold associated with the F-distribution, a threshold associated the central F-distribution, and/or a threshold associated with the another statistical distribution.

The regression window may be determined based on at least one of: the movement of the object, a quantity associated with the object, the at least one characteristics and/or spatial-temporal information of the object associated with the movement of the object, an estimated location of the local extremum, a noise characteristics, an estimated noise characteristics, an F-distribution, a central F-distribution, another statistical distribution, a threshold, a preset threshold, a threshold associated with a probability, a threshold associated with a desired probability, a threshold associated with a probability of finding a false peak, a threshold associated with the F-distribution, a threshold associated the central F-distribution, a threshold associated with the another statistical distribution, a condition that a quantity at the window center is largest within the regression window, a condition that the quantity at the window center is largest within the regression window, a condition that there is only one of the local extremum of the particular function for the particular value of the first time in the regression window, another regression window, and/or another condition.

A time offset near time offset associated with maximum regression error of the regression function with respect to the particular function in the regression window may become the updated current time offset based on a condition.

A stopping criterion may be that change of current offset value in the updating in an iteration is less than a threshold. The threshold may be 0.5, 1, 1.5, 2, or another number. The threshold may be adaptive. It may change as the iteration progresses. The adaptive threshold may be determined based on the particular value of the first time, the current time offset value, the regression window, the regression analysis, the regression function, the regression error, the convexity of the regression function, and/or an iteration number.

A stopping criterion may be adaptive determined based on the particular value of the first time, the current time offset value, the regression window, the regression analysis, the regression function, the regression error, the convexity of the regression function, and/or an iteration number. A stopping criterion may be that change of current time offset value is less than a threshold. The threshold may be 1, 2, 3, or other number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The particular function may comprise de-noising, smoothing, conditioning, enhancement, restoration, feature extraction, weighted averaging, low-pass filtering, bandpass filtering, high-pass filtering, median filtering, ranked filtering, quartile filtering, percentile filtering, mode filtering, linear filtering, nonlinear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transform, Fourier transform, Laplace, Hadamard transform, transformation, decomposition, selective filtering, adaptive filtering, derivative, first order derivative, second order derivative, higher order derivative, integration, zero crossing, indicator function, absolute conversion, convolution, multiplication, division, preprocessing, post-processing, another transform, another processing, another filter, and a third function.

The searching for a local extremum may comprise a robust search, a minimization, a maximization, an optimization, a statistical optimization, a dual optimization, a constraint optimization, a convex optimization, a global optimization, a local optimization an energy minimization, a linear regression, a quadratic regression, a higher order regression, a linear programming, a nonlinear programming, a stochastic programming, a combinatorial optimization, a constraint programming, a constraint satisfaction, a calculus of variations, an optimal control, a dynamic programming, a mathematical programming, a multi-objective optimization, a multi-modal optimization, a disjunctive programming, a space mapping, an infinite-dimensional optimization, a heuristics, a metaheuristics, a convex programming, a semidefinite programming, a conic programming, a cone programming, an integer programming, a quadratic programming, a fractional programming, a numerical analysis, a simplex algorithm, an iterative method, a gradient descent, a subgradient method, a coordinate descent, a conjugate gradient method, a Newton's algorithm, a sequential quadratic programming, an interior point method, an ellipsoid method, a reduced gradient method, a quasi-Newton method, a simultaneous perturbation stochastic approximation, an interpolation method, a pattern search method, a line search, a non-differentiable optimization, a genetic algorithm, an evolutionary algorithm, a dynamic relaxation, a hill climbing, a particle swarm optimization, a gravitation search algorithm, a simulated annealing, a memetic algorithm, a differential evolution, a dynamic relaxation, a stochastic tunneling, a Tabu search, a reactive search optimization, a curve fitting, a least square, a simulation based optimization, a variational calculus, and/or a variant. The search for a local extremum may be associated with an objective function, a loss function, a cost function, a utility function, a fitness function, an energy function, and/or an energy function.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

The current time offset value may be initialized based on a target value, a target profile, a trend, a past trend, a current trend, a target speed, a speed profile, a target speed profile, a past speed trend, the movement of the object, at least one characteristics and/or spatial-temporal information of the object associated with the movement of object, a positional quantity of the object, an initial speed of the object associated with the movement of the object, a predefined value, an initial width of the regression window, a time duration, a value based on a carrier frequency of the wireless signal, a bandwidth of the wireless signal, an amount of antennas associated with the wireless multipath channel, a noise characteristics, and/or an adaptive value. The current time offset may be at the center, on the left side, on the right side, and/or at another fixed relative location, of the regression window.

One of the at least one characteristics and/or spatial-temporal information of the object associated with the movement of the object may be speed of the object. The speed of the object may be computed based on the particular value of time offset associated with the local extremum of the particular function for a particular value of the first time in the regression window.

The speed of the object at a time may be computed based on the particular value of time offset associated with the local extremum of the particular function for a particular value of the first time in the regression window. The particular value of the first time may be equal to the time.

An acceleration of the object at a particular time may be determined based on at least one value of the speed of the object each at a time close to the particular time. The acceleration of the object at the particular time may be one of the at least one characteristics and/or spatial-temporal information of the object associated with the movement of the object.

An acceleration of the object at a particular time may be determined based on at least one value of the speed of the object at one or more time each close to the particular time. The determination of the acceleration of the object at the particular time may comprise: approximating the speed of the object at the one or more time by a time function, determining one or more slopes of the time function close to the particular time, and computing the acceleration based on the one or more slopes of the time function.

The time function may be a continuous function, a continuous differentiable function, a linear function, a piecewise linear function, a quadratic function, a piecewise quadratic function, a polynomial, a piecewise continuous polynomial, a piecewise continuous differentiable polynomial, a regression function, an auto-regressive function, an adaptive function, a time adaptive function, a time-frequency function, another function, an optimized function, a constrained optimized function, an unconstrained optimized function, a low-pass filtered function of the speed, a bandpass filtered function of the speed, a high-pass filtered function of the speed, and/or another filtered function of the speed. The time function may be obtained by an optimization of a cost function associated with the speed of the object. The optimization may be constrained and/or unconstrained.

The acceleration may be computed as a function of the one or more slopes of the time function. The function may be an average, a weighted average, a median, a mode, a quartile, a percentile, a robust function, a linear function, a nonlinear function, and/or another function.

One of the one or more slopes of the time function may be determined as a difference between two values of the speed of the object at two adjacent times divided by a difference of the two adjacent time values.

The time function may be a piecewise linear function. The acceleration may be computed as a slope of the piecewise linear function at the particular time. The one or more time may be within a time window around the particular time. The one or more time may comprise a time window around the particular time.

The acceleration of the object may be the acceleration of the object associated with the movement of the object at the particular time.

An acceleration of the object at a particular time may be determined based on a speed of the object computed at multiple values of time close to the particular time. The speed of the object may be one of the at least one characteristics and/or spatial-temporal information of the object associated with the movement of the object determined based on the at least one time series of channel information.

The speed of the object may be one of the at least one characteristics and/or spatial-temporal information of the object associated with the movement of the object determined based on the particular function computed for the particular value of first time and the at least one value of time offset, with the particular value of the first time being one of the multiple values of time close to the particular time.

The speed of the object may also be one of the at least one characteristics and/or spatial-temporal information of the object associated with the movement of the object determined based on the time offset associated with the local extremum of the particular function for the particular value of the first time in the regression window, the particular value of the first time being equal to the time.

The speed of the object at the particular value of the first time may be computed as a quantity divided by the particular value of time offset associated with the local extremum of the particular function in the regression window.

In another example, one of the at least one characteristics and/or spatial-temporal information may be speed of the object. The speed of the object at the first time may be computed based on the particular value of time offset associated with the local extremum of the particular function in the regression window. The local extremum may be the first local maximum with positive time offset, and/or the first local maximum with negative time offset. The particular function may be a derivative of a characteristic auto-correlation function with respect to the time offset. The channel information may be CSI associated with a frequency decomposition. Each CSI may be a vector of complex components each corresponding to a frequency of the frequency decomposition. Component-wise auto-correlation function may be computed for each frequency of the frequency decomposition based on the particular time series of CSI. The characteristic auto-correlation may be computed as average of the component-wise auto-correlation function over the frequency of the frequency decomposition.

The iteration may be applied at least one time to obtain at least one extremum. Each extremum may be associated with a respective current time offset value, a respective regression window, a respective regression function, and/or a respective particular time offset value in the respective iteration. The at least one characteristics and/or spatial-temporal information of the object associated with the movement of the object may be computed based on at least one of the respective particular time offset value of the particular function in the regression window.

The iteration may be applied two times to obtain a first local extremum and a second local extremum. The first local extremum may be associated with a first current time offset value, a first regression window, a first regression function, and/or a first particular time offset value. The second local extremum may be associated with a second current time offset value, a second regression window, a second regression function, and/or a second particular time offset value. The at least one characteristics and/or spatial-temporal information of the object associated with the movement of the object may be computed based on the first particular time offset value and/or the second particular time offset value of the particular function in the regression window.

The iteration may be applied two times to obtain a first local extremum which is first local maximum with positive time offset, and a second local extremum which is first local maximum with negative time offset. The first local extremum may be associated with a first current time offset value, a first regression window, a first regression function, and/or a first particular time offset value. The second local extremum may be associated with a second current time offset value, a second regression window, a second regression function, and/or a second particular time offset value. The at least one characteristics and/or spatial-temporal information of the object associated with the movement of the object may be computed based on the first particular time offset value and/or the second particular time offset value, of the particular function in the regression window.

A gait cycle of the object may be determined based on at least one value of the speed of the object, and/or at least one value of acceleration of the object.

At least one gait cycle of the object may also be determined based on at least one value of the speed of the object and/or at least one value of the acceleration of the object. The at least one gait cycle may be determined by detecting a succession of a period of positive acceleration and a period of negative acceleration. The at least one gait cycle may be determined by detecting a succession of a period of increasing speed and a period of decreasing speed.

The at least one gait cycle may be determined by detecting a succession of a period of positive speed and a period of negative speed. The at least one gait cycle may be determined by detecting an underlying periodic behavior of the speed of the object, a speed change of the object, and/or the acceleration of the object, with an associated time period.

The at least one gait cycle may be determined by detecting an underlying periodic behavior of local maximum speed of the object, local minimum speed of the object, local maximum acceleration of the object, local minimum acceleration of the object, local maximum speed change of the object, and/or local minimum speed change of the object, with an associated time period.

The at least one gait cycle may be determined to be associated with a time period. A function of the speed of the object and/or the acceleration of the object may exhibit a local maximum at a location associated with the time period.

The at least one gait cycle may be determined to be associated with a time period. A function of the speed of the object and/or the acceleration of the object may be determined to exhibit peak localization with multiple pairs of local maximum and local minimum with associated multiple pairs of peak location associated with the time period.

The time period may be determined based on a distance between at least one of: two adjacent local maximum, two adjacent local minimum, a pair of adjacent local maximum and local minimum, two local maximums separated by a predetermined number of maximums, two local minimums separated by a predetermined number of minimums, and a pair of local maximum and local minimum separated by a predetermined number of extremum, of the function.

The function may comprise an auto-correlation function, an auto-correlation like function, an auto-covariance function, an auto-covariance like function, a product of the speed and a shifted version of the acceleration, a product of the speed and a shifted version of a periodic function with known period, a product of the acceleration and the shifted version of the periodic function with known period, an optimization of a cost function, a constrained optimization of the cost function, a unconstrained optimization of the cost function, a Fourier transform, a Laplace transform, another transform, and/or another function.

At least one gait cycle of the object may be determined based on at least one of: at least one value of a speed of the object and at least one value of an acceleration of the object. The speed of the object may be one of the at least one characteristics and/or spatial-temporal information of the object associated with the movement of the object determined based on the at least one time series of channel information. The acceleration of the object may be determined based on the speed of the object.

At least one gait cycle of the object may be determined based on at least one of: at least one value of a speed of the object and at least one value of an acceleration of the object. The speed of the object may be one of the at least one characteristics and/or spatial-temporal information of the object associated with the movement of the object determined based on the particular function computed for the particular value of first time and the at least one value of time offset, with the particular value of the first time being one of the multiple values of time close to the particular time. The acceleration of the object may be determined based on the speed of the object.

At least one gait cycle of the object may be determined based on at least one of: at least one value of a speed of the object and at least one value of an acceleration of the object. The speed of the object may be one of the at least one characteristics and/or spatial-temporal information of the object associated with the movement of the object determined based on the time offset associated with the local extremum of the particular function for the particular value of the first time in the regression window, the particular value of the first time being equal to the time. The acceleration of the object may be determined based on the speed of the object.

A gait of the object and/or an event may be detected based on at least one of: at least one segment of a time series of channel information, at least one segment of a time series of channel state information (CSI), at least one value of the particular function, at least one value of the speed of the object, and/or at least one value of an acceleration of the object each based on at least one value of the speed of the object.

The gait of the object and/or the event may be detected based on a time trend of at least one of: the channel information, the channel state information (CSI), the particular function, the speed of the object, and/or the acceleration of the object.

The detection of the gait of the object and/or the event may comprise determining the gait of the object and/or the event, using an engine based on the time trend of the speed of the object. Input to the engine may comprise at least one of: at least one segment of a time series of channel information, at least one segment of a time series of channel state information (CSI), at least one value of the particular function, at least one value of the speed of the object, at least one value of an acceleration of the object. The engine may be a neural network and/or a classification engine.

The engine may be trained in a training phase with training input to generate at least one reference time trend associated with known gait of the object and known event. The training input of the engine may be associated with the known gait of the object and the known event. The training may be at least one of: discriminative training, decision feedback training, machine learning, supervised learning, unsupervised learning, shallow learn, deep learning, and/or another training.

The determination of the gait of the object and/or the event using the engine may comprise: obtaining the time trend, comparing the time trend with each of the reference time trend, and aligning the time trend of a first duration with each of the at least one reference time trend of heterogeneous duration. It may further comprise computing at least one similarity score each between the time trend and respective aligned reference time trend, and/or determining the gait of the object and/or the event as one of the known gaits of the object and/or one of the known events, based on the at least one similarity score.

The speed of the object may be one of the at least one characteristics and/or spatial-temporal information of the object associated with the movement of the object determined based on the at least one time series of channel information.

The speed of the object may be one of the at least one characteristics and/or spatial-temporal information of the object associated with the movement of the object determined based on the particular function computed for the particular value of first time and the at least one value of time offset, with the particular value of the first time being one of the multiple values of time close to the particular time.

At least one threshold may be determined. The at least one characteristics and/or spatial-temporal information of the object may be determined based on the at least one threshold.

The at least one threshold may be determined based on at least one time series of training channel information (CI) of the wireless multipath channel using a second processor, a second memory communicatively coupled with the second processor and a second set of instructions stored in the second memory. The second processor may be the first processor, part of the first processor, and/or connected with the first processor. Some resources (hardware, network, communication, user-interface, and/or software) of the second processor may be shared with the first processor. The second memory may be the first memory, part of the first memory, connected to the first memory, and/or shared with the first memory. The second set of instructions may be the first set of instructions, and/or part of the first set of instructions. The second set of instructions and the first set of instructions may share some software library, some software routine, some hardware resources, some communication resources and/or other resource. The second set of instructions and the first set of instructions may work independently, cooperatively, jointly, sequentially, in parallel, alternately, and/or interactively.

The at least one time series of training channel information (CI) of the wireless multipath channel may be obtained from a second wireless signal sent through the wireless multipath channel in a training phase. The wireless multipath channel may be impacted by a training movement of a second object in the training phase. The training phase may be a training session, which may be carried out once, occasionally, regularly, and/or on demand.

At least one time series of first training channel information of the wireless multipath channel associated with a target positive training movement of the second object in the training phase may be obtained. The positive training movement may be a target movement to be recognized, monitored, measured, studied, processed, detected, estimated, verified, and/or captured.

At least one time series of second training channel information of the wireless multipath channel associated with a target negative training movement of the second object in the training phase may be obtained. The negative training movement may be a target movement to be ignored, missed, not monitored, not detected, not estimated, not recognized, not verified, not captured, not measured, and/or not studied.

At least one first quantity from the at least one time series of first training channel information and/or at least one second quantity from the at least one time series of second training channel information may be computed. The at least one first quantity and/or the at least one second quantity may comprise a motion statistics, a location statistics, a map coordinate statistics, a height statistics, a speed statistics, an acceleration statistics, a movement angle statistics, a rotation statistics, a size statistics, a volume statistics, a time trend, a time trend statistics, a time profile statistics, a periodic motion statistics, a frequency statistics, a transient statistics, a breathing statistics, a gait statistics, an action statistics, an event statistics, a suspicious event statistics, a dangerous event statistics, an alarming event statistics, a warning statistics, a belief statistics, a proximity statistics, a collision statistics, a power statistics, a signal statistics, a signal power statistics, a signal strength statistics, a received signal strength indicator (RSSI), a signal amplitude, a signal phase, a signal frequency component, a signal frequency band component, a channel state information (CSI), a CSI statistics, a map statistics, a time statistics, a frequency statistics, a time-frequency statistics, a decomposition statistics, a orthogonal decomposition statistics, a non-orthogonal decomposition statistics, a tracking statistics, a breathing statistics, a heartbeat statistics, a biometric statistics, a baby statistics, a patient statistics, a machine statistics, a device statistics, a temperature statistics, a vehicle statistics, a parking lot statistics, a venue statistics, a lift statistics, an elevator statistics, a spatial statistics, a road statistics, a fluid flow statistics, a home statistics, a room statistics, an office statistics, a house statistics, a building statistics, a warehouse statistics, a storage statistics, a system statistics, a ventilation statistics, a fan statistics, a pipe statistics, a duct statistics, a people statistics, a human statistics, a car statistics, a boat statistics, a truck statistics, an airplane statistics, a drone statistics, a downtown statistics, a crowd statistics, an impulsive event statistics, a cyclo-stationary statistics, an environment statistics, a vibration statistics, a material statistics, a surface statistics, a 3-dimensional statistics, a 2-dimensional statistics, a local statistics, a global statistics, a presence statistics, and/or another statistics.

The at least one threshold may be determined based on the at least one first quantity and/or the at least one second quantity. The at least one threshold may be determined such that a first percentage of the first quantity is larger than, equal to and/or less than a first threshold (not the at least one threshold). The at least one threshold may be determined such that a second percentage of the second quantity is larger than, equal to and/or less than a second threshold (not the at least one threshold).

The first threshold may be greater than, equal to and/or less than the second threshold. The first threshold may be the second threshold. The first percentage may be greater than, equal to and/or less than the second percentage.

The at least one time series of first training channel information of the wireless multipath channel may be associated with a training movement of the second object inside a monitored area in the training phase. The target positive training movement of the second object may be the training movement of the second object inside the monitored area.

The at least one time series of second training channel information of the wireless multipath channel may be associated with a training movement of the second object outside the monitored area in the training phase. The target negative training movement of the second object may be the training movement of the second object outside the monitored area.

The second object may be the first object. The second object may be an imitation, a replacement, a backup, and/or a replica of the first object. The second object may be another object similar to the first object. The second object may be similar to the first object in terms of structure, size, shape, functionality, periodicity, deformation characteristics, motion characteristics, speed, acceleration, gait, trend, habit, wireless properties, and other characteristics.

This disclosure is also related to communication hardware that is capable of providing the channel information. The communication hardware may be a WiFi-capable chip (e.g. integrated circuit or IC), a next generation WiFi-capable chip, a LTE-capable chip, a 5G-capable chip, a 6G/7G/8G-capable chip, etc. These CSI ready chips can be used to implement the passive speed estimation disclosed above for monitoring a transient motion like fall-down. The communication hardware computes the channel information and stores the channel information in a buffer memory and makes the channel information available for extraction. The channel information may comprise data and/or at least one matrices related to channel state information (CSI). The at least one matrices may be used for channel equalization, and/or beam forming, etc.

Figure 3:
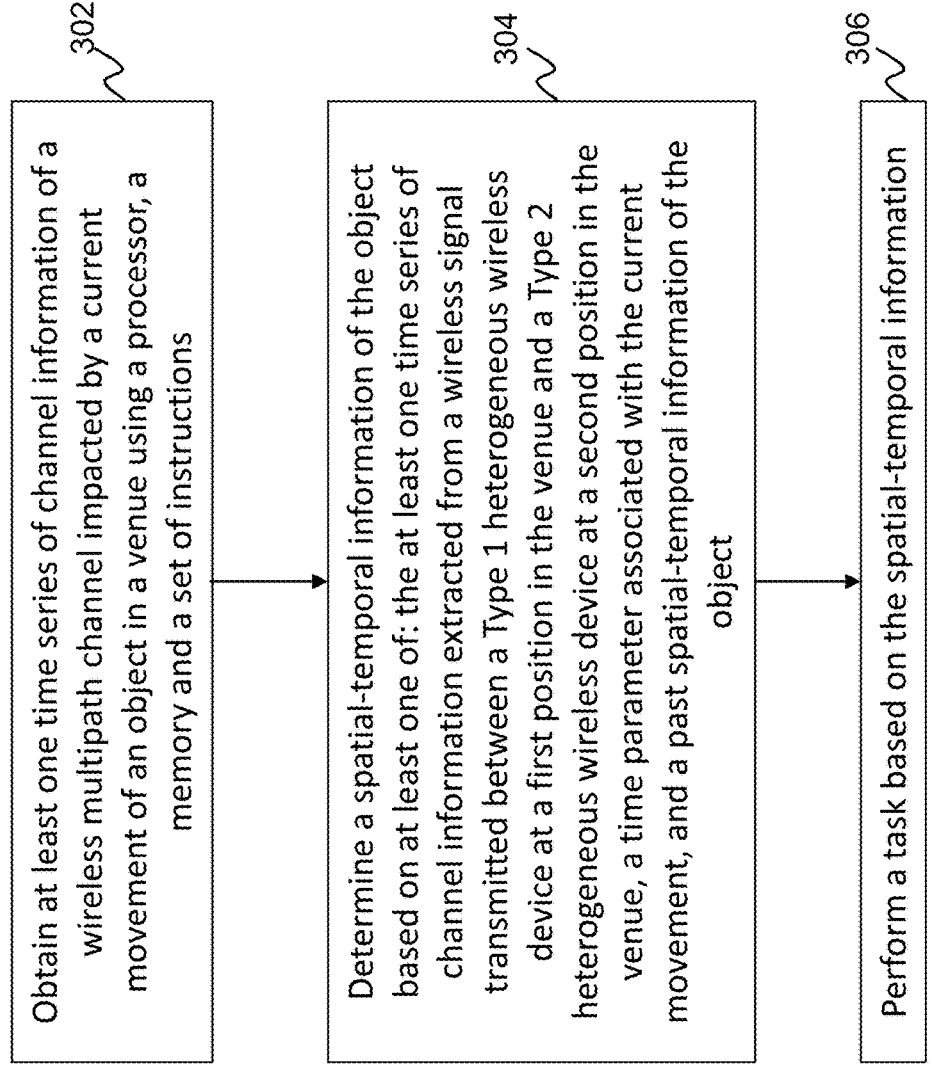
FIG. 3 illustrates an exemplary method for object tracking, according to one embodiment of the present teaching.

FIG. 3 illustrates an exemplary method for object tracking, according to one embodiment of the present teaching. At operation 302, at least one time series of channel information f a wireless multipath channel is obtained, using a processor, a memory and a set of instructions stored in the memory. The at least one time series of channel information is extracted from a wireless signal transmitted between a Type 1 heterogeneous wireless device at a first position in a venue and a Type 2 heterogeneous wireless device at a second position in the venue through the wireless multipath channel. The wireless multipath channel is impacted by a current movement of an object in the venue. At operation 304, a spatial-temporal information of the object is determined based on at least one of: the at least one time series of channel information, a time parameter associated with the current movement, and a past spatial-temporal information of the object. At operation 306, a task is performed based on the spatial-temporal information.

Figure 4:
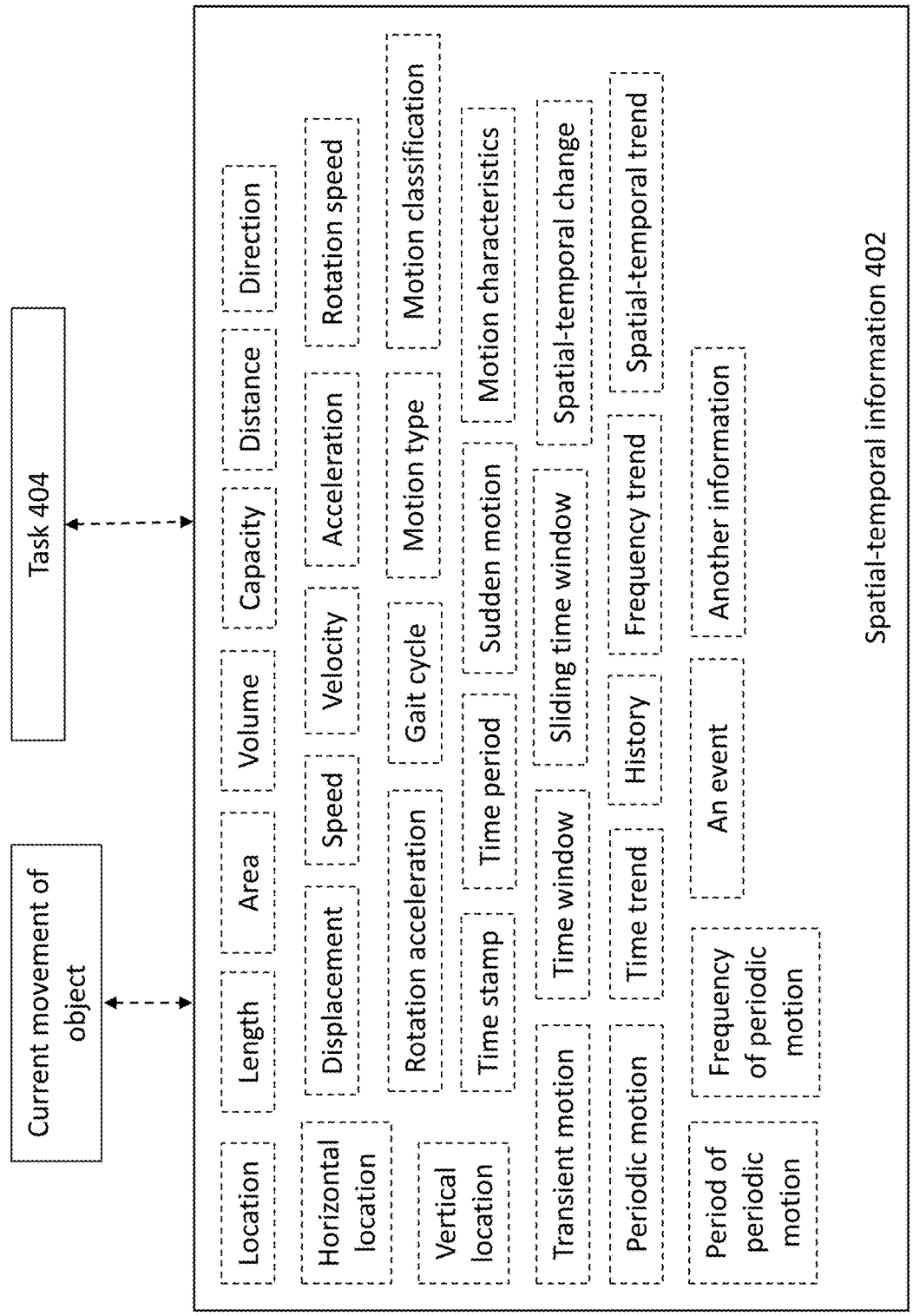
FIG. 4 illustrates examples of spatial-temporal information, according to one embodiment of the present teaching.
Figure 5:
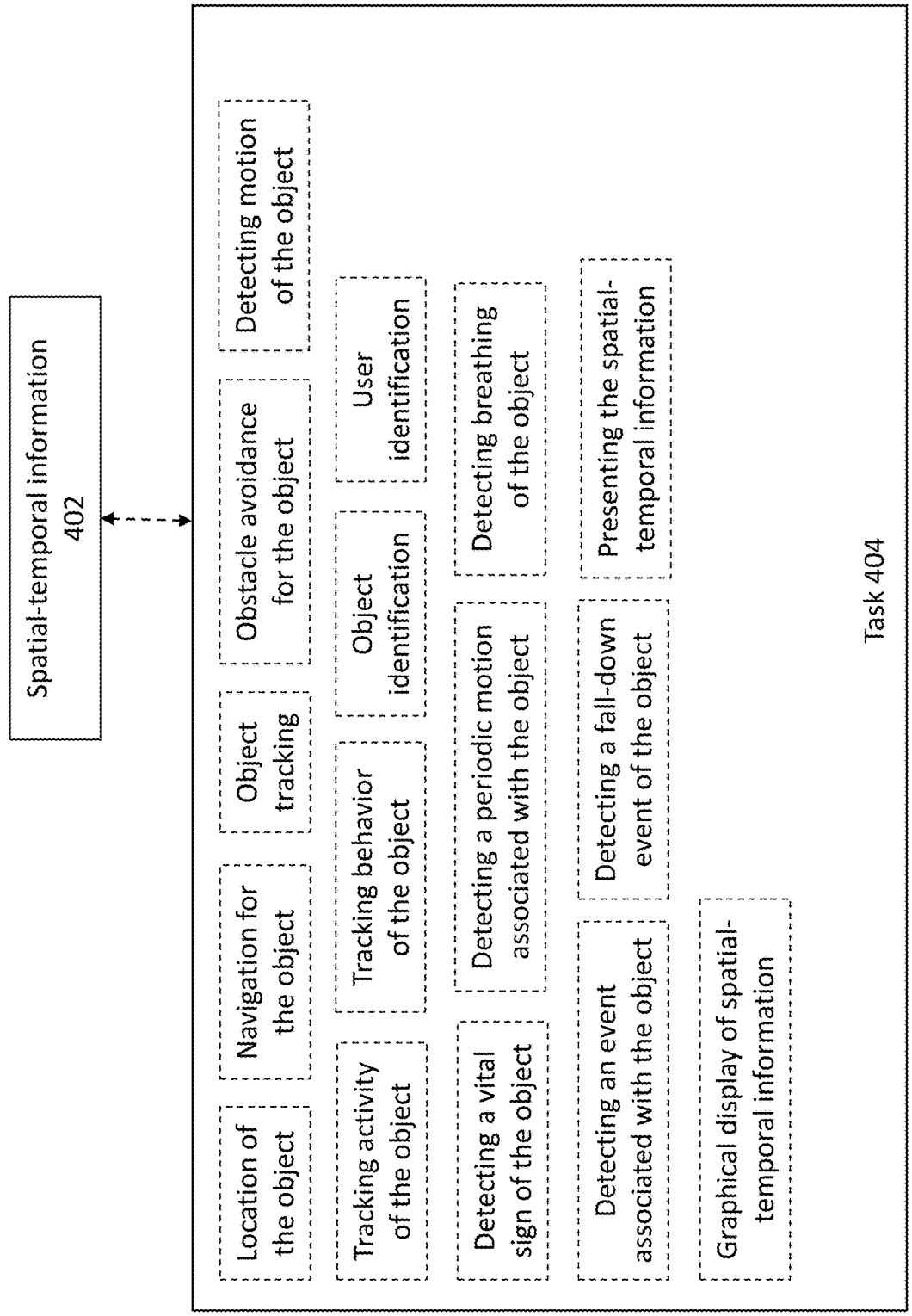
FIG. 5 illustrates examples of tasks performed based on spatial-temporal information, according to one embodiment of the present teaching.

FIG. 4 illustrates examples of the spatial-temporal information 402, according to one embodiment of the present teaching. Accordingly, FIG. 5 illustrates some examples of the task 404 performed based on spatial-temporal information, according to one embodiment of the present teaching.

Figure 6:
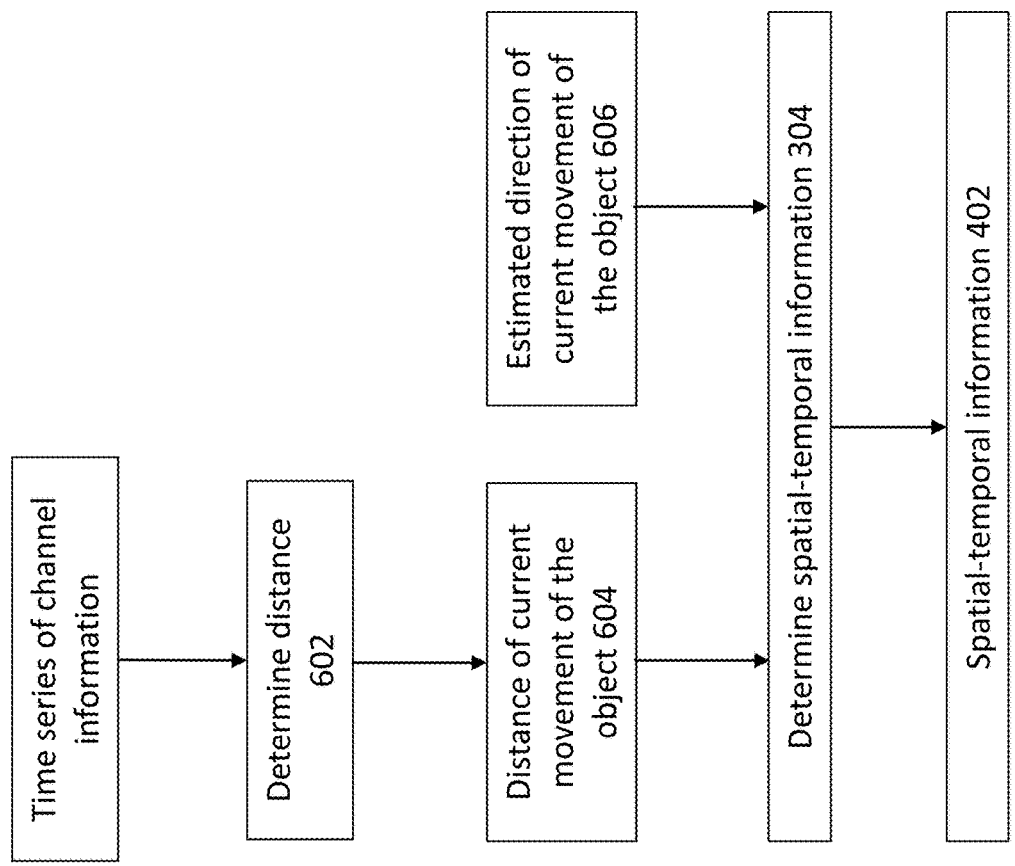
FIG. 6 illustrates another exemplary method for object tracking, according to one embodiment of the present teaching.

FIG. 6 illustrates another exemplary method for object tracking, according to one embodiment of the present teaching. As shown in FIG. 6, time series of channel information may be obtained to determined distance at operation 602, such that distance information 604 of the current movement of the object may be obtained. In parallel, some mechanism may be used to obtain an estimated direction 606 of the current movement of the object. As such, the spatial-temporal information may be determined, similar to the operation 304 as shown in FIG. 3, based on the distance information 604 and the estimated direction 606, to obtain the spatial-temporal information 402 as illustrated in FIG. 4.

In general, a task may be performed based on the spatial-temporal information, as shown in operation 306 of FIG. 3. In one embodiment, the task may comprise a presentation of the spatial-temporal information. It may be presented in an audio-visual way, a graphical way, a textual way, symbolic way or mechanical way. For example, the spatial-temporal information may be a detection of motion of the object in different rooms of a house. A graphical user interface (GUI) may be constructed to show that the where-about of the object in a house. For example, the object may be a person. The location or approximate location of the object may be shown or marked. And the GUI may partition a house into living-room area, family-room area, dining-room area, bedroom1-area, bedroom2-area, etc. Each area may be assigned a color and/or shaded with the color. Each area may be animated (e.g. size of the area, shape of the area, color of the area, intensity of the color of the area, text display, symbol display, etc.). Or, the GUI may have separate representation of each area with or without a map. The representation may be animated. The animation may be in real time, or at a later time. Predicted object (user) behavior/activity may be animated also. The presentation may also be in the form of vibration, mechanical feedback, physical feedback, haptic feedback, light, shade, shape, etc. to reflect the spatial-temporal information. The spatial-temporal information may include more than one analytics, e.g. number of people, existence of motion, motion intensity, motion duration, motion frequency, "abnormal" or "unexpected" motion, vital sign, alive/death, motionless, asleep, suspicious event, and/or fall-down, etc. For example, if motion is large, the color may be darker (more black/grey element) or more saturated or brighter. If motion is small, the color may be lighter or less saturated or dimmer. When the person enters a house, the GUI may show that he is at the front foyer area, living room, bedroom1, etc. The GUI may be software for a computer/a tablet, an app on a smart phone (e.g. iPhone, Android phone, etc.), an app in a smart device (e.g. smart glass, smart watch, etc.).

In an example of antenna matching based speed estimation, the speed estimation may be obtained by comparing a time reversal resonating strength (TRRS) between two adjacent CSI against a model function. Let $H_i(t)$ denote the CSI (or channel information CI) measured at the i-th receive antenna at time t and let $\Delta t$ stand for the duration between two adjacent CSI measurement. For each time $t_1$, one may form the reference CSI, which is measured by the leading antennas, as $H_{lead}(t_1)=[H_2(t_1), H_3(t_1), H_2(t_1+\Delta t), H_3(t_1+\Delta t), \ldots, H_2(t_1+(N-1)\Delta t), H_3(t_1+(N-1)\Delta t)]$, where N may be 1, 2, 3 ..., and form the CSI for comparison, which is measured by the following antennas (or trailing antennas), as $H_{follow}(t)=[H_1(t), H_2(t), H_1(t+\Delta t), H_2(t+t), \ldots, H_1(t+(N-1)\Delta t), H_2(t+(N-1)\Delta t)]$. The TRRS $\gamma(t_1, t)$ value and/or some similarity measure and/or some distance measure between $H_{lead}(t_1)$ and $H_{follow}(t)$ may be computed.

Figure 7:
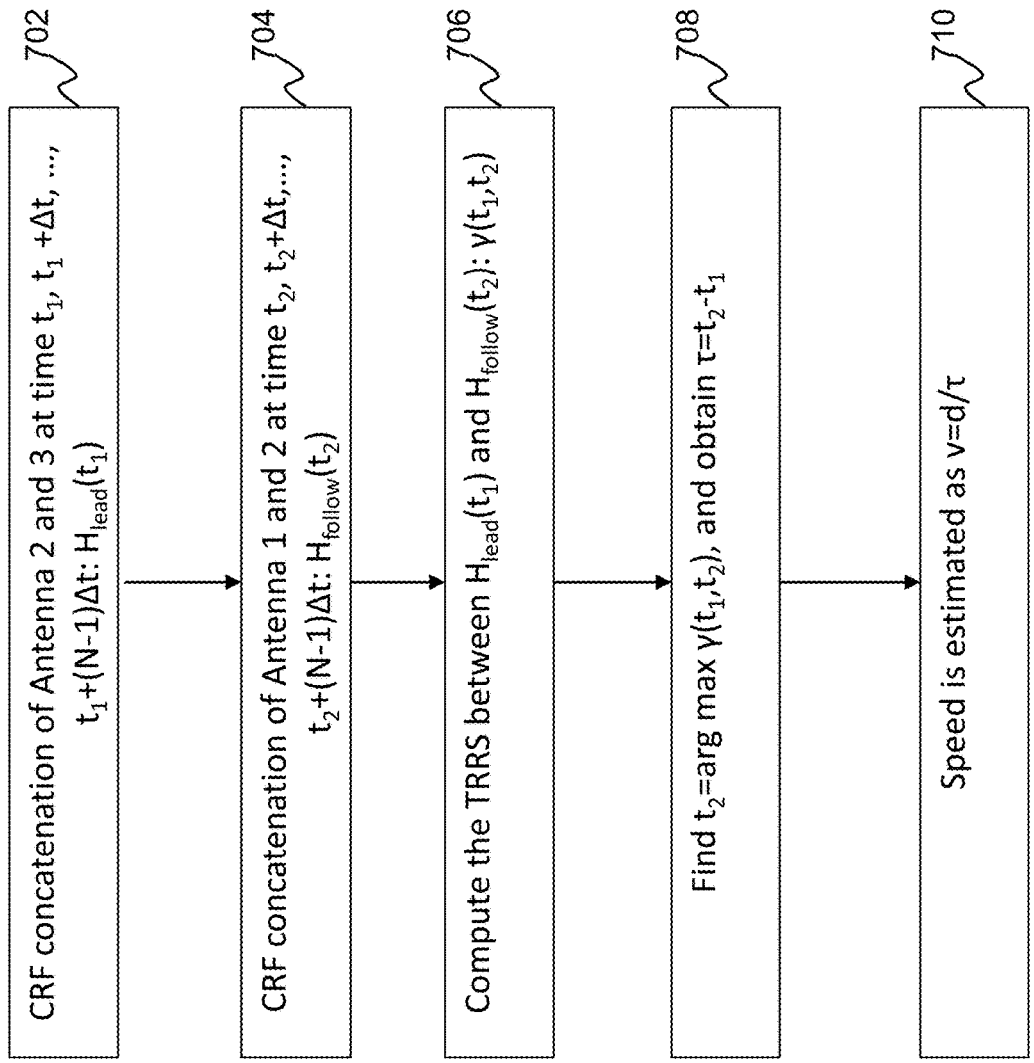
FIG. 7 is a flowchart illustrating a method for antenna matching based speed estimation, according to one embodiment of the present teaching.

An exemplary flow chart of antenna matching based speed estimation is shown in FIG. 7. In operation 702, the detailed formulation of the CFR concatenation for the leading antennas is $H_{lead}(t_1)=[H_2(t_1), H_3(t_1), H_2(t_1+\Delta t), H_3(t_1+\Delta t), \ldots, H_2(t_1+(N-1)\Delta t), H_3(t_1+(N-1)\Delta t)]$. In operation 704, the detailed formulation of the CFR concatenation for the following antennas is $H_{follow}(t_2)=[H_1(t_2), H_2(t_2), H_1(t_2+\Delta t), H_2(t_2+\Delta t), \ldots, H_1(t_2+(N-1)\Delta t), H_2(t_2+(N-1)\Delta t)]$. In operation 706, for each time slot $t_1$, the TRRS $\gamma(t_1, t_2)$ between the two CFR fingerprint $H_{lead}(t_1)$ and $H_{follow}(t_2)$ is computed for different $t_2$'s nearby $t_1$. In operation 708, it may determine the $t_2$ that gives the maximum value of $\gamma(t_1, t_2)$ and then the delay i between the group of leading antennas and the group of following antennas is thus $z=t_2-t_1$. In operation 710, the speed estimation is thus $v=d/\tau$, where d the distance between any two adjacent uniformly separated antennas.

The present teaching also discloses systems, devices, and methods for detecting object motion in a venue based on channel information of a wireless multipath channel that is impacted by the object motion. In one embodiment, the motion of the object is detected based on motion information computed based on a time series of channel information of the wireless multipath channel. The motion information may include a heterogeneous similarity score between a current time window and a past time window of the time series of channel information.

In one embodiment, the disclosed system comprises a first wireless device configured for transmitting a wireless signal through a wireless multipath channel impacted by a motion of an object in the venue; and a second wireless device that has a different type from that of the first wireless device. The second wireless device is configured for: receiving the wireless signal through the wireless multipath channel impacted by the motion of the object in the venue, and obtaining a time series of channel information (CI) of the wireless multipath channel based on the wireless signal. The disclosed system further comprises a motion detector configured for detecting the motion of the object in the venue based on motion information related to the motion of the object. The motion information associated with the first and second wireless devices is computed based on the time series of CI by at least one of: the motion detector and the second wireless device.

The motion detector may be coupled to at least one of: the first wireless device; the second wireless device; a third wireless device having a same type as that of the first wireless device; a fourth wireless device having a same type as that of the second wireless device; a cloud server; a fog server; a local server; and an edge server. In one embodiment, the first wireless device is a Type 1 device having a Type 1; the second wireless device is a Type 2 device having a Type 2; the system further comprises at least one of: at least one additional Type 1 device, and at least one additional Type 2 device; the Type 1 devices and the Type 2 devices form a plurality of pairs of Type 1 and Type 2 devices. For each pair of Type 1 and Type 2 devices comprising a Type 1 device and a Type 2 device: the respective Type 1 device may be configured for transmitting a respective wireless signal through the wireless multipath channel impacted by the motion of the object in the venue, the respective Type 2 device may be configured for receiving the respective wireless signal through the wireless multipath channel and obtaining a respective time series of CI of the wireless multipath channel based on the respective wireless signal, and at least one of the motion detector and the respective Type 2 device may be configured for asynchronously computing respective heterogeneous motion information related to the motion of the object based on the respective time series of CI; and at least one of the motion detector and the Type 2 devices is configured for performing at least one of: monitoring the motion of the object in the venue individually and asynchronously based on the asynchronously computed heterogeneous motion information associated with a pair of Type 1 and Type 2 devices, monitoring the motion of the object in the venue jointly and asynchronously based on the asynchronously computed heterogeneous motion information associated with any pair of Type 1 and Type 2 devices comprising a particular Type 2 device, monitoring the motion of the object in the venue jointly and asynchronously based on the asynchronously computed heterogeneous motion information associated with any pair of Type 1 and Type 2 devices comprising a particular Type 1 device, and monitoring the motion of the object in the venue globally and asynchronously based on the asynchronously computed heterogeneous motion information associated with any pair of Type 1 and Type 2 devices.

According to various embodiments of the present teaching, an Origin may be a transceiver and a Bot may be another transceiver in the disclosed system for object motion detection and monitoring. Each of the Bot and the Origin may be a Type 1 or Type 2 heterogeneous wireless device.

In one embodiment, each CI of the respective CI time series may have at least one respective component. For each Type 2 device, and for each of the at least one respective particular pair of Type 1 and Type 2 devices comprising the Type 2 device, and for each of the at least one respective component, the following may be done: (a) a respective current component window of the component of the respective CI time series may be determined asynchronously based on the respective current window; (b) a respective past component window of the component of the respective CI time series may be determined asynchronously based on the respective past window; (c) the respective current component window may be compared component-wise with the respective past component window asynchronously; and (d) the motion of the object may be monitored component-wise based on the component-wise comparing of the respective current component window and the respective past component window asynchronously. The motion of the object may be detected based on the asynchronous component-wise comparing.

In one embodiment, the disclosed system has hardware components (e.g. wireless transmitter/receiver with antenna, analog circuitry, RF/IF/baseband elements, low-noise amplifier, power supply, processor, memory, etc.) working in pairs (a Type 1 device and a Type 2 device) and corresponding software components. The disclosed system is capable of detecting object motions in a venue, with a very high detection rate and a very low false alarm rate. In particular, the disclosed system is much better than an existing passive infra-red (PIR) sensor which is a widely used motion sensor in security systems.

First, the disclosed system has a much larger motion detection range. In one embodiment, the disclosed wireless motion detection system uses wireless signals (such as Wi-Fi or LTE) to probe the environment (venue) and have a large inherent range of about 10,000 square feet due to Wi-Fi. PIR has a much smaller range of about 100-200 square feet by using an infra-red signal.

Second, the disclosed system can detect motion around corners. While a PIR sensor relies on line-of-sight (LOS) operation, it cannot detect motion behind a wall or around a corner or behind an obstacle (e.g. TV, sofa, window, partitions, etc.). In contrast, the disclosed system works in both line-of-sight (LOS) and non-line-of-sight (NLOS) conditions. The disclosed system is fully capable of detecting motion behind multiple walls, around multiple corners and behind obstacles. In security applications, being able to detect motion around corners and behind walls is extremely important because intruders may exactly be hiding there in the dark waiting to do bad things.

Third, the disclosed system has a much better false alarm rate. A false alarm means that a system detects a motion when there is actually no motion. Such false alarms are very annoying to the operators and police. The disclosed system has a very low false alarm rate of even less than 0.1% while the false alarm rate of a PIR based detector is in the range of 10% or more. While a PIR based detector is sensitive to temperature change due to e.g. a strong sunshine, the disclosed system is not sensitive to sunshine or temperature change.

Fourth, the disclosed system does not need special installation like a PIR based detector. PIR based detectors need special installation. Once installed, they cannot be moved around. As the PIR based detector has very limited range, many PIR devices are labor intensive, time consuming and expensive. In addition, replacement of faulty PIR devices requires additional effort. The disclosed system can use existing Wi-Fi or LTE to perform motion detection. In other words, no special installation is needed. The disclosed system may just use some existing Wi-Fi-compliant device such as Wi-Fi router, smart phone, smart speaker (e.g. Amazon Echo, Google Home, etc.), smart devices (e.g. smart thermometer, smart camera, smart TV, smart set-top box, smart refrigerator, etc.). Type 1 devices and Type 2 devices may be plug-and-play devices without a requirement of special installation. Due to the plug-and-play nature, the disclosed wireless motion detection system still works when the devices are moved around by consumers (e.g. from living room to family room, or from one plug to another plug).

Moreover, the disclosed system can exploit existing standard-compliant mass-market infrastructure such as Wi-Fi and LTE. Thus many components of the disclosed system are typically mass-produced and thus have a low cost, suitable for the consumer market as well as niche markets.

In various embodiments, machine learning, training, discriminative training, deep learning, neural network, continuous time processing, distributed computing, distributed storage, GPU/DSP/coprocessor/multicore/multiprocessing acceleration may be applied to any/every operation disclosed in the present teaching.

In one embodiment, a task related to object motion may be performed based on some spatial-temporal information (e.g. location, speed, velocity, acceleration, a periodic motion, a time trend, a transient motion, a period, a characteristic, etc.) of an object based on at least one time series of channel information (CI), a time parameter associated with a current movement, and/or a past spatial-temporal information of the object. The one or more time series of channel information may be preprocessed. In one embodiment, the task may comprise a presentation of the spatial-temporal information. It may be presented in an audio-visual way, a graphical way, a textual way, symbolic way or mechanical way. For example, the spatial-temporal information may indicate a detection of motion of an object in different rooms of a house. A graphical user interface (GUI) may be constructed to show that the where-about of the object in a house. For example, the object may be a person. The location or approximate location of the object may be shown or marked.

The GUI may partition a house into living-room area, family-room area, dining-room area, bedroom1-area, bedroom2-area, etc. Each area may be assigned a color and/or shaded with the color. Each area may be animated (e.g. size of the area, shape of the area, color of the area, intensity of the color of the area, text display, symbol display, etc.). Or, the GUI may have separate representation of each area with or without a map. The representation may be animated. The animation may be in real time, or at a later time. Predicted object (user) behavior/activity may be animated as well. The presentation may also be in the form of vibration, mechanical feedback, physical feedback, haptic feedback, light, shade, shape, etc. to reflect the spatial-temporal information. The spatial-temporal information may include more than one analytics, e.g. number of people, existence of motion, motion intensity, motion duration, motion frequency, "abnormal" or "unexpected" motion, vital sign, alive/death, motionless, asleep, suspicious event, and/or fall-down, etc. For example, if motion is large, the color may be darker (more black/grey element) or more saturated or brighter. If motion is small, the color may be lighter or less saturated or dimmer. When the person enters a house, the GUI may show that he is at the front foyer area, living room, bedroom1, etc. The GUI may be implemented by software for a computer/a tablet, an app on a smart phone (e.g. iPhone, Android phone, etc.), an app in a smart device (e.g. smart glass, smart watch, etc.).

Figure 8:
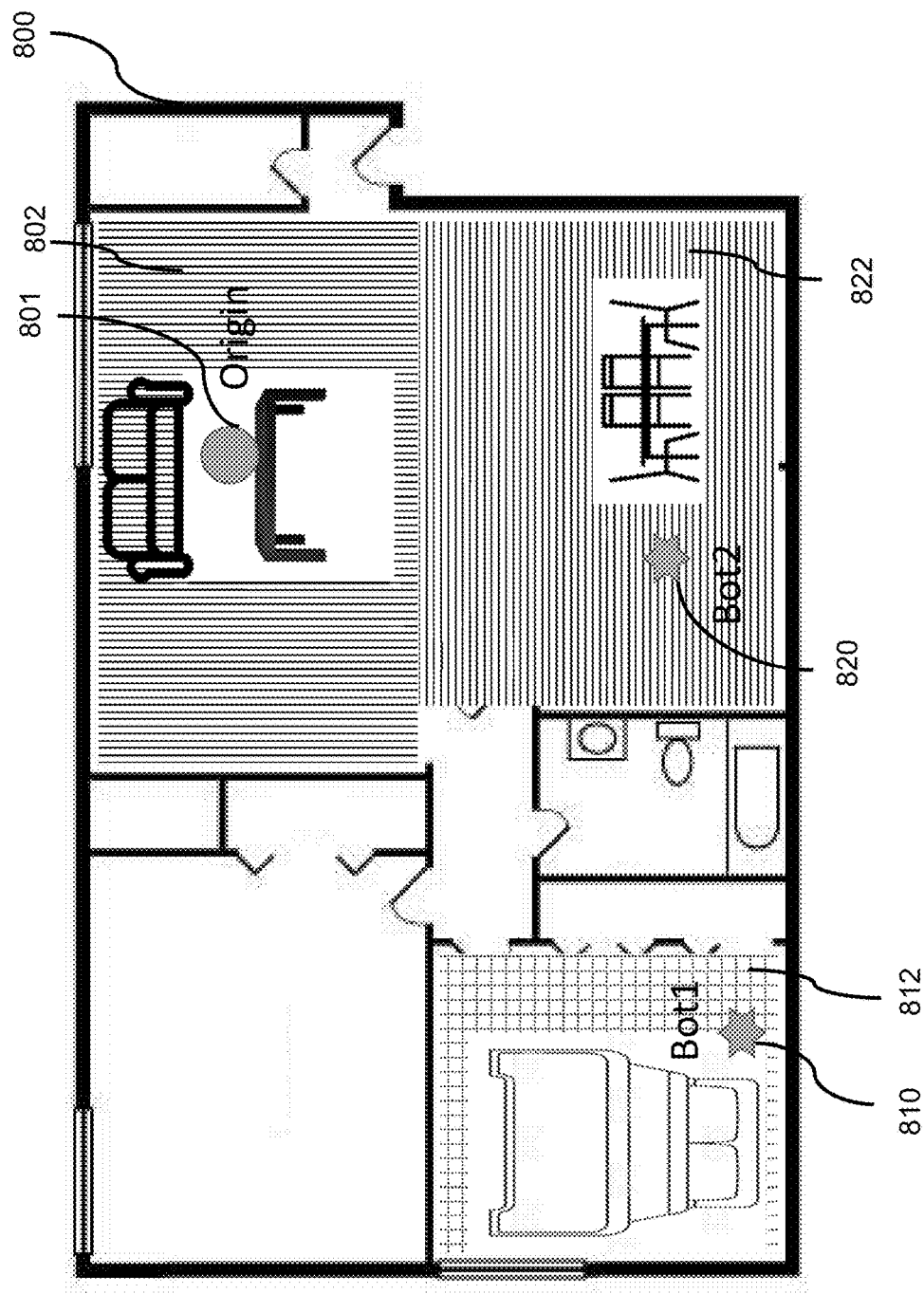
FIG. 8 illustrates an exemplary scenario where object motion is detected based on spatial-temporal information in a venue, according to one embodiment of the present teaching.

FIG. 8 illustrates an exemplary scenario where object motion is detected based on spatial-temporal information in a venue, according to one embodiment of the present teaching. FIG. 8 also illustrates an exemplary presentation of the spatial-temporal information in the venue. For example, as shown in FIG. 8, in a 2-bedroom apartment 800, Origin 801 may be placed in the living-room area 802, Bot 1 810 may be placed in a bedroom1-area 812, and Bot 2 820 may be placed in the dining-room area 822. Each of Bot 1 810 and Bot 2 820 can transmit a wireless signal to the Origin 801, which can obtain channel information of a wireless multipath channel based on the wireless signal. The Origin 801, by itself or through a third device like a motion detector, can compute motion information based on the channel information and detect object motion/activity based on the motion information. That is, the Origin 801, by itself or through a third device like a motion detector, can detect object motion/activity based on wireless signals transmitted by Bot 1 810 and/or Bot 2 820.

If object motion/activity is detected based on wireless signals transmitted by both Bot 1 810 and Bot 2 820, the activity/motion or the object (e.g. person/user) may be in the living-room area 802. If object motion/activity is detected based only on wireless signals transmitted by Bot 1 810, the activity/motion or the object (e.g. person/user) may be in the bedroom-1 area 812. If object motion/activity is detected based only on wireless signals transmitted by Bot 2 820, the activity/motion or the object (e.g. person/user) may be in the dining-room area 822. If object motion/activity cannot be detected based on wireless signals transmitted by either Bot 1 810 or Bot 2 820, then it may be determined that nobody and no object is in the apartment 800. The corresponding area where the activity/motion/person/user is detected may be marked with a predetermined pattern or color.

Figure 9:
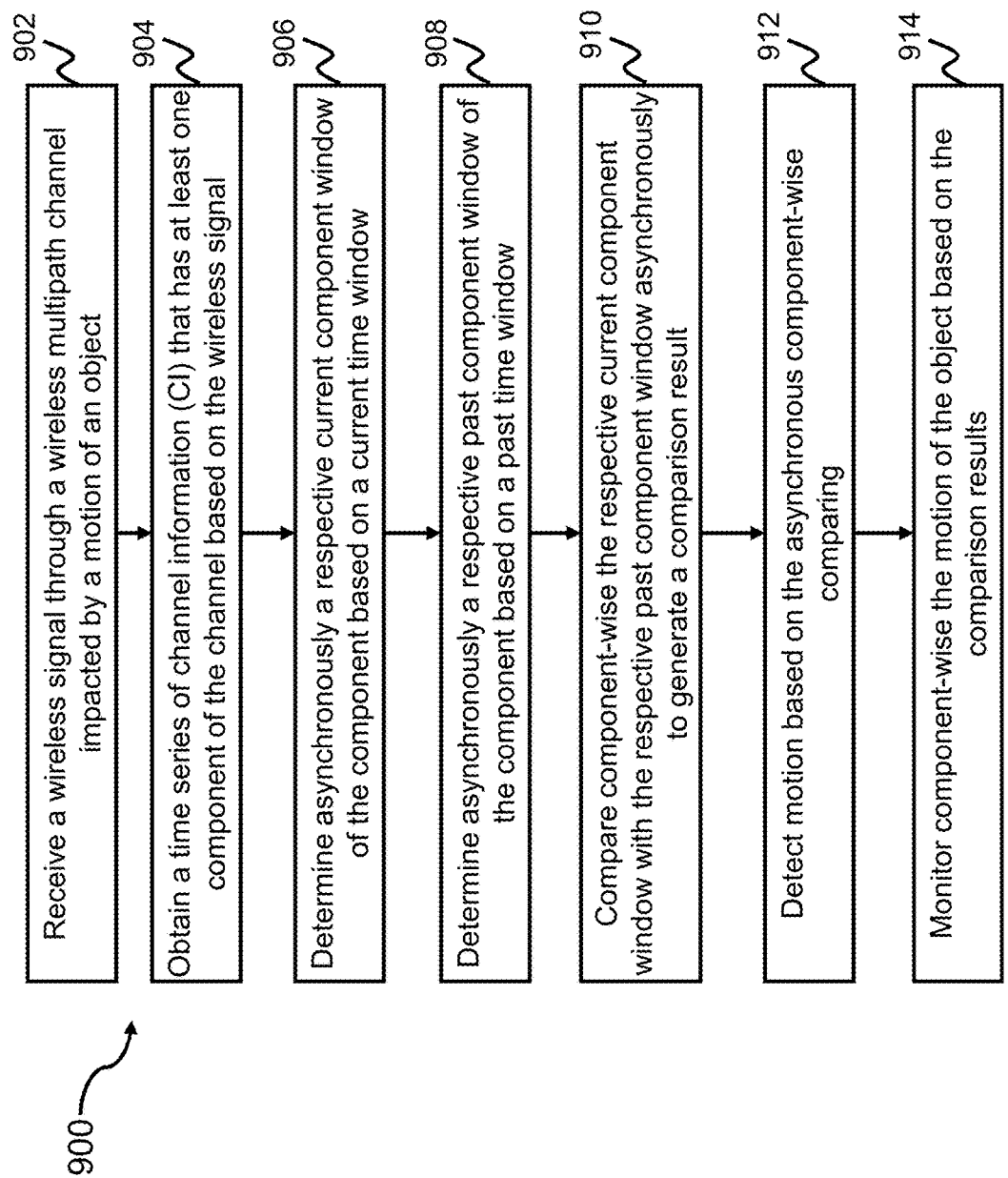
FIG. 9 illustrates a flowchart of an exemplary method for motion detection, according to one embodiment of the present teaching.

FIG. 9 illustrates a flowchart of an exemplary method for motion detection performed by a motion detector based on wireless channel information, according to one embodiment of the present teaching. At operation 902, a wireless signal is received through a wireless multipath channel impacted by a motion of an object. At operation 904, a time series of channel information (CI) that has at least one component of the channel is obtained based on the wireless signal. A respective current component window of the component is determined asynchronously, at operation 906, based on a current time window. A respective past component window of the component is determined asynchronously, at operation 908, based on a past time window. At operation 910, the respective current component window is compared component-wise with the respective past component window asynchronously to generate a comparison result. At operation 912, object motion is detected based on the asynchronous component-wise comparison result. Optionally at operation 914, the motion of the object is monitored based on the continuously generated comparison results.

Figure 10:
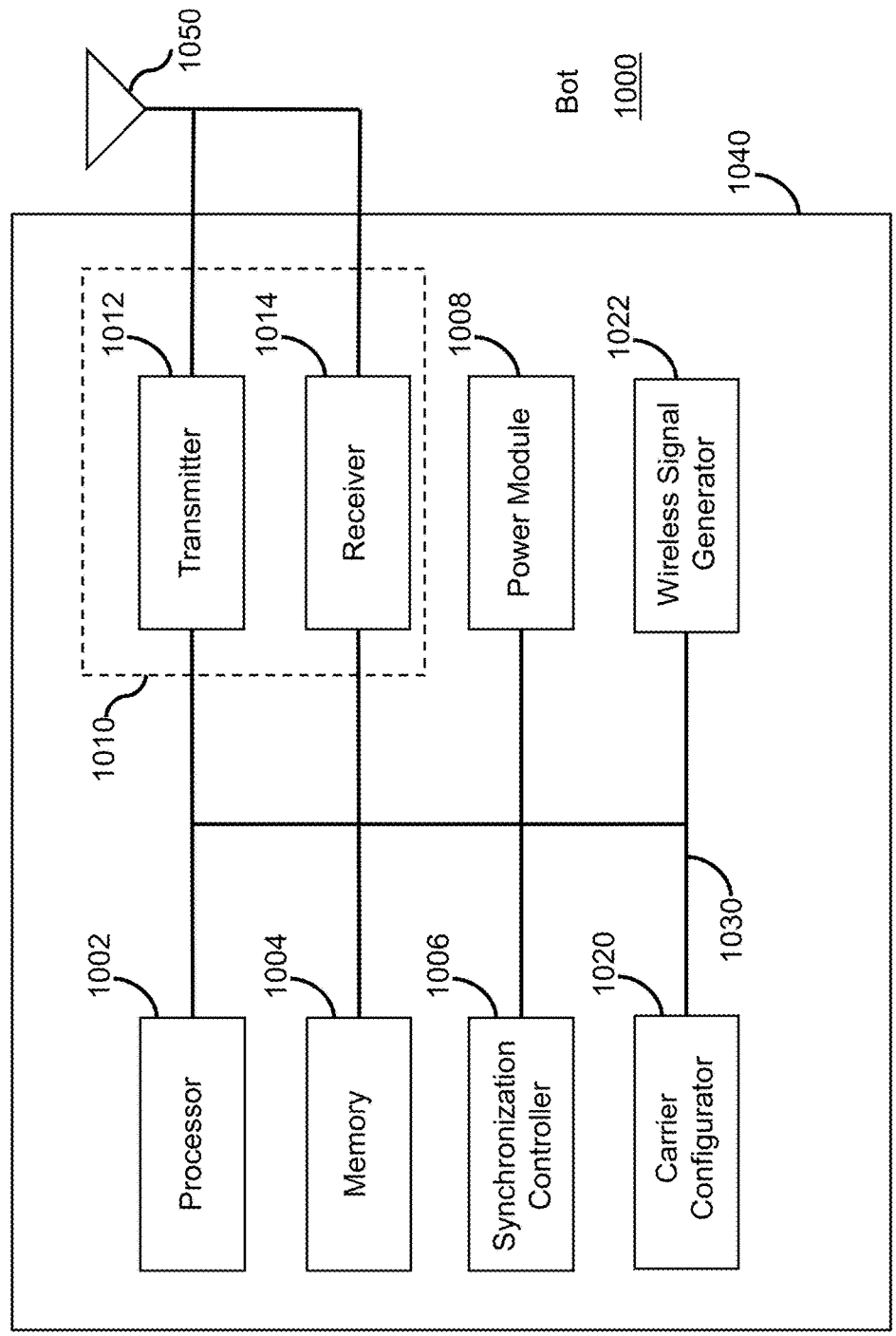
FIG. 10 illustrates an exemplary block diagram of a first wireless device, according to one embodiment of the present teaching.

FIG. 10 illustrates an exemplary block diagram of a first wireless device, e.g. a Bot 1000, according to one embodiment of the present teaching. The Bot 1000 is an example of a device that can be configured to implement the various methods described herein. As shown in FIG. 10, the Bot 1000 includes a housing 1040 containing a processor 1002, a memory 1004, a transceiver 1010 comprising a transmitter 1012 and receiver 1014, a synchronization controller 1006, a power module 1008, a carrier configurator 1020 and a wireless signal generator 1022.

In this embodiment, the processor 1002 controls the general operation of the Bot 1000 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 1004, which can include both read-only memory (ROM) and random access memory (RAM), can provide instructions and data to the processor 1002. A portion of the memory 1004 can also include non-volatile random access memory (NVRAM). The processor 1002 typically performs logical and arithmetic operations based on program instructions stored within the memory 1004. The instructions (a.k.a., software) stored in the memory 1004 can be executed by the processor 1002 to perform the methods described herein. The processor 1002 and the memory 1004 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 1010, which includes the transmitter 1012 and receiver 1014, allows the Bot 1000 to transmit and receive data to and from a remote device (e.g., an Origin or another Bot). An antenna 1050 is typically attached to the housing 1040 and electrically coupled to the transceiver 1010. In various embodiments, the Bot 1000 includes (not shown) multiple transmitters, multiple receivers, and multiple transceivers. In one embodiment, the antenna 1050 is replaced with a multi-antenna array 1050 that can form a plurality of beams each of which points in a distinct direction. The transmitter 1012 can be configured to wirelessly transmit signals having different types or functions, such signals being generated by the processor 1002. Similarly, the receiver 1014 is configured to receive wireless signals having different types or functions, and the processor 1002 is configured to process signals of a plurality of different types.

The Bot 1000 in this example may serve as Bot 1 810 or Bot 2 820 in FIG. 8 for detecting object motion in a venue. For example, the wireless signal generator 1022 may generate and transmit, via the transmitter 1012, a wireless signal through a wireless multipath channel impacted by a motion of an object in the venue. The wireless signal carries information of the channel. Because the channel was impacted by the motion, the channel information includes motion information that can represent the motion of the object. As such, the motion can be indicated and detected based on the wireless signal. The generation of the wireless signal at the wireless signal generator 1022 may be based on a request for motion detection from another device, e.g. an Origin, or based on a system pre-configuration. That is, the Bot 1000 may or may not know that the wireless signal transmitted will be used to detect motion.

In one embodiment, the Bot 1000 may be a particular asynchronous heterogeneous Type 1 device of a radio monitoring system. The radio monitoring system may comprise at least one asynchronous heterogeneous Type 1 device and at least one asynchronous heterogeneous Type 2 device. The radio monitoring system may comprise at least one combination of Type 1 and Type 2 devices, each combination comprising one of the at least one Type 1 device, and one of the at least one Type 2 device. The particular asynchronous heterogeneous Type 1 device is in at least one particular combination of Type 1 and Type 2 devices of the radio monitoring system. The particular Type 1 device is paired with at least one particular Type 2 device through the at least one particular combination of Type 1 and Type 2 devices. The particular asynchronous heterogeneous Type 1 device comprises a wireless circuitry; a first processor communicatively coupled with the wireless circuitry; a first memory communicative coupled with the first processor; and a first set of instructions stored in the first memory which, when executed, cause the first processor to transmit asynchronously using the wireless circuitry an asynchronous heterogeneous wireless signal from the particular Type 1 device to the at least one particular Type 2 device through a wireless multipath channel impacted by a dynamics of a substance in a site. For each of the at least one particular Type 2 device: at least one series of channel information (time series of CI) of the wireless multipath channel gleaned from the asynchronous heterogeneous wireless signal transmitted by the wireless circuitry is fetched by the Type 2 device using a second processor, a second memory and a second set of instructions of the Type 2 device. In one example, the dynamics of the substance in the site is tracked individually and asynchronously, using a third processor, a third memory and a third set of instructions of a Type 3 device, based on time series of CI associated with a combination of Type 1 and Type 2 devices comprising the particular Type 1 device. In another example, the dynamics of the substance is tracked jointly and asynchronously based on time series of CI associated with any combinations of Type 1 and Type 2 devices comprising the particular Type 1 device. In another example, the dynamics of the substance is tracked jointly and asynchronously based on time series of CI associated with any combinations of Type 1 and Type 2 devices comprising one of the at least one particular Type 2 device. In another example, the dynamics of the substance is tracked globally and asynchronously based on time series of CI associated with any combinations of Type 1 and Type 2 devices.

In another embodiment, for each Type 1 device, and for each of the at least one combination of Type 1 and Type 2 devices comprising the Type 1 device, a respective heterogeneous similarity score associated with the respective combination of Type 1 and Type 2 devices is computed asynchronously based on comparing a respective current window and a respective past window of at least one respective time series of CI associated with the respective combination of Type 1 and Type 2 devices. In one example, the dynamics of the substance in the site is tracked individually and asynchronously based on asynchronously computed heterogeneous similarity score associated with the combination of Type 1 and Type 2 devices comprising the particular Type 1 device. In another example, the dynamics of the substance in the site is detected individually and asynchronously when a heterogeneous similarity score associated with the combination of Type 1 and Type 2 devices comprising the particular Type 1 device is greater than and/or equal to an individual threshold. In another example, the dynamics of the substance in the site is tracked jointly and asynchronously based on asynchronously computed heterogeneous similarity score associated with any combination of Type 1 and Type 2 devices comprising the particular Type 1 device. In another example, the dynamics of the substance in the site is detected jointly and asynchronously when a first joint score computed based on heterogeneous similarity score associated with any combination of Type 1 and Type 2 devices comprising the particular Type 1 device is at least one of: greater than, and equal to, a first joint threshold. In another example, the dynamics of the substance in the site is tracked jointly and asynchronously based on asynchronously computed heterogeneous similarity score associated with any combination of Type 1 and Type 2 devices associated with one of the at least one particular Type 2 device. In another example, the dynamics of the substance in the site is detected jointly and asynchronously when a second joint score computed based on heterogeneous similarity score associated with any combination of Type 1 and Type 2 devices associated with one of the at least one particular Type 2 device is at least one of: greater than, and equal to, a second joint threshold. In another example, the dynamics of the substance in the site is tracked globally and asynchronously based on asynchronously computed heterogeneous similarity score associated with any combination of Type 1 and Type 2 devices. In another example, the dynamics of the substance in the site is detected globally and asynchronously when a third joint score computed based on heterogeneous similarity score associated with any combination of Type 1 and Type 2 devices is greater than and/or equal to a third joint threshold.

The synchronization controller 1006 in this example may be configured to control the operations of the Bot 1000 to be synchronized or un-synchronized with another device, e.g. an Origin or another Bot. In one embodiment, the synchronization controller 1006 may control the Bot 1000 to be synchronized with an Origin that receives the wireless signal transmitted by the Bot 1000. In another embodiment, the synchronization controller 1006 may control the Bot 1000 to transmit the wireless signal asynchronously with other Bots. In another embodiment, each of the Bot 1000 and other Bots may transmit the wireless signals individually and asynchronously.

The carrier configurator 1020 in this example may configure transmission resources, e.g. time and carrier, for transmitting the wireless signal generated by the wireless signal generator 1022. In one embodiment, each CI of the time series of CI has one or more components each corresponding to a carrier or sub-carrier of the transmission of the wireless signal. The detection of the motion may be based on motion detections on any one or any combination of the components.

The power module 1008 can include a power source such as one or more batteries, and a power regulator, to provide regulated power to each of the above-described modules in FIG. 10. In some embodiments, if the Bot 1000 is coupled to a dedicated external power source (e.g., a wall electrical outlet), the power module 1008 can include a transformer and a power regulator.

The various modules discussed above are coupled together by a bus system 1030. The bus system 1030 can include a data bus and, for example, a power bus, a control signal bus, and/or a status signal bus in addition to the data bus. It is understood that the modules of the Bot 1000 can be operatively coupled to one another using any suitable techniques and mediums.

Although a number of separate modules or components are illustrated in FIG. 10, persons of ordinary skill in the art will understand that one or more of the modules can be combined or commonly implemented. For example, the processor 1002 can implement not only the functionality described above with respect to the processor 1002, but also implement the functionality described above with respect to the wireless signal generator 1022. Conversely, each of the modules illustrated in FIG. 10 can be implemented using a plurality of separate components or elements.

Figure 11:
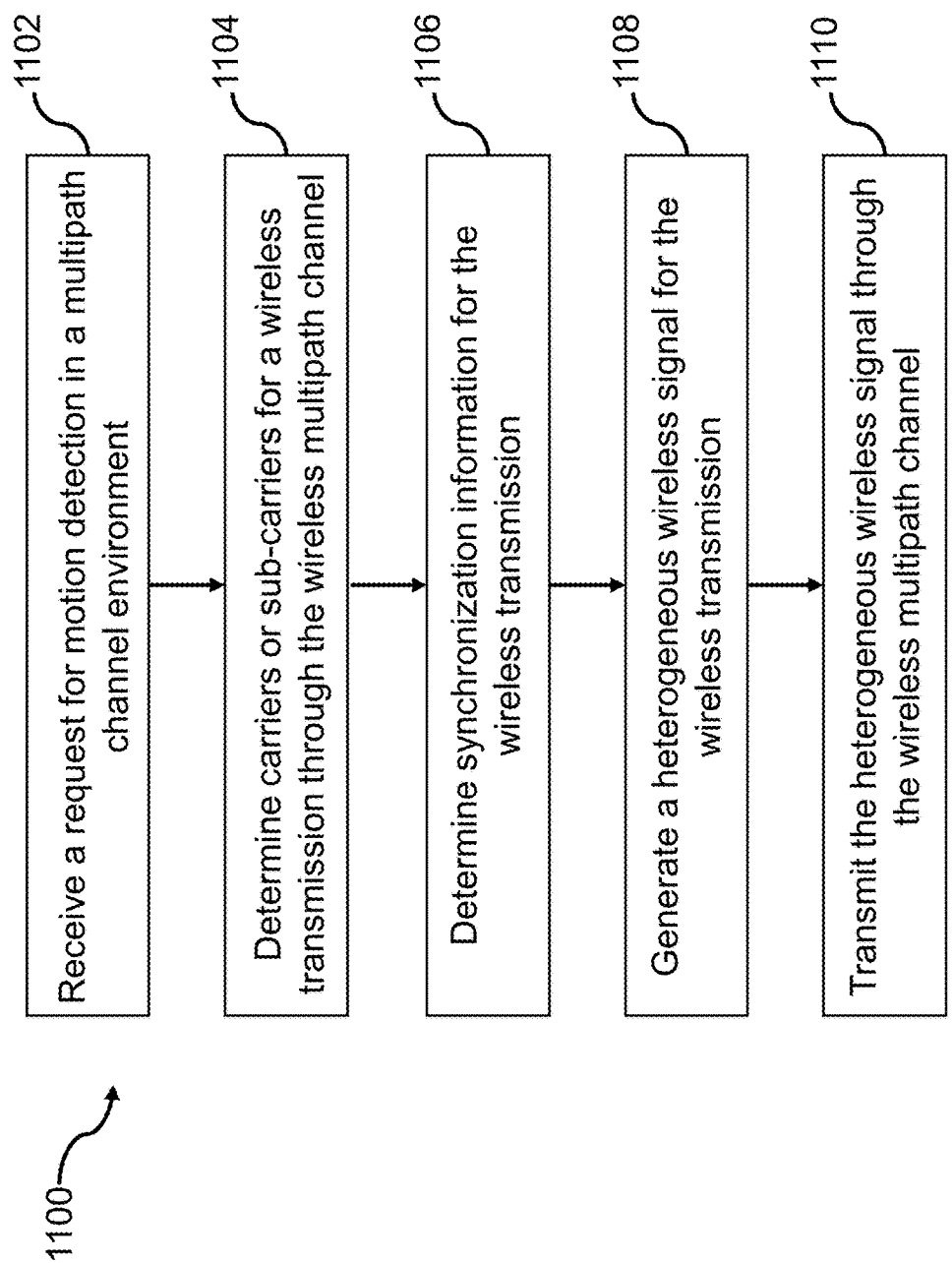
FIG. 11 illustrates a flowchart of an exemplary method performed by a first wireless device, according to one embodiment of the present teaching.

FIG. 11 illustrates a flowchart of an exemplary method 1100 performed by a first wireless device, e.g. the Bot 1000 in FIG. 10, in accordance with some embodiments of the present disclosure. Optionally at operation 1102, the Bot receives a request for motion detection in a multipath channel environment. At operation 1104, the Bot determines carriers or sub-carriers for a wireless transmission through the wireless multipath channel. At operation 1106, the Bot may determine synchronization information for the wireless transmission. At operation 1108, the Bot may generate a heterogeneous wireless signal for the wireless transmission. At operation 1110, the Bot transmits the heterogeneous wireless signal through the wireless multipath channel.

Figure 12:
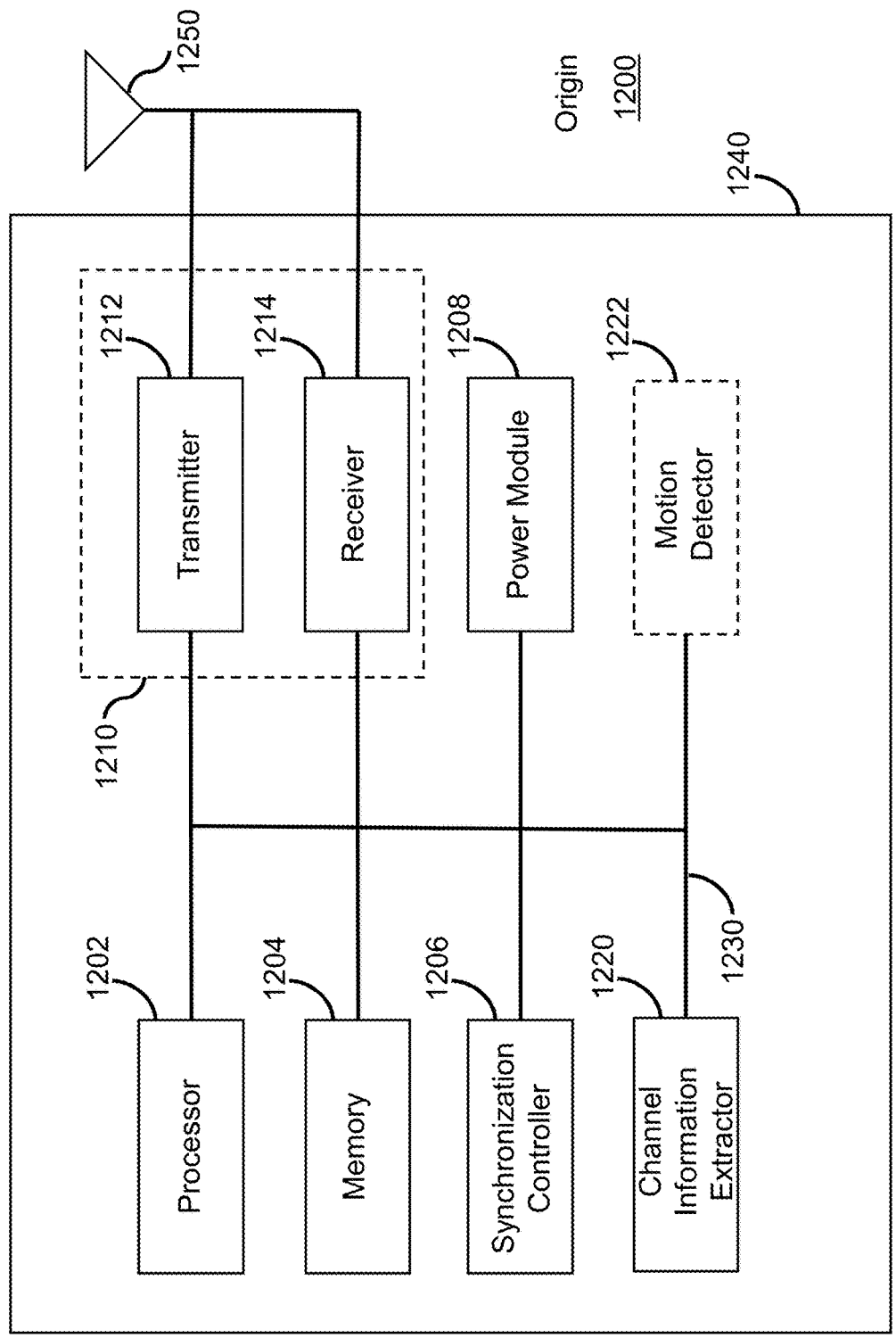
FIG. 12 illustrates an exemplary block diagram of a second wireless device, according to one embodiment of the present teaching.

FIG. 12 illustrates an exemplary block diagram of a second wireless device, e.g. an Origin 1200, according to one embodiment of the present teaching. The Origin 1200 is an example of a device that can be configured to implement the various methods described herein. As shown in FIG. 12, the Origin 1200 includes a housing 1240 containing a processor 1202, a memory 1204, a transceiver 1210 comprising a transmitter 1212 and a receiver 1214, a power module 1208, a synchronization controller 1206, a channel information extractor 1220, and an optional motion detector 1222.

In this embodiment, the processor 1202, the memory 1204, the transceiver 1210 and the power module 1208 work similarly to the processor 1002, the memory 1004, the transceiver 1010 and the power module 1008 in the Bot 1000. An antenna 1250 or a multi-antenna array 1250 is typically attached to the housing 1240 and electrically coupled to the transceiver 1210.

The Origin 1200 may be a second wireless device that has a different type from that of the first wireless device (the Bot 1000). In particular, the channel information extractor 1220 in the Origin 1200 is configured for receiving the wireless signal through the wireless multipath channel impacted by the motion of the object in the venue, and obtaining a time series of channel information (CI) of the wireless multipath channel based on the wireless signal. The channel information extractor 1220 may send the extracted CI to the optional motion detector 1222 or to a motion detector outside the Origin 1200 for detecting object motion in the venue.

The motion detector 1222 is an optional component in the Origin 1200. In one embodiment, it is within the Origin 1200 as shown in FIG. 12. In another embodiment, it is outside the Origin 1200 and in another device, which may be a Bot, another Origin, a cloud server, a fog server, a local server, and an edge server. The optional motion detector 1222 may be configured for detecting the motion of the object in the venue based on motion information related to the motion of the object. The motion information associated with the first and second wireless devices is computed based on the time series of CI by the motion detector 1222 or another motion detector outside the Origin 1200.

In one embodiment, the Origin 1200 is a particular asynchronous heterogeneous Type 2 device of a radio monitoring system. The radio monitoring system may comprise at least one asynchronous heterogeneous Type 1 device and at least one asynchronous heterogeneous Type 2 device. The radio monitoring system may comprise at least one pairing of Type 1 and Type 2 devices, each pairing comprising one of the at least one Type 1 device, and one of the at least one Type 2 device. The particular asynchronous heterogeneous Type 2 device is in at least one particular pairing of Type 1 and Type 2 devices of the radio monitoring system. The particular Type 2 device is grouped with at least one particular Type 1 device through the at least one particular pairing of Type 1 and Type 2 devices. In one example, the particular asynchronous heterogeneous Type 2 device comprises: a wireless circuitry to receive asynchronously at least one asynchronous heterogeneous radio signal, a second heterogeneous processor communicatively coupled with the wireless circuitry, a second heterogeneous memory communicative coupled with the second heterogeneous processor, and a second heterogeneous set of instructions stored in the second heterogeneous memory. Each asynchronous heterogeneous radio signal is transmitted asynchronously by one of the at least one particular Type 1 device using a respective first heterogeneous processor, a respective first heterogeneous memory and a respective first heterogeneous set of instructions of the Type 1 device to at least one asynchronous heterogeneous Type 2 device through a wireless multipath channel influenced by a movement of a mass in a site. The second heterogeneous set of instructions, when executed, cause the second heterogeneous processor to secure asynchronously at least one respective series of channel information (time series of CI) of the wireless multipath channel, for each of the at least one particular pairing of Type 1 and Type 2 devices.

In one embodiment, the at least one respective time series of CI associated with the particular pairing of Type 1 and Type 2 devices is being derived asynchronously from the respective asynchronous heterogeneous radio signal received asynchronously by the wireless circuitry. In one example, the movement of the mass in the site is monitored individually and asynchronously, using a third processor, a third memory and a third set of instructions of a Type 3 device, based on time series of CI associated with a pairing of Type 1 and Type 2 devices comprising the particular Type 2 device. In another example, the movement of the mass is monitored jointly and asynchronously based on time series of CI associated with any pairings of Type 1 and Type 2 devices comprising the particular Type 2 device. In another example, the movement of the mass is monitored jointly and asynchronously based on time series of CI associated with any pairings of Type 1 and Type 2 devices comprising one of the at least one particular Type 1 device. In another example, the movement of the mass is monitored globally and asynchronously based on time series of CI associated with any pairings of Type 1 and Type 2 devices.

In one embodiment, for each Type 2 device, and for each of the at least one pairing of Type 1 and Type 2 devices comprising the Type 2 device, a respective heterogeneous similarity score associated with the respective pairing of Type 1 and Type 2 devices is computed asynchronously based on comparing a respective current window and a respective past window of at least one respective time series of CI associated with the pairing of Type 1 and Type 2 devices. In one example, the movement of the mass in the site is monitored individually and asynchronously based on asynchronously computed heterogeneous similarity score associated with the pairing of Type 1 and Type 2 devices comprising the particular Type 2 device. In another example, the movement of the mass in the site is detected individually and asynchronously when a heterogeneous similarity score associated with the pair of Type 1 and Type 2 devices comprising the particular Type 2 device is at least one of: greater than, and equal to, an individual threshold. In another example, the movement of the mass in the site is monitored jointly and asynchronously based on asynchronously computed heterogeneous similarity score associated with any pairing of Type 1 and Type 2 devices comprising the particular Type 2 device. In another example, the movement of the mass in the site is detected jointly and asynchronously when a first joint score computed based on heterogeneous similarity score associated with any pairing of Type 1 and Type 2 devices comprising the particular Type 2 device is at least one of: greater than, and equal to, a first joint threshold. In another example, the movement of the mass in the site is monitored jointly and asynchronously based on asynchronously computed heterogeneous similarity score associated with any pairing of Type 1 and Type 2 devices associated with one of the at least one particular Type 1 device. In another example, the movement of the mass in the site is detected jointly and asynchronously when a second joint score computed based on heterogeneous similarity score associated with any pairing of Type 1 and Type 2 devices associated with one of the at least one particular Type 1 device. In another example, the movement of the mass in the site is monitored globally and asynchronously based on asynchronously computed heterogeneous similarity score associated with any pairing of Type 1 and Type 2 devices. In another example, the movement of the mass in the site is detected globally and asynchronously when a third joint score computed based on heterogeneous similarity score associated with any pairing of Type 1 and Type 2 devices is at least one of: greater than, and equal to, a third joint threshold.

The synchronization controller 1206 in this example may be configured to control the operations of the Origin 1200 to be synchronized or un-synchronized with another device, e.g. a Bot, another Origin, or an independent motion detector. In one embodiment, the synchronization controller 1206 may control the Origin 1200 to be synchronized with a Bot that transmits a wireless signal. In another embodiment, the synchronization controller 1206 may control the Origin 1200 to receive the wireless signal asynchronously with other Origins. In another embodiment, each of the Origin 1200 and other Origins may receive the wireless signals individually and asynchronously. In one embodiment, the optional motion detector 1222 or a motion detector outside the Origin 1200 is configured for asynchronously computing respective heterogeneous motion information related to the motion of the object based on the respective time series of CI.

In one example, the optional motion detector 1222 or a motion detector outside the Origin 1200 is configured for monitoring and/or detecting the motion of the object in the venue individually and asynchronously based on the asynchronously computed heterogeneous motion information associated with a pair of Type 1 and Type 2 devices. In another example, the optional motion detector 1222 or a motion detector outside the Origin 1200 is configured for monitoring and/or detecting the motion of the object in the venue jointly and asynchronously based on the asynchronously computed heterogeneous motion information associated with any pair of Type 1 and Type 2 devices comprising a particular Type 2 device. In another example, the optional motion detector 1222 or a motion detector outside the Origin 1200 is configured for monitoring and/or detecting the motion of the object in the venue jointly and asynchronously based on the asynchronously computed heterogeneous motion information associated with any pair of Type 1 and Type 2 devices comprising a particular Type 1 device. In another example, the optional motion detector 1222 or a motion detector outside the Origin 1200 is configured for monitoring and/or detecting the motion of the object in the venue globally and asynchronously based on the asynchronously computed heterogeneous motion information associated with any pair of Type 1 and Type 2 devices. A detailed structure of the optional motion detector 1222 or a motion detector outside the Origin 1200 will be described with respect to FIG. 14.

The various modules discussed above are coupled together by a bus system 1230. The bus system 1230 can include a data bus and, for example, a power bus, a control signal bus, and/or a status signal bus in addition to the data bus. It is understood that the modules of the Origin 1200 can be operatively coupled to one another using any suitable techniques and mediums.

Although a number of separate modules or components are illustrated in FIG. 12, persons of ordinary skill in the art will understand that one or more of the modules can be combined or commonly implemented. For example, the processor 1202 can implement not only the functionality described above with respect to the processor 1202, but also implement the functionality described above with respect to the channel information extractor 1220. Conversely, each of the modules illustrated in FIG. 12 can be implemented using a plurality of separate components or elements.

In one embodiment, in addition to the Bot 1000 and the Origin 1200, the system may also comprise: a third wireless device, e.g. another Bot, configured for transmitting an additional heterogeneous wireless signal through an additional wireless multipath channel impacted by the motion of the object in the venue, and a fourth wireless device, e.g. another Origin, that has a different type from that of the third wireless device. The fourth wireless device may be configured for: receiving the additional heterogeneous wireless signal through the additional wireless multipath channel impacted by the motion of the object in the venue, and obtaining a time series of additional channel information (CI) of the additional wireless multipath channel based on the additional heterogeneous wireless signal. The additional CI of the additional wireless multipath channel is associated with a different protocol or configuration from that associated with the CI of the wireless multipath channel. For example, the wireless multipath channel is associated with LTE, while the additional wireless multipath channel is associated with Wi-Fi. In this case, the optional motion detector 1222 or a motion detector outside the Origin 1200 is configured for detecting the motion of the object in the venue based on both the motion information associated with the first and second wireless devices and additional motion information associated with the third and fourth wireless devices computed by at least one of: an additional motion detector and the fourth wireless device based on the time series of additional CI.

Figure 13:
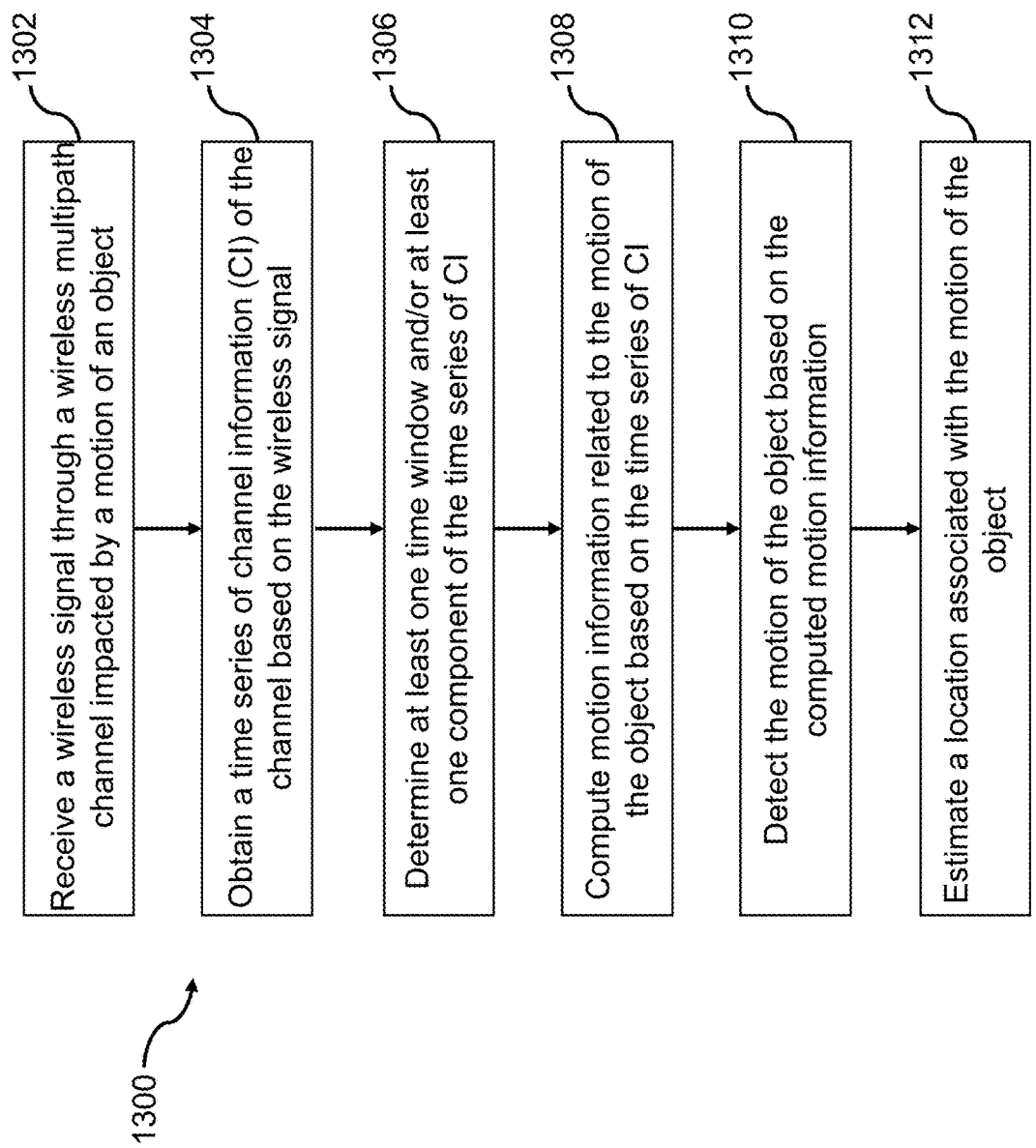
FIG. 13 illustrates a flowchart of an exemplary method performed by a second wireless device, according to one embodiment of the present teaching.

FIG. 13 illustrates a flowchart of an exemplary method performed by a second wireless device, e.g. the Origin 1200 in FIG. 12, in accordance with some embodiments of the present disclosure. At operation 1302, the Origin receives and analyzes a wireless signal through a wireless multipath channel impacted by a motion of an object. At operation 1304, the Origin obtains a time series of channel information (CI) of the channel based on the wireless signal. Optionally at operation 1306, the Origin determines at least one time window and/or at least one component of the time series of CI. Optionally at operation 1308, the Origin computes motion information related to the motion of the object based on the time series of CI. Optionally at operation 1310, the Origin detects the motion of the object based on the computed motion information. Optionally at operation 1312, the Origin estimates a location associated with the motion of the object.

Figure 14:
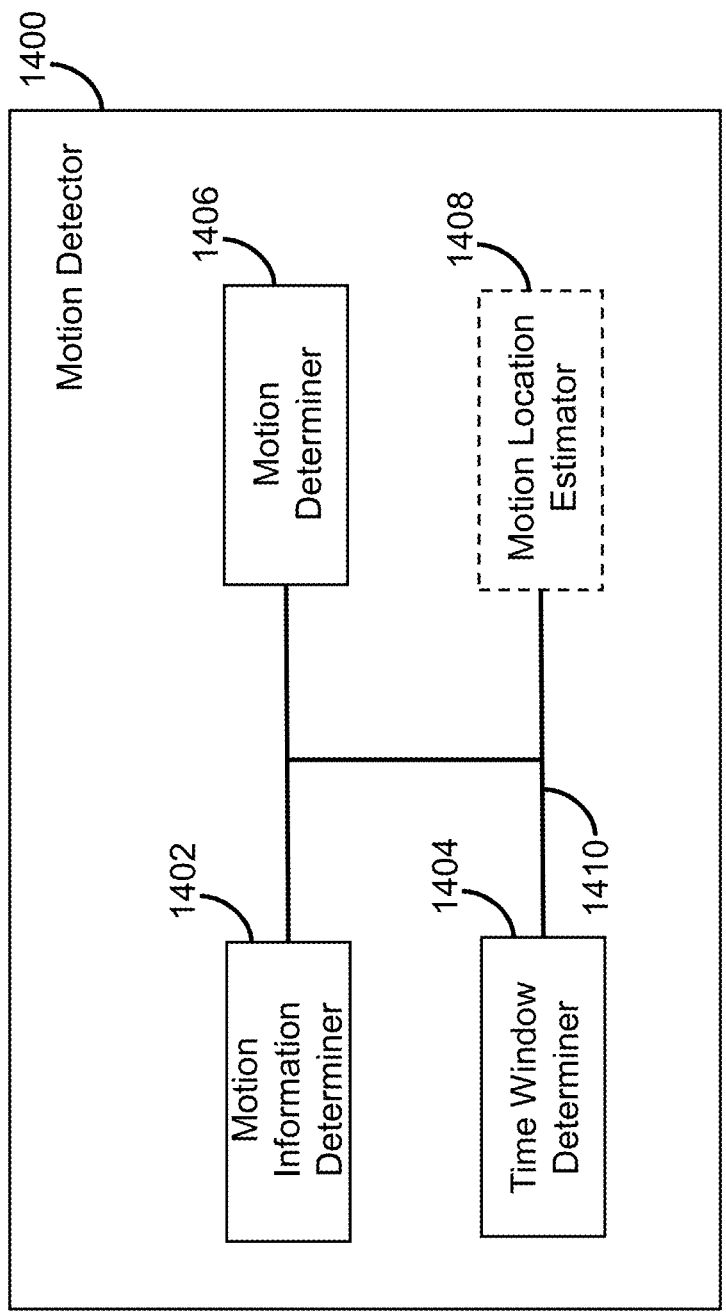
FIG. 14 illustrates an exemplary motion detector, according to one embodiment of the present teaching.

FIG. 14 illustrates an exemplary motion detector 1400, according to one embodiment of the present teaching. The motion detector 1400 may serve as a motion detector (e.g. the optional motion detector 1222) in an Origin, or an independent motion detector outside any Origin. As shown in FIG. 14, the motion detector 1400 in this example includes a motion information determiner 1402, a motion determiner 1406, a time window determiner 1404, and an optional motion location estimator 1408. According to various embodiments, the motion detector 1400 may be coupled to at least one of: the first wireless device; the second wireless device; a third wireless device having a same type as that of the first wireless device; a fourth wireless device having a same type as that of the second wireless device; a cloud server; a fog server; a local server; and an edge server, for detecting and monitoring object motions.

In one embodiment, the motion detector 1400 may receive the time series of CI from the channel information extractor 1220, and compute motion information based on the time series of CI. For example, the motion information determiner 1402 may receive the respective time series of CI from an Origin, and asynchronously compute respective heterogeneous motion information related to the motion of the object based on the respective time series of CI. In one example, the motion information determiner 1402 may compute a heterogeneous similarity score between a current time window and a past time window of the time series of CI, based on at least one of: a distance score, an absolute distance, a Euclidean distance, a norm, a metric, a statistical characteristic, a time reversal resonating strength (TRRS), a cross-correlation, an auto-correlation, a covariance, an auto-covariance, an inner product of two vectors, a preprocessing, a signal conditioning, a denoising, a phase correction, a timing correction, a timing compensation, a phase offset compensation, a transformation, a projection, a filtering, a feature extraction, a finite state machine, a history of past similarity score, another past window of the at least one CI time series, a component-wise operation, machine learning, a neural network, a deep learning, a training, a discrimination, a weighted averaging, and another operation, such that the motion of the object in the venue is detected based on the computed heterogeneous similarity score. The motion information determiner 1402 may send the computed motion information to the motion determiner 1406 for detecting and monitoring object motions.

In one embodiment, the time window determiner 1404 can determine a current window and a past window of the time series of CI, and send the current time window and the past time window to the motion information determiner 1402. Then the motion information determiner 1402 can compute asynchronously a heterogeneous similarity score between the current window and the past window of the time series of CI, such that the motion of the object in the venue is detected based on the motion information and the heterogeneous similarity score.

The motion determiner 1406 in this example may receive the computed motion information from the motion information determiner 1402, and detect the motion of the object in the venue based on motion information related to the motion of the object. In one embodiment, for each of the at least one component, the time window determiner 1404 can determine asynchronously a respective current component window of the component based on a current time window, determine asynchronously a respective past component window of the component based on a past time window, and send the information about the respective current component window and the respective past component window to the motion determiner 1406. The motion determiner 1406 may compare component-wise the respective current component window with the respective past component window asynchronously to generate a comparison result, monitor component-wise the motion of the object based on the comparison result, and detect the motion of the object in the venue based on the asynchronous component-wise comparing.

In one embodiment, for each of the at least one component, the motion information determiner 1402 can compute asynchronously a component similarity score associated with the respective current component window and the respective past component window, based on at least one of: a distance score, a norm, a metric, a statistical characteristic, a time reversal resonating strength (TRRS), a cross-correlation, an auto-correlation, a covariance, an auto-covariance, an inner product of two vectors, a preprocessing, a signal conditioning, a denoising, a phase correction, a timing correction, a timing compensation, a phase offset compensation, a transformation, a projection, a filtering, a feature extraction, a finite state machine, a history of past similarity score, another past window of the at least one time series of CI, a component-wise operation, machine learning, a neural network, a deep learning, a training, a discrimination, a weighted averaging, and another operation. The motion information determiner 1402 may then compute asynchronously a heterogeneous similarity score based on a heterogeneous function of the at least one component similarity score. The heterogeneous function comprises at least one of: a representative value, a typical value, a weighted average, a percentile, a maximum, a minimum, a 40% quartile, a 50% quartile, a 60% quartile, a mean, a median, a mode, a sum, a product, a root, an arithmetic mean, a geometric mean, a harmonic mean, a generalized mean, an ordered statistic, a trimmed mean, a statistical function, an expected value, a variance, a selected one, and another function. The motion determiner 1406 may detect the motion of the object in the venue when the heterogeneous similarity score is greater than or equal to a first threshold.

In another embodiment, for each of the at least one component, the motion information determiner 1402 may compute asynchronously a component similarity score associated with the respective current component window and the respective past component window, based on at least one of: a distance score, a norm, a metric, a statistical characteristic, a time reversal resonating strength (TRRS), a cross-correlation, an auto-correlation, a covariance, an auto-covariance, an inner product of two vectors, a preprocessing, a signal conditioning, a denoising, a phase correction, a timing correction, a timing compensation, a phase offset compensation, a transformation, a projection, a filtering, a feature extraction, a finite state machine, a history of past similarity score, another past window of the at least one time series of CI, a component-wise operation, machine learning, a neural network, a deep learning, a training, a discrimination, a weighted averaging, and another operation. Then for each of the at least one component, the motion determiner 1406 may detect component-wise the motion of the object asynchronously when the respective component similarity score is greater than or equal to a respective component threshold, and detect the motion of the object in the venue when a percentage of component-wise motion detection in a selected group of components is greater than or equal to a second threshold.

In one embodiment, the first wireless device is a Type 1 device having a Type 1; the second wireless device is a Type 2 device having a Type 2. In one example, the motion determiner 1406 may monitor and/or detect the motion of the object in the venue individually and asynchronously based on the asynchronously computed heterogeneous motion information associated with a pair of Type 1 and Type 2 devices. In another example, the motion determiner 1406 may monitor and/or detect the motion of the object in the venue jointly and asynchronously based on the asynchronously computed heterogeneous motion information associated with any pair of Type 1 and Type 2 devices comprising a particular Type 2 device. In another example, the motion determiner 1406 may monitor and/or detect the motion of the object in the venue jointly and asynchronously based on the asynchronously computed heterogeneous motion information associated with any pair of Type 1 and Type 2 devices comprising a particular Type 1 device. In another example, the motion determiner 1406 may monitor and/or detect the motion of the object in the venue globally and asynchronously based on the asynchronously computed heterogeneous motion information associated with any pair of Type 1 and Type 2 devices.

In one embodiment, for each pair of Type 1 and Type 2 devices comprising a Type 1 device and a Type 2 device, the respective Type 2 device or the motion information determiner 1402 in the motion detector 1400 is configured for computing asynchronously a respective heterogeneous similarity score between a respective current window and a respective past window of the respective time series of CI. Then the motion determiner 1406 or the Type 2 device may detect the motion of the object in the venue individually and asynchronously when a first function of the respective heterogeneous similarity score associated with a pair of Type 1 and Type 2 devices is greater than or equal to a respective individual threshold, detect the motion of the object in the venue jointly and asynchronously when a second function of the heterogeneous similarity scores associated with any pair of Type 1 and Type 2 devices comprising a particular Type 2 device is greater than or equal to a respective joint threshold, detect the motion of the object in the venue jointly and asynchronously when a third function of the heterogeneous similarity scores associated with any pair of Type 1 and Type 2 devices comprising a particular Type 1 device is greater than or equal to another respective joint threshold, and/or detect the motion of the object in the venue globally and asynchronously when a fourth function of the heterogeneous similarity scores associated with any pair of Type 1 and Type 2 devices is greater than or equal to a respective global threshold.

The optional motion location estimator 1408 in this example is an optional component in the motion detector 1400. In one embodiment, the optional motion location estimator 1408 may be outside the motion detector 1400 and serve as a supervisory device, that is configured for: partitioning a map of the venue into a plurality of regions; and/or associating asynchronously the motion of the object with at least one of the plurality of regions of the map of the venue based on heterogeneous motion information received from the Type 2 wireless devices. In one embodiment, at least one of the motion detector 1400 and the Type 2 devices is configured for performing at least one of: partitioning a respective feature space of each of the heterogeneous motion information into a plurality of respective feature segments; constructing a respective mapping that associates each respective feature segment with at least one of the plurality of regions of the map of the venue; associating asynchronously the motion of the object individually with at least one of the plurality of regions of the map of the venue based on the respective mapping; partitioning a joint feature space of heterogeneous motion information associated with a plurality of pairs of Type 1 and Type 2 devices into a plurality of joint feature segments; constructing a joint mapping that associates each joint feature segment with at least one of the plurality of regions of the map of the venue; and associating asynchronously the motion of the object jointly with a particular one of the plurality of regions of the map of the venue based on the joint mapping.

In one embodiment, the motion detector 1400 may serve as a Type 3 device of a radio monitoring system. The radio monitoring system may comprise at least one asynchronous heterogeneous Type 1 device and at least one asynchronous heterogeneous Type 2 device. The radio monitoring system may comprise at least one doublet of Type 1 and Type 2 devices, each doublet comprising one of the at least one asynchronous heterogeneous Type 1 device, and one of the at least one asynchronous heterogeneous Type 2 device. The Type 3 device may comprise a third processor communicatively coupled with at least one of: at least one asynchronous heterogeneous Type 1 device, and at least one asynchronous heterogeneous Type 2 device; a third memory communicative coupled with the third processor; and a third set of instructions stored in the third memory. The third set of instructions, when executed, cause the third processor to: for each Type 2 device, and for each of the at least one doublet of Type 1 and Type 2 devices comprising the Type 2 device, receive asynchronously at least one respective time series of channel information (time series of CI) of a wireless multipath channel influenced by a motion of an item in a place received asynchronously by the Type 2 device using a respective second processor, a respective second memory and a respective second set of instructions of the Type 2 device. The at least one respective time series of CI associated with the respective doublet of Type 1 and Type 2 devices is obtained asynchronously from a respective asynchronous heterogeneous radio signal transmitted from a respective Type 1 device of the respective doublet using a respective first processor, a respective first memory and a respective first set of instructions of the respective Type 1 device to at least one asynchronous heterogeneous Type 2 device through the wireless multipath channel. In addition, the third set of instructions, when executed, cause the third processor to perform at least one of the following: tracking the motion of the item in the place individually and asynchronously, based on time series of CI associated with a particular doublet of Type 1 and Type 2 devices comprising a particular Type 2 device and a particular Type 1 device, tracking the motion of the item jointly and asynchronously based on time series of CI associated with any of the at least one doublet of Type 1 and Type 2 devices associated with the particular Type 2 device, tracking the motion of the item jointly and asynchronously based on time series of CI associated with any of the at least one doublet of Type 1 and Type 2 devices associated with the particular Type 1 device, and tracking the motion of the item globally and asynchronously based on time series of CI associated with any of the at least one doublet of Type 1 and Type 2 devices.

In one embodiment, the system may comprise a monitoring device configured for signaling asynchronously information associated with at least one of: the map of the venue, the plurality of partitioned regions of the map, regions associated with any detected motion of the object, heterogeneous motion information associated with at least one pair of Type 1 and Type 2 devices, the component-wise similarity score, the heterogeneous similarity score, past motion information, past similarity score, another past information, Type 1 devices, and Type 2 devices. In one example, the monitoring device may be a mobile phone running an app or GUI to display the detection or monitoring result. In other examples, the monitoring device may be a desktop, a laptop, a tablet, an IoT device, or a smart speaker.

FIG. 15 illustrates an exemplary algorithm of motion detection, according to one embodiment of the present teaching. In FIG. 15, $G(f; t)$ may denote the CSI (or CI) amplitude of subcarrier f at time slot t. For a system with M by N antenna configuration, the total number of subcarriers is $F=MNL$, where L is the number subcarrier for each antenna pair. For each subcarrier f, one may compute a motion statistic as the first order of the sample auto-correlation coefficient, where T is the length of the time window to compute the motion statistic. The physical meaning of the motion statistic is that the higher the motion statistic, the stronger the motion is. On each subcarrier, there is a motion statistic calculated for detecting a motion, e.g., when its sample auto-correlation coefficient is larger than a pre-defined threshold. A majority vote may be applied to fuse all the decisions from F subcarriers of the system. When more than half of the total number of the available subcarriers detect the human motion inside the elevator, then the system detects the motion; otherwise, no motion is detected. In another embodiment, $G(f; t)$ may be defined as another function of the CI on subcarrier f at time slot t, for example, (CSI amplitude)$^2$, (CSI amplitude)$^4$, real/imaginary part of the CSI after phase offset cleaning. The motion static may also be defined as the sample auto-correlation coefficient with another order, if the order is less than a quarter of the time window length T. Other decision fusion rule such as weighted combining of the individual decision may also be adopted.

Figure 16:
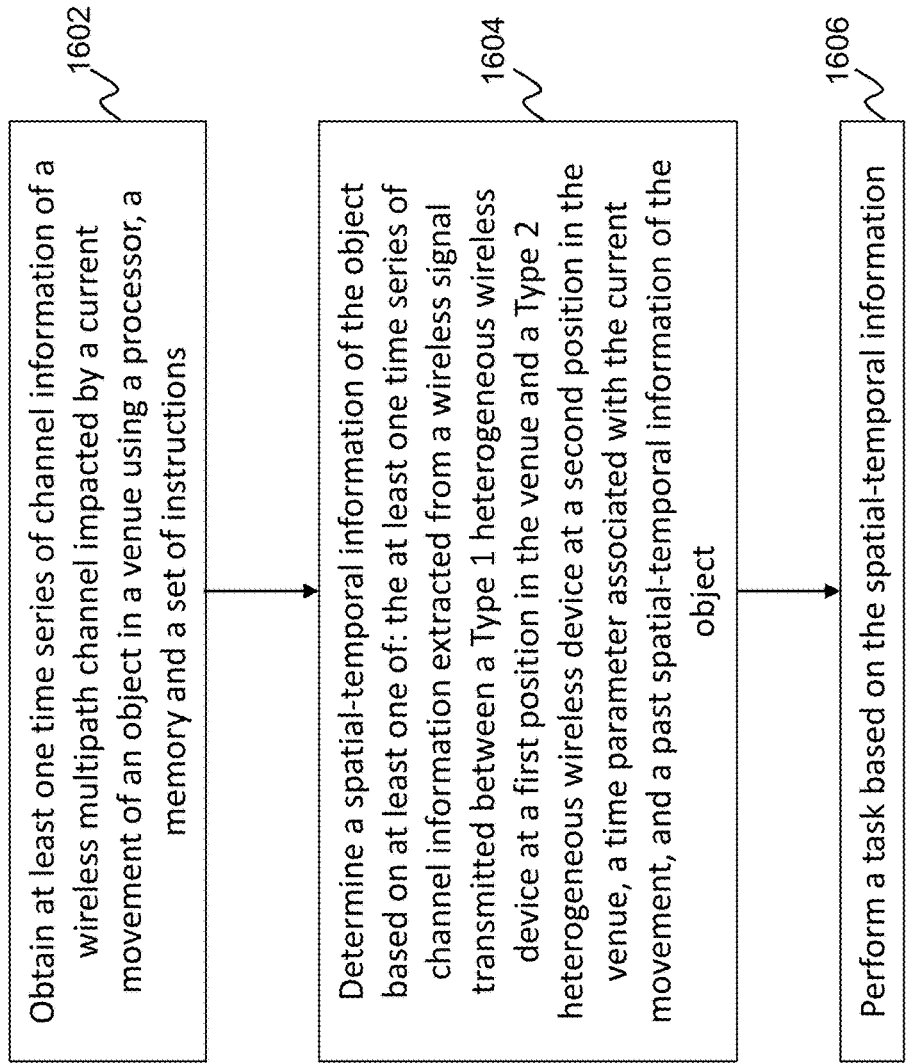
FIG. 16 illustrates an exemplary method for object motion detection, according to one embodiment of the present teaching.

FIG. 16 illustrates an exemplary method for object motion detection, according to one embodiment of the present teaching. At operation 1602, at least one time series of channel information of a wireless multipath channel is obtained, using a processor, a memory and a set of instructions stored in the memory. The at least one time series of channel information is extracted from a wireless signal transmitted between a Type 1 heterogeneous wireless device at a first position in a venue and a Type 2 heterogeneous wireless device at a second position in the venue through the wireless multipath channel. The wireless multipath channel is impacted by a motion of an object in the venue. At operation 1604, a spatial-temporal information of the object is determined based on at least one of: the at least one time series of channel information, a time parameter associated with the motion, and a past spatial-temporal information of the object. At operation 1606, a task is performed based on the spatial-temporal information. The spatial-temporal information may be a form of motion information, and motion information may be a form of spatial-temporal information. A Type 1 device may be the First Device, the Type 2 device may be the Second Device. The "task" mentioned above may be to "monitor motion" and/or to "detect motion".

Figure 17:
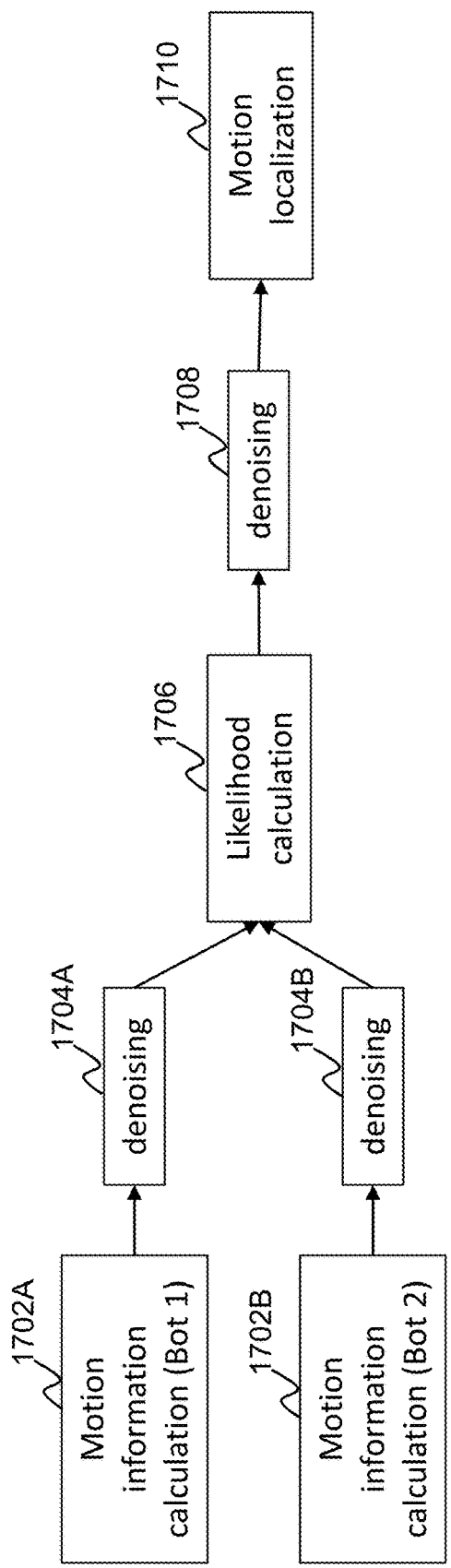
FIG. 17 illustrates an exemplary flowchart for a method of object motion localization, according to one embodiment of the present teaching.

FIG. 17 illustrates an exemplary flowchart for a method of object motion localization, according to one embodiment of the present teaching. The object motion localization in FIG. 17 is based on 2 Bots (Type 1 Devices), paired with a particular Origin (Type 2 Device). First, for each Bot, the motion information/statistics associated with each Bot-Origin pair (1702A and 1702B) is calculated. Then each of the calculated motion information is passed through a denoising processor (e.g. a low pass filter) to remove noise (1704A and 1704B). Then a motion likelihood (1706) is calculated according to some function. The motion likelihood may denote a probability of motion occurring near a Bot or near an Origin. Since the likelihood may also be noisy, e.g., change rapidly when motion occurs, the likelihood values may go through another denoising processor 1708. Finally, a decision of motion localization is made on where the motion happens.

An example function of mapping motion information to likelihood may be defined as follows. Denote $m_i(t)$ as the motion information calculated for Bot i-Origin pair at time t. An example of motion likelihood near Bot i at time t may be calculated as $$L_i(t) = \begin{cases} 1, & \text{Bot } i \text{ detects motion, the other Bot doesn't detect motion,} \\ 0, & \text{Bot } i \text{ doesn't detect motion, the other Bot detect motion,} \\ \dfrac{m_i^p}{\sum_i m_i^p}, & \text{Both Bots detect motion.} \end{cases}$$

$L_i(t)$ is undefined when neither of the bots detect motion. Denote $\tilde{L}_i(t)$ as the likelihood after denoising an example of motion localization decision rule can be $$MLoc(t) = \begin{cases} \text{Near Bot 1,} & \text{when } \tilde{L}_1(t) > \eta_1 \\ \text{Near Bot 2,} & \text{when } \tilde{L}_2(t) > \eta_2 \\ \text{Near the common area,} & \text{when } \tilde{L}_1(t) < \eta_1 \text{ and } \tilde{L}_2(t) < \eta \end{cases}$$

When both $\tilde{L}_1(t)$ and $\tilde{L}_2(t)$ are undefined, then no motion exists in the monitored area.

Different embodiments of the present disclosure will now be described in detail hereinafter. It is noted that the features of the embodiments and examples in the present disclosure may be combined with each other in any manner without conflict.

In one embodiment, a wireless (or radio or RF) monitoring system comprises at least one asynchronous heterogeneous Type 1 wireless (or radio or RF) device (or apparatus) and at least one asynchronous heterogeneous Type 2 wireless (or radio or RF) device. The wireless (or radio or RF) monitoring system also comprises at least one pair (or pairing, or couple, or duo, or combination, or doublet, or combo, or match, or team) of Type 1 and Type 2 devices, each pair comprising one of the at least one asynchronous heterogeneous Type 1 device, and one of the at least one asynchronous heterogeneous Type 2 device. Each of the at least one Type 2 device is in at least one respective particular pair of Type 1 and Type 2 devices. Each Type 2 device is associated (or grouped or coupled or paired or conjoined or combined or affiliate or partnered) with at least one respective particular Type 1 device through the at least one respective particular pair of Type 1 and Type 2 devices.

In one embodiment, a disclosed method of the wireless (or radio or RF) monitoring system comprises obtaining (or receiving, or getting, or collecting, or retrieving, or securing, or fetching) asynchronously at least one respective time series of channel information (CI) (or channel data) of a wireless multipath channel impacted (or influenced) by a motion (or movement, or act, or gesture, or change, or drift, or dynamics, or flow, or fluctuation, or flux, or gesticulation, or kinetics, or locomotion, or mobility, or movement, or oscillation, or passing, or progressing, or stirring, or swaying) of an object (or article, or body, or commodity, or gadget, or item, or matter, or substance, or entity, or mass) in a venue (or locale, or place, or site, or setting, or ground) for each Type 2 device and for each of the at least one respective particular pair of Type 1 and Type 2 devices comprising the Type 2 device. The at least one respective time series of CI (CI time series) associated with the particular pair of Type 1 and Type 2 devices is extracted (or obtained or derived or gleaned or collected or garnered) asynchronously from a respective asynchronous heterogeneous wireless (or radio or RF) signal. The respective asynchronous heterogeneous wireless (or radio or RF) signal is transmitted asynchronously from a respective one of the at least one respective particular Type 1 device using a respective first heterogeneous processor, a respective first heterogeneous memory and a respective first heterogeneous set of instructions of the Type 1 device to at least one asynchronous heterogeneous Type 2 device through the wireless multipath channel.

The motion of the object in the venue is monitored (or tracked or checked or observed or overseen or observed or surveyed) using a third processor, a third memory and a third set of instructions of a Type 3 device in at least one of the four following ways: (a) the motion of the object in the venue is monitored individually and asynchronously, based on CI time series associated with a pair of Type 1 and Type 2 devices comprising a particular Type 2 device; (b) the motion of the object is monitored jointly and asynchronously based on CI time series associated with any of the at least one pair of Type 1 and Type 2 devices associated with the particular Type 2 device; (c) the motion of the object is monitored jointly and asynchronously based on CI time series associated with any of the at least one pair of Type 1 and Type 2 devices associated with one of the at least one respective particular Type 1 device, and (d) the motion of the object is monitored globally and asynchronously based on CI time series associated with any of the at least one pair of Type 1 and Type 2 devices.

For example, more than one asynchronous heterogeneous Type 1 devices may transmit asynchronously their respective asynchronous heterogeneous wireless (or radio or RF) signals to the same Type 2 devices. (Some Type 1 device may be transmitting to more than one Type 2 devices.) Their transmission may be synchronized momentarily. Their transmission may be asynchronous, but sometimes the wireless (or radio or RF) signals of two of the Type 1 devices may overlap in time. Their transmission may be coordinated. The motion of the object may be jointly monitored based on CI time series associated pairs of Type 1 and Type 2 devices comprising the Type 2 device and one of the more than one asynchronous Type 1 devices.

In another example, an asynchronous heterogeneous Type 1 devices may transmit the asynchronous heterogeneous wireless (or radio or RF) signal to more than one asynchronous heterogeneous Type 2 devices. The asynchronous heterogeneous wireless (or radio or RF) signal may be received asynchronously, or near synchronously, or simply synchronously. CI time series may be extracted asynchronously from the received asynchronous heterogeneous wireless (or radio or RF) signal. The motion of the object may be jointly monitored based on the CI time series associated pairs of Type 1 and Type 2 devices each comprising the asynchronous heterogeneous Type 1 device and one of the more than one asynchronous heterogeneous Type 2 devices.

Each channel information (CI) may comprise at least one of: a channel state information (CSI), a frequency domain CSI, a frequency domain CSI associated with at least one sub-band, a time domain CSI, a CSI in a domain, a channel impulse response (CIR), a channel frequency response (CFR), a channel characteristics, a channel filter response, a CSI of the wireless multipath channel, an information of the wireless multipath channel, a time stamp, an auxiliary information, a data, a meta data, a user data, an account data, an access data, a security data, a session data, a status data, a supervisory data, a household data, an identity (ID), a device data, a network data, a neighborhood data, an environment data, a real-time data, a sensor data, a stored data, an encrypted data, a compressed data, a protected data, and/or another channel information.

A channel information (CI) may be extracted from a received probe signal (with multi-path) by a Type 2 device, an integrated circuit (IC, or chip) of the Type 2 device (e.g. a Wi-Fi chip, an LTE chip, a cellular network chip, a wireless network chip, a mesh network chip, a Bluetooth chip, a UWB chip, etc). The probe signal may/may not contain data. More than one CI may be extracted from a received probe signal. One CI may be extracted for each pair of transmitting antenna and receiving antenna. For example, for a Type 1 device with 3 transmitting antennas and a Type 2 device with 2 receiving antennas, a total of 6 CI may be extracted from each probe signal.

A CI may comprise information of the channel from more than one pairs of transmitting antennas and receiving antennas. A CI may be sent from the Type 2 device to another device (e.g. a neighboring device, a companion device, a paired device, an edge device, a cloud device). The another device may be communicatively coupled with the Type 2 device. The another device may be another Type 2 device, the Type 1 device and/or another Type 1 device. The CI obtained by different heterogeneous Type 2 devices may be different because different heterogeneous Type 2 devices may be at different locations within the venue such that they may experience different multipath patterns. In other words, the respective wireless multipath channel experienced by respective heterogeneous Type 2 device may be different. The CI may capture information (e.g. motion, periodic motion, shape, size, volume, path, direction, distance, speed, acceleration, change, rate of change, etc.) of the venue and/or any object (people, pet, creature, machine, device with movable parts, door, window, wall, partitioning, furniture, fixture, piping, air conditioning, heating, fan, etc.) in the venue. The CI may have some inherent imperfection such as noise, phase error, timing error, etc. The CI may be preprocessed, processed and/or post-processed.

Any preprocessing, processing and/or postprocessing may comprise: doing nothing, zero-padding, time-domain processing, frequency domain processing, time-frequency processing, spatially varying processing, temporally varying processing, adaptive processing, de-noising, smoothing, conditioning, enhancement, restoration, feature extraction, weighted averaging, averaging over antenna links, averaging over selected frequency, averaging over selected components, quantization, vector quantization, filtering, linear filtering, nonlinear filtering, low-pass filtering, bandpass filtering, high-pass filtering, median filtering, ranked filtering, quartile filtering, percentile filtering, mode filtering, linear filtering, nonlinear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transformation, mapping, transform, inverse transform, integer transform, power-of-2 transform, real transform, floating-point transform, fixed-point transform, complex transform, fast transform, Fourier transform, Laplace transform, Hadamard transform, Hilbert transform, sine transform, cosine transform, triangular transform, wavelet transform, transformation, decomposition, selective filtering, adaptive filtering, derivative, first order derivative, second order derivative, higher order derivative, integration, zero crossing, indicator function, absolute conversion, convolution, multiplication, division, another transform, another processing, another filter, another function, and/or another preprocessing.

Any of preprocessing, processing and/or post-processing may comprise: normalization, temporal normalization, frequency normalization, magnitude correction, phase correction, phase cleaning, cleaning a phase associated with the channel information, normalizing components associated with the channel information, cleaning a phase of frequency components of the channel information, normalizing the frequency components, re-sampling, labeling, tagging, training, sorting, grouping, folding, thresholding, matched filtering, spectral analysis, clustering, quantization, vector quantization, time correction, time base correction, time stamp correction, sampling rate up-conversion/down-conversion, interpolation, intrapolation, extrapolation, subsampling, decimation, compression, expansion, encryption decryption, coding, storing, retrieving, transmitting, receiving, representing, merging, combining, splitting, tracking, monitoring, projection, orthogonal projection, non-orthogonal projection, over-complete projection, decomposition, eigen-decomposition, principal component analysis (PCA), sparse approximation, matching pursuit, and another operation etc.

In the case of at least one Type 1 devices interacting with at least one Type 2 devices, the processing, preprocessing, post-processing, and/or other processing may be different (heterogeneous) for different devices. The processing/pre-processing/post-processing/other processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

Any preprocessing, processing and/or postprocessing may require one or more thresholds. Any thresholds may be pre-determined, adaptively determined and/or determined by a finite state machine. The adaptive determination may be based on time, space, location, antenna, path, link, state, battery life, remaining battery life, available power, available computational resources, available network bandwidth, etc.

The wireless (or radio or RF) signal transmitted from the heterogeneous Type 1 device to the heterogeneous Type 2 device may be a series of probe signals. Each probe signal may be an impulse, a number (e.g. 2, 3, 4, or more) of impulses, or another signal waveform. The another signal waveform may be based on the wireless multipath channel. The time separation of the number of impulses may be changed over time. (For example, the time separation between the second and third impulses may be different from the time separation between the first and second impulses). The magnitude of different impulses may be different (e.g. the first impulse may be stronger or weaker than the second impulse). The shape of different impulses may be different. (e.g. the first impulse may have a narrow, triangular waveform while the second impulse may have yet another waveform). The probe signal may be adaptive changed over time. The probe signal(s) may be different for different channels, different space-time-frequency channels, different antenna, etc. The probe signal(s) may be different for different Type 1 devices and/or Type 2 devices. The probe signal may be changed based on a feedback signal (e.g. from one or more Type 2 devices). The probe signal(s) may/may comprise data. Some probe signals may comprise data while some other probe signals may not comprise data.

The series of probe signals may be at regular intervals (e.g. 40 probe signals per second, with an interval of 25 ms (1/40 second) between adjacent probe signals), or irregular intervals (e.g. probe signals sent when the wireless channel is less busy or not busy, or probe signals sent in short/longer/long bursts adaptively or on demand). The regular intervals and/or waveform associated with each probe signal may be changed over time. For example, the probe signals may be 40 probe signals per second for a period of time (e.g. 1 day, 1 hour, or 20 seconds), and changed to 1000 probe signals per second for another period of time. The change may be based on a user input, a system command, a task, a change in the task, the venue, a change of the venue, the respective object, a change of the respective object, the respective motion of the respective object, a change of the respective motion of the respective object, and/or the monitoring of the respective object/the respective motion of the respective object.

The wireless multipath channel may be associated with a media access control (MAC) layer, a physical (PHY) layer, Wi-Fi, an IEEE 802.11 standard, 802.11a/b/g/n/ac/ad/af/ag/ah/ai/aj/aq/ax/ay, Bluetooth, Bluetooth 1.0/1.1/1.2/2.0/2.1/3.0/4.0/4.1/4.2/5, BLE, mesh network, an IEEE 802.16/1/1a/1b/2/2a/a/b/c/d/e/f/g/h/i/j/k/l/m/n/o/p/, standard, 802.16, Zigbee, WiMax, UWB, mobile channel, 1G/2G/3G/3.5G/4G/LTE/5G/6G/7G, etc.

The venue may comprise an indoor environment, an enclosed environment, an outdoor environment, an open-air environment (e.g. an open-air parking lot), a facility, a warehouse, a factory, a manufacturing facility, an assembly line, a building, a multi-storey building, a house, a home, an office, a store, a supermarket, a casino, a hotel, a room, a box, a stadium, a hall, a station, an airport, a port, a subway, a vehicle, a car, a boat, a ship, a cruise ship, a military vehicle, a submersible, a plane, a drone, a cave, a tunnel, a pipe, a piping system, a crawl space, a maintenance system, a tube, an air conditioning/ventilation system, a fluid, etc. The venue may comprise people, pet, children, animals, plants, partitions, walls, dry walls, concrete walls, brick walls, glass walls, metal walls, doors, windows, glasses, floors, ceilings, attics, garage, fireplace, parking facilities, structure elements, columns, beams, movable objects, non-movable objects, furniture, wardrobe, fixtures, machines, devices, lighting, curtains, blinds, construction features, building features, water pipes, air ducts, crawl space, basement, elevator, stairs, stair wells, hall way, corridor, maintenance space, fan, ventilation system, air-condition system, heat, HVAC, electrical wiring, refrigerator, cooking devices, oven, microwave, stove, television, sound system, smart speaker, lights, carpets, restricted area, limited-access area, forbidden area, etc.

The object may comprise a person, a crowd, a congregation of people, a group of people, a baby, a sick person, an older person, a younger person, an intruder, a suspicious person, a consumer, a supervisor, a professional, an athlete, a waiter, a shopper, a staff, an officer, a customer, a manager, a high-valued person, a targeted person, a doctor, a patient, a guest, a security personnel, a traveler, a pet, an animal, a vehicle, a automated guided vehicle (AGV), a driverless car, a motorcycle, a bicycle, a boat, a ship, a truck, a car, a train, a tram, an electric vehicle, a plane, a drone, an air-borne device, a subway train, a transport, a vehicle on a track/rail, a machine, a fixture, a furniture, a moveable object, a non-moveable object, a lift, a chair, a table, a valuable object, a jewelry, a robot, a robotic arm, a motion capture device, a tool, a body part of a person, a head, a neck, a shoulder, an arm, an elbow, a hand, a finger, a refrigerator, an air conditioner, a vacuum cleaner, a smart device, a smart fabric, a smart material, a smart phone, a phone, an electric device, an electronic device, a television, a media device, a heating device, a microwave oven, an oven, a stove, a light-emitting device, a sound-producing device, a speaker, a light-capturing device, a camera, an infra-red sensor, a sound-capturing device, a microphone, a moveable object, a non-moveable object, a rigid object, a non-rigid object, a fluid object, a deforming object, a fan, a hollow object, a box, a room, a liquid, a fluid, a plasma, a particle, etc.

Two of the respective objects may be the same object. Any of the respective objects may be the same object. The motion may comprise no-motion, inaction, idling, immobility, rest, stagnation, a repose, an impulsive motion, a collision, an impact, an explosion, a stiffening, a relaxation, a locomotion, an induced motion, a reactive motion, an active motion, a sudden motion, a steady motion, a waving motion, a motion sequence, a steady-state motion sequence, a repeatable motion, a changing motion, a timed motion, an oscillation, a periodic motion, a pseudo-periodic motion, a translational motion, a rotational motion, a regular motion, an irregular motion, a transient motion, a resizing, a deformation, a complex motion, a vibration, a shaking, an earthquake, a shock, an event, a chaotic motion, a statistical motion, a stationary motion, a non-stationary motion, a head motion, a neck motion, a shoulder motion, an arm motion, a hand motion, a finger motion, a waist motion, a leg motion, a foot motion, a body motion, an emotion display, an act, a gesture, a gait, a lie-down motion, a get-up motion, a sitting, a standing, a walking, a running, a jogging, a jumping, a dancing, a bow, a curtsy, a signing, an expression, an indication, a talking, a singing, a wind motion, a turbulence, a door movement, a window movement, a machine motion, a movement of a moveable object, an installation of a machine, a movement associated with a motor, a car movement, a braking, a turn, a change of direction, a drift, a sway, a stirring, a fluctuation, a disturbance, a flux, a mixing, a stirring, a right-turn, a left-turn, a wind-induced motion, a heart-beat, a breathing motion, a water motion, a fluid motion, a flow, a fluctuation, a motion of a flexible/non-rigid object, a temperature-related motion, expansion, contraction, a crowd motion, a turmoil, an unrest, etc.

The monitoring may comprise monitoring at least one characteristics associated with the respective object and/or the respective motion of the respective object. The characteristics may comprise at least one of: a frequency of pseudo-periodic motion, a frequency characteristics, a frequency spectrum, a time period of pseudo periodic motion, a count of periodic motion, a temporal characteristics, a temporal profile, a timing of pseudo-periodic motion, a starting time, an ending time, a duration, an occurrence of event(s), a timing of events, a time separation between two events, an evolution of events, a count of events, a count of frequency domain events, a count of time domain events, a count of time-frequency events, a history of motion, a motion type, a motion classification, a location of the object, a speed, a displacement, an acceleration, a rotational speed, a rotational characteristics, a gait cycle of the object, a transient behavior of the object, a transient motion, a change in pseudo-periodic motion, a change in frequency of pseudo-periodic motion, a change in gait cycle, an event associated with pseudo-periodic motion, an event associated with transient motion, a sudden-motion event, a fall-down event, and another information.

The characteristics may further comprise a location, a location tag, a location label, a starting location, an ending location, a horizontal location, a vertical location, a length, an area, a volume, a capacity, a distance, a direction, a displacement, a displacement vector, a speed, a velocity, a velocity vector, an acceleration, an acceleration vector, a rotational speed, a rotational acceleration, a gait cycle, a motion type, a motion classification, a motion characteristics, a sudden motion, a correlation between two characteristic, a similarity between two characteristics, a co-occurrence of two characteristics, a timed-occurrence of two characteristics, a temporal characteristics, a timing, a time stamp, a time period, a time window, a sliding time window, a time delay, a time mapping, a time label, a time tag, a starting time, an ending time, a temporal profile, a temporal history, a trend, a spatial-temporal trend, a frequency trend, a frequency characteristics, a frequency, a temporal frequency, a spatial frequency, a spatial-temporal frequency, a frequency range, a starting frequency, an ending frequency, a temporal range, a spatial range, a spatial-temporal change, a spatial change, a temporal change, a frequency change, a frequency shift, an information of a periodic motion, an information of a transient motion, a time trend, a frequency trend, a spatial trend, a time-varying characteristics, a steady-state characteristics, a transient characteristics, a consumed characteristics, a remaining characteristics, a stationary characteristics, a cyclo-stationary characteristics, a pseudo-stationary characteristics, an event, a temporal event, a spatial event, a frequency event, a spatial-temporal event, and/or another information.

A heterogeneous Type 1 device and/or a heterogeneous Type 2 device may be an antenna, a device with an antenna, a device that has interface to attach/connect to/link an antenna, a device with a wireless transceiver, a device with a wireless transmitter, a device with a wireless receiver, an internet-of-thing (IoT) device, a device with wireless network, a device with both wired networking and wireless networking capability, a device with a wireless integrated circuit (IC), a Wi-Fi device, a device with a Wi-Fi chip (e.g. 802.11a/b/g/n/ac/ax standard compliant, etc), a Wi-Fi access point (AP), a Wi-Fi client, a Wi-Fi router, a Wi-Fi repeater, a Wi-Fi hub, a Wi-Fi mesh network router/hub/AP, a wireless mesh network router, an adhoc network device, a wireless mesh network device, a mobile device (e.g. 2G/2.5G/3G/3.5G/4G/LTE/5G/6G/7G, etc), a cellular device, a mobile network base station, a mobile network hub, a mobile network compatible device, an LTE device, a device with an LTE module, a mobile module (e.g. a circuit board with an mobile-enabling chip (IC) such as Wi-Fi chip, LTE chip, BLE chip, etc), a Wi-Fi chip (IC), an LTE chip, a BLE chip, a device with a mobile module, a smart phone, a companion device (e.g. dongle, attachment, plugin) for smart phones, a dedicated device, a plugin device, an AC-powered device, a battery-powered device, a device with a processor/memory/set of instructions, a smart clock, a smart stationary, a smart pen, a smart user-interface, a smart paper, a smart mat, a smart camera, a smart television (TV), a set-top-box, a smart microphone, a smart speaker, a smart refrigerator, a smart oven, a smart machine, a smart phone, a smart wallet, a smart furniture, a smart door, a smart window, a smart ceiling, a smart floor, a smart wall, a smart table, a smart chair, a smart bed, a smart night-stand, a smart air-conditioner, a smart heater, a smart pipe, a smart duct, a smart cable, a smart carpet, a smart decoration, a smart gadget, a smart USB device, a smart plug, a smart dongle, a smart lamp/light, a smart tile, a smart ornament, a smart bottle, a vehicle, a smart car, a smart AGV, a drone, a smart robot, a laptop, a tablet, a computer, a harddisk, a network card, a smart instrument, a smart racket, a smart ball, a smart shoe, a smart wearable, a smart clothing, a smart glasses, a smart hat, a smart necklace, a smart food, a smart pill, a small device that moves in the body of a creature (e.g. in blood vessels, in lymph fluid, digestive system, etc). The Type 1 device and/or Type 2 device may be communicatively coupled with: the internet, another device with access to internet (e.g. smart phone), a cloud server, an edge server, a local server, and/or a storage.

There may be more than one heterogeneous Type 1 device. The Type 1 devices (and/or Type 2 devices) may be heterogeneous. For example, a Type 1 device (and/or Type 2 devices) may be a Wi-Fi access point, another Type 1 device (and/or Type 2 device) may be a smart TV, and/or yet another Type 1 device may be a simple device dedicated to sending the series of probe signals (and/or yet another Type 2 device may be a simple device dedicated to receiving the series of probe signals and passing them on). Different Type 1 devices (and/or Type 2 devices) may have different functionalities, brands (e.g. Sony, Samsung, Philips, Apple, etc), models, size, form factors, shape, color, modules, antennas, circuitry, logic circuits, processors, clock, bus, memory, memory buses, storage, sets of instructions, power (e.g. AC or DC, rechargeable battery, etc), chips (IC), chip sets, firmware, software, network connection, priorities, access rights, security settings, etc.

A device may function as a Type 1 device and a Type 2 device. The device may function as Type 1 device at a time and as Type 2 device at a different time. The device may function as Type 1 device and Type 2 device simultaneously.

A heterogeneous Type 1 device and/or a heterogeneous Type 2 device may comprise an integrated circuits (IC). The IC may be standard compliant. The IC may support more than one standards/protocols (e.g. 802.11a/b/e/g/n/ac/ax, 2G/2.5G/3G/3.5G/4G/LTE/5G/6G, 802.16, mesh network, adhoc network, beyond 4G, Bluetooth, BLE, another network, UWB, RFID, etc). The Type 1 or Type 2 device may detect a motion and control another device (e.g. TV, fan, radio, speaker, light, air conditioner, heater, electrical appliance, security system, etc). A heterogeneous Type 1 device and/or a Type 2 device may comprise more than one antenna. The antennas may be heterogeneous. An antenna may be directional or omni-directional. The antennas may be arranged in a circle/ellipse, in a straight line, in a lattice, or another pattern, or another placing order. A particular heterogeneous Type 1 device may/may not establish communication link with a particular Type 2 device.

The Type 3 device may be a networked server, a cloud server, a fog server, an edge server, a local server, a local client, a smart device, a smart phone, an internet-of-thing device. The Type 3 processor may be a heterogeneous Type 1 device, or a heterogeneous Type 2 device.

The first processor, the second processor and/or the third may be a microprocessor, a multi-processor, a multi-core processor, a parallel processor, a CISC processor, a RISC processor, a micro-controller, central processing unit (CPU), a graphical processor unit (GPU), a digital signal processor (DSP), an FPGA, an embedded processor (e.g. ARM), a logic circuit, etc. The third processor may be the first processor, the second processor or another processor.

The first memory, the second memory and/or the third memory may be RAM, ROM, PROM, EPROM, EEPROM, harddisk, flash memory, storage network, internal storage, external storage, local storage, edge storage, and/or cloud storage. The first memory, the second memory and/or the third memory may be volatile and/or non-volatile. The first set of instructions, second set of instructions and/or the third set of instructions may be embedded, pre-loaded, loaded upon boot up, loaded on the fly, loaded on demand, pre-installed, installed, and/or downloaded.

For each Type 2 device, and for each of the at least one respective particular pair of Type 1 and Type 2 devices comprising the Type 2 device, at least one respective heterogeneous motion information associated with the motion of the object may be computed (or obtained or calculated or estimated or determined or evaluated) asynchronously based on the at least one respective CI time series associated with the respective particular pair of Type 1 and Type 2 devices.

The motion of the object in the venue may be monitored individually and asynchronously based on asynchronously computed heterogeneous motion information associated with the pair of Type 1 and Type 2 devices comprising the particular Type 2 device. The motion of the object may be monitored jointly and asynchronously based on asynchronously computed heterogeneous motion information associated with any of the at least one pair of Type 1 and Type 2 devices associated with the particular Type 2 device. The motion of the object may be monitored jointly and asynchronously based on asynchronously computed heterogeneous motion information associated with any of the at least one pair of Type 1 and Type 2 devices associated with the respective particular Type 1 device. The motion of the object may be monitored globally and asynchronously based on asynchronously computed heterogeneous motion information associated with any of the at least one pair of Type 1 and Type 2 devices. For example, at least one combined score may be computed based on all the scores and the motion of the object may be monitored jointly based on the at least one combined score. Computation may be shared among the first processor, the second processor, the third processor, a companion processor, a cloud server, a fog server, and/or a local server.

For each Type 2 device, and for each of the at least one respective particular pair of Type 1 and Type 2 devices comprising the Type 2 device, a respective heterogeneous similarity score between a respective current window and a respective past window of the at least one respective CI time series associated with the respective particular pair of wireless devices may be computed asynchronously.

The respective heterogeneous similarity score may be computed based on at least one of: a distance score, an absolute distance (e.g. 1_1 norm), a Euclidean distance, a norm, a metric, a statistical characteristic, a time reversal resonating strength (TRRS), a cross-correlation, an auto-correlation, a covariance, an auto-covariance, and/or an inner product of two vectors. The respective heterogeneous similarity score may also be computed based on at least one of: a preprocessing, a signal conditioning, a denoising, a phase correction, a timing correction, a timing compensation, a phase offset compensation, a transformation, a projection, and/or a filtering. The respective heterogeneous similarity score may also be computed based on at least one of: a feature extraction, a finite state machine, a history of past similarity score, another past window of the at least one CI time series, a component-wise operation, machine learning, a neural network, a deep learning, a training, a discrimination, a weighted averaging, and/or another operation.

The motion of the object in the venue may be monitored individually and asynchronously based on asynchronously computed heterogeneous similarity score associated with the pair of Type 1 and Type 2 devices comprising the particular Type 2 device. The motion of the object may be monitored jointly and asynchronously based on asynchronously computed heterogeneous similarity score associated with any of the at least one pair of Type 1 and Type 2 devices associated with the particular Type 2 device. The motion of the object may be monitored jointly and asynchronously based on asynchronously computed heterogeneous similarity score associated with any of the at least one pair of Type 1 and Type 2 devices associated with the respective particular Type 1 device. The motion of the object may be monitored globally and asynchronously based on asynchronously computed heterogeneous similarity score associated with any of the at least one pair of Type 1 and Type 2 devices.

Each of the current window and the past window of a (or more than one, or all) CI time series may be represented as or transformed into a vector. The similarity score may be a distance between the two vectors such as absolute distance, Euclidean distance or other distance. The CI (or windows of CI, or sliding window of CI) may be considered a stochastic process. The similarity measure may be a cross-covariance, or auto-covariance. A covariance close to 1 may mean two CIs (or two windows of CI) being very similar (or highly correlated). In the case of CI with zero mean, covariance may become correlation. Inner product may be a way to compute correlation.

The inner product of two vectors: Assuming N components for each CI. A vector associated with a CI may be an N-tuple containing the N components. There may be more than one CI time series, say M time series, with M>=1. A vector associated with the M channel information (CI) time series, at a particular time, may be a K-tuple, with K=M*N, containing the N components of the M channel information (CI) at the particular time.

Consider a window of a CI time series containing P channel information (CI), with P>=1. A vector associated with the window may be a K-tuple, with K=P*N, containing the N components of the P channel information (CI) of the window.

Consider a composite window of M channel information (CI) time series containing a window of P channel information (CI), with P>=1 of each CI time series. A vector associated with the composite window may be a K-tuple, with K=P*M*N, containing the N components of the P channel information (CI) of the window of each of the M time series.

Consider a composite window of M channel information (CI) time series containing a window of P_i channel information (CI), with P_i>=1, of the i^{th} CI time series, for i=1, . . . , M. A vector associated with the composite window may be a K-tuple, with K=(P_1+P_2+ . . . +P_M)*N, containing the N components of the P_i channel information (CI) of the window of the i^{th} CI time series, i=1, 2, . . . , M.

Each CI of the at least one respective CI time series may have at least one respective component. For each Type 2 device, and for each of the at least one respective particular pair of Type 1 and Type 2 devices comprising the Type 2 device, and for each of the at least one respective component, the following may be done: (a) a respective current component window of the component of the at least one respective CI time series may be determined asynchronously based on the respective current window; (b) a respective past component window of the component of the at least one respective CI time series may be determined asynchronously based on the respective past window; (c) the respective current component window may be compared component-wise with the respective past component window asynchronously; and (d) the motion of the object may be monitored component-wise based on the component-wise comparing of the respective current component window and the respective past component window asynchronously.

The motion of the object in the venue may be monitored individually and asynchronously based on asynchronous component-wise comparing associated with the pair of Type 1 and Type 2 devices comprising the particular Type 2 device. The motion of the object may be monitored jointly and asynchronously based on asynchronous component-wise comparing associated with any of the at least one pair of Type 1 and Type 2 devices associated with the particular Type 2 device. The motion of the object may be monitored jointly and asynchronously based on asynchronous component-wise comparing associated with any of the at least one pair of Type 1 and Type 2 devices associated with the respective particular Type 1 device. The motion of the object may be monitored globally and asynchronously based on asynchronous component-wise comparing associated with any of the at least one pair of Type 1 and Type 2 devices.

For example, each CI may comprise a set/record with N elements (components), a collection of N items/features/characteristics/behavioral measures (components), an N-tuple, a matrix with N columns (with each column being a component), a matrix with N rows (with each row being a component), an N-component vector, an N-component channel response, an N-component time signal, an N-component channel, an N-component channel impulse response (CIR), an N-component frequency signal, an N-component channel frequency response (CFR), etc. The N components may be homogeneous or heterogeneous.

Each component may be different. For example, one component may be a complex number and another component may be a logical value. Each component may be associated with at least one of: a frequency, a frequency subcarrier, a frequency band, a time, a time lag, a time window, a time period, and/or a count.

The amount of CI in the current window (or current component window) and/or the amount of CI in the past window (or past component window) may be the same, or different. The amount of CI in the current window and/or the past window may be time varying. Complex conjugation may be applied.

The comparing may comprise preprocessing, signal conditioning, denoising, phase correction, timing correction, timing compensation, phase offset compensation, transformation, projection, filtering, feature extraction, finite state machine, machine learning, neural network, deep learning, training discrimination, weighted averaging, etc.

For example, the past motion information may be past CI, past CI associated with the motion of the object, past comparing, past motion decision, past motion statistics, past scores, past similarity scores, past component similarity scores, past device-wise similarity scores, etc.

For each Type 2 device, and for each of the at least one respective particular pair of Type 1 and Type 2 devices comprising the Type 2 device, for each of the at least one component, a component similarity score may be computed asynchronously based on the respective current component window and the respective past component window.

Each component similarity score may be computed based on at least one of: a distance score, a norm, a metric, a statistical characteristics, a time reversal resonating strength (TRRS), a cross-correlation, an auto-correlation, a covariance, an auto-covariance, an inner product of two vectors, a preprocessing, a signal conditioning, a denoising, a phase correction, a timing correction, a timing compensation, a phase offset compensation, a transformation, a projection, a filtering, a feature extraction, a finite state machine, a history of past similarity score, another past window of the at least one CI time series, a component-wise operation, machine learning, a neural network, a deep learning, a training, a discrimination, a weighted averaging, and/or another operation.

A respective heterogeneous similarity score may be computed asynchronously as a heterogeneous function of the at least one component similarity score. The heterogeneous function may comprise at least one of: a representative value, a typical value, a weighted average, a percentile, a maximum, a minimum, a 40% quartile, a 50% quartile, a 60% quartile, a mean, a median, a mode, a sum, a product, a root, an arithmetic mean, a geometric mean, a harmonic mean, a generalized mean, an ordered statistic, a trimmed mean, a statistical function, an expected value, a variance, a selected one, and/or another function.

The motion of the object in the venue may be monitored individually and asynchronously based on at least one of: heterogeneous similarity score, and at least one component similarity score, associated with the pair of Type 1 and Type 2 devices comprising the particular Type 2 device. The motion of the object may be monitored jointly and asynchronously based on at least one of: heterogeneous similarity score, and at least one component similarity score, associated with any of the at least one pair of Type 1 and Type 2 devices associated with the particular Type 2 device. The motion of the object may be monitored jointly and asynchronously based on at least one of: heterogeneous similarity score, and at least one component similarity score, associated with any of the at least one pair of Type 1 and Type 2 devices associated with the respective particular Type 1 device. The motion of the object may be monitored globally and asynchronously based on at least one of: heterogeneous similarity score, and at least one component similarity score, associated with any of the at least one pair of Type 1 and Type 2 devices.

The function may comprise at least one of: a representative value, a typical value, a weighted average, a percentile, a maximum, a minimum, a 10% quartile, a 20% quartile, a 30% quartile, a 40% quartile, a 50% quartile, a 60% quartile, a 70% quartile, a 80% quartile, a 90% quartile, a mean, a median, a mode, a sum, a product, a root, an arithmetic mean, a geometric mean, a harmonic mean, a generalized mean, an ordered statistics, a trimmed mean, a statistical function, an expected value, a variance, a thresholding, a counting, and/or a selected one.

The feature extraction may comprise at least one of: a sampled feature, a statistical feature, a time domain feature, a frequency domain feature, a decomposition, a singular value decomposition, a principal component analysis, an independent component analysis, a preprocessing, a signal processing, a postprocessing, a transformation, a linear processing, a nonlinear processing, a signal conditioning, a signal processing, a representative value, a typical value, a weighted average, a percentile, a maximum, a minimum, a 10% quartile, a 20% quartile, a 30% quartile, a 40% quartile, a 50% quartile, a 60% quartile, a 70% quartile, a 80% quartile, a 90% quartile, a mean, a median, a mode, a sum, a product, a root, an arithmetic mean, a geometric mean, a harmonic mean, a generalized mean, an ordered statistics, a trimmed mean, a statistical function, an expected value, a variance, a thresholding, a clustering, a training, a machine learning, a neural network, a deep learning, a counting, and/or a robust processing, etc.

For each Type 2 device, and for each of the at least one respective particular pair of Type 1 and Type 2 devices comprising the Type 2 device, for each of the at least one component, the motion of the object may be detected component-wise asynchronously when the respective component similarity score is at least one of: greater than, and equal to, a respective component threshold.

The motion of the object in the venue may be detected individually and asynchronously when at least one of: a first function of heterogeneous similarity score associated with the pair of Type 1 and Type 2 devices comprising the particular Type 2 device is at least one of: greater than, and equal to, a respective first individual threshold, and/or a first percentage of component-wise motion detection in a first selected group of components associated with the pair of Type 1 and Type 2 devices comprising the particular Type 2 device is at least one of: greater than, and equal to, a respective second individual threshold. The motion of the object may be detected jointly and asynchronously when at least one of: a second function of heterogeneous similarity scores associated with any of the at least one pair of Type 1 and Type 2 devices comprising the particular Type 2 device is at least one of: greater than, and equal to, a respective first joint threshold, and/or a second percentage of component-wise motion detection in a second selected group of components associated with any of the at least one pair of Type 1 and Type 2 devices comprising the particular Type 2 device is at least one of: greater than, and equal to, a respective second joint threshold. The motion of the object may be detected jointly and asynchronously when at least one of: a third function of heterogeneous similarity scores associated with any of the at least one pair of Type 1 and Type 2 devices associated with the respective particular Type 1 device is at least one of: greater than, and equal to, a respective third joint threshold, and/or a third percentage of component-wise motion detection in a third selected group of components associated with any of the at least one pair of Type 1 and Type 2 devices associated with the respective particular Type 1 device is at least one of: greater than, and equal to, a respective fourth joint threshold. The motion of the object may be detected globally and asynchronously when at least one of: a fourth function of heterogeneous similarity scores associated with any of the at least one pair of Type 1 and Type 2 devices is at least one of: greater than, and equal to, a respective first global threshold, and/or a fourth percentage of component-wise motion detection in a fourth selected group of components associated with any of the at least one pair of Type 1 and Type 2 devices is at least one of: greater than, and equal to, a respective second global threshold.

The first function, second function, third function and/or fourth function may be a linear function, nonlinear function, an average, a weighted average, an arithmetic mean, a geometric mean, a harmonic mean, a generalized mean, a trimmed mean, a robust mean, a weighted mean, a median, a mode, and/or another function. Two or more of the first function, second function, third function and/or fourth function may be mathematically similar.

The individual threshold and/or the joint threshold may be 0.1, 0.2, 0.3, 0.4, 0.5, 0.6, 0.7, 0.8, 0.9 and/or another threshold. It may be time varying. Two or more thresholds may be the same or different for some current time.

The motion of the object in the venue may be monitored asynchronously further based on another CI time series of another wireless multipath channel impacted by the motion of the object in the venue. The another CI time series may be extracted from another asynchronous heterogeneous wireless (or radio or RF) signal transmitted from an asynchronous heterogeneous Type 3 wireless device to an asynchronous heterogeneous Type 4 wireless device through the another wireless multipath channel. For example, Type 1 and Type 2 devices may be Wi-Fi devices, while Type 3 and Type 4 devices may be LTE, BLE, RFID or a another Wi-Fi devices. For example, Type 1 and Type 2 may be Wi-Fi at 2.4 GHz while Type 3 and Type 4 devices may be Wi-Fi 5 GHz.

The selected group of components (e.g. First, second, third, fourth selected group of components) may be a group of significant components, a group of insignificant components, important components, un-important components, improving components, decaying components, good components, bad components, components with certain behavior/trend, opinion-influencing components, targeted components, components with significant energy, a group of decomposition components with significant energy, a group of components significant/useful/sensitive for the monitoring, a group of components learned in a training stage, a group of components selected in some ways. For example, the selected component may be sensitive/revealing/differentiating/discriminating to some targeted event to be monitored. Two or more of the first, second, third, fourth selected group of components may overlap, and/or be the same.

For example, majority vote may be performed with the threshold being 0.5 (50%). The motion may be detected if the percentage is greater than 50%.

For each Type 2 device, and for each of the at least one respective particular pair of Type 1 and Type 2 devices comprising the Type 2 device, at least one respective heterogeneous motion information associated with the motion of the object may be computed asynchronously based on the at least one respective CI time series associated with the respective particular pair of Type 1 and Type 2 device.

A respective current window of the at least one respective CI time series associated with the respective particular pair of wireless devices with a respective past window of the at least one respective CI time series may be compared asynchronously. A respective heterogeneous similarity score between the respective current window and the respective past window of the at least one respective CI time series may be computed asynchronously.

The motion of the object in the venue may be monitored individually and asynchronously based on asynchronously computed heterogeneous motion information and heterogeneous similarity score associated with the pair of Type 1 and Type 2 devices comprising the particular Type 2 device. The motion of the object may be monitored jointly and asynchronously based on asynchronously computed heterogeneous motion information and heterogeneous similarity score associated with any of the at least one pair of Type 1 and Type 2 devices associated with the particular Type 2 device. The motion of the object may be monitored jointly and asynchronously based on asynchronously computed heterogeneous motion information and heterogeneous similarity score associated with any of the at least one pair of Type 1 and Type 2 devices associated with the respective particular Type 1 device. The motion of the object may be monitored globally and asynchronously based on asynchronously computed heterogeneous motion information and heterogeneous similarity score associated with any of the at least one pair of Type 1 and Type 2 devices.

For example, the Type 1 and Type 2 devices may be Wi-Fi devices (with the wireless (or radio or RF) signal being a Wi-Fi signal), while the Type 3 and Type 4 devices may be LTE devices (with the another wireless (or radio or RF) signal being an LTE signal). In another example, the Type 1 and Type 2 devices may be Wi-Fi devices using a Wi-Fi network with a first SSID (e.g. "my home network"), while the Type 3 and Type 4 devices may be Wi-Fi devices using a Wi-Fi network with a second SSID (e.g. "Your Neighborhood"). In another example, the Type 1, Type 2, Type 3 and Type 4 devices may be in the same Wi-Fi network. The Type 1 and Type 2 devices may be using 20 MHz bandwidth, while the Type 3 and Type4 devices may be using 40 MHz bandwidth.

The Type 1 device and the Type 3 device may be the same device, or different devices. A Type 2 device and a Type 4 device may be the same device. Type 1 devices may be Type 3 devices, and vice versa. Type 2 devices may be Type 4 devices, and vice versa.

A map of the venue may be partitioned into more than one regions. The motion of the object may be associated asynchronously with at least one of the more than one regions of the map of the venue based on at least one of: (a) asynchronously computed heterogeneous motion information associated with the pair of Type 1 and Type 2 devices comprising the particular Type 2 device, (b) asynchronously computed heterogeneous motion information associated with any of the at least one pair of Type 1 and Type 2 devices associated with the particular Type 2 device, (c) asynchronously computed heterogeneous motion information associated with any of the at least one pair of Type 1 and Type 2 devices associated with the respective particular Type 1 device, and (d) asynchronously computed heterogeneous motion information associated with any of the at least one pair of Type 1 and Type 2 devices.

The respective similarity score may be one of the at least one respective motion information. The respective current window may have same or different duration (or length) as the respective past window. Current windows associated with different Type 2 devices may be different. Past windows associated with different Type 2 devices may also be different. The current window and the past window may have same amount of CI, same time duration, same pre-processing, same processing, same post-processing, and/or same settings. The current window and the past window may have different amount of CI, different time duration, different pre-processing, different processing, different post-processing, and/or different settings.

The motion information and/or past motion information may comprise information related to at least one of: a motion statistics, a motion magnitude, a motion phase, a location, a location coordinate, a change in location, a movement, a displacement, a distance, a motion differential, a speed, a speed differential, a change of speed, a change of direction, a velocity, an acceleration, a motion thresholding, a similarity score, a distance score, a distance, a Euclidean distance, a weighted distance, a norm, an L_1 (or 1_1) norm, an L_2 (or 1_2) norm, an L_k (or 1_k) norm for k>2, a statistical distance, a correlation, an auto-correlation, a covariance, an auto-covariance, a cross-covariance, an inner product, an outer product, a motion signal transformation, a motion signal decomposition, a motion signal multi-resolution signal decomposition, a motion signal sparse principal component analysis, a singular value decomposition, truncated singular value decomposition, a principle component analysis, an independent component analysis, factor analysis, dictionary learning, scalar quantization, vector quantization, matching pursuit, motion signal non-negative matrix factorization, latent Dirichlet Allocation (LDA), a motion clustering, a motion recognition, a motion identification, a motion localization, a motion feature extraction, a sample mean, a weighted mean, a trimmed mean, a robust mean, a sample variance, a presence, an absence, a presence of motion, an absence of motion, a presence of the object, an absence of the object, a change of the object, a deformation of the object, an action of the object, a movement of the object, an entrance of the object, an exit of the object, a presence of a repetitive motion, a motion frequency, a motion period, a motion rhythm, a breathing motion frequency, a breathing motion period, a motion cycle, a motion count, a motion intensity, a breathing motion period, a motion classification, a gait information, a motion sequence, a presence of a transient motion, a motion change, a motion event information, an entrance event, an exit event, an object fall down motion, a resizing motion, a deformation motion, a turning motion, a translational motion, a rotational motion, a gesture, a handwriting motion, a head motion, a mouth motion, a heart motion, an internal organ motion, a presence of a statistical motion, a statistical motion quantity, a mean, a variance, an autocorrelation, an auto-covariance, a cross correlation, a cross covariance, a wind motion, a motion localization, a motion location, a motion intensity, a presence of motion, an absence of motion, a presence of the object, an absence of the object, a time history of the motion statistics, a change of the motion statistics, a behavior of the motion statistics, and/or, a trend of the motion statistics, an appearing, a disappearing, an increase, a decrease, a spending-up, a slowing-down, a direction change, a sudden motion, an impulsive motion, a size, a length, an area, a volume, a capacity, a shape, a form, a spatial quantity, a location, a distance, a spatial range, a spatial label, a spatial tag, a starting location, an ending location, a speed, an acceleration, a rotation, an angular motion, a differential, a direction, a spatial trend, a temporal quantity, a time stamp, a time label, a time tag, a starting quantity, an ending quantity, a starting time, an ending time, a duration, a count, a period, a time window, a rate, a timing, a time delay, a trend, a time trend, a motion profile, a time event, a time-space quantity, a time-frequency quantity, a time-frequency-space quantity, a periodic behavior, a transient behavior, a periodic motion, a pseudo-periodic motion, a transient motion, a steady state behavior, a planned motion, an unplanned motion, and/or a perturbation, a statistical behavior, a stationary behavior, a quasi-stationary behavior, a cyclo-stationary behavior, a chaotic behavior, a co-occurrence, a timed-occurrence, an interaction, a response, an activity, a sign of an activity, a gesture, a gait, a body motion, a body part motion, a hand motion, an arm motion, a foot motion, a leg motion, a head motion, a facial motion, a mouth motion, an eye motion, a gaze, a breathing motion, a heart motion, a writing motion, a drawing motion, a finger motion, a user-interface motion, an event, a fall-down event, a security event, an accident event, a home event, an office event, a factory event, a warehouse event, a manufacturing event, an assembly line event, a maintenance event, a car-related event, a navigation event, a tracking event, a door event, a door-open event, a door-close event, a window event, a window-open event, a window-close event, a repeatable event, a one-time event, another event, a frequency characteristics, a frequency, a spectrum, a starting frequency, an ending frequency, a changing frequency, a frequency shift, a frequency trend, a frequency event, a user, a household, an office, a factory, a warehouse, a facility, an identity (ID), a consumed quantity, an unconsumed quantity, a state, a physical state, a health state, a well-being state, an emotional state, a mental state, and/or another motion information. The respective similarity score may be different for different Type 2 devices.

For each respective pair of Type 1 and Type 2 devices, a respective feature space of the at least one respective heterogeneous motion information may be partitioned associated with the respective pair of Type 1 and Type 2 devices into more than one respective feature segments. A respective mapping that associates each respective feature segment with at least one of the more than one regions of the map of the venue may be constructed. The motion of the object may be associated asynchronously individually with at least one of the more than one regions of the map of the venue based on the respective mapping. A joint feature space of heterogeneous motion information associated with more than one pairs of Type 1 and Type 2 devices may be partitioned into more than one joint feature segments. A joint mapping that associates each joint feature segment with at least one of the more than one regions of the map of the venue may be constructed. The motion of the object may be associated with the particular one of the more than one regions of the map of the venue based on the joint mapping.

Two or more of the more than one regions may overlap. A region may be a subset of another region. A region may be a union of more than one other regions. A location of a region may be related to a location of one or more Type 2 device. The map and/or the regions may be 1-dimensional, 2-dimensional, 3-dimensional or higher-dimensional. A 2D region may be a rectangular, square, circle, ellipse or other shapes. A region may be concave, or convex. Some regions may be large. Some may be small. The more than one regions may comprise a decomposition (e.g. multi-resolution decomposition) of the venue into disjoint regions or overlapping regions. The more than one regions may be regular or irregular.

For each respective pair of Type 1 and Type 2 devices, a respective heterogeneous similarity score between a respective current window and a respective past window of the at least one respective CI time series associated with the respective pair of Type 1 and Type 2 devices may be computed asynchronously.

The motion of the object in the venue may be detected individually and asynchronously when a first function of heterogeneous similarity score associated with the pair of Type 1 and Type 2 devices comprising the particular Type 2 device is at least one of: greater than, and equal to, a respective individual threshold. The motion of the object in the venue may be detected jointly and asynchronously when a second function of heterogeneous similarity scores associated with any of the at least one pair of Type 1 and Type 2 devices comprising the particular Type 2 device is at least one of: greater than, and equal to, a respective joint threshold. The motion of the object in the venue may be detected jointly and asynchronously when a third function of heterogeneous similarity scores associated with any of the at least one pair of Type 1 and Type 2 devices associated with the respective particular Type 1 device is at least one of: greater than, and equal to, another respective joint threshold. The motion of the object in the venue may be detected globally and asynchronously when a fourth function of heterogeneous similarity scores associated with any of the at least one pair of Type 1 and Type 2 devices is at least one of: greater than, and equal to, a respective global threshold.

A feature may be a motion information, or a feature/characteristics/a function of one or more motion information. The features may be heterogeneous. For example, one feature may be a real number, another feature may be a boolean, another may be a complex number/vector, another may be a set, and yet another may be a collection of things. A feature may be obtained by applying an operation on one or more motion information. A feature space may be a space or a subspace. A feature space may be spanned by one or more of the features.

Some feature segments may be partitioned/bound/defined by hyperplanes and/or manifolds. Some feature segments may be partitioned/defined by scalar quantization and/or vector quantization. The feature space may be decomposed/divided into cells (e.g. "rectangular" cell of unity length in all dimensions). A feature segment may be a union of adjacent cells or non-adjacent cells.

The joint feature space may be a union of the respective feature space. The dimension of the feature space of different Type 2 devices may be different. The respective mapping or the joint mapping may be one-to-one, many-to-one, one-to-many, or many-to-many. The mapping may be onto.

An information may be signaled, presented, displayed, played, transmitted, stored asynchronously by a monitoring device. The information may be associated with at least one of: the map of the venue, the more than one partitioned regions of the map, regions associated with any detected motion of the object, heterogeneous motion information associated with at least one pair of Type 1 and Type 2 devices, component similarity score, heterogeneous similarity score, past motion information, past similarity score, another past information, Type 1 devices, Type 2 devices, Type 3 devices, and/or Type 4 devices. The signaling may comprise analysis, decomposing, transforming, processing, filtering, ordering, arranging, formatting, organizing, presenting, displaying, playing, transmitting, and/or storing.

The information may be displayed with the map of the venue. The information may be location, zone, region, area, corrected location, approximate location, location with respect to (w.r.t.) a map of the venue, location w.r.t. a segmentation of the venue, direction, a path, a path w.r.t. the map and/or the segmentation, a trace (e.g. location within a time window such as the past 5 seconds, or past 10 seconds; the time window duration may be adjusted adaptive; the time window duration may be adaptively adjusted w.r.t. speed, acceleration, etc.), a history of a path, approximate regions/zones along a path, a history/summary of past locations, a history of past locations of interest, frequently-visited areas, customer traffic, crowd distribution, crowd behavior, crowd control information, speed, acceleration, motion statistics, breathing rate, heart rate, presence/absence of motion, presence/absence of people, presence/absence of vital sign, gesture, gesture control (control of devices using gesture), location-based gesture control, information of a location-based operation, an identity (ID) of the respect object (e.g. a pet, a person, an self-guided machine/device, a vehicle, a drone, a car, a boat, a bicycle, a self-guided vehicle, a machine with a fan, an air-conditioner, a TV, a machine with a movable part), an identification of a user (e.g. a person), an information of the user, a location/speed/acceleration/direction/motion/gesture/gesture control/motion trace of the user, an ID of the user, an activity of the user, a state of the user, a sleeping/resting characteristics of the user, an emotional state of the user, a vital sign of the user, an environment information of the venue, a weather information of the venue, an earthquake, an explosion, a storm, a rain, a fire, a temperature, a collision, an impact, a vibration, a event, a door-open event, a door-close event, a window-open event, a window-close event, a fall-down event, a burning event, a freezing event, a water-related event, a wind-related event, an air-movement event, an accident event, a pseudo-periodic event (e.g. running on a treadmill, jumping up and down, skipping rope, somersault, etc), a crowd event, a vehicle event, a gesture of the user (e.g. a hand gesture, an arm gesture, a foot gesture, a leg gesture, a body gesture, a head gesture, a face gesture, a mouth gesture, an eye gesture, etc).

The location may be 2-dimensional (e.g. with 2D coordinates), 3-dimensional (e.g. with 3D coordinates). The location may be relative (e.g. w.r.t. a map) or relational (e.g. halfway between point A and point B, around a corner, up the stairs, on top of table, at the ceiling, on the floor, on a sofa, close to point A, a distance R from point A, within a radius of R from point A, etc). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/state/status/action/motion of a user, temperature, network traffic, network connectivity, a status of a device/machine, remaining power of a device, a status of the device, etc). The rate of change, the size, the orientation, the color, the intensity and/or the symbol may reflect the respective motion. The information may be described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. an iPhone, an Android phone), a tablet (e.g. iPad), a laptop (e.g. notebook computer), a personal computer (PC), a device with graphical user interface (GUI), a smart speaker, a device with voice/audio/speaker capability, a virtual reality (VR) device, an augmented reality (AR) device, a smart car, a display in the car, a voice assistant, a voice assistant in a car, The map may be a 2-dimensional map, a 3-dimensional map and/or a higher-dimensional map. (e.g. a time varying 2D/3D map) Walls, windows, doors, entrances, exits, forbidden areas may be marked on the map. The map may comprise a floor plan of a facility. The map may have one or more layers (overlays). The map may be a maintenance map comprising at least one of: water pipes, gas pipes, wiring, cabling, air ducts, crawl-space, ceiling layout, underground layout.

The venue may be segmented into multiple zones such as bedroom, living room, storage room, walkway, kitchen, dining room, foyer, garage, first floor, second floor, rest room, offices, conference room, reception area, various office areas, various warehouse regions, various facility areas, etc. The segments/regions/areas may be presented in a map. Different regions may be color-coded. Different regions may be presented with a characteristic (e.g. color, brightness, color intensity, texture, animation, flashing, flashing rate, etc). Logical segmentation of the venue may be done using the at least one heterogeneous Type 2 device, or a server, or a cloud server, etc.

In another embodiment, a wireless (or radio or RF) monitoring system comprises at least one asynchronous heterogeneous Type 1 wireless (or radio) device and at least one asynchronous heterogeneous Type 2 wireless (or radio or RF) device. The wireless (or radio or RF) monitoring system comprises at least one pair of Type 1 and Type 2 devices, each pair comprising one of the at least one Type 1 device, and one of the at least one Type 2 device.

A particular asynchronous heterogeneous Type 2 device is in at least one particular pair of Type 1 and Type 2 devices of the wireless (or radio or RF) monitoring system. The particular Type 2 device is associated with at least one particular Type 1 device through the at least one particular pair of Type 1 and Type 2 devices.

The particular asynchronous heterogeneous Type 2 device of the wireless (or radio) monitoring system comprises a wireless circuitry, a second heterogeneous processor, a second heterogeneous memory and a second heterogeneous set of instructions.

The wireless circuitry receives asynchronously at least one asynchronous heterogeneous wireless (or radio or RF) signal. Each asynchronous heterogeneous wireless (or radio or RF) signal is transmitted asynchronously by one of the at least one particular Type 1 device using a respective first heterogeneous processor, a respective first heterogeneous memory and a respective first heterogeneous set of instructions of the Type 1 device to at least one asynchronous heterogeneous Type 2 device through a wireless multipath channel impacted by a motion of an object in a venue.

The second heterogeneous processor is communicatively coupled with the wireless circuitry. The second heterogeneous memory is communicative coupled with the second heterogeneous processor. The second heterogeneous set of instructions is stored in the second heterogeneous memory which, when executed, cause the second heterogeneous processor to, for each of the at least one particular pair of Type 1 and Type 2 devices, obtain asynchronously at least one respective series of channel information (CI time series) of the wireless multipath channel. The at least one respective CI time series associated with the particular pair of Type 1 and Type 2 devices is being extracted asynchronously from the respective asynchronous heterogeneous wireless (or radio or RF) signal received asynchronously by the wireless circuitry.

One of the following is performed: (a) the motion of the object in the venue is monitored individually and asynchronously, using a third processor, a third memory and a third set of instructions of a Type 3 device, based on CI time series associated with a pair of Type 1 and Type 2 devices comprising the particular Type 2 device; (b) the motion of the object is monitored jointly and asynchronously based on CI time series associated with any pairs of Type 1 and Type 2 devices comprising the particular Type 2 device; (c) the motion of the object is monitored jointly and asynchronously based on CI time series associated with any pairs of Type 1 and Type 2 devices comprising one of the at least one particular Type 1 device; and/or (d) the motion of the object is monitored globally and asynchronously based on CI time series associated with any pairs of Type 1 and Type 2 devices.

In another embodiment, a wireless (or radio or RF) monitoring system comprises at least one asynchronous heterogeneous Type 1 wireless (or radio or RF) device and at least one asynchronous heterogeneous Type 2 wireless (or radio or RF) device. The wireless (or radio) monitoring system comprises at least one pair of Type 1 and Type 2 devices, each pair comprising one of the at least one Type 1 device, and one of the at least one Type 2 device.

The particular asynchronous heterogeneous Type 1 device is in at least one particular pair of Type 1 and Type 2 devices of the wireless (or radio) monitoring system. The particular Type 1 device is associated with at least one particular Type 2 device through the at least one particular pair of Type 1 and Type 2 devices.

A particular asynchronous heterogeneous Type 1 device of a wireless (or radio) monitoring system comprises: a wireless circuitry, a first processor, a first memory and a first set of instructions. The first processor is communicatively coupled with the wireless circuitry. The first memory is communicative coupled with the first processor. The first set of instructions is stored in the first memory which, when executed, cause the first processor to transmit asynchronously using the wireless circuitry an asynchronous heterogeneous wireless (or radio or RF) signal from the particular Type 1 device to the at least one particular Type 2 device through a wireless multipath channel impacted by a motion of an object in a venue.

For each of the at least one particular Type 2 device, at least one series of channel information (CI time series) of the wireless multipath channel extracted from the asynchronous heterogeneous wireless (or radio or RF) signal transmitted by the wireless circuitry is obtained by the Type 2 device using a second processor, a second memory and a second set of instructions of the Type 2 device.

At least one of the following is performed: (a) the motion of the object in the venue is monitored individually and asynchronously, using a third processor, a third memory and a third set of instructions of a Type 3 device, based on CI time series associated with a pair of Type 1 and Type 2 devices comprising the particular Type 1 device, (b) monitoring the motion of the object jointly and asynchronously based on CI time series associated with any pairs of Type 1 and Type 2 devices comprising the particular Type 1 device, (c) monitoring the motion of the object jointly and asynchronously based on CI time series associated with any pairs of Type 1 and Type 2 devices comprising one of the at least one particular Type 2 device, and (d) monitoring the motion of the object globally and asynchronously based on CI time series associated with any pairs of Type 1 and Type 2 devices.

In another embodiment, a wireless (or radio or RF) monitoring system comprises at least one asynchronous heterogeneous Type 1 wireless (or radio or RF) device and at least one asynchronous heterogeneous Type 2 wireless (or radio or RF) device. The wireless (or radio) monitoring system comprises at least one pair of Type 1 and Type 2 devices, each pair comprising one of the at least one asynchronous heterogeneous Type 1 device, and one of the at least one asynchronous heterogeneous Type 2 device.

A Type 3 device of the wireless (or radio) monitoring system comprises a third processor, a third memory and a third set of instructions. The third processor is communicatively coupled with at least one of: at least one asynchronous heterogeneous Type 1 device, and at least one asynchronous heterogeneous Type 2 device. The third memory is communicative coupled with the third processor. The third set of instructions is stored in the third memory.

When executed, the third set of instructions causes the third processor to, for each Type 2 device, and for each of the at least one pair of Type 1 and Type 2 devices comprising the Type 2 device, receive asynchronously at least one respective time series of channel information (CI time series) of a wireless multipath channel impacted by a motion of an object in a venue.

Each CI time series is obtained asynchronously by the Type 2 device using a respective second processor, a respective second memory and a respective second set of instructions of the Type 2 device. The at least one respective CI time series associated with the respective pair of Type 1 and Type 2 devices is extracted asynchronously from a respective asynchronous heterogeneous wireless (or radio or RF) signal. The respective asynchronous heterogeneous wireless (or radio or RF) signal is transmitted from a respective Type 1 device of the respective pair using a respective first processor, a respective first memory and a respective first set of instructions of the respective Type 1 device to at least one asynchronous heterogeneous Type 2 device through the wireless multipath channel. When executed, the third set of instructions further causes the third processor to do at least one of the following: (a) monitor the motion of the object in the venue individually and asynchronously, based on CI time series associated with a particular pair of Type 1 and Type 2 devices comprising a particular Type 2 device and a particular Type 1 device, (b) monitor the motion of the object jointly and asynchronously based on CI time series associated with any of the at least one pair of Type 1 and Type 2 devices associated with the particular Type 2 device, (c) monitor the motion of the object jointly and asynchronously based on CI time series associated with any of the at least one pair of Type 1 and Type 2 devices associated with the particular Type 1 device, and/or (d) monitor the motion of the object globally and asynchronously based on CI time series associated with any of the at least one pair of Type 1 and Type 2 devices.

As an example to implement the above disclosed system and method, Stephen and his family want to install the disclosed wireless motion detection system to detect motion in their 2000 sqft two-storey town house in Seattle, Wash.

Because his house has two storeys, Stephen decided to use one Type 2 device (named A) and two Type 1 devices (named B and C) in the ground floor. His ground floor has predominantly three rooms: kitchen, dining room and living room arranged in a straight line, with the dining room in the middle. The kitchen and the living rooms are on opposite end of the house. He put the Type 2 device (A) in the dining room, and put one Type 1 device (B) in the kitchen and the other Type 1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g. an SMS text message, an email, a push message to the mobile phone app, etc). If Stephen pays a monthly fee (e.g. $10/ month), a service company (e.g. security company) will receive the warning signal through wired network (e.g. broadband) or wireless network (e.g. home WiFi, LTE, 3G, 2.5G, etc) and perform a security procedure for Stephen (e.g. call him to verify any problem, send someone to check on the house, contact the police on behalf of Stephen, etc).

Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 am. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 am, or she stayed in the kitchen for too long, or she remains motionless for too long, etc), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type 2 device. He simply unplugs the device from the original AC power plug and plug it into another AC power plug. He is happy that the wireless motion detection system is plug-and-play and the repositioning does not affect the operation of the system. Upon powering up, it works right away.

Sometime later, Stephen is convinced that our wireless motion detection system can really detect motion with very high accuracy and very low alarm, and he really can use the mobile app to monitor the motion in the ground floor. He decides to install a similar setup (i.e. one Type 2 device and two Type 1 devices) in the second floor to monitor the bedrooms in the second floor. Once again, he finds that the system set up is extremely easy as he simply needs to plug the Type 2 device and the Type 1 devices into the AC power plug in the second floor. No special installation is needed. And he can use the same mobile app to monitor motion in the ground floor and the second floor. Each Type 2 device in the ground floor/second floor can interact with all the Type 1 devices in both the ground floor and the second floor. Stephen is happy to see that, as he doubles his investment in the Type 1 and Type 2 devices, he has more than double the capability of the combined systems.

In one embodiment, the present teaching discloses a method, apparatus, and a system for sleep monitoring. The disclosed method comprises: obtaining a time series of channel information (CI) of a wireless multipath channel using a processor, a memory communicatively coupled with the processor and a set of instructions stored in the memory, and monitoring the sleep-related motion of the user based on the time series of CI.

The time series of CI is extracted from a wireless signal transmitted between a Type 1 heterogeneous wireless device and a Type 2 heterogeneous wireless device in a venue through the wireless multipath channel. The wireless multipath channel is impacted by a sleep-related motion of a user in the venue.

Monitoring the sleep-related motion comprises monitoring at least one of the following of the user: sleep timings, sleep durations, sleep stages, sleep quality, sleep apnea, sleep problems, sleep disorders, breathing problems, gasping, choking, teeth-grinding, pause of sleep, absence of sleep, insomnia, restlessness during sleep, hypersomnia, parasomnia, day-time sleepiness, sleep locations, sleep-while-driving, sleep disruptions, nightmares, night terrors, sleep walking, REM sleep behavior disorder, Circadian rhythm disorder, non-24-hour sleep-wake disorder, periodic limb movement disorder, shift-work sleep disorder, narcolepsy, confusional arousals, sleep paralysis, another sleep-related condition, and/or another sleep-related behavior.

Sleep timings comprises timings of at least one of: go-to-bed, sleep-onset, wake-up, REM-onset, NREM-onset, onset of sleep stage transitions, sleep disorders, sleep problems, breathing problems, insomnia, hypersomnia, parasomnia, sleep hypnogram-related events, sleep disruptions, sleep apnea, snoring during sleep, sleeping-not-on-a-bed, day-time sleep, sleep-walking, sleep-related events, sleep-related condition, and/or, sleep-related behavior, etc.

Sleep stages comprises at least one of: wake-up, rapid-eye-movement (REM) and/or non-REM (NREM).

At least one of: a time function of breathing rate, and a time function of motion statistics, of the user may be computed based on the series of CI. If breathing is not detected at time t, the breathing rate at time t may be computed as zero. The sleep-related motion of the user may be monitored based on at least one of: the time function of breathing rate, and/or the time function of motion statistics, of the user.

At least one of: a time function of breathing ratio, and a time function of motion ratio, of the user may be computed based on the series of CI. The breathing ratio at time t may be computed as percentage of time when the time function of breathing rate is non-zero in a first time window comprising the time t. The motion ratio at time t may be computed as percentage of time when the time function of motion statistics is larger than a first threshold within a second time window comprising the time t. The sleep-related motion of the user may be monitored based on at least one of: the time function of breathing ratio, and/or the time function of motion ratio, of the user.

A sleep stage may be classified as "awake" if at least one of: the motion ratio is greater than a second threshold, and/or the breathing ratio is less than a third threshold. The sleep stage may be classified as "asleep" if at least one of: the motion ratio is less than the second threshold, and/or the breathing ratio is greater than the third threshold. The "asleep" stage may comprise at least one of: rapid-eye-movement (REM) stage, and/or non-REM (NREM) stage.

A breathing rate trend function may be computed by low-pass filtering the time function of breathing rate. A detrended breathing rate function may be computed by subtracting the breathing rate trend function from the time function of breathing rate. A time function of breathing rate variance may be computed by computing variance of the detrended breathing rate function within a sliding time window. The sleep-related motion of the user may be monitored based on the time function of breathing rate variance.

An average NREM breathing rate may be computed by identifying a peak of a histogram of the time function of breathing rate in "asleep" stage in an overnight period. (e.g. the whole night, or the whole night subtracting any "awake" periods). A time function of breathing rate deviation may be computed by computing a distance between the average NREM and a percentile of the breathing rate within a sliding time window. The sleep stage may be classified as at least one of: REM stage and/or NREM stage, based on the time function of breathing rate deviation.

A time function of breathing rate variance may be computed by computing variance of a detrended breathing rate function within a first sliding time window. A time function of breathing rate deviation may be computed by computing a distance between an average NREM and a percentile of the breathing rate within a second sliding time window. The sleep stage may be classified as at least one of: REM stage, and/or NREM stage, based on the time function of breathing rate variance and the time function of breathing rate deviation.

A classifier may be trained based on at least one of: breathing rate variance, and breathing rate deviation, using machine learning. The machine learning may comprise at least one of: supervised learning, unsupervised learning, semi-supervised learning, active learning, reinforcement learning, support vector machine, deep learning, feature learning, clustering, regression, and/or dimensionality reduction. The sleep stage may be classified as at least one of: REM stage, and/or NREM stage, based on the classifier.

A quantity related to the sleep-related motion of the user may be computed based on the time series of CI. The sleep-related motion of the user may be monitored based on the quantity.

The quantity may comprise at least one of: the time the user goes to bed, the time the user gets out of bed, the sleep onset time, total time it takes the user to fall asleep, the wake up time, sleep disruption time, number of sleep disruption period, mean disruption duration, variance of disruption duration, total time in bed, total time the user is asleep, time periods of REM, time periods of NREM, time periods of awake, total time of REM, total time of NREM, number of REM periods, number of NREM periods, time of toss and turn in bed, duration of tossing and turning, hypnogram, periods of apnea, periods of snore, total duration of apnea, number of apnea periods, average duration of apnea period, periods of breathing problems, sleep quality score, daytime sleep, time periods of daytime sleep, total duration of daytime sleep, number of period of daytime sleep, average duration of period of daytime sleep, and another quantity.

Figure 18:
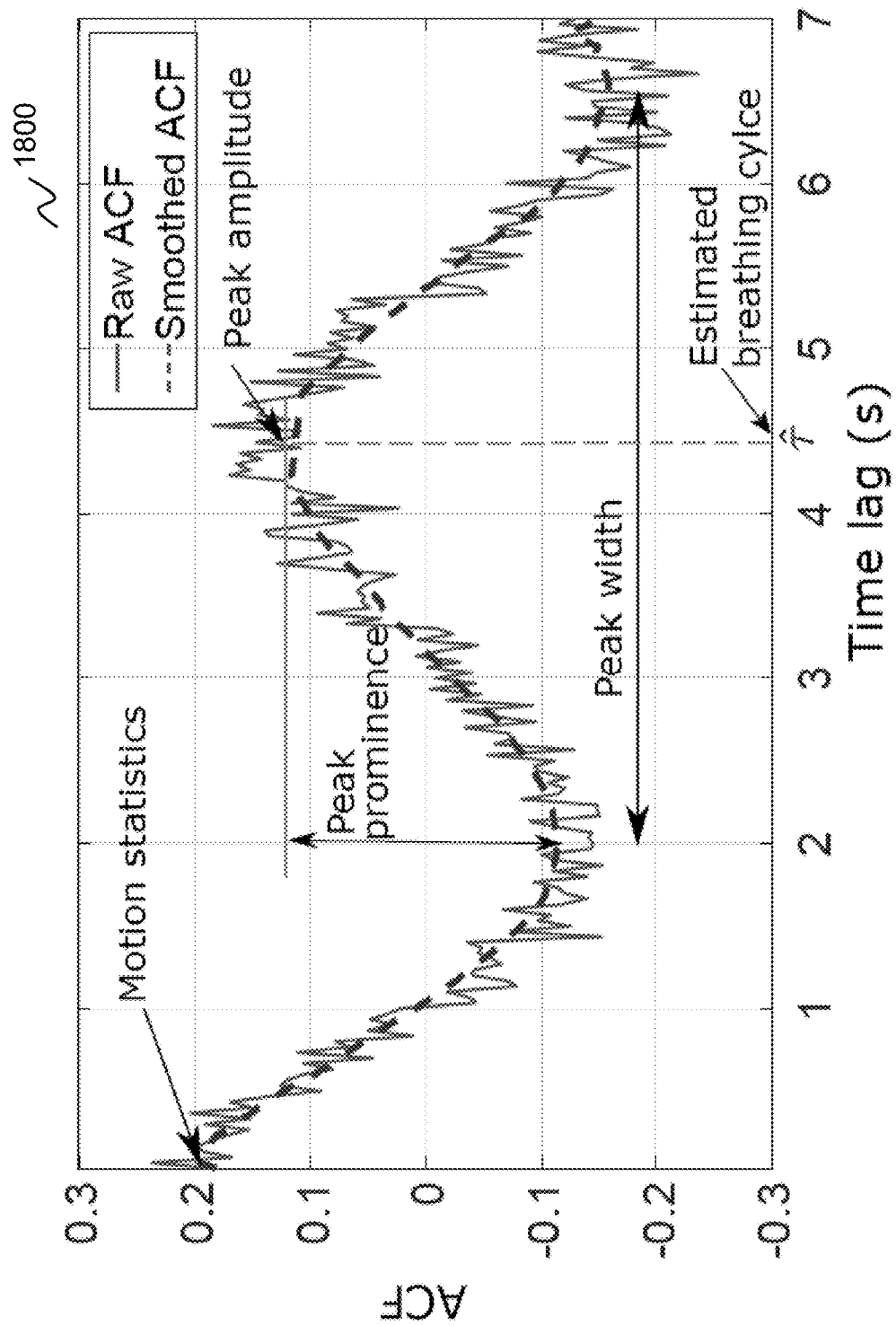
FIG. 18 illustrates exemplary features extracted from the derived autocorrelation functions for breathing detection and estimation, according to one embodiment of the present teaching.

Breathing Detection and Estimation. Based on the calculated ACF and its inherent characteristics, SMARS first detects the presence and absence of breathing and, if presented, then estimates the breathing rate, accurately and instantaneously. As shown in FIG. 18, for a subcarrier with frequency f, one can extract a total of five features from $\hat{\rho}\_G(\tau,f)$ for breathing detection, in addition to the motion statistics: 1. Peak prominence: the vertical distance between the peak value and the largest height of the adjacent valleys, which measures the likelihood of the existence of the peak; 2. Peak width: the horizontal distance between the two adjacent valleys, which also measures the likelihood of the existence of the peak; 3. Peak amplitude: the height of the peak, which measures the amplitude of the ACF of the breathing signal and will be comparable to the value of motion statistic in presence of only breathing motion; 4. Motion interference ratio: the ratio between the motion statistics and peak amplitude, which measures degree of the interference of the non-breathing motion, such as body movements, walking, standing up, typing keyboard, etc., in the environment; 5. Peak location: the horizontal distance between the origin and the peak (i.e., time lags), which measures the breathing cycle.

Sleep Stage Recognition

SMARS divides the continuous motion and breathing estimates of overnight sleep into 300-second epochs. For each epoch, SMARS recognizes three different sleep stages, i.e., wake, REM sleep and NREM sleep. The staging is performed in two steps: First, SMARS differentiates wake from sleep mainly by body motions; Second, REM and NREM stages are further identified during sleep period.

Sleep/Wake Detection.

SMARS first implements a sleep-wake detector to identify the sleep and wake states. The key insight is that, more frequent body movements will be observed when a subject is awake, while mainly breathing motion presents when he/she is asleep. Since bodily movements are significantly stronger than breathing motions, and both of them can be easily captured and quantified by the motion statistic defined herein, SMARS utilizes it to distinguish between sleep and wake states.

Figure 19A:
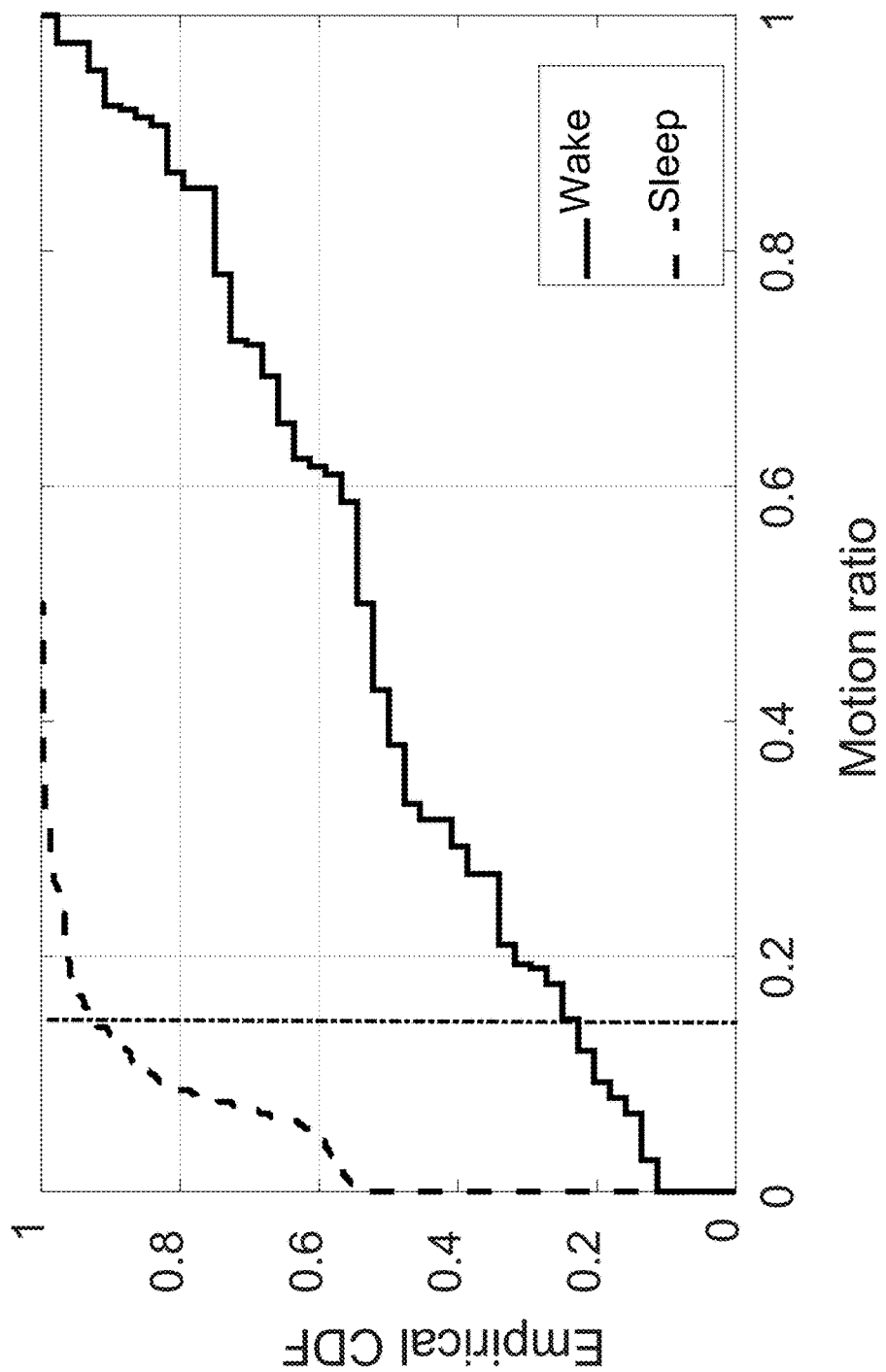
FIG. 19A and FIG. 19B illustrate comparison results between a wake state and a sleep state, according to one embodiment of the present teaching.
Figure 19B:
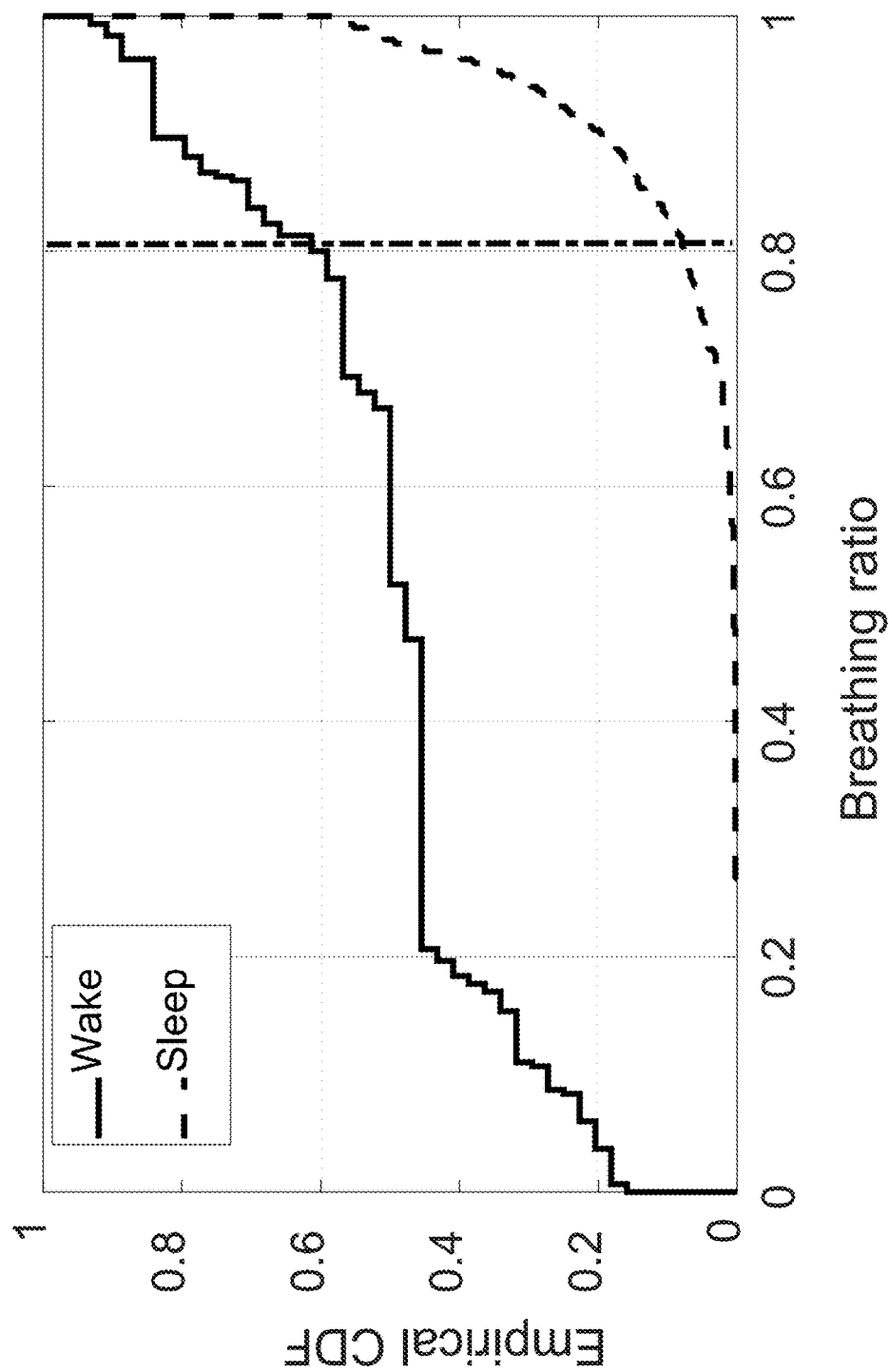

Specifically, one can define motion ratio as the percentage of time when the motion statistic, $\hat{\rho}_b(1/F_s)$, is larger than a preset threshold. Thus for the wake state, a higher motion ratio is expected, as shown in FIG. 19A. Similarly, one can also define breathing ratio as the percentage of time when the breathing signal is detected. Since bodily movements destroy the periodicity of the environmental dynamics, the breathing ratio will be lower when a subject is awake, as shown in FIG. 19B.

Combining the above two features, SMARS identifies an epoch as sleep only when the motion ratio is smaller than the predefined threshold and the breathing ratio is larger than the other threshold. Both thresholds are empirically determined as in FIG. 19A and FIG. 19B. Since the disclosed model statistically considers all multipaths indoors, the values of both thresholds generalize to different environments and subjects.

REM/NREM Recognition.

SMARS exploits the following clinical facts and accordingly extracts two distinctive features from breathing rate estimates for REM/NREM stages classification: Breathing rate is usually faster and presents higher variability and irregular patterns for REM stage, while more stable and slower for NREM stage.

Figure 20A:
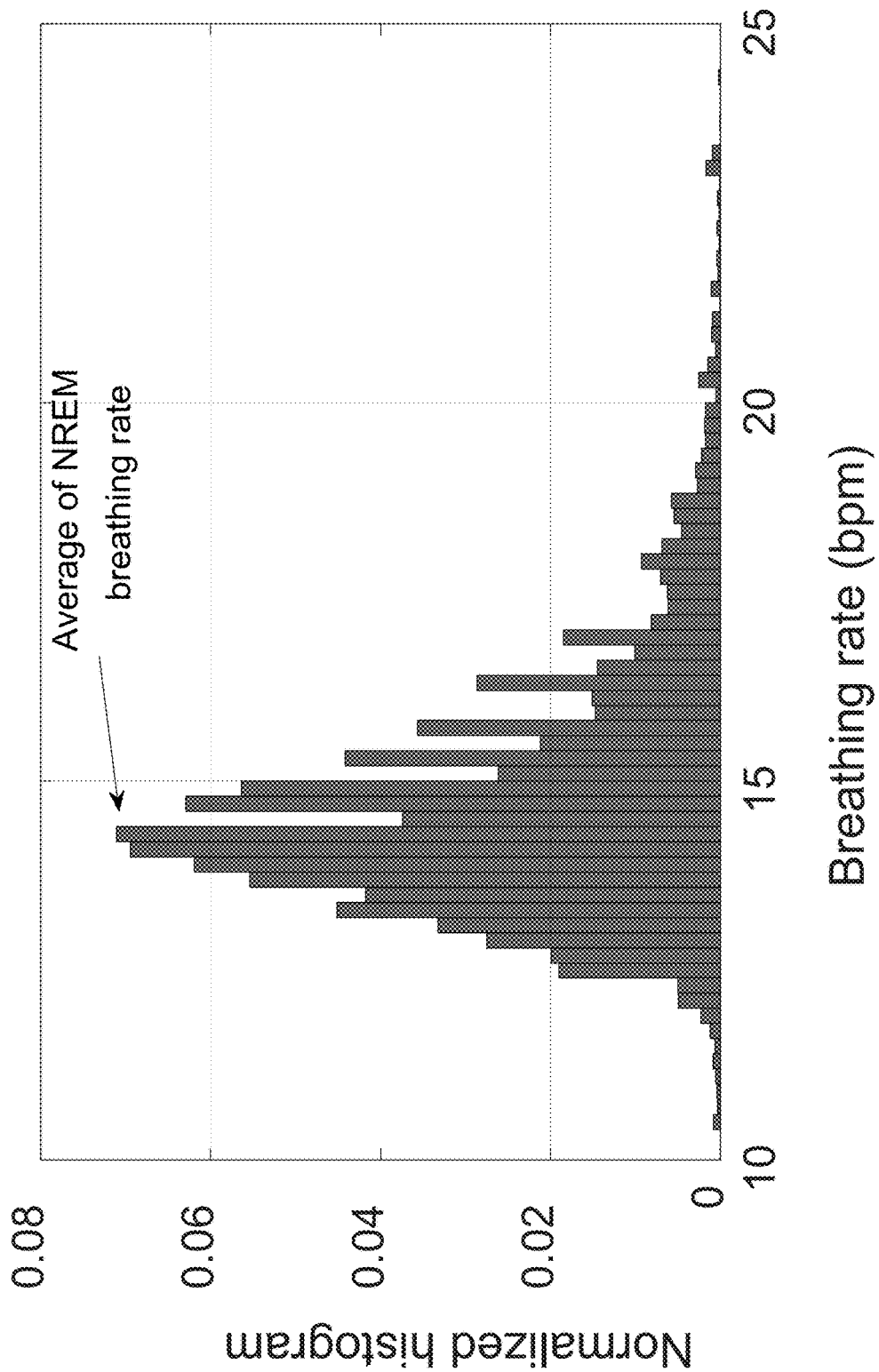
FIG. 20A and FIG. 20B illustrate breathing rate performances of different sleep stages, according to one embodiment of the present teaching.

Since NREM stage constitutes the majority (about 75% to 80%) of total sleep for typical healthy adults, the average breathing rate during NREM stage can be estimated by localizing the peak of the histogram of overnight breathing rate estimates, as shown in FIG. 20A. On this basis, one can define breathing rate deviation, the distance between the estimated average NREM breathing rate and the 90% tile of the breathing rate for each epoch, to quantify the deviation of the breathing rate during REM stage from that during NREM stage.

To extract the variability of the breathing rate for each epoch, one can first estimate the trend of breathing rate by applying a low pass filter to the breathing estimates of the whole night, and obtain the detrended breathing rate estimates by subtracting the trend from the original breathing rate estimates. Then, the breathing rate variability is defined and calculated for each epoch as the variance of the detrended estimates normalized by the length of epoch.

Figure 20B:
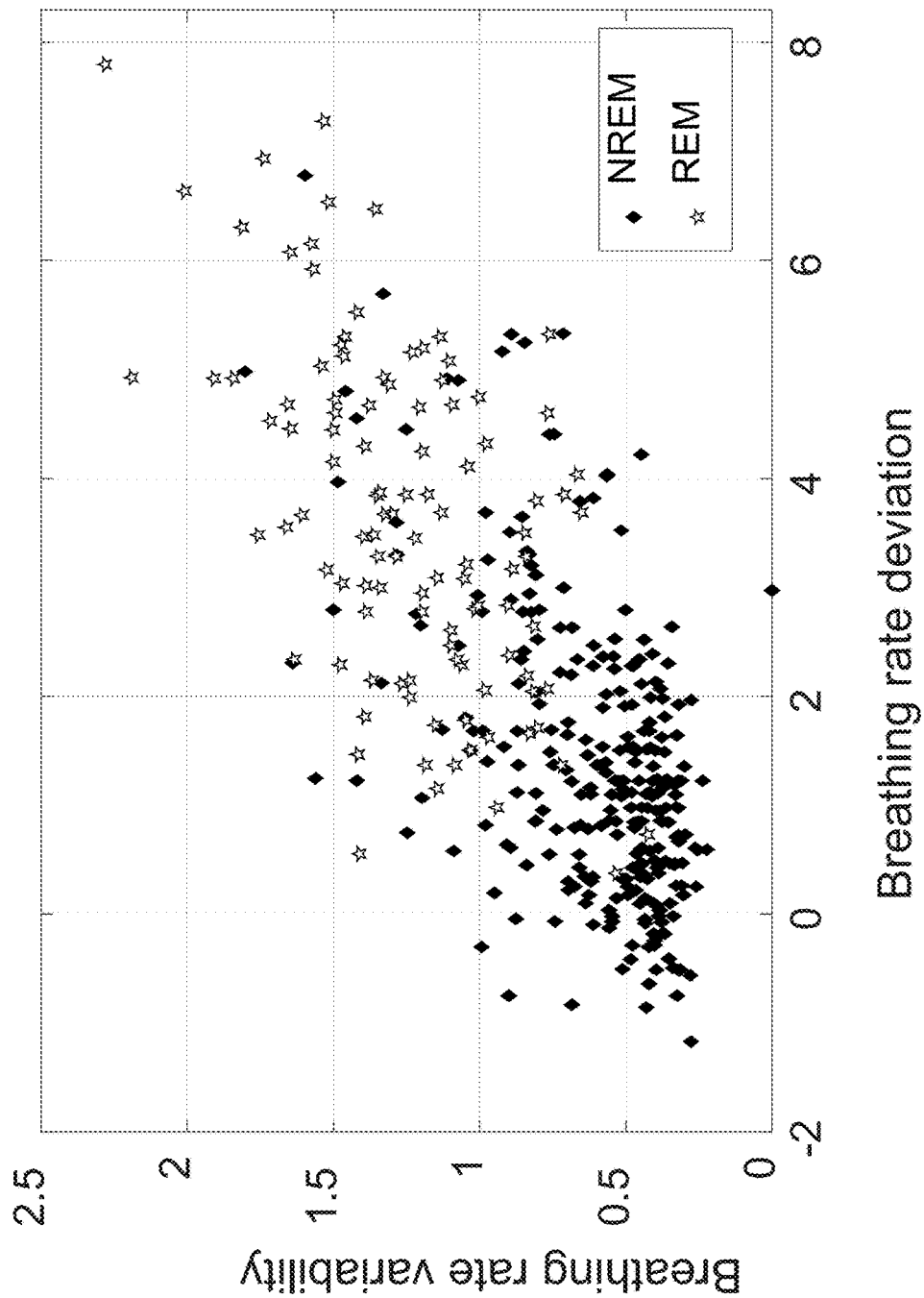

FIG. 20B visualizes the distribution of the proposed two features under NREM and REM sleep, respectively. As one can see from FIG. 20B, the majority of the breathing rate variability and breathing rate deviation of NREM sleep are much smaller than those of REM sleep. Based on these two features, one can train a support vector machine (SVM), a widely used binary classifier, to differentiate between REM and NREM sleep.

Sleep Quality Assessment

When one obtains the estimates of wake, REM, and NREM stages of a whole sleep, one can assess the elusive sleep quality for a user by following standard approach used in clinical practice. In particular, one can calculate the sleep score for each night based on the recognized sleep stages as follows. Let $T_N$, $T_R$ and $T_W$ denote the durations (measured in hours) of NREM sleep, REM sleep and wake, respectively. Since there is no standard formula for sleep score calculation, a simple formula for the sleep score is applied in SMARS:

$$S=10*T_N+20*T_R-10*T_W,$$

which means that the more you sleep, the more you have REM sleep, the less you keep awake in the bed, the better your sleep score is. According to recent research, REM sleep is crucial for mental recovery, and thus a higher weight has been assigned to REM sleep.

Figure 21:
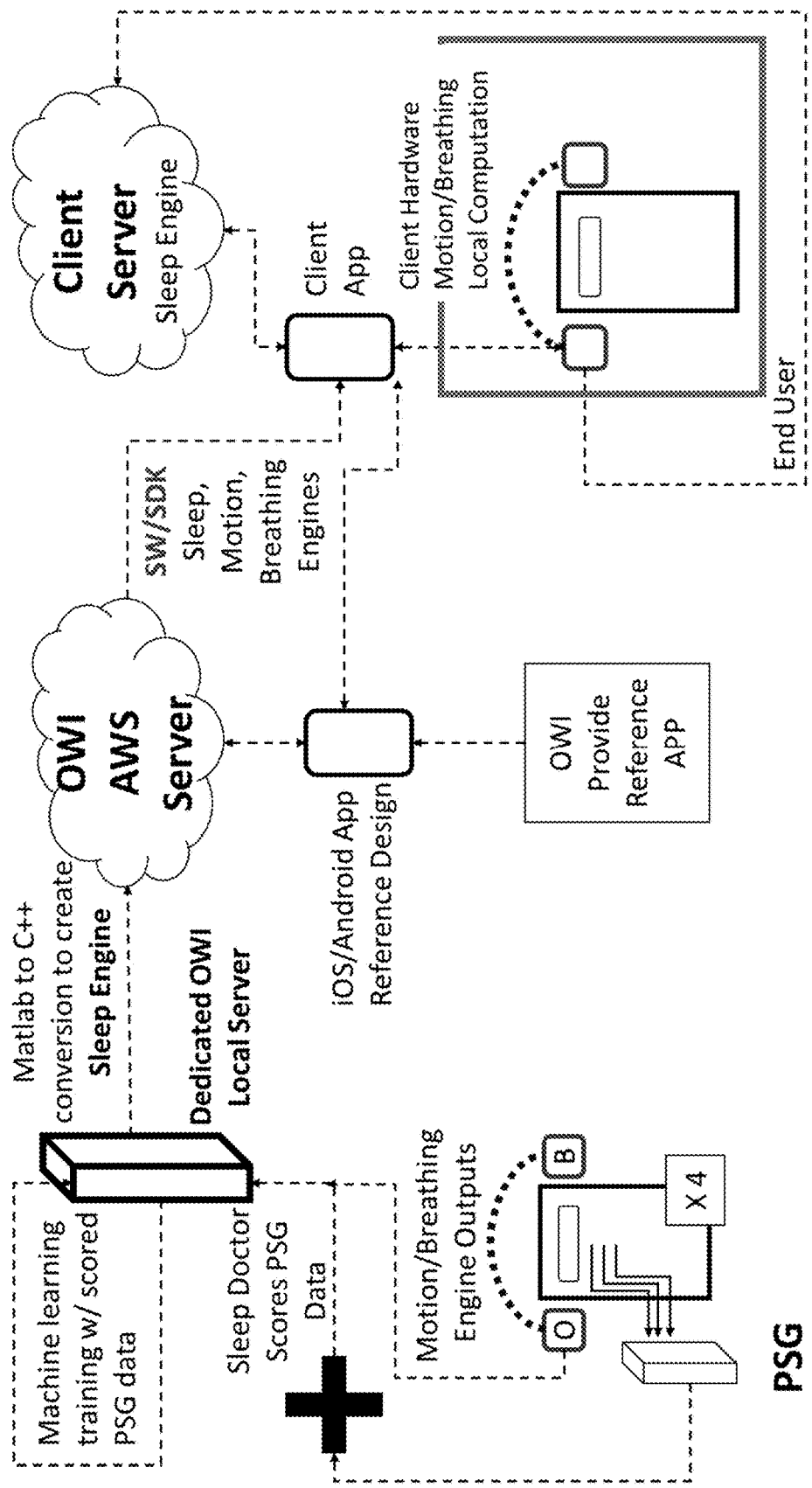
FIG. 21 illustrates an exemplary network environment for sleep monitoring, according to one embodiment of the present teaching.
Figure 22:
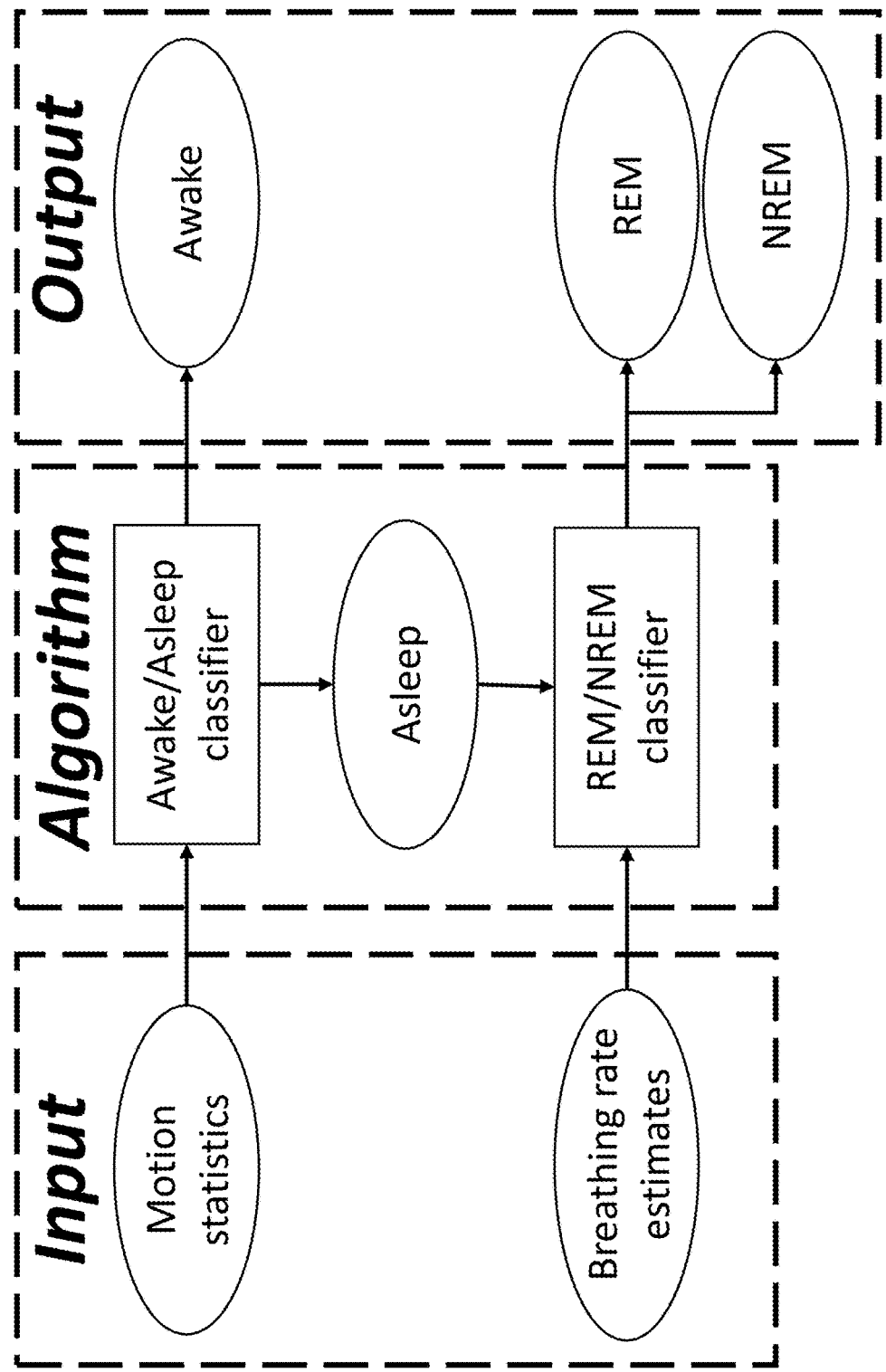
FIG. 22 illustrates an exemplary algorithm design for sleep monitoring, according to one embodiment of the present teaching.

SMARS envisions a practical sleep monitoring for daily in-home use. Although it does not make much sense to compare the sleep score among different users, the trend or history of the sleep score for a particular user would reflect the changes of his/her sleep quality. Such results provide clinically meaningful evidences to help diagnose sleep disorders and manage personal health, in an attractive way. FIG. 21 illustrates an exemplary network environment for sleep monitoring, according to one embodiment of the present teaching. FIG. 22 illustrates an exemplary algorithm design for sleep monitoring, according to one embodiment of the present teaching.

In one embodiment, the disclosed system can detect and monitor a fall-down action based on an active monitoring and/or a passive monitoring. The system may include a Type 1 device which is a Bot including a transmitter, a Type 2 device which is an Origin including a receiver. The transmitter transmits a wireless signal, e.g. a series of probing signal at 1500 Hz sounding rate, to the receiver. The receiver can extract a time series of CSI from the wireless signal. As a fall-down happens very fast, typically in 0.5 to 1.0 sec, a high sounding rate (e.g. 1500 Hz) may be needed to capture the details of the fall. The (overlapping) analysis window should be short (e.g. 0.1 s) as well.

For an active monitoring, one of the transmitter and the receiver is stationary or fixed. The other one is carried by a person to monitor human movement. This is similar to Google map running on smart phone while a user drives in a car to monitor human/car movement. This monitoring is "active" because one of the transmitter and the receiver is moving with the moving object. A preferred set up is for the transmitter to be fixed and broadcast to all receivers in the system, which is called the "satellite mode."

For a passive monitoring, both the transmitter and the receiver are stationary or fixed while the human (moving object) moves around. This monitoring is "passive" because neither the transmitter nor the receiver is moving with the moving object.

In one embodiment, a fall-down detection algorithm may comprise two steps. An instantaneous speed is computed in a first step, while the speed is analyzed in a second step to detect the fall-down event.

In the first step, the time series of CSI is partitioned into overlapping short analysis windows or observation windows. In one example of implementation, a formula is used to compute the window width (e.g. 0.12s). Each CSI has N frequency components (N~=128). For each component, the magnitude square is computed and the autocorrelation function of that component is computed within the analysis window. Then the first local maximum of the autocorrelation function is identified. The instantaneous speed of the moving object is computed based on the time associated with the first local maximum.

In the second step, the fall-down is characterized by a special "signature" of speed profile. When a person falls, it accelerates due to gravity at about 9.8 m/s/s. Then it comes to an abrupt stop (quick deceleration). Thus one can use another analysis window (e.g. 0.5s) for the speed. Within the window, one can compute (a) maximum change in acceleration, and (b) maximum speed during period of maximum change of acceleration. When (a) is greater than a threshold and (b) is greater than another threshold, the system can determine that a fall-down is detected.

In one embodiment, the transient motion is part of a series of repeated gait cycles of the object. To compute the gait cycle, the second step in the above algorithm may be amended to perform: finding local maximum and local minimum of the speed. One gait (e.g. walking) cycle can be from one maximum to the next maximum, or from one minimum to the next minimum. The duration of the cycle may be found by computing the difference of the time stamps. Such duration from multiple cycles may be averaged to improve accuracy.

In another embodiment, the second step can be replaced by the following three operations (2a), (2b), (2c). At operation (2a), based on the speed computed in the first step, the system computes acceleration (e.g. derivative of speed, or slope of speed). The system gathers speed and acceleration for a short period of time (e.g. 5 seconds) to form a "current speed profile" and "current acceleration profile". Both profiles have the same time duration and are synchronized. At operation (2b), in a training phase, it obtains a "reference speed profile" and a "reference acceleration profile" of fall-down. Both profiles have same time duration (different from that of current profiles). At operation (2c), the system compares a distance between the current speed profile/acceleration profile with reference speed profile/acceleration profile. As the current profiles and reference profiles have difference time durations, an algorithm may be used to establish a non-linear mapping of the two time axis so that a distance can be computed between the current profiles and reference profiles. The system detects a fall-down when the distance after being processed is less than a threshold. A matching score between two profiles may be normalized by the window length so that the same threshold can be used for different window lengths.

In one example, the system can compute the template or reference profile as below. When the target event is a fall-down, in the training stage, multiple people (adult, children, older adult, male, female, fat, thin, big, small) may be asked to fall repeatedly in many different ways (e.g. drop from bed, drop from chair, slip, collision and fall, fall down staircase, thick clothing, thin clothing, clothing with metallic elements, heavy luggage, grocery, etc.), at many different locations of a house (e.g. carpet floor, hardwood floor, tile floor, kitchen, rest room, garage, living room, dining room, bedroom, hallway, stairs, basement, upstairs, downstairs, etc.), and in many different houses (single family house, town house, apartment, different layout, big office building, big university lecture hall, gym, etc.). Each fall-down generates one time series of training CI. The same algorithm used to compute the current profile can be used in the computation of the template/reference profile, and be applied to at least two windows of training IQ, each associated with a time series of training CI.

Figure 23:
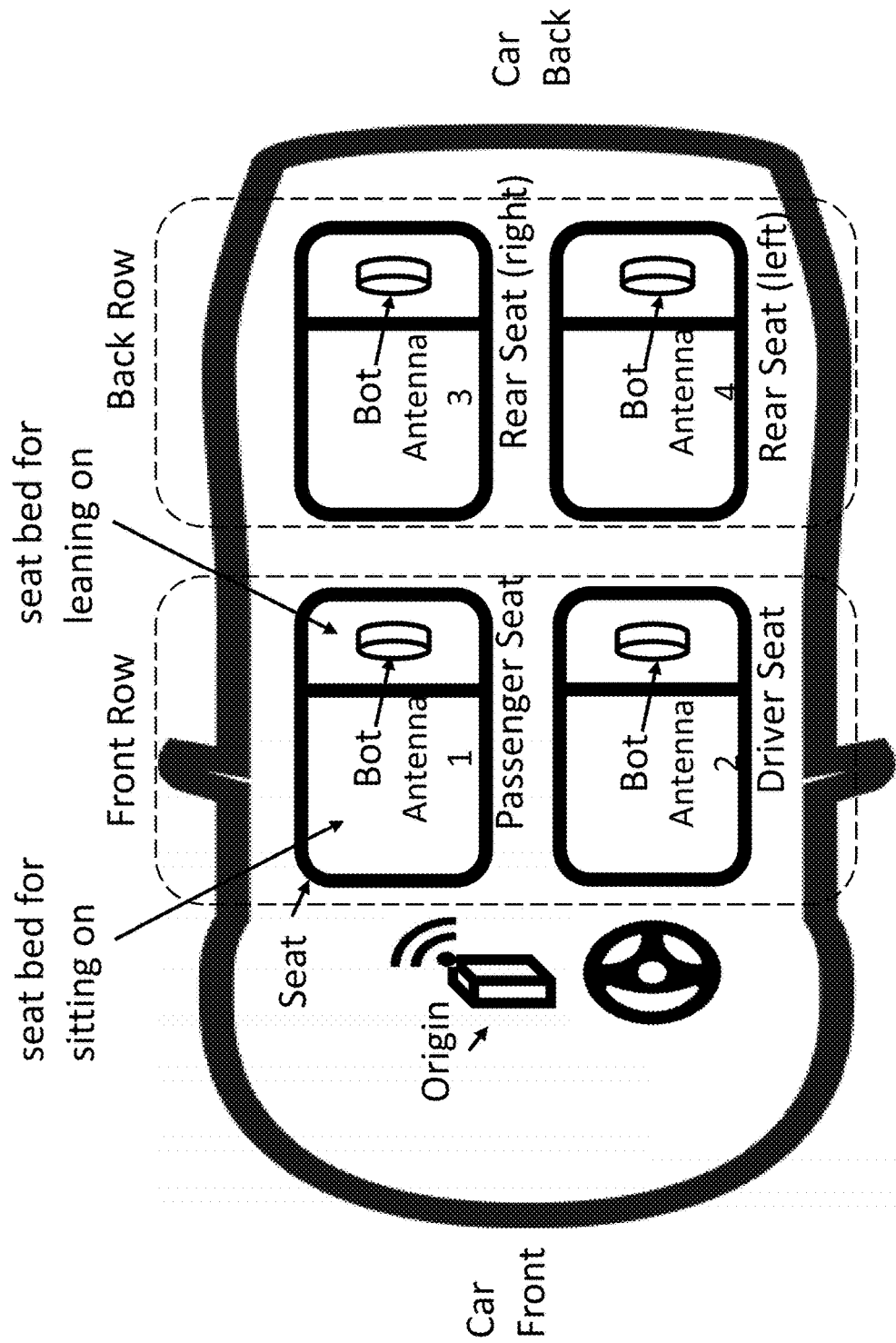
FIG. 23 illustrates an exemplary interior bird-view of a car for seat occupancy detection and people counting, according to one embodiment of the present teaching.

FIG. 23 illustrates an exemplary interior bird-view of a car for seat occupancy detection and people counting, according to one embodiment of the present teaching. In an example, one or more Type 1 devices and multiple Type 2 devices (e.g. N=4) may be placed in a confined area (e.g. closed area such as a car, a conference room, a bus, an airplane, or a cinema, semi-open area such as a bus with windows open, or a balcony with 8 outdoor chairs around an outdoor table) with multiple "seats" at fixed locations (may be a space for standing, sitting, kneeling, lying down, etc.) that may hold a person. A presence of a person at one or more "seats" may be detected based on time series of CI extracted from wireless signals sent from the Type 1 devices to the Type 2 devices.

FIG. 23 shows a particular example of a car with 4 seats, two in front row and two in back row. Note that each seat has a "seat bed" for a person to sit on and a "seat back" for a person to lean back on. The Type 1 device may be placed in the front, on the dash board. Four Type 2 devices may be deployed, one at each of the 4 seats (e.g. in/on/under the seat bed, or in/on/under the seat bed). When a seat A (e.g. driver seat, or right seat on front row, or back row left seat, etc.) is occupied by the driver or a passenger or a baby in a car-seat, the CI (channel information) associated with the occupied seat A may behave differently (e.g. become smaller or bigger) from the CI associated with an empty seat A. Thus one can detect the seat occupancy of each seat by examining the CI. By performing such test for all the seats, one can count the amount of people in the car. If a person sits at non-standard locations (e.g. between two seats, in the center of back row, in the center of front row, or a baby in a car seat), CI associated multiple Type 2 devices can be analyzed jointly to determine if there is a person there. As signature of a baby in car-seat may be different from an adult or a children, adult/children/baby classification may be performed based on the CI.

A task may be performed based on the seat occupancy described above. For example, the task may be to arm an air-bag if a seat is occupied, but disarm the airbag if the seat is not occupied. If a small size person (e.g. a child) instead of a regular-size adult is detected, an air-bag designed for adults may not be armed. The heating/air-condition setting may be adjusted. The task may be to control windows, lighting, audio system, entertainment system (e.g. video), noise cancelling, shock-absorbing system, stabilizing size, car avoidance system, safety features, tire pressure, any other car subsystems, etc. For example, if a passenger is detected at the front right seat, the temperature at that region (front, right) may be controlled to a preset level. If the seat is empty, the temperature may be adjusted differently.

Figure 24A:
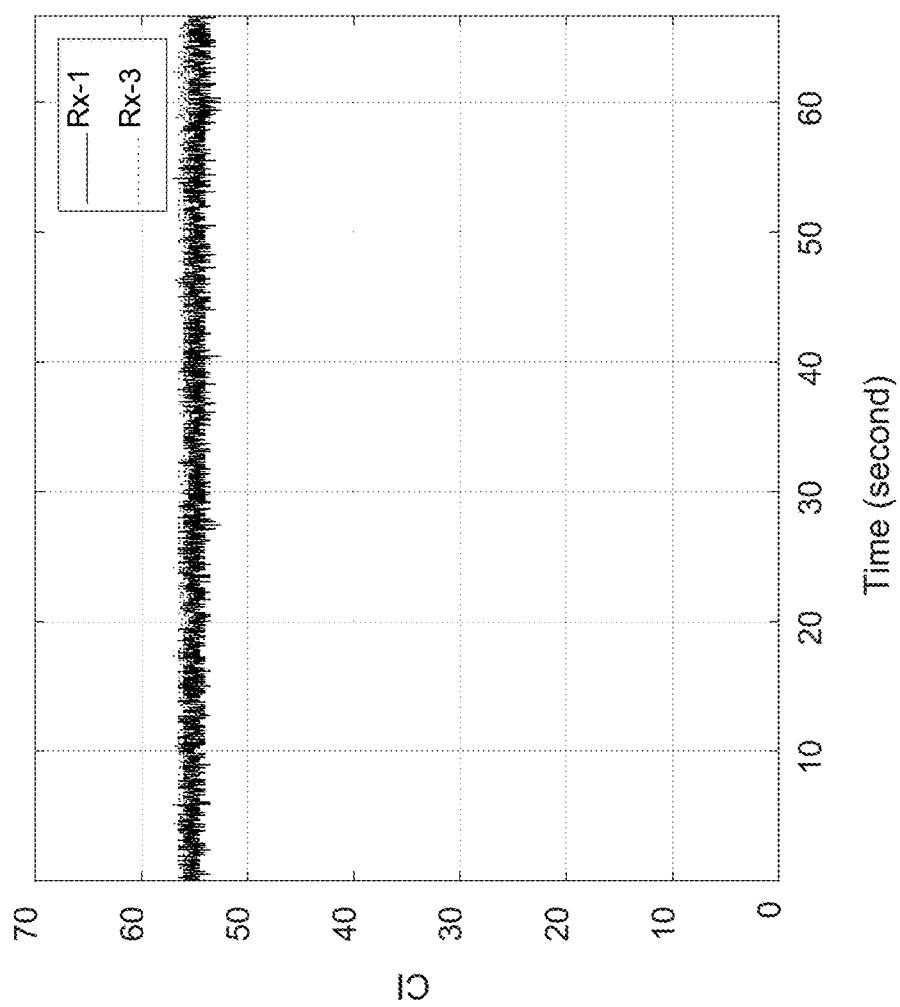
FIGS. 24A-24D illustrate changes of channel information according to various seat occupancy situations in a car, according to one embodiment of the present teaching.
Figure 24B:
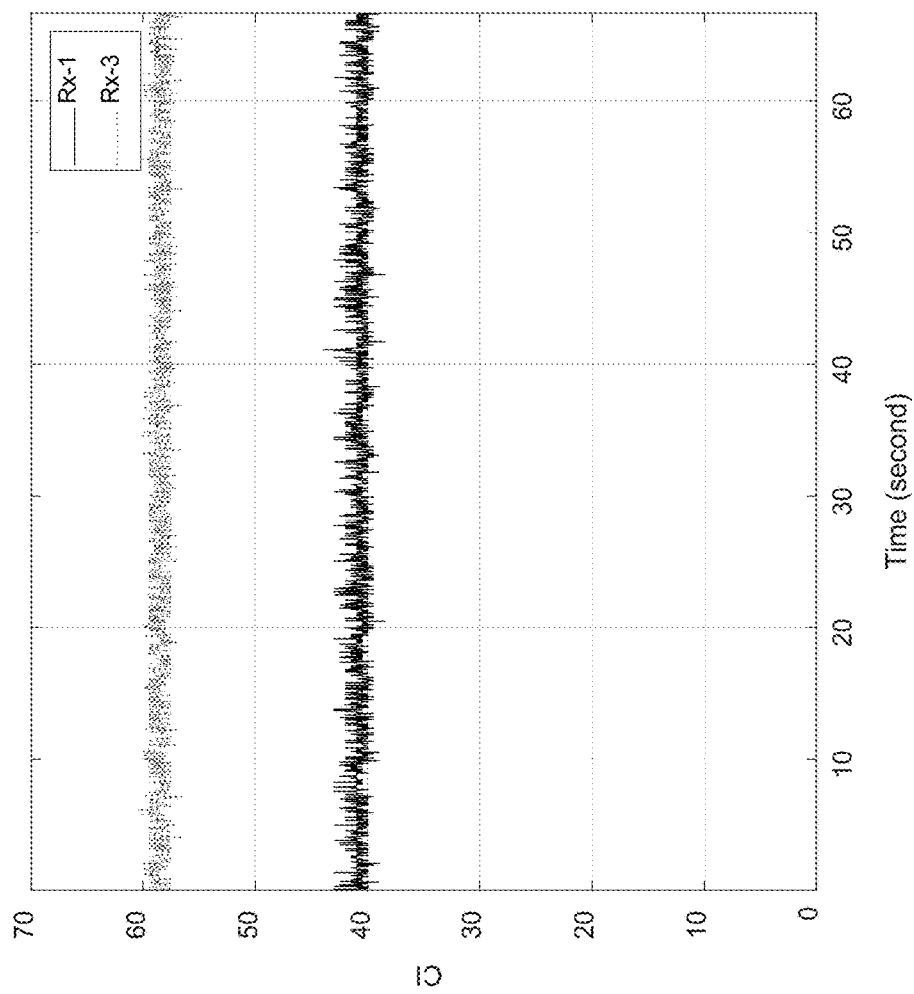
Figure 24C:
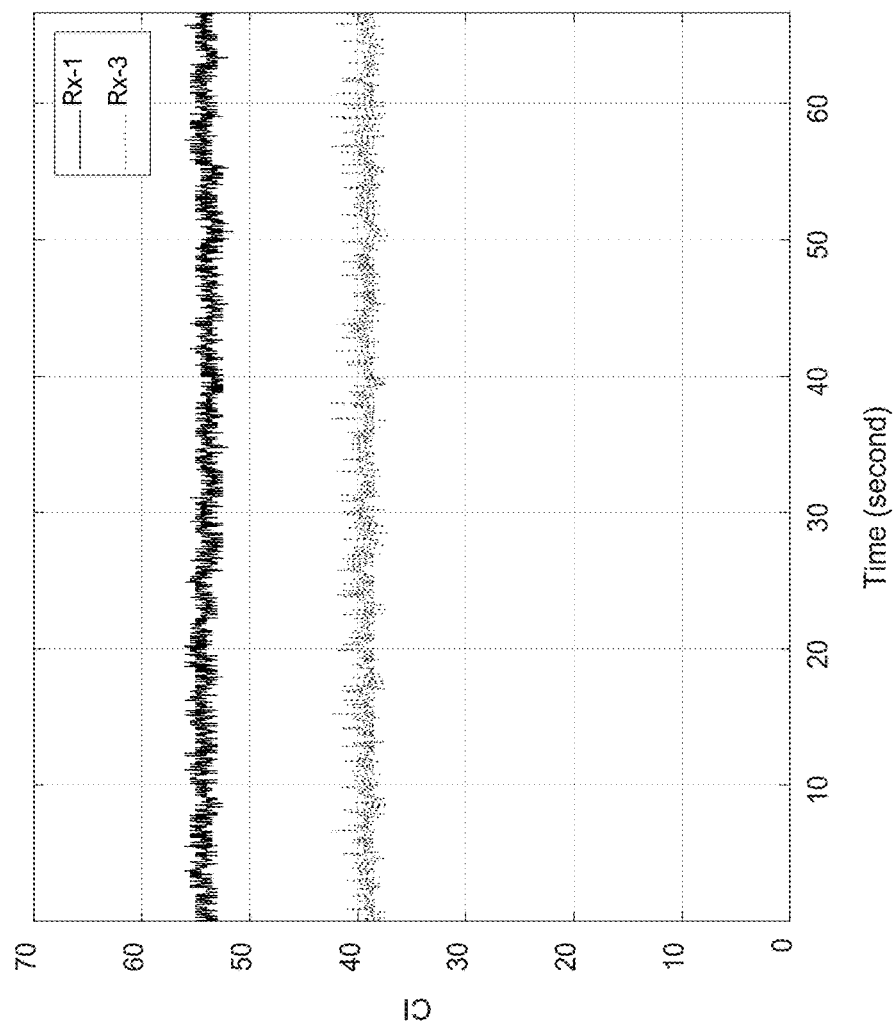
Figure 24D:
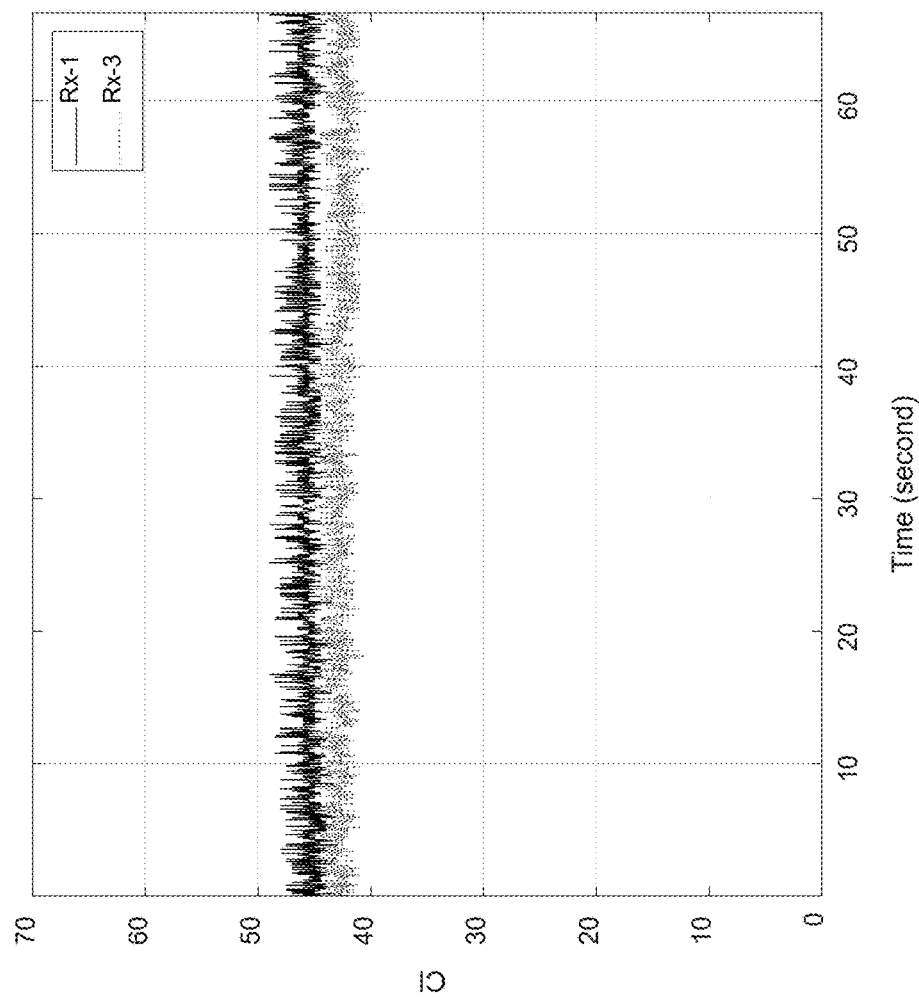

FIGS. 24A-24D illustrate changes of channel information (CI) according to various seat occupancy situations in a car, according to one embodiment of the present teaching. FIG. 24A shows CI when no seat is occupied. FIG. 24B shows CI when seat 1 (e.g. seat with Bot antenna 1 in FIG. 23) is occupied. FIG. 24C shows CI when seat 3 (e.g. seat with Bot antenna 3 in FIG. 23) is occupied. FIG. 24D shows CI when both seat 1 and seat 3 are occupied.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A system having a processor, a memory communicatively coupled with the processor and a set of instructions stored in the memory for monitoring a transient motion in a venue, comprising:
    a transmitter located at a first position in the venue and configured for transmitting a wireless signal through a wireless multipath channel impacted by the transient motion of an object in the venue;
    a receiver located at a second position in the venue and configured for:
        receiving the wireless signal through the wireless multipath channel impacted by the transient motion of the object in the venue, and
        obtaining a time series of channel information (CI) of the wireless multipath channel based on the wireless signal; and
    a transient motion monitor configured for:
        monitoring the transient motion of the object based on the time series of CI, and
        triggering a response action based on the monitored transient motion of the object.

2. The system of claim 1, wherein the transient motion monitor is further configured for:
    determining a sliding time window having a duration comparable to the transient motion of the object; and
    computing an intermediate quantity (IQ) based on CI of the time series in the sliding time window, wherein the transient motion of the object is monitored based on the IQ.

3. The system of claim 2, wherein computing the IQ based on the CI comprises:
    computing an auto function (AF) based on the CI of the time series in the sliding time window;
    computing an IQ-related feature of the AF; and
    computing the IQ based on the IQ-related feature of the AF, wherein the AF comprises at least one of: auto-correlation function, auto-covariance function, cross-correlation function, cross-covariance function, differential function, differential auto-correlation, differential auto-covariance, differential cross-correlation, differential cross-covariance, a frequency transform, frequency spectrum, and a power spectral density.

4. The system of claim 3, wherein computing the AF comprises:
    transforming each CI of the time series in the sliding time window; and
    computing the AF of each transformed CI in the sliding time window, wherein transforming each CI comprises performing at least one of the following on the CI:
        a scalar operation, a magnitude, a phase, a nonlinear map, a linear map, a piecewise linear map, a function, a linear function, a nonlinear function, a piecewise linear function, a real function, a complex function, a vector-valued function, an inverse function, a derivative of a function, an integration of a function, a function of another function, a one-to-one function, a one-to-many function, a many-to-one function, a many-to-many function, a logarithmic function, an exponential function, a trigonometric function, a circular function, an algebraic function, a transcendental function, a power function, a root function, a polynomial, a square, a cube, a sine, a cosine, a tangent, a cotangent, a secant, a cosecant, an elliptical function, a parabolic function, a hyperbolic function, a gamma function, a zeta function, an absolute value, a thresholding, a quantization, a piecewise constant function, a piecewise linear function, a table look-up,
        a set operation, a histogram, a combination, a permutation, a subset, an inclusion, a logical operation, an OR, an ADD, an XOR, a union, an intersection, a set difference, a symmetric difference a Cartesian product, a power set, a cardinality, an average, a weighted average, a mean, a variance, a range, a trimmed mean, a statistics, a percentile,
        a vector operation, a norm, a metric, a vector addition, a vector subtraction, a vector multiplication, a vector division, a dot product, an inner product, an outer product, an arithmetic operation, a mathematical operation, a subspace, a projection, a decomposition, a vector transformation, a change of basis, a rotation, a translation, a vector function, a projection, a principal component, a kernel principal component, an independent component, a neighborhood component, a connected component,
        a linear transform, a nonlinear transform, Fourier transform, Laplace transform, Hilbert transform, Sine transform, Cosine transform, Wavelet transform, Hadamard transform, Slant transform, Fast Fourier transform (FFT), discrete cosine transform (DCT), frequency transform, frequency decomposition, inverse transform, time transform, time decomposition, a frequency, a spectrum, a period, a time,
        a matrix operation, a rank, a transpose, a determinant, a matrix addition, a matrix subtraction, a matrix multiplication, a matrix division, a matrix inverse, a basis vector, a basis, an eigenvalue, and an eigenvector.

5. The system of claim 3, wherein:
    each CI has at least one component; and
    computing the AF comprises:
        transforming each of the at least one component of each CI of the time series in the sliding time window,
        computing, for each component, a component auto function (CAF) based on the corresponding transformed component of each CI of the time series in the sliding time window, and computing the AF by aggregating the at least one CAF associated with the at least one component based on weighted averaging.

6. The system of claim 3, wherein computing the IQ-related feature of the AF comprises:
determining a presence of a class of features comprising the IQ-related feature in the AF in a window of argument of the AF; and
computing the IQ-related feature of the AF in the window of argument of the AF, wherein determining the presence of the class of features in the window of argument of the AF comprises:
computing a first regression of the AF in the window of argument of the AF and a first regression error corresponding to the first regression,
computing a second regression of the AF in the window of argument of the AF and a second regression error corresponding to the second regression,
computing a function of the first regression error and the second regression error, and
determining the presence of the class of features in the AF by comparing the function with a threshold, wherein the IQ-related feature in the AF comprises at least one of the following of the AF: a maximum, a minimum, a constrained maximum, a constrained minimum, a local maximum, a local minimum, a first local maximum, a first local minimum, a k-th local maximum, a k-th local minimum, an average, a weighted average, a percentile, a mean, a median, a mode, a trimmed mean, a conditional mean, and an argument associated with another quantity.

7. The system of claim 3, wherein computing the IQ based on the IQ-related feature of the AF comprises:
determining an IQ-related argument of the AF in a window of argument of the AF corresponding to the IQ-related feature; and
computing the IQ based on at least one of: the IQ-related feature, the IQ-related argument, and the window of argument of the AF.

8. The system of claim 2, wherein the transient motion monitor is further configured for:
computing at least one feature of the IQ, wherein the transient motion of the object is monitored based on the at least one feature of the IQ, and wherein the at least one feature comprises at least one of: an IQ within an analysis time window, a maximum, a minimum, a local maximum, a local minimum, an IQ within a target range, a thresholding, an incremental change, a rate of change, a first derivative, a second derivative, a higher order derivative, a mean, a median, a mode, a variance, a total variation, a filtered IQ, a lowpass filtered IQ, a highpass filtered IQ, a nonlinear filtered IQ, a transformed IQ, and a function of IQ.

9. The system of claim 2, wherein the transient motion monitor is further configured for:
comparing a feature of the IQ with a threshold; and
detecting the transient motion of the object when the feature of IQ is larger than the threshold, wherein the response action is triggered based on the detected transient motion of the object.

10. The system of claim 2, wherein the transient motion monitor is further configured for:
determining that a first significant fraction of IQ in an observation time window are within a first target range, and a second significant fraction of changing rate of IQ in the observation time window are within a second target range, wherein:

the transient motion is part of a series of repeated gait cycles of the object,
each of the observation time window, the first target range and the second target range is related to the repeated gait cycles of the object,
the transient motion of the object is monitored by analyzing the IQ in the observation time window and estimating an information of the repeated gait cycles of the object based on the IQ in the observation time window, and
the information comprises at least one of: a cycle duration, a cycle period, a cycle frequency, a gait intensity, a stage of a gait cycle, a gait start time, a gait stop time, a time trend of the gait cycles, a classification of the gait, a behavior associated with the gait, an activity associated with the gait, a meaning associated with the gait, a state of the object associated with the gait, a change in gait, a normal gait, a deviation from normal gait, and another gait with a characteristics different from the repeated gait cycles.

11. The system of claim 10, wherein analyzing the IQ in the observation time window comprises:
identifying at least one of the following characteristic IQ features: a significant feature of IQ, a feature of IQ in a target range, an IQ with a magnitude in a target IQ range, a local mean of IQ, a local variance of IQ, a local behavior of IQ, a local statistics of IQ, a global statistics of IQ, a global behavior of IQ, a local maximum IQ, a local minimum IQ, a zero-crossing of IQ, a zero-crossing of mean-subtracted IQ, a pair of adjacent local maximum IQ and local minimum IQ, time stamp associated with an identified characteristic IQ feature, a window of IQ that match a training pattern; and
computing the information based on the identified at least one characteristic IQ feature.

12. The system of claim 2, wherein the transient motion monitor is further configured for:
determining a first analysis time window of a first window length comprising at least one first time stamp, wherein each of the at least one first time stamp is associated with a respective sliding time window;
computing at least one first intermediate quantity (IQ) each associated with a respective first time stamp in the first analysis time window based on CI of the time series in the respective sliding time window;
comparing the at least one first IQ in the first analysis time window with at least one second IQ in a second analysis time window of a second window length, wherein each of the at least one second IQ is associated with a respective second time stamp in the second analysis time window;
computing a first nonlinear mapping between the at least one first time stamp in the first analysis time window and the at least one second time stamp in the second analysis time window based on the at least one first IQ in the first analysis time window and the at least one second IQ in the second analysis time window;
computing a first matching score between the at least one first IQ in the first analysis time window and the at least one second IQ in the second analysis time window based on the first nonlinear mapping;
monitoring the transient motion of the object based on the first matching score; and
detecting the transient motion of the object when the first matching score is less than or equal to a threshold.

13. The system of claim 12, wherein the transient motion monitor is further configured for:
  computing a second nonlinear mapping between the at least one first time stamp in the first analysis time window and at least one third time stamp in a third analysis time window based on the at least one first IQ in the first analysis time window and at least one third IQ in the third analysis time window, wherein each of the at least one third IQ is associated with one of the at least one third time stamp in the third analysis time window;
  computing a second matching score between the at least one first IQ in the first analysis time window and the at least one third IQ in the third analysis time window based on the second nonlinear mapping;
  comparing the first matching score and the second matching score to generate a comparison result; and
  identifying, based on the comparison result, the transient motion of the object as one of: a first reference motion and a second reference motion, wherein the first reference motion is associated with the at least one second IQ in the second analysis time window, and wherein the second reference motion is associated with the at least one third IQ in the third analysis time window.

14. The system of claim 12, further comprising at least one heterogeneous transmitter and at least one heterogeneous receiver for obtaining at least one time series of training channel information (CI) in a training stage, wherein:
  each of the at least one heterogeneous transmitter is located in a respective training venue and configured for transmitting a respective wireless signal through the wireless multipath channel impacted by a respective training transient motion of a respective training object in the respective training venue in the training stage;
  each of the at least one heterogeneous receiver is located in the respective training venue and configured for:
    receiving the respective wireless signal through the wireless multipath channel, and
    obtaining a respective time series of training CI of the wireless multipath channel based on the respective wireless signal, wherein a respective time window of the respective time series of training CI is associated with the respective training transient motion; and
  the transient motion monitor is further configured for:
    computing at least one training IQ each associated with a respective time stamp in the respective time window, based on training CI of the respective time series in a sliding time window associated with the respective time stamp, and
    computing the at least one second IQ in the second analysis time window of the second window length, based on the at least one training IQ associated with each of the at least one time series of training CI.

15. The system of claim 12, wherein the transient motion monitor is further configured for:
  computing a third nonlinear mapping between time stamps of a first time window and time stamps of a second time window, based on at least one first training IQ in the first time window associated with a first time series of training CI and at least one second training IQ in the second time window associated with a second time series of training CI;
  computing, based on the third nonlinear mapping, a third matching score between the at least one first training IQ in the first time window and the at least one second training IQ in the second time window; and
  computing the at least one second IQ in the second analysis time window of the second window length, based on at least one of: the third matching score, the third nonlinear mapping, the at least one first training IQ and the at least one second training IQ.

16. The system of claim 2, wherein the transient motion monitor is further configured for:
  determining a first analysis time window of a first window length comprising at least one first time stamp, wherein each of the at least one first time stamp is associated with a respective sliding time window;
  for each first time stamp in the first analysis time window, computing a set of N first intermediate quantity (IQ) comprising $IQ\_1, IQ\_2, \ldots$, and $IQ\_N$ associated with the first time stamp based on CI of the time series in the respective sliding time window associated with the time stamp, wherein N is greater than 1;
  comparing the set of N first IQ associated with each first time stamp in the first analysis time window with a set of N second IQ associated with one of at least one second time stamp in a second analysis time window of a second window length;
  computing a nonlinear mapping between the at least one first time stamp in the first analysis time window and the at least one second time stamp in the second analysis time window based on all first IQ in the first analysis time window and all second IQ in the second analysis time window;
  computing, based on the nonlinear mapping, a matching score between the first IQ in the first analysis time window and the second IQ in the second analysis time window;
  monitoring the transient motion of the object based on the matching score; and
  detecting the transient motion of the object when the matching score is less than or equal to a threshold.

17. The system of claim 1, wherein the response action comprises at least one of:
  presenting a data related to the transient motion of the object, displaying the data visually, playing an audio related to the data, animating the data,
  presenting an alarm, displaying an alarm, sounding an alarm, animating an alarm, sending a message to a designated user, informing emergency service, requesting emergency service, taking corrective measure, taking preventive measure, initiating emergency response procedure, activating counter measure,
  controlling the object, controlling the transient motion of the object, controlling a next motion of the object, controlling a speed of the object, controlling a direction of the object, controlling a gait of the object, controlling a state of the object,
  controlling a second device in response to the transient motion of the object, turning on the second device, turning off the second device, turning off the second device and turning on a third device,
  sending a data to a fourth device, triggering the fourth device to respond collaboratively, presenting the data on the fourth device, displaying the data visually on the fourth device, playing an audio to present the data on the fourth device, and sounding an alarm on the fourth device.

18. The system of claim 1, further comprising:
  an additional receiver configured for:
    receiving the wireless signal through the wireless multipath channel impacted by the transient motion of the object in the venue, and obtaining an additional time series of CI of the wireless multipath channel based on the wireless signal,
wherein the transient motion monitor is further configured for monitoring the transient motion of the object jointly based on the time series of CI and the additional time series of CI.

19. The system of claim 1, further comprising:
an additional transmitter configured for transmitting an additional wireless signal through the wireless multipath channel impacted by the transient motion of the object in the venue,
wherein the receiver is further configured for:
receiving the additional wireless signal through the wireless multipath channel, and
obtaining an additional time series of CI of the wireless multipath channel based on the additional wireless signal,
wherein the transient motion monitor is further configured for monitoring the transient motion of the object jointly based on the time series of CI and the additional time series of CI.

20. The system of claim 1, wherein the transient motion monitor is further configured for computing a location of the transient motion of the object based on at least one of:
a location of the transmitter;
a location of the receiver;
a location of a device that is at least one of:
an additional receiver in the venue for receiving the wireless signal from the transmitter through the wireless multipath channel, and
an additional transmitter in the venue for transmitting an additional wireless signal to the receiver through the wireless multipath channel; and
a joint monitoring of the transient motion of the object based on the time series of CI and at least one of:
an additional time series of CI extracted from the wireless signal received by the additional receiver, and
an additional time series of CI extracted from the additional wireless signal transmitted by the additional transmitter.

21. The system of claim 1, wherein:
the object is a person;
the transient motion represents a fall-down action of the person; and
the transient motion monitor is coupled to at least one of: the transmitter, the receiver, an additional transmitter, an additional receiver, a cloud server, a fog server, a local server, and an edge server.

22. A method implemented on a machine having a processor, a memory communicatively coupled with the processor and a set of instructions stored in the memory for monitoring a transient motion in a venue, comprising:
receiving a wireless signal through a wireless multipath channel impacted by the transient motion of an object in the venue;
obtaining a time series of channel information (CI) of the wireless multipath channel based on the wireless signal;
monitoring the transient motion of the object based on the time series of CI; and
triggering a response action based on the monitored transient motion of the object.

23. The method of claim 22, further comprising:
determining a sliding time window having a duration comparable to the transient motion of the object; and
computing an intermediate quantity (IQ) based on CI of the time series in the sliding time window, wherein the transient motion of the object is monitored based on the IQ.

24. The method of claim 23, wherein computing the IQ based on the CI comprises:
computing an auto function (AF) based on the CI of the time series in the sliding time window;
computing an IQ-related feature of the AF; and
computing the IQ based on the IQ-related feature of the AF, wherein the AF comprises at least one of: auto-correlation function, auto-covariance function, cross-correlation function, cross-covariance function, differential function, differential auto-correlation, differential auto-covariance, differential cross-correlation, differential cross-covariance, a frequency transform, frequency spectrum, and a power spectral density.

25. The method of claim 24, wherein computing the AF comprises:
transforming each CI of the time series in the sliding time window; and
computing the AF of each transformed CI in the sliding time window, wherein transforming each CI comprises performing at least one of the following on the CI:
a scalar operation, a magnitude, a phase, a nonlinear map, a linear map, a piecewise linear map, a function, a linear function, a nonlinear function, a piecewise linear function, a real function, a complex function, a vector-valued function, an inverse function, a derivative of a function, an integration of a function, a function of another function, a one-to-one function, a one-to-many function, a many-to-one function, a many-to-many function, a logarithmic function, an exponential function, a trigonometric function, a circular function, an algebraic function, a transcendental function, a power function, a root function, a polynomial, a square, a cube, a sine, a cosine, a tangent, a cotangent, a secant, a cosecant, an elliptical function, a parabolic function, a hyperbolic function, a gamma function, a zeta function, an absolute value, a thresholding, a quantization, a piecewise constant function, a piecewise linear function, a table look-up,
a set operation, a histogram, a combination, a permutation, a subset, an inclusion, a logical operation, an OR, an ADD, an XOR, a union, an intersection, a set difference, a symmetric difference a Cartesian product, a power set, a cardinality, an average, a weighted average, a mean, a variance, a range, a trimmed mean, a statistics, a percentile,
a vector operation, a norm, a metric, a vector addition, a vector subtraction, a vector multiplication, a vector division, a dot product, an inner product, an outer product, an arithmetic operation, a mathematical operation, a subspace, a projection, a decomposition, a vector transformation, a change of basis, a rotation, a translation, a vector function, a projection, a principal component, a kernel principal component, an independent component, a neighborhood component, a connected component,
a linear transform, a nonlinear transform, Fourier transform, Laplace transform, Hilbert transform, Sine transform, Cosine transform, Wavelet transform, Hadamard transform, Slant transform, Fast Fourier transform (FFT), discrete cosine transform (DCT), frequency transform, frequency decomposition, inverse transform, time transform, time decomposition, a frequency, a spectrum, a period, a time, a matrix operation, a rank, a transpose, a determinant, a matrix addition, a matrix subtraction, a matrix multiplication, a matrix division, a matrix inverse, a basis vector, a basis, an eigenvalue, and an eigenvector.

26. The method of claim 24, wherein:
each CI has at least one component; and
computing the AF comprises:
    transforming each of the at least one component of each CI of the time series in the sliding time window,
    computing, for each component, a component auto function (CAF) based on the corresponding transformed component of each CI of the time series in the sliding window, and
    computing the AF by aggregating the at least one CAF associated with the at least one component based on weighted averaging.

27. The method of claim 24, wherein computing the IQ-related feature of the AF comprises:
    determining a presence of a class of features comprising the IQ-related feature in the AF in a window of argument of the AF; and
    computing the IQ-related feature of the AF in the window of argument of the AF, wherein determining the presence of the class of features in the window of argument of the AF comprises:
        computing a first regression of the AF in the window of argument of the AF and a first regression error corresponding to the first regression,
        computing a second regression of the AF in the window of argument of the AF and a second regression error corresponding to the second regression,
        computing a function of the first regression error and the second regression error, and
        determining the presence of the class of features in the AF by comparing the function with a threshold, wherein the IQ-related feature in the AF comprises at least one of the following of the AF: a maximum, a minimum, a constrained maximum, a constrained minimum, a local maximum, a local minimum, a first local maximum, a first local minimum, a k-th local maximum, a k-th local minimum, an average, a weighted average, a percentile, a mean, a median, a mode, a trimmed mean, a conditional mean, and an argument associated with another quantity.

28. The method of claim 24, wherein computing the IQ based on the IQ-related feature of the AF comprises:
    determining an IQ-related argument of the AF in the sliding time window corresponding to the IQ-related feature; and
    computing the IQ based on at least one of: the IQ-related feature, the IQ-related argument, and the sliding time window.

29. A monitor of a motion monitoring system, comprising:
a processor;
a memory communicatively coupled with the processor; and
a set of instructions stored in the memory which, when executed, causes the processor to perform:
    obtaining a time series of channel information (CI) of a wireless multipath channel from a receiver of the motion monitoring system, wherein the receiver extracts the time series of CI from a wireless signal received from a transmitter of the motion monitoring system through the wireless multipath channel impacted by a transient motion of an object in a venue,
    monitoring the transient motion of the object based on the time series of CI, and
    triggering a response action based on the monitored transient motion of the object.

30. A receiver of a motion monitoring system, comprising:
a wireless circuitry configured to receive a wireless signal through a wireless multipath channel impacted by a transient motion of an object in a venue, wherein the wireless signal is transmitted by a transmitter of the motion monitoring system;
a processor communicatively coupled with the wireless circuitry;
a memory communicatively coupled with the processor; and
a set of instructions stored in the memory which, when executed, causes the processor to obtain a time series of channel information (CI) of the wireless multipath channel based on the wireless signal, wherein:
    the time series of CI is to be used by a transient motion monitor of the motion monitoring system to monitor the transient motion of the object and trigger a response action based on the monitored transient motion.

* * * * *